(12) United States Patent
Gillette et al.

(10) Patent No.: US 12,317,912 B2
(45) Date of Patent: Jun. 3, 2025

(54) SYSTEMS AND METHODS FOR PROVIDING FOOD INTERVENTION AND TENDERIZATION

(71) Applicant: S2I, LLC, Burley, ID (US)

(72) Inventors: Zane M. Gillette, Burley, ID (US); Thomas D. Gillette, Burley, ID (US); James M. Gillette, Burley, ID (US); C. Brennan Jones, Burley, ID (US); David Haskell, Burley, ID (US); Jared Reid, Burley, ID (US); Victor Rodriguez, Burley, ID (US); Tyler Hepworth, Burley, ID (US); Jonathan E. Hale, Burley, ID (US); Ray D'Alesandro, Burley, ID (US)

( * ) Notice: Subject to any disclaimer, the term of this patent is extended or adjusted under 35 U.S.C. 154(b) by 966 days.

(21) Appl. No.: 17/073,106

(22) Filed: Oct. 16, 2020

(65) Prior Publication Data
US 2021/0084945 A1     Mar. 25, 2021

Related U.S. Application Data

(63) Continuation-in-part of application No. 16/538,556, filed on Aug. 12, 2019, now Pat. No. 11,638,435, (Continued)

(51) Int. Cl.
   *A23B 4/28*         (2006.01)
   *A22C 9/00*         (2006.01)
   (Continued)

(52) U.S. Cl.
   CPC ............ *A23L 3/3589* (2013.01); *A22C 9/001* (2013.01); *A22C 17/0053* (2013.01); *A23B 4/28* (2013.01); *A23B 7/158* (2013.01); *A23L 3/003* (2013.01)

(58) Field of Classification Search
   CPC .......................... A22C 9/001; A22C 17/0053
   See application file for complete search history.

(56) References Cited

U.S. PATENT DOCUMENTS 3,675,567 A     7/1972    Rejsa
4,661,252 A *   4/1987    Burgess ................. B01D 33/11
                                                           210/402
(Continued)

FOREIGN PATENT DOCUMENTS

CA          2995934 A1    12/2016
EP          3297447 A4     5/2018
(Continued)

*Primary Examiner* — Dana Ross
*Assistant Examiner* — Lawrence H Samuels
(74) *Attorney, Agent, or Firm* — David B. Tingey; K. Russell Griggs; Kirton McConkie

(57) ABSTRACT

Systems and methods for providing food intervention, pumping up, and tenderization are discussed. While such systems can include any suitable component, in some cases, they include a needleless spray nozzle head that injects injectate into food without requiring the head to contact the food. In some cases, the head comprises an elongated needleless spray bar that defines multiple internal fluid channels that extend from a first end to a second end of the spray bar. In some cases, the head comprises a manifold system with a first manifold portion at the first end and a second manifold portion at the second end of the spray bar. In some cases, the first manifold portion directs the injectate towards the second end, and the second manifold portion directs the injectate towards the first end of the elongated needleless spray bar. Other implementations are described.

24 Claims, 86 Drawing Sheets

Related U.S. Application Data which is a continuation of application No. 16/120,089, filed on Aug. 31, 2018, now Pat. No. 10,806,166, which is a continuation-in-part of application No. 15/161,005, filed on May 20, 2016, now Pat. No. 10,375,977.

(60) Provisional application No. 62/198,975, filed on Jul. 30, 2015, provisional application No. 62/165,845, filed on May 22, 2015.

(51) Int. Cl.
    *A22C 17/00* (2006.01)
    *A23B 7/158* (2006.01)
    *A23L 3/00* (2006.01)
    *A23L 3/3589* (2006.01)

(56) References Cited

U.S. PATENT DOCUMENTS

| | | | |
|---|---|---|---|
| 5,433,849 A * | 7/1995 | Zittel | B01D 33/72 209/291 |
| 5,451,318 A * | 9/1995 | Moorehead | B01D 21/0021 209/730 |
| 5,591,344 A | 1/1997 | Kenley et al. | |
| 6,014,926 A * | 1/2000 | Tanaka | A23B 4/26 99/533 |
| 6,165,528 A * | 12/2000 | Tanaka | A23B 4/02 452/62 |
| 6,763,760 B2 | 7/2004 | Hansen et al. | |
| 6,976,421 B2 | 12/2005 | Hansen et al. | |
| 7,284,477 B2 * | 10/2007 | Hansen | A23B 4/24 99/534 |
| 7,297,265 B1 * | 11/2007 | Booth | B01D 29/688 210/411 |
| 7,415,428 B2 | 8/2008 | Garwood | |
| 7,837,766 B2 | 11/2010 | Gillette | |
| 7,968,135 B2 | 6/2011 | Hansen et al. | |
| 8,122,819 B2 | 2/2012 | Hansen et al. | |
| 10,375,977 B2 | 8/2019 | Gillette et al. | |
| 10,806,166 B2 | 10/2020 | Gillette et al. | |
| 2002/0017199 A1 * | 2/2002 | Durth | A21B 3/04 99/417 |
| 2003/0005831 A1 | 1/2003 | Hansen et al. | |
| 2003/0167934 A1 * | 9/2003 | Hansen | A23B 4/16 99/279 |
| 2003/0170357 A1 | 9/2003 | Garwood | |
| 2004/0094470 A1 * | 5/2004 | Jackson | B01D 29/58 210/411 |
| 2004/0202756 A1 | 10/2004 | Holzschuh et al. | |
| 2004/0221746 A1 * | 11/2004 | Hansen | A23B 4/20 99/532 |
| 2004/0258799 A1 | 12/2004 | Hansen et al. | |
| 2005/0181720 A1 | 8/2005 | Osborn et al. | |
| 2007/0084791 A1 * | 4/2007 | Jordan | B01D 63/02 210/608 |
| 2008/0044526 A1 | 2/2008 | Hansen et al. | |
| 2009/0249964 A1 | 10/2009 | Petursson | |
| 2009/0277342 A1 | 11/2009 | Jetton | |
| 2010/0310711 A1 * | 12/2010 | Kendell | A23C 3/04 210/411 |
| 2010/0323072 A1 | 12/2010 | Bernstein et al. | |
| 2011/0052765 A1 * | 3/2011 | Lyden | A23L 13/72 99/533 |
| 2011/0070346 A1 | 3/2011 | Spillner et al. | |
| 2013/0098003 A1 * | 4/2013 | Pietraszek | F17C 11/00 60/286 |
| 2013/0231034 A1 * | 9/2013 | O'Neil | A22C 17/08 452/173 |
| 2014/0102811 A1 * | 4/2014 | Danwerth | G01G 11/046 177/1 |
| 2014/0261824 A1 * | 9/2014 | Byers | B24B 57/02 137/896 |
| 2016/0302435 A1 | 10/2016 | Hukelmann | |
| 2016/0338392 A1 * | 11/2016 | Gillette | A23L 3/3589 |
| 2017/0017246 A1 * | 1/2017 | Hornung | G05D 7/0635 |
| 2017/0120263 A1 * | 5/2017 | Needham | G05D 7/00 |
| 2017/0203382 A1 * | 7/2017 | Nicewonger | H05K 7/20272 |
| 2019/0191746 A1 | 6/2019 | Gillette et al. | |
| 2019/0364934 A1 | 12/2019 | Gillette et al. | |

FOREIGN PATENT DOCUMENTS

| | | |
|---|---|---|
| HK | 1253213 A1 | 6/2019 |
| ID | 201812058 A1 | 11/2018 |
| WO | 2016191326 A1 | 12/2016 |
| ZA | 201801926 B | 1/2019 |

* cited by examiner

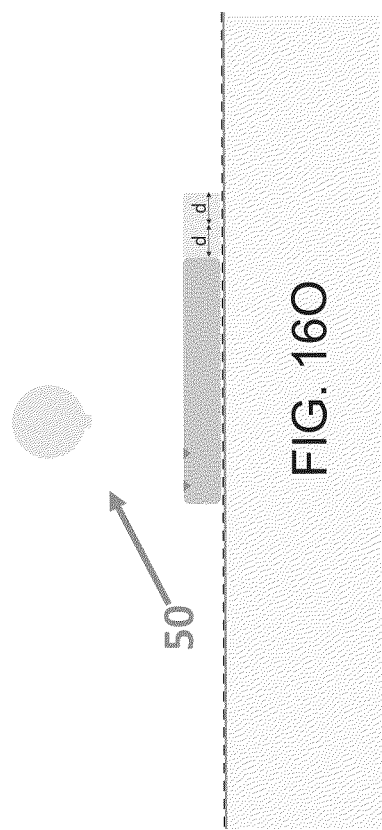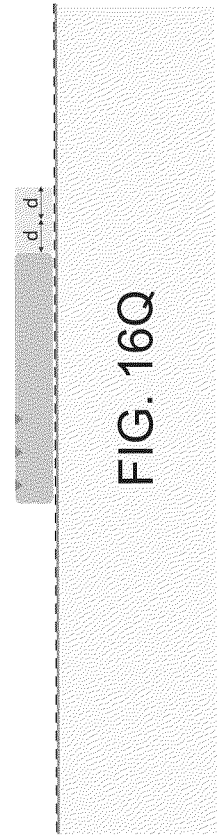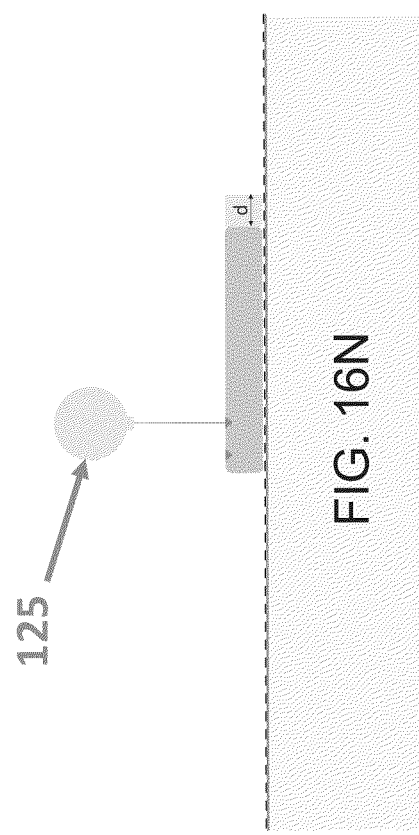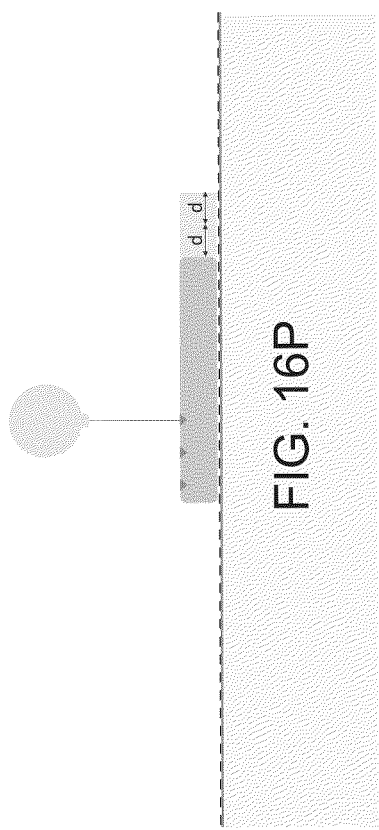

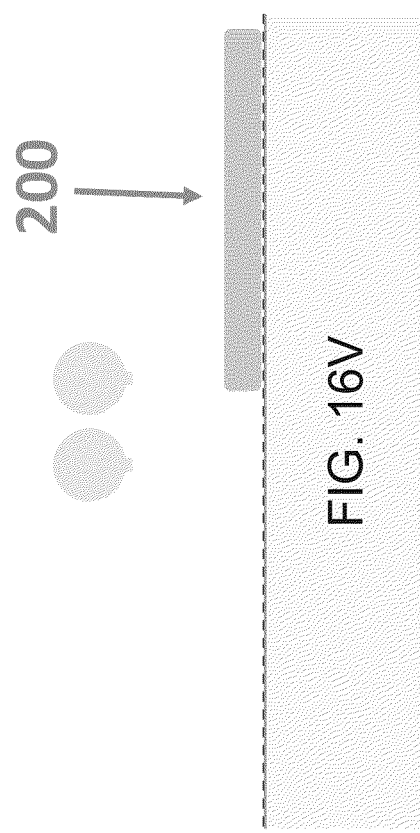
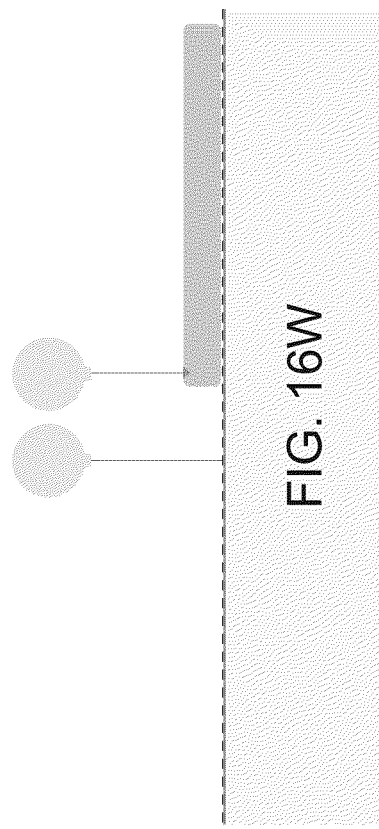
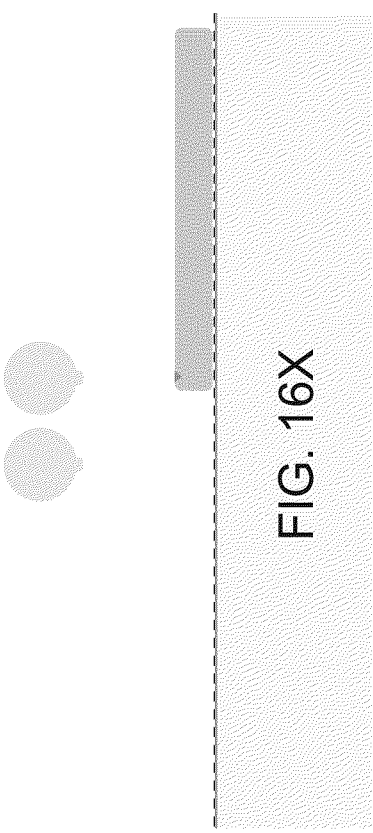
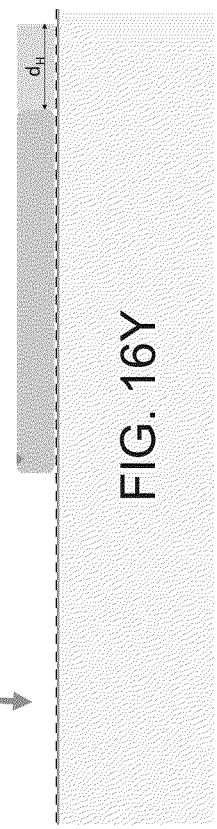

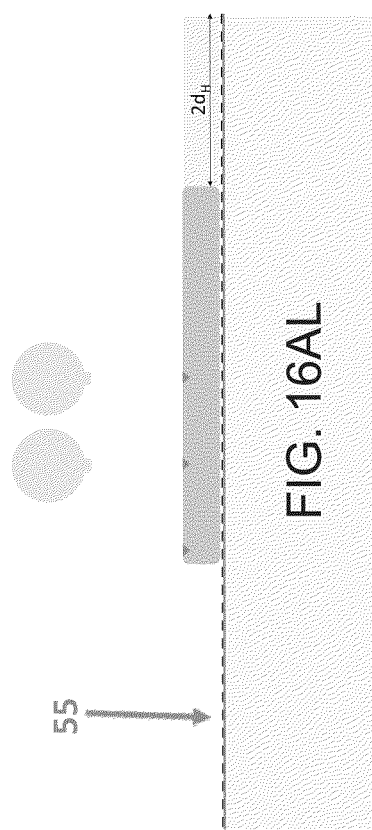
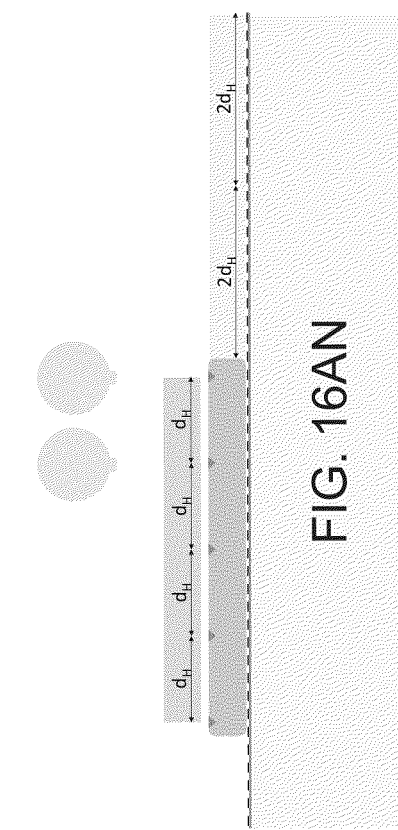
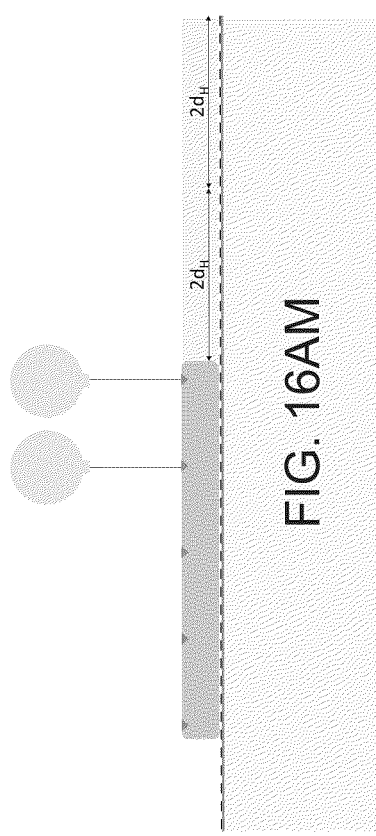
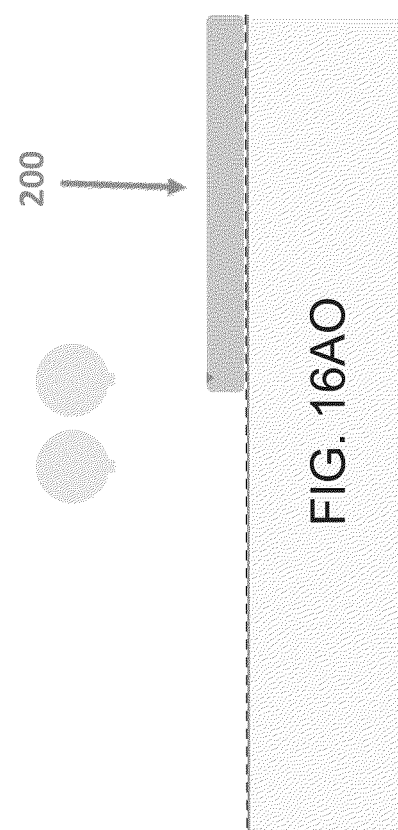

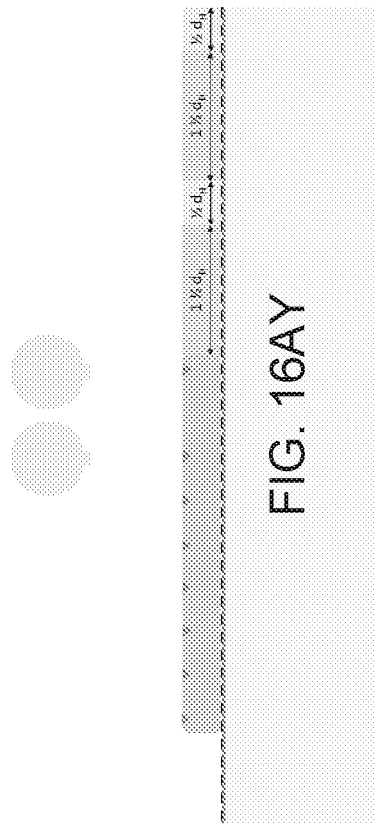
FIG. 16AX
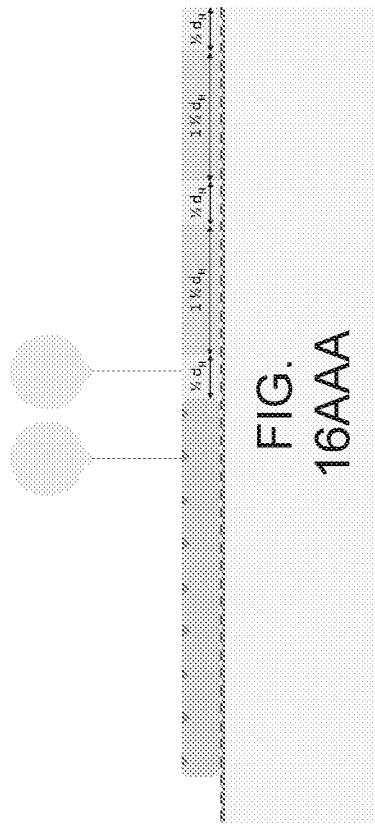
FIG. 16AY
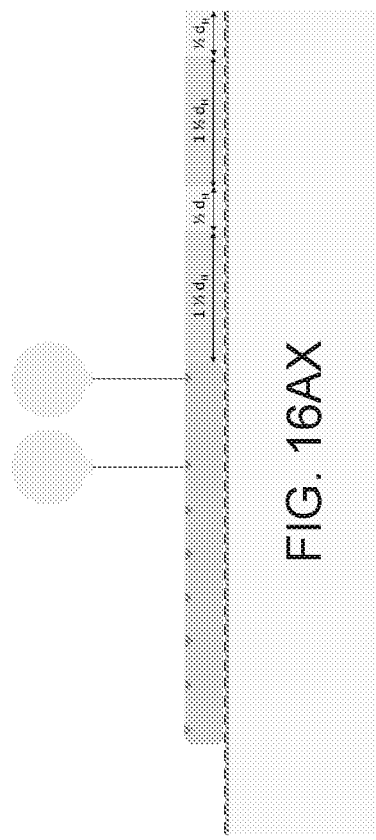
FIG. 16AZ
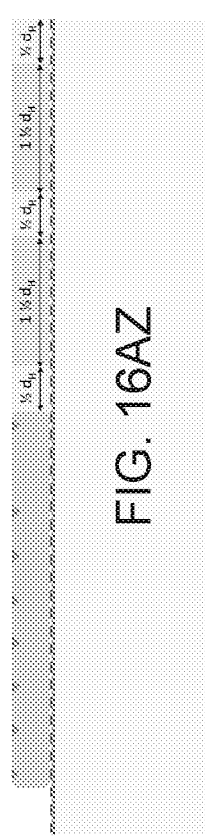
FIG. 16AAA

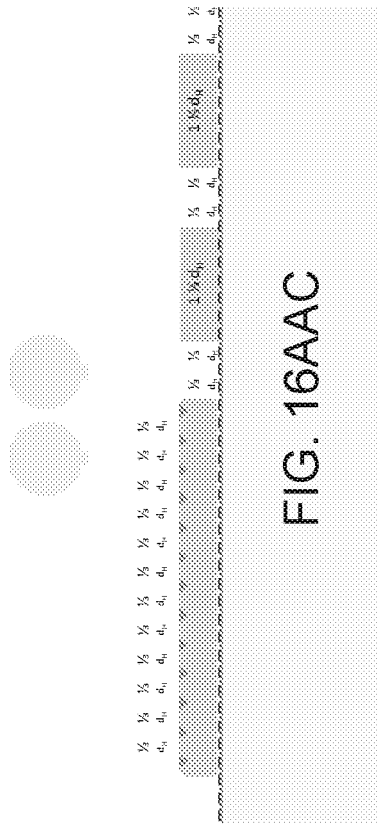
FIG. 16AAB
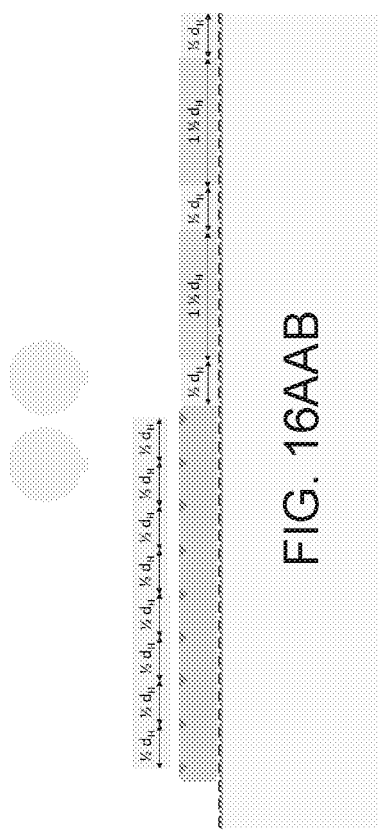
FIG. 16AAC
FIG. 16AAD
FIG. 16AAE

FIG. 16AAF
FIG. 16AAG
FIG. 16AAH
FIG. 16AAI

| Input | Rule | Result | Pattern |
|---|---|---|---|
| $j = 1$ | $x = j - 1$ | $x = 0$ | |
| | $d_S = \dfrac{d_H}{j}$ | $d_S = d_H$ | |
| $n = 3$ | $d_L = d_H \times (n-1) + d_S$ | $d_L = 3d_H$ | $3\,d_H$ |
125
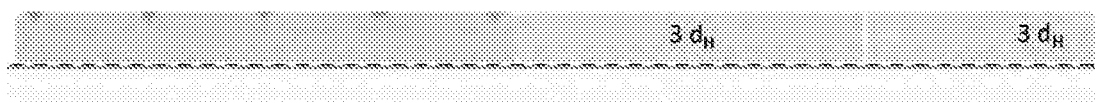
FIG. 16AAJ
$n = 1$ 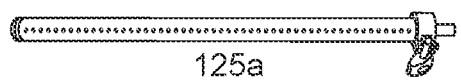
125a
$n = 2$ 
125b
$n = 4$ 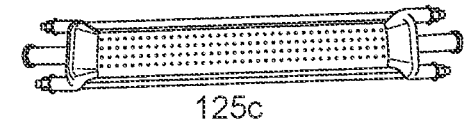
125c
$n = 8$ 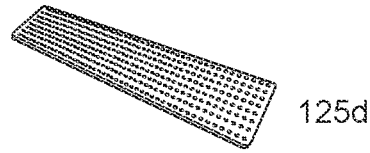
125d
FIG. 16AAK

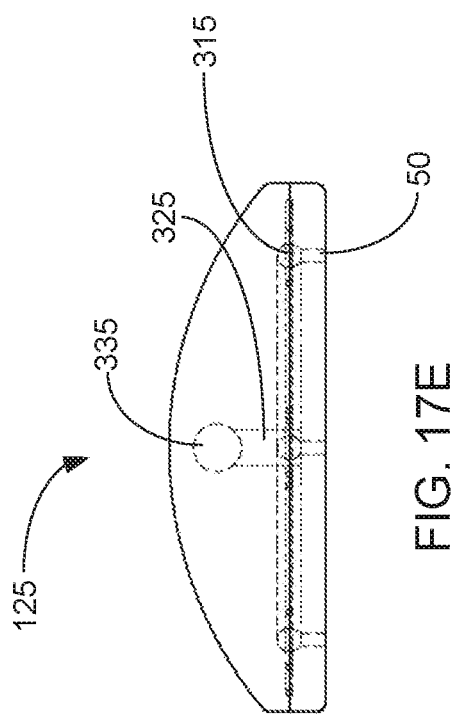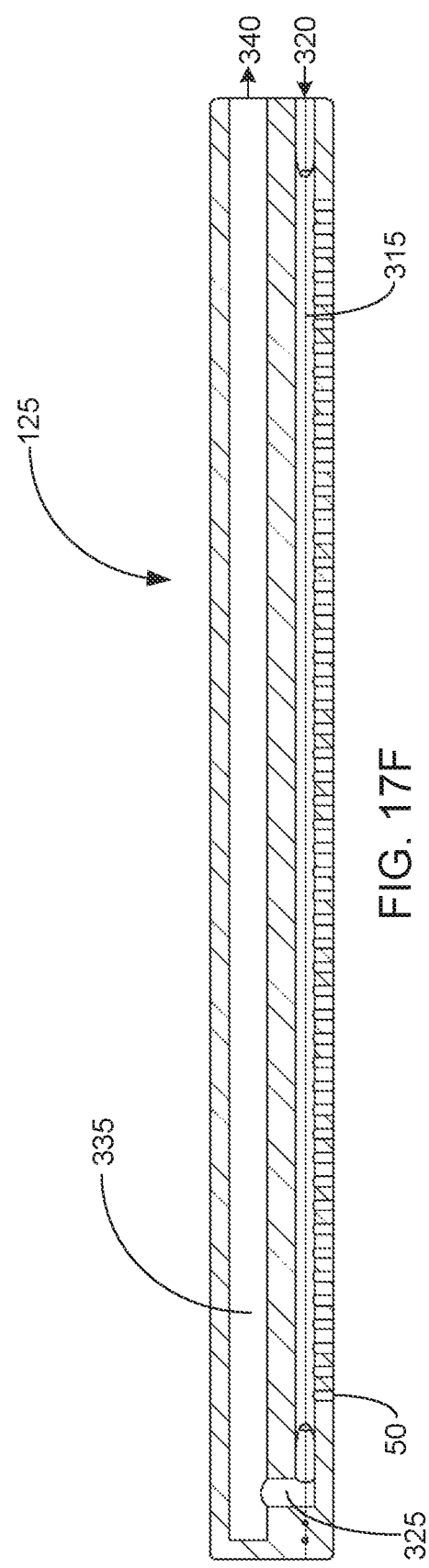

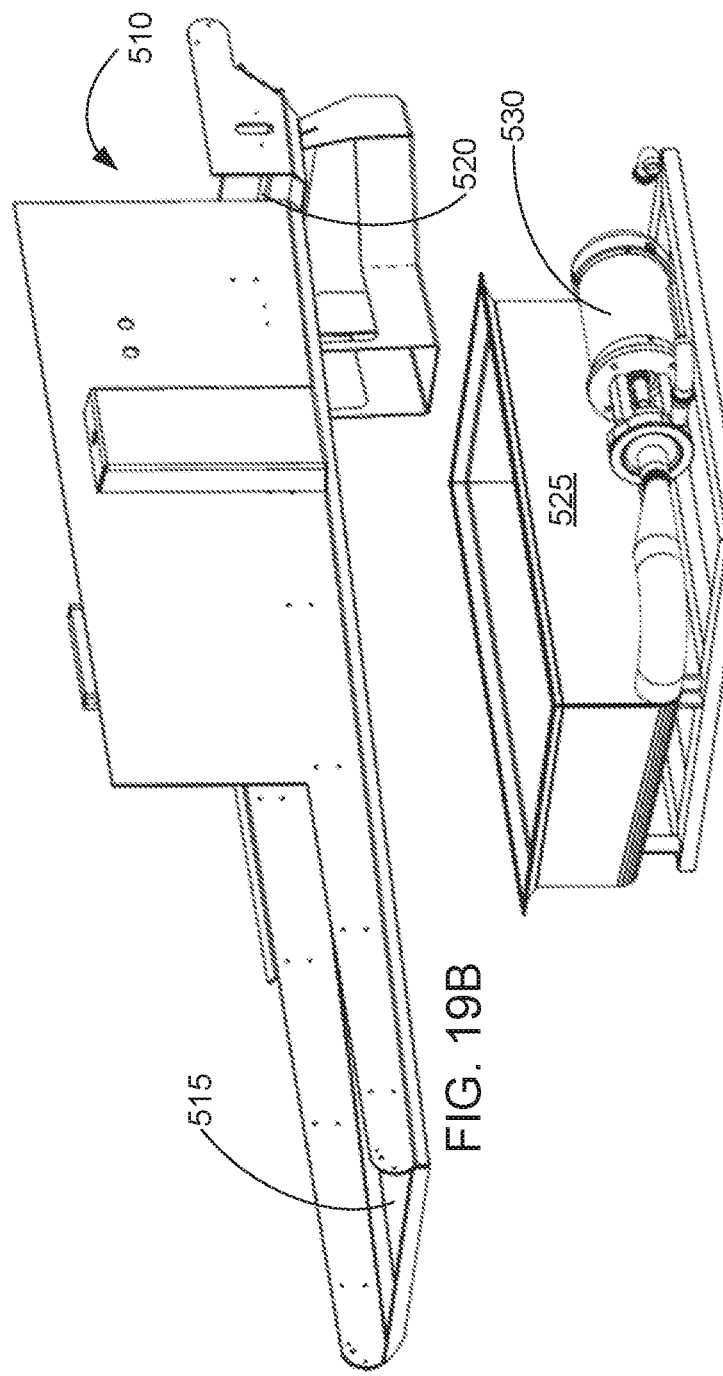

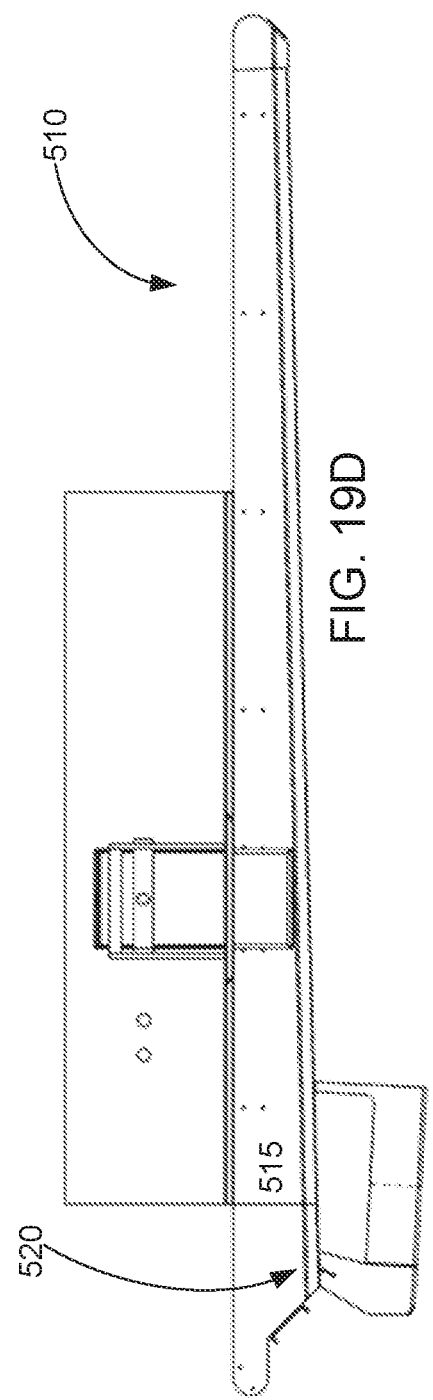

SYSTEMS AND METHODS FOR PROVIDING FOOD INTERVENTION AND TENDERIZATION

RELATED APPLICATIONS

This is a continuation-in-part of and claims priority to U.S. patent application Ser. No. 16/538,556, filed on Aug. 12, 2019, and entitled "SYSTEMS AND METHODS FOR PROVIDING FOOD INTERVENTION AND TENDERIZATION", which is a continuation of and claims priority to U.S. patent application Ser. No. 16/120,089, filed on Aug. 31, 2018, and entitled "SYSTEMS AND METHODS FOR PROVIDING FOOD INTERVENTION AND TENDERIZATION", which claims priority to U.S. patent application Ser. No. 15/161,005 (now U.S. Pat. No. 10,375,977), filed on May 20, 2016, and entitled "SYSTEMS AND METHODS FOR PROVIDING FOOD INTERVENTION AND TENDERIZATION", which claims priority to U.S. Provisional Patent Application Ser. No. 62/165,845, filed May 22, 2015, and entitled "SYSTEMS AND METHODS FOR PROVIDING FOOD INTERVENTION AND TENDERIZATION", as well as to U.S. Provisional Patent Application Ser. No. 62/198,975, filed Jul. 30, 2015, and entitled "SYSTEMS AND METHODS FOR PROVIDING FOOD INTERVENTION AND TENDERIZATION"; the entire disclosures of which are incorporated herein by reference.

BACKGROUND OF THE INVENTION

Field of the Invention

The present invention relates to food treatment. More particularly, some implementations of the described invention relate to systems and methods for injecting (and/or otherwise applying) an injectate to a food product to tenderize, limit microbial growth in (or provide intervention to), color, flavor, freeze, chill, increase a weight of, pump up, provide uptake to, improve a value of, and/or otherwise treat the food product.

Background and Related Art

Some foods (such as some cuts of meat) can have a relatively large amount of connective tissue and can otherwise be relatively hard to cut and tough to chew. Additionally, many foods can contain (or be covered with) bacteria, viruses, parasites, fungi, protozoa, algae, microbes, debris, and/or other pathogens that can make their consumption undesirable and even dangerous. In one example of how some foods become contaminated with such pathogens, as many meats, cheeses, types of produce, and other foods are cut before being sold, the exposed surfaces of some such foods can come in contact with and/or otherwise become contaminated with bacteria, fungi, microbes, and/or other pathogens. In another example, as many foods are grown, raised, and/or harvested, they are exposed to environmental factors (such as feces; environmental parasites, fungi, protozoa, and other contaminants; dirty hands, equipment, and machinery; and a variety of other pathogen sources) that cause the foods to become contaminated.

In an effort to make some relatively tough foods more readily edible and even desirable and/or to reduce pathogen contamination in some foods, many people have developed a variety of food treatment techniques. For instance, in order to tenderize some foods, several techniques exist for providing mechanical tenderization (such as pounding meat with a meat mallet, vacuum tumbling, or otherwise), thermal tenderization (such as slow cooking meat at a relatively low temperature), and enzymatic tenderization (such as marinating a piece of meat in one or more enzymes that are configured to break down collagen and other connective tissue). Furthermore, to reduce pathogen contamination in food, many practices have been developed, including the practice of exposing food to ionizing radiation, exposing food to one or more preservatives, processing food with a retort, using pressure cooking to treat food, treating food through high pressure processing (or HPP), cooking foods until they are "well done", and washing foods with a decontaminant.

Although current systems and methods for tenderizing and/or decontaminating foods may provide a variety of benefits, such systems and methods are not necessarily without their shortcomings. In one example of such a shortcoming, while some methods for tenderizing meat do break down connective tissues in the meat, such methods can further break down, smash, cut, puncture, dissolve, and otherwise leave the meat with an unappetizing appearance, texture, taste, and/or other characteristic. In another example, in some instances in which one or more needles are stabbed into a piece of food to allow a tenderizing agent to be injected into the food, the needles can be a means of passing contamination to the food they are used to tenderize. Additionally, in this example, the needles can be stabbed into bones, where they can break off pieces of the bones, or become plugged with the bones, tendons, and/or other connective tissue. Similarly, in some methods for decontaminating foods, the foods are: visibly damaged (for instance, through the use of the needles discussed above), only partially decontaminated (for instance, cleaned on the outside but not on the inside), subjected to radiation treatments, and/or are otherwise cleaned in a manner that lessens the food's appeal to consumers.

Thus, while systems and methods currently exist that are used to tenderize, pump up, and/or decontaminate foods, challenges still exist, including those listed above. Accordingly, it would be an improvement in the art to augment or even replace current techniques with other techniques.

SUMMARY OF THE INVENTION

The present invention relates to systems and methods for treating food products. More particularly, some implementations relate to systems and methods for injecting (and/or otherwise applying) an injectate to a food product to: tenderize, limit microbial growth in or on (or provide intervention to), color, flavor, freeze, chill, preserve, increase a weight of, modify a density of, improve an aesthetic appearance of, change a texture of, change a moisture content of, pump up, change a nutrient content of, and/or to otherwise treat the food product.

While the described systems and methods can include any suitable component, in some cases, they include an injectate reservoir; a filter; a pump (or an injection pump) configured to force injectate from the injectate reservoir through the filter, through a pressure regulator, and to a nozzle (e.g., and/or a set of nozzles on a nozzle head) that is configured to inject injectate into a food product without having the nozzle contact the food; and a nozzle dwell time valve (also referred to as a shot valve or injection valve) that is configured to selectively open and close to regulate when and how much of the injectate that passes through the filter is forced out of the nozzle.

In some cases, the described system optionally includes at least one of: a chiller configured to cool injectate in the reservoir, a sensor configured to determine a distance between the nozzle and the food item (or vice versa), an actuator and/or any other suitable mechanical movement device configured to move the nozzle into proximity (e.g., vertically, horizontally, and/or in any other suitable manner) with the food product (and/or to move the food product into proximity with the nozzle), and/or a computer processor (e.g., a proportional-integral-derivative controller (PID), programmable logic controller (PLC), a processor, a microprocessor, and/or any other suitable processor) that controls an amount of injectate sprayed from the nozzle.

In some other implementations, the described food product treatment system comprises at least one of: an injectate reservoir; a filter; a pump configured to force injectate from the injectate reservoir through the filter; an injection nozzle, a pulsation nozzle, a continuous cleaning nozzle, and/or any other suitable spray nozzle that is configured to inject the injectate into (and/or to otherwise apply the injectate to) a food product without requiring the spray nozzle (or a portion thereof, such as a needle) to contact the food product; a valve that is configured to selectively open and close to regulate when and how much of the injectate is sprayed from the nozzle; a conduit system configured to pass the injectate from the reservoir, through the filter, and out of the spray nozzle; a chamber that is configured to contain the food product as the injectate is sprayed from the spray nozzle into the food product; and/or a demister that is configured to draw water vapor from within the chamber.

In still other implementations, the described systems include an injectate reservoir configured to cool injectate disposed therein (e.g., via one or more glycol chillers, chilled conduits, refrigeration systems, liquid cooling systems (such as liquid-to-liquid, closed-loop dry, closed-loop dry system with trim cooling, open-loop evaporative, closed-loop evaporative, chilled-water, fans, and/or other liquid-cooling systems), and/or any other suitable cooling system); a filter; a spray nozzle that is configured to inject injectate into a food product without requiring a portion of the spray nozzle to contact the food product; a pump configured to force the injectate from the injectate reservoir through the filter and to the spray nozzle; a valve that is configured to selectively open and close to regulate when and how much of the injectate is forced out of the nozzle; a chamber that is configured to contain the food product as the injectate is sprayed from the spray nozzle into the food product; a first pressure sensor configured to measure pressure of the injectate prior to passing the valve; a second pressure sensor configured to measure pressure of the injectate after passing the valve and before being forced from the spray nozzle; a demister that is configured to draw vapor from within the chamber; and/or a computer processor, wherein the processor is configured to control when and how much of the injectate is forced out of the nozzle.

In some implementations, a set of nozzles are disposed at a nozzle head in the system. While such a nozzle head can have any suitable component or characteristic that allows it to apply (e.g., inject) injectate to a food product, in some implementations, the head comprises one or more channels, orifices, jets, and/or other conduits that direct injectate (and/or any other suitable fluid) to the nozzles, with one or more optional risers extending from, and in fluid communication with, the channels. In this regard, the risers can comprise any suitable channel, recess, tubing, piping, and/or other feature that allows one or more gases (e.g., air) that are introduced into the nozzle head with the injectate to rise above the injectate in the channel and be vented out (e.g., to: ambient air, the injectate tank, a drain, etc.) of the nozzle head without being forced through one or more nozzles. Additionally, while the risers can be disposed in any suitable portion of the heads, in some implementations, they are disposed at a far end of the head (e.g., near an exit end or otherwise). Accordingly, in some implementations, by allowing air to vent from one or more channels in the nozzle head, the nozzle head is configured to deliver a consistent and predicable amount of injectate.

The nozzle head can comprise any suitable characteristic. Indeed, the nozzle head and/or nozzle manifold can comprise any suitable number of nozzles, in any suitable configuration. In some cases, for instance, the nozzle head: comprises a single row of nozzles, comprises multiple rows of nozzles, receives injectate from a single inlet, receives injectate from multiple inlets (e.g., inlets on opposite sides of the nozzle and/or in any other suitable location), is configured to vibrate to clean the head, is configured to be self-cleaning, is configured to be released by hand (e.g., without requiring the use of a tool), and/or otherwise comprises any characteristic that allows it to apply injectate to one or more food products. Indeed, in some implementations, the nozzle head comprises multiple rows of nozzles, and the nozzle head receives injectate from two substantially opposite portions of the head (e.g., two or more opposite sides, adjacent sides, top portions, bottom portions, and/or any other suitable portions) to increase injectate flow, to increase the response time needed for the injectate to be applied through the nozzles after one or more corresponding valves are opened, and/or for any other suitable purpose.

While the nozzle head can have any suitable characteristic, in some cases, it comprises an elongated member defining a plurality of channels that extend along a length of the member, with multiple nozzles (which are disposed on one side of the elongated member) being in fluid communication with a corresponding channel. In some cases, the nozzle head further comprises one or more endcaps that each have an injectate inlet and a cavity that is configured to act as a manifold and to direct injectate into the plurality of channels.

The described systems and methods can include any suitable number of nozzle heads and/or nozzle manifolds that allow the system to function, including, without limitation, 1, 2, 3, 4, 5, 6, 7, 8, 9, 10, or more. Indeed, in some cases, the system includes a single nozzle head. In some other cases, however, the system comprise 2, 3, 4, 5, or more nozzle heads. In some cases, a single nozzle head is sized to extend across a width of a food product transport (e.g., conveyor belt), while in some other cases, multiple nozzle heads are disposed end to end and/or side by side so as to extend across a width of the food product transport. Additionally, while each of the nozzle heads or manifolds can comprise one nozzle, in some implementations, each nozzle head comprises more than one nozzle (e.g., between about 2 and about 10,000 nozzles, or any subrange thereof). Indeed, in some cases, a nozzle head comprises between about 20 and about 600 nozzles (e.g., about 400 nozzles±50 nozzles).

In some implementations, one nozzle head is configured to spray and/or otherwise apply injectate on or to one side of a food product. In some other implementations, the described system comprises at least two nozzle heads that are configured to apply injectate onto, into, and/or through multiple different surfaces of a food product (e.g., one or more top surfaces, bottom surfaces, first side surfaces, second side surfaces, internal surfaces, and/or any other suitable portion of the food product). In some such implementations, the described system comprises at least a first nozzle head that is configured to spray a first surface (e.g., a top surface) of a food product, and at least a second nozzle head that is configured to spray a second surface (e.g., a bottom surface) of the food product. In this regard, the two nozzle heads (or two or more sets of nozzle heads) can inject and/or otherwise apply injectate to the food product in any suitable manner, including, without limitation, as the food product is hung and moves past the nozzle heads (e.g., via one or more meat hooks, clips, baskets, belts, chains, tracks, and/or any other suitable method); as the nozzles are moved past the food product; as the food product moves past the nozzles on a conveyor belt, a spinning platform, a moving surface, belt, chain, and/or any other suitable food product transport (or food transport system, food transport, or variations thereof); and/or in any other suitable manner.

In some implementations in which the described system comprises at least two nozzle heads to apply injectate to two different portions of food product, the first nozzle head is disposed on a first side of a food transport (e.g., a top surface of a conveyor belt, a rotating table, a moving surface, and/or any other suitable surface that is configured to support the food product), while the second nozzle head is disposed on a second, opposite side of the food transport. In some such implementations, the second nozzle head is configured to spray and/or otherwise force injectate through the food transport. For instance, in some cases, the food transport comprises a wire belt, a chain conveyor belt, a pintle chain, a perforated conveyor belt (or a conveyor belt having openings in it), a perforated rotating surface (or a rotating surface having openings in it), a mesh conveyor, a mesh surface, a weave belt, and/or any other suitable food transport that allows the second nozzle head to spray (and/or otherwise apply) injectate through the food transport and to a food product resting on the transport.

In some implementations in which the food transport comprises a belt (e.g., a conveyor belt and/or any other suitable belt system), the belt is configured to snake, bend, and/or otherwise be disposed under and/or to a side of the first and/or second nozzle heads. In some other implementations, in which the food transport comprises two belts (and/or other suitable food transportation mechanisms), the second nozzle head is configured to spray injectate in between the two food transports and then into (and/or onto) the food product.

In some implementations, one or more nozzle heads are configured to be moved toward and/or away from a food product. In this regard, the nozzle heads can be moved in any suitable manner, including, without limitation, by being moved manually, automatically, and/or in any other suitable manner. In some cases, however, at least one nozzle and/or nozzle head comprising multiple nozzles is coupled to one or more linear actuators, linear bearings, pneumatic actuators, hydraulic actuators, motors, robotic arms, movable frames, supports, and/or other suitable actuators and/or supports that are configured to automatically and/or manually move the nozzle (e.g., based on a programmatic setting, the size and/or position of a food product as determined by one or more sensors and/or users, one or more characteristics of the injectate and/or the food product, and/or any other suitable factor).

Although some implementations of the described system are configured to move one or more nozzle heads by themselves, in other implementations, the system is configured to move one or more injection manifolds, valves, risers, sensors, framework, and/or any other suitable component with the nozzle heads. Indeed, in some implementations, one or more valves are maintained in relatively close proximity with the nozzle head (e.g., by being moved with the nozzle head) to provide increased response time (e.g., to have injectate spray through the nozzle almost immediately when a valve is opened), to cause the pressure and spraying times to be substantially constant at each of the nozzles across a relatively long nozzle head, and to otherwise increase overall system throughput (e.g., by speeding the injection process, by making injections consistent, by allowing for longer nozzle heads, etc.).

In some implementations, one or more nozzle heads and/or pumps are configured to be selectively interchangeable with one or more other nozzle heads and/or pumps (e.g., to readily change a throughput of the system). Accordingly, in some cases, damaged heads and/or pumps can be quickly changed. Similarly, in some instances, by allowing the pump and/or nozzle head to be readily switched out, the capacity and processing capability can be easily modified (e.g., increased or decreased based on need).

Although such a system can comprise any suitable component, in some cases, it includes a main chassis that includes a food product transport (e.g., a conveyor belt); a first needleless spray nozzle head that is releasably coupled to the main chassis and that is configured to spray and inject injectate into a food product on the food product transfer device without requiring the needleless spray nozzle head to contact the food product; and a first pump that is releasably coupled (e.g. fluidly, electrically, signally, and/or mechanically coupled) to the main chassis and/or one or more other components of the system; wherein the first needleless spray nozzle head and the first pump are configured to inject the injectate at a first rate, and wherein the first needleless spray nozzle head and the first pump are configured to be readily released from the main chassis and to be replaced with a second needleless spray nozzle head and a second pump that are configured to inject the injectate at a second rate that is different than the first rate.

In some cases, the first pump in such a system is coupled to a first wheeled skid (and/or any other suitable object) that is optionally configured to selectively couple to, and decouple from, the main chassis. Similarly, in some cases, the second pump is also configured to be coupled to a skid (e.g., the same or another skid). Thus, in some cases, one pump and skid can easily be slid out, and another pump and skid can easily be slid into its place. Additionally, in some such cases, the system also includes a first coupler (e.g., wingnut system, lever-activated clamp, hand-engaged threaded coupling mechanism, quick connect fluid coupler, quick-connect electrical plug, plug, socket, and/or any other suitable coupler) that is configured to selectively couple (e.g., fluidly, electrically, signally, and/or mechanically) the first pump to, and to selectively decouple the first pump from, the main chassis and/or any other suitable portion of the system without requiring the use of a tool.

In some such cases, the second pump and second needleless spray nozzle head allow the needleless spray nozzle system to inject roughly an equal amount of the injectate into each individual food product, while processing between 1.1 and 50 times (or any subrange thereof) as much food product in a first time period than possible when the system is only equipped with the first pump and the first needleless spray nozzle head. For instance, in some cases, the second pump and/or nozzle head have a larger capacity than do the first pump and nozzle head. In some cases, such a system further includes one or more electronic controls that are configured to add a variable frequency drive for the first and/or second pump.

In accordance with some implementations, the described system is configured to ensure that injectate that is sprayed through the nozzle head is not recirculated through the system. In some other implementations, however, the described system is configured to collect injectate that has been sprayed and/or otherwise released from one or more nozzle heads and to then recirculate that injectate back through the nozzle heads. While such a recirculation process can be accomplished in any suitable manner, in some implementations, after the injectate is sprayed, it is collected in one or more fluid collectors, filtered (e.g., via one or more screens, sieves, colanders, paper filters, synthetic filers, meshes, catches, wedge wire rotary drum filters with or without a scraper, wedge wire canisters (and/or other wedge wire filters), mesh canisters, multi-stage filtration systems, and/or other filters or filtering mechanisms), and/or recycled through the system. Indeed, in some implementations, once relatively large particles and/or other masses have been filtered out of the injectate (e.g., via one or more wedge wire canisters), the injectate is passed through one or more blenders, shear blenders, stator pumps, rotor-stator pumps, stators and rotors, positive displacement pumps, pumps, macerators, colloidal mills, and/or other mechanisms that are configured to homogenize the injectate and/or to reduce the size of any particulates in the injectate. In some such implementations, after the injectate has been homogenized, it is pumped and/or otherwise introduced back into the system (e.g., directly and/or indirectly).

Indeed, as mentioned above, some implementations of the system comprise a multi-stage filtration system. In such implementations, the system can include any suitable component. For instance, in some cases, the system includes a needleless spray nozzle head that is configured to spray and inject injectate into a food product without requiring the needleless spray nozzle head to contact the food product; a recipient that is configured to receive the injectate that is injected by the needles spray nozzle head and that is not retained within the food product; a pump that is configured to recirculate the injectate that is received within the recipient from the recipient to the needleless spray nozzle head; and a multi-stage filtration system that includes: a first stage of the multi-stage filtration system having a wedge wire rotary drum filter with a scraper and/or any other suitable filter having a suitable pore size (e.g., between about 301 µm and about 500 µm, or within any subrange thereof, such as about 400 µm±50 µm); and a second stage of the multi-stage filtration system comprising a first wedge wire filter (e.g., a wedge wire canister and/or any other suitable wedge wire filter) having a pore size that is less than about 150 µm. In some implementations, the first wedge wire filter comprises a pore size of between about 50 µm and 150 µm (or within any subrange thereof).

In some cases in which the system comprises a multi-stage filtration system, the filtration system further includes a second wedge wire filter (e.g., a wedge wire canister and/or any other suitable wedge wire filter) that is disposed between the first stage and the second stage. In some cases, the filtration system also includes one or more redundant filters (e.g., wedge wire canister filters and/or any other suitable filters), wherein the redundant filter (and/or other suitable filter) is disposed in a parallel fluid path with the first wedge wire filter (e.g., a wedge wire canister filter) and/or any other suitable filter.

In some cases, the multi-stage filtration system further includes a redundant canister filter (or any other suitable filter or filters), wherein the redundant canister filter is disposed in a duplex configuration with the first wedge wire filter (e.g., a wedge wire canister filter and/or any other suitable filter). Additionally, in some cases, the filtration system includes a pressure sensor that is configured to measure a differential pressure across a filter to determine when the filter is clogged. Moreover, in some cases, the multi-stage filtration system comprises multiple fluid branches, wherein the wedge wire canister filter (or any other suitable filter) is coupled to a first fluid branch, wherein a redundant canister filter (or any other suitable filter) is coupled to a second fluid branch, and wherein the system is configured to switch fluid flow from the first fluid branch to the second fluid branch when the pressure sensor determines that the wedge wire canister filter (or any other applicable filter) is clogged.

In some cases, the multi-stage filtration system includes a backflush system (e.g., an automatic and/or manual backflush system) that is configured to backflush the wedge wire canister filter (and/or any other suitable filter). Moreover, in some cases, the filtration system includes a second wedge wire canister filter (and/or any other suitable filter), wherein the first wedge wire canister filter (or other filter) comprises a first dump valve and the second wedge wire canister filter (or other filter) comprises a second dump valve, and wherein the first and second dump valves are independently controllable such that the first dump valve can be selectively closed while the second dump value is selectively opened and vice versa. Moreover, although the multi-stage filtration system can be fed in any suitable manner, in some cases, the filtration system is disposed below the recipient so as to be configured to be gravity fed by the recipient.

In some cases, the system is configured to automatically modulate injectate pressure to reduce and/or eliminate pressure dips and spikes. In this regard, such pressure modulation can be accomplished in any suitable manner, including without limitation, through the use of one or more PIDs, PLCs, and/or other processors; pressure regulators; automated valves; variable pumps; and/or any other suitable component. Indeed, in some cases, the system includes a needleless spray nozzle system that includes: a needleless spray nozzle head that is configured to spray and inject an injectate into a food product without requiring the needleless spray nozzle head to contact the food product; an injectate tank; a pump that is configured to pump the injectate from the injectate tank to and through the needleless spray nozzle head; an injection valve that is configured to selectively open and close to respectively allow the injectate to flow through, and to prevent the injectate from flowing through, the needleless spray nozzle head; a pressure regulator valve; and a processor that is configured to preemptively actuate the pressure regulator valve prior to the injection valve at least one of opening and closing. Thus in some case, when the injector valve opens, the regulator is already on its way to being tightened so that delay is eliminated and the pressure spikes are mitigated.

In some cases, in order to help modulate pressure, the PID, PLC, and/or any other suitable processor is configured to modify a speed of the pump prior to the injection valve at least one of opening and closing so as to keep a pressure of the injectate being released by the needleless spray nozzle head substantially constant as the injectate is released. In some cases, the system further includes a sensor that is configured to measure a flow characteristic of the injectate as it is injected from the needleless spray nozzle head; and a PID and/or other processing unit that is configured to received feedback from the sensor, wherein the PID and/or other processing unit is configured to use the feedback received from the sensor to modify operation of at least one of: (i) the pump and (ii) the pressure regulator to keep a pressure of the injectate being released by the needleless spray nozzle head substantially constant as the injectate is released.

In some cases, the described system is optionally configured to monitor a pluggedness (or cloggedness) of one or more nozzles and/or nozzle heads. While the system can be configured in any suitable manner that allows it perform such a function, in some cases, the needleless spray nozzle system includes: a needleless spray nozzle head that is configured to spray and inject an injectate into a food product without requiring the needleless spray nozzle head to contact the food product; a pump that is configured to pump the injectate to and through the needleless spray nozzle head, the injection pump having a first inlet and a first outlet; a pressure regulator valve having a second inlet and a second outlet; a first flowmeter disposed adjacent to the first inlet of the pump; a second flowmeter disposed adjacent to second outlet of the pressure regulator valve; and a processor, wherein the processor is configured to derive a difference in readings from the first and second flowmeters to determine a cloggedness (or pluggedness) of the needleless spray nozzle head. While the first and second flowmeters can comprise any suitable type of flowmeters, in some cases, the first and second flowmeters each include a low pressure magnetic flowmeter. Thus, in some cases, the system is configured to determine the cloggedness of the needleless spray nozzle head without the use of a flowmeter on a high pressure conduit that feeds the injectate from the pump to the needleless spray nozzle head.

In some cases, the described system is configured to reduce recirculation of injectate. While this can be accomplished in any suitable manner, in some cases, the described needleless spray nozzle system includes: a needleless spray nozzle head that is configured to spray and inject an injectate into a food product without requiring the needleless spray nozzle head to contact the food product; a pump that is configured to pump the injectate to and through the needleless spray nozzle head; an injectate recipient; a drain line from the pressure regulator valve to the injectate recipient; a pressure regulator valve; a flowmeter that is configured to track an amount of the injectate that flows from the pressure regulator valve, through the drain line, and to the injectate recipient; and a PID, PLC, and/or any other suitable processor that is configured to dynamically modulate a speed of the pump based on a flow rate of the injectate through the drain line. In some such cases, the processor further ensures that the injection valve open and injection valve closed are treated as being separate states. In this regard, the processor is configured (in some cases) to automatically run the pump at a first speed when the injection valve is open and at a second speed when the injection valve is closed, the second speed being slower than the first speed. Moreover, in some cases, the processor is configured to switch from the valve closed state to the valve open state a little early (e.g., when the pump is running at the first speed) to ensure there is no period where the pump is not delivering a sufficient amount of the injectate to maximize flow through the needless spray nozzle head.

In some cases, the operating parameters of the system are further configured to provide a substantially even dispersion of injectate and/or to allow more injectate to be retained within a food product. While this can be accomplished in any suitable manner, in some cases, the system is configured to spray injectate into food products at a pressure that is between about 100 psi and about 300 psi (or within any subrange thereof). Additionally, in some cases, the system is configured to spray the injectate for a relatively long dwell time (e.g., between about 1 second and about 60 seconds or within any subrange thereof, such as for between about 2 and about 10 seconds).

In addition to the aforementioned characteristics, the described systems and methods can be modified in any suitable manner. Indeed, in some cases, after a food product receives injectate from a nozzle, the described method is further configured to pass the food product through a bath, cascade, waterfall, curtain, dip, spray, powder, stream, breading, rub, coating, and/or other application method that is configured to coat, bread, fill holes in, color, preserve, flavor, and/or otherwise treat the food product.

While the methods and processes of the present invention may be particularly useful for tenderizing, pumping up, and/or decontaminating food products, those skilled in the art will appreciate that the described systems and methods can be used in a variety of different applications and in a variety of different areas of manufacture. For instance, the described systems and methods can be used to provide a desired color, flavor, shelf-life, aroma, palatability, presentation, appearance, value, weight, pump up, size, density, texture, nutrient content, mineral content, moisture content, temperature, coating, injectate, and/or other characteristic to a food product.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the invention will be rendered by reference to specific embodiments thereof, which are illustrated in the appended drawings. Understanding that the drawings are not necessarily drawn to scale or in proper proportion, and that the drawings depict only typical embodiments of the present invention and are not, therefore, to be considered as limiting the scope of the invention, the present invention will be described and explained with additional specificity and detail through the use of the accompanying drawings in which:

FIG. 1O illustrates two graphs, with the upper graph plotting injection pressure and the lower graph plotting regulator opening in accordance with a reactive pressure regulation embodiment;

FIGS. 16F-16AAK illustrate some embodiments of patterns of food product movement for use with various nozzle head configurations and various embodiments of the system;

FIGS. 17C-17F each illustrate a different cross-sectional view of a representative embodiment of the spray nozzle head;

FIGS. 19B-19E illustrates various views of various portions of an injectate reclamation system in accordance with a representative embodiment;

DETAILED DESCRIPTION OF THE INVENTION

Figure 1A:
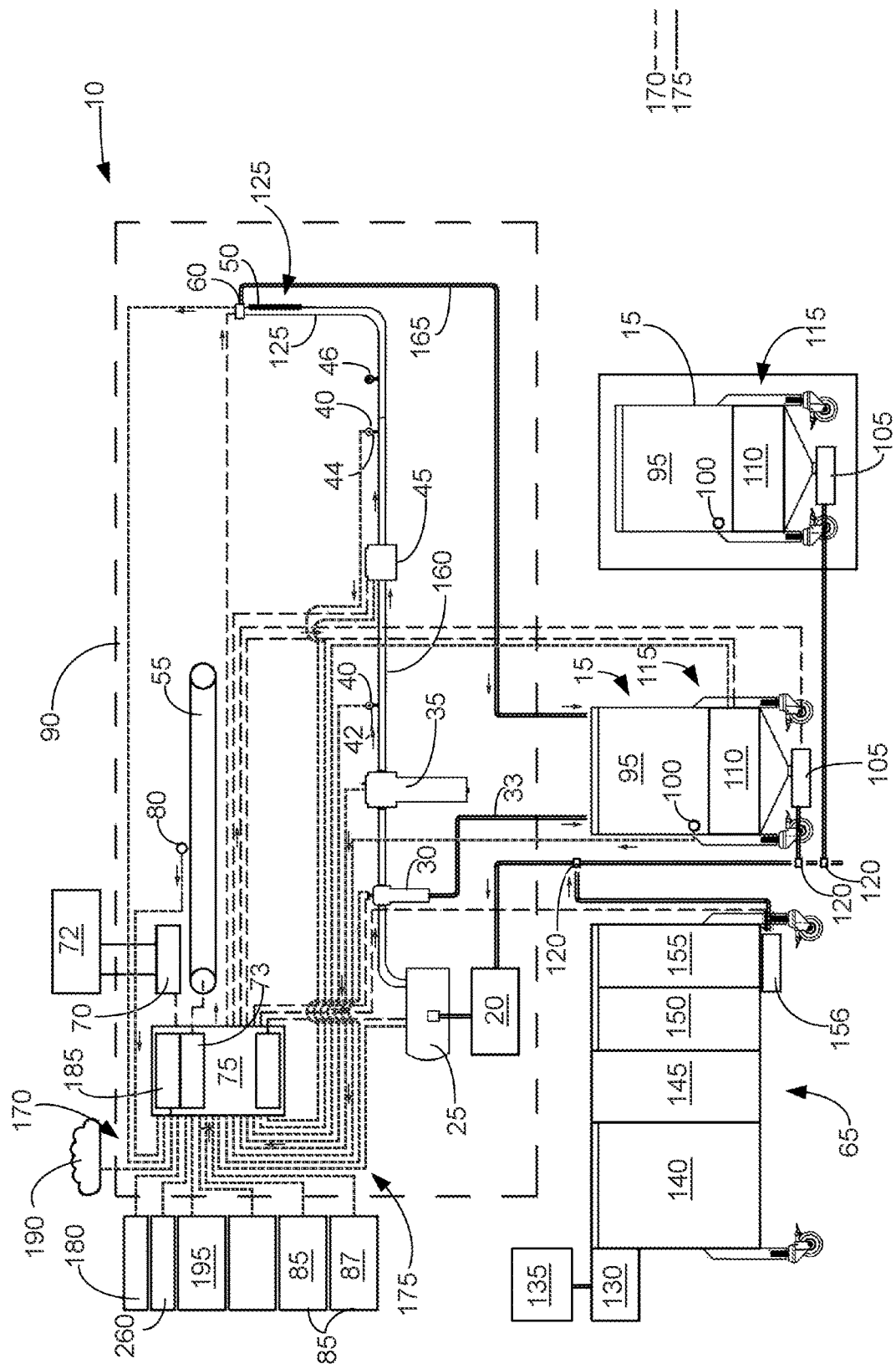
FIG. 1A illustrates a schematic view of a food treatment system in accordance with a representative embodiment of the invention.
Figure 1B:
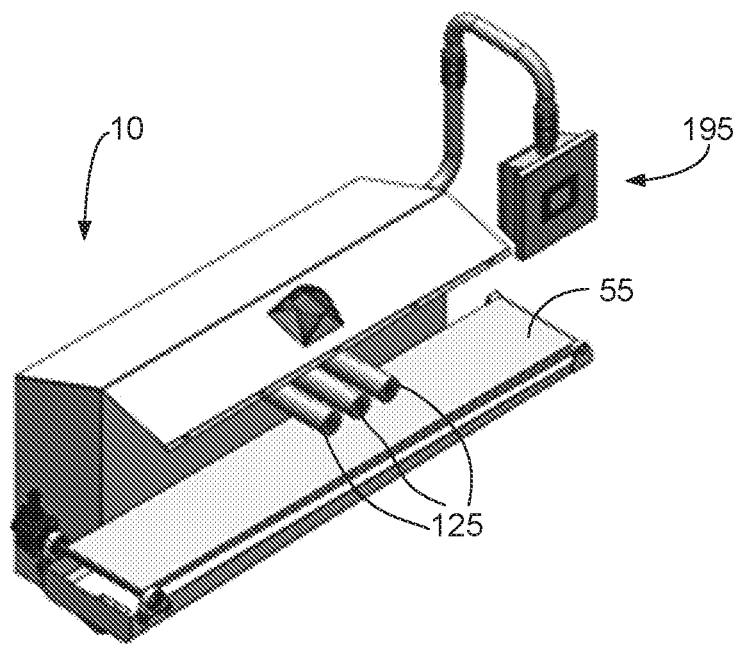
FIG. 1B illustrates a perspective view of a representative embodiment of the food treatment system comprising three spray nozzle heads with a food product transport system in a first position in accordance with a representative embodiment.
Figure 1C:
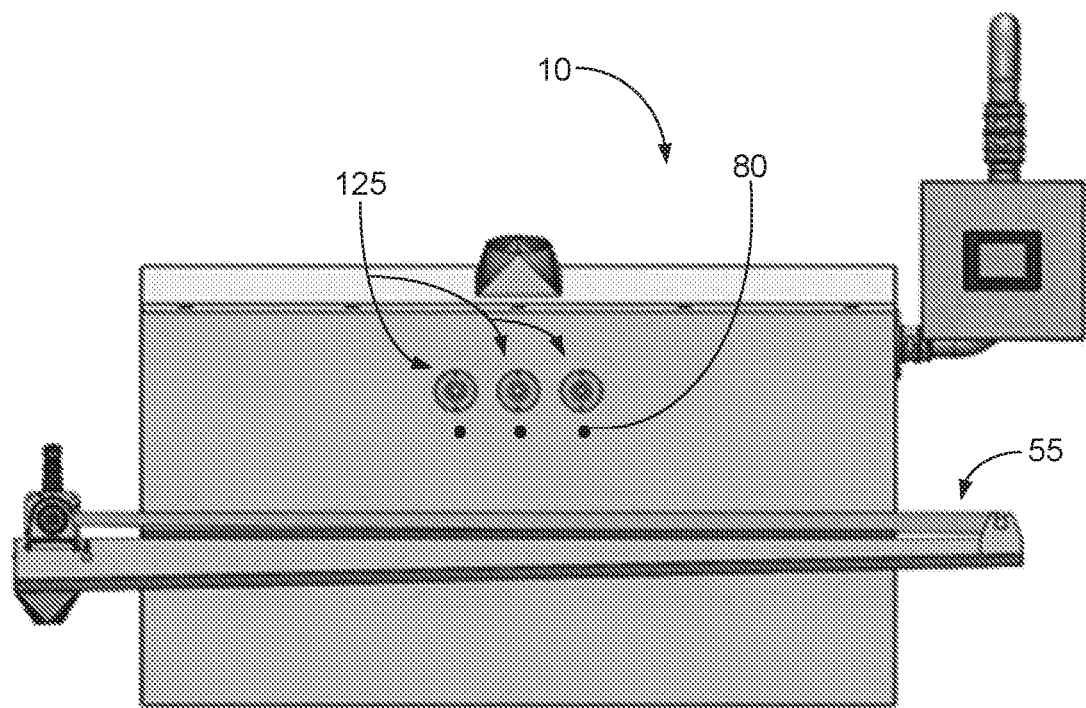
FIG. 1C illustrates a front schematic view of a representative embodiment of the food treatment system comprising three nozzle heads with the food transport system in the first position in accordance with a representative embodiment.
Figure 1D:
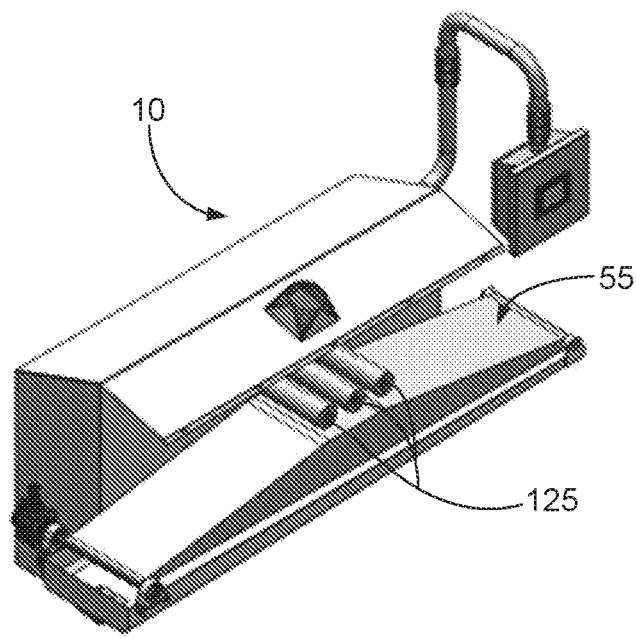
FIG. 1D illustrates a perspective view of a representative embodiment of the food treatment system comprising three spray nozzle heads with the food transport system in a second position in accordance with a representative embodiment.
Figure 1E:
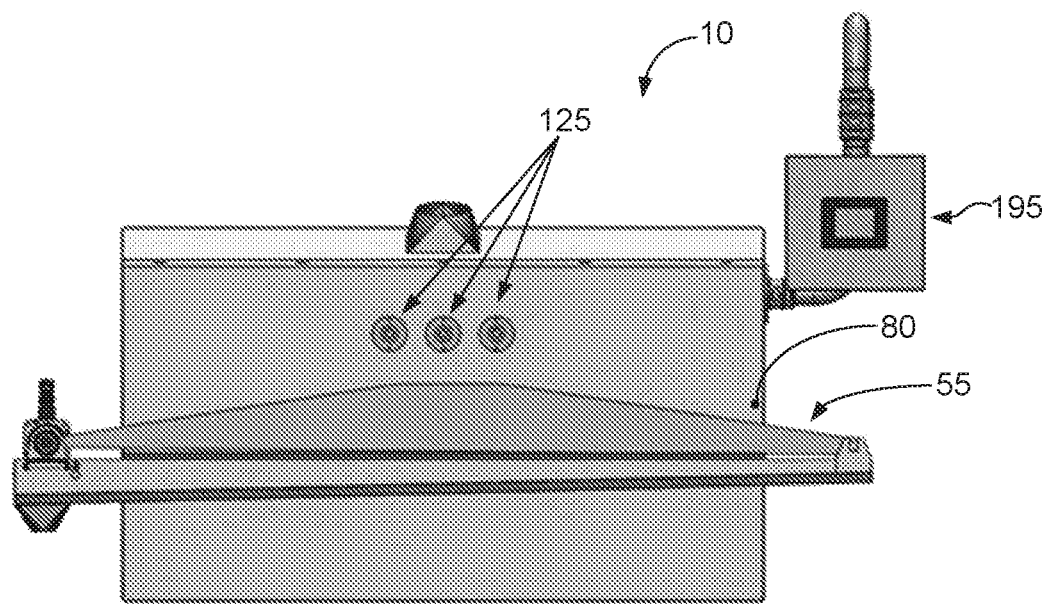
FIG. 1E illustrates a front schematic view of a representative embodiment of the food treatment system comprising three nozzle heads with the food transport system in the second position in accordance with a representative embodiment.
Figure 1F:
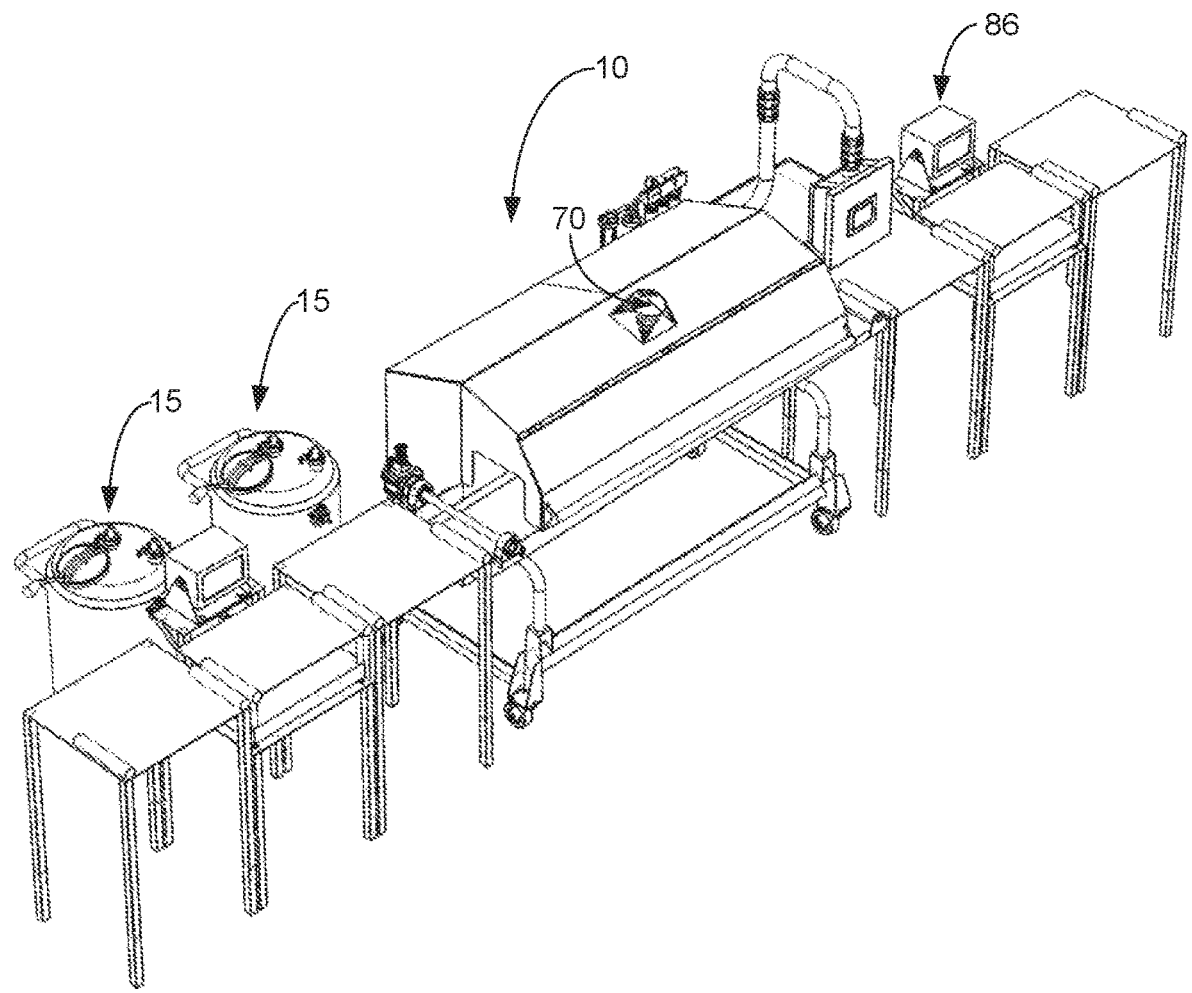
FIG. 1F illustrates a perspective view of a representative embodiment of the food treatment system.
Figure 1G:
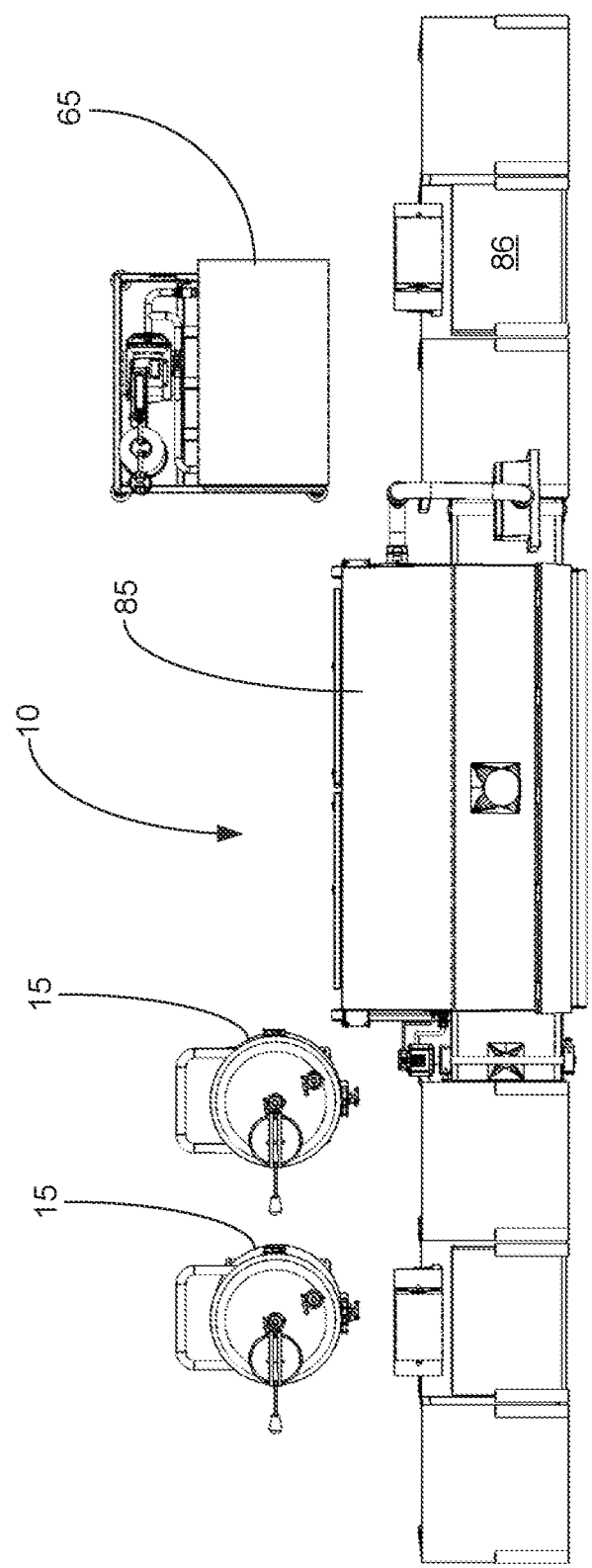
FIG. 1G illustrates a top view of a representative embodiment of the food treatment system.
Figure 1H:
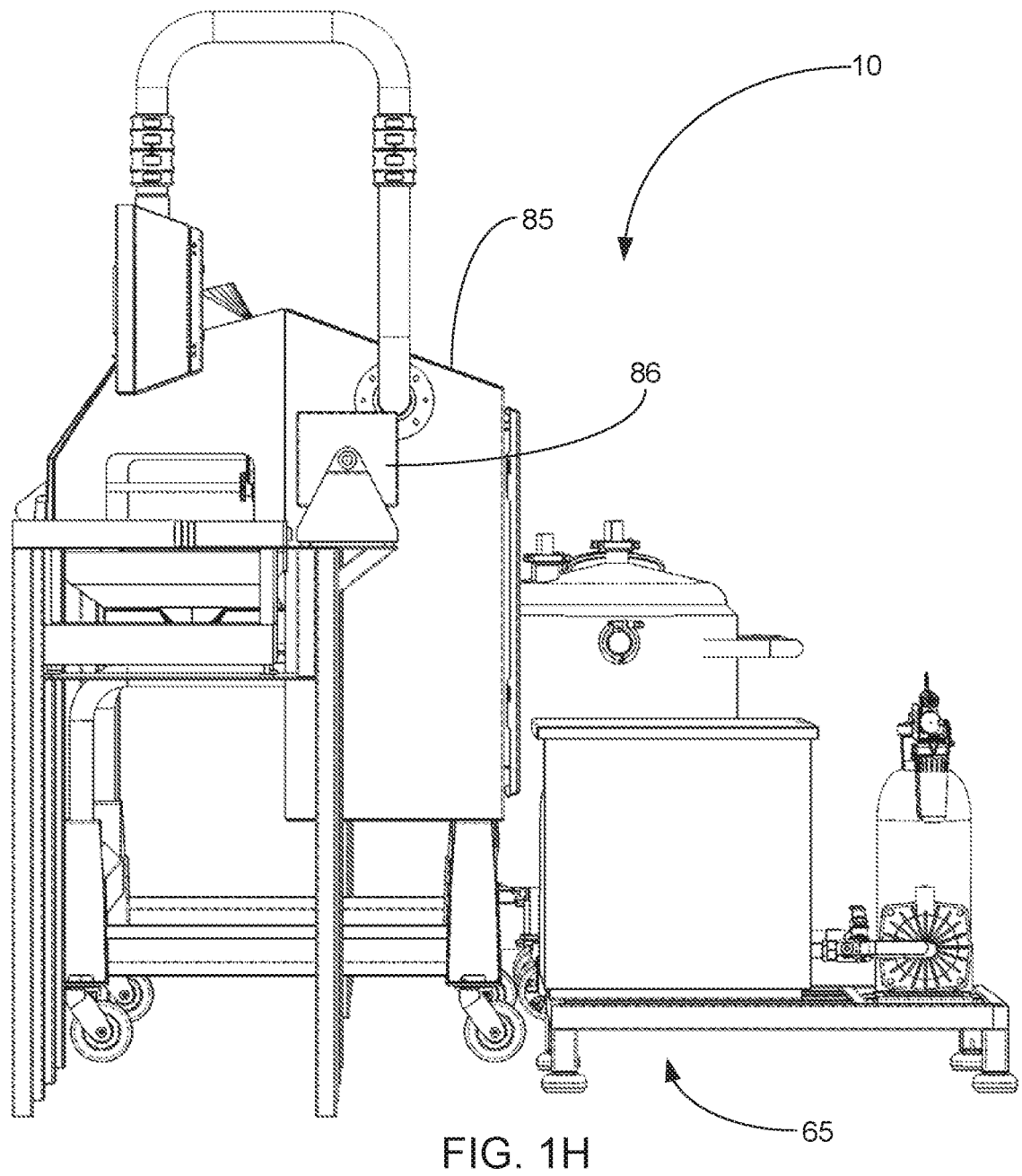
FIG. 1H illustrates a side view of a representative embodiment of the food treatment system.

The present invention relates to systems and methods for treating food products. More particularly, some implementations relate to systems and methods for injecting (and/or otherwise applying) one or more injectates to a food product to: tenderize, limit microbial growth in (or provide intervention to), pump up, color, flavor, freeze, chill, preserve, increase a weight of, modify a density of, improve an aesthetic appearance of, change a texture of, change a moisture content of, change a nutrient content of, and/or to otherwise treat the food product.

In the disclosure and in the claims, the term food product (and variations thereof) may be used to refer to any suitable food, foods, comestible, comestibles, and/or other edible material (or materials) that can be treated with the described systems and methods. In this regard, some examples of such food products include, but are not limited to, one or more: pieces of an animal (e.g., one or more pieces of meat, fat, flesh, a carcass, tissue, and/or other portions of one or more cows, pigs, lambs, fish, shrimp, lobsters, crustaceans, aquatic animals, deer, elk, rabbits, chickens, turkeys, birds, game animals, and/or any other animal), proteins, protein substitutes, dairy products, animal products, cheeses, fruits, vegetables, plants, legumes, stalks, leaves, grasses, grains, nuts, seeds, beans, tofu, pieces of fresh food, pieces of frozen good, pieces of raw food, pieces of cooked food, pieces of smoked food, pieces of unsmoked food, pieces of cured food, pieces of preserved food, and/or any other edible material that can be treated with the described systems and methods.

As used herein, the terms injectate, solution, brine, and variations thereof, may refer to any suitable material (or materials) that can be applied (interiorly, exteriorly, and/or in any other suitable manner) by the described systems to a food product. In some embodiments, the injectate further comprises any suitable material that can be sprayed and/or otherwise provided from the described systems such that the injectate is injected into (and/or contacted on a surface of and/or otherwise applied to) the food product to: tenderize, marinate, decontaminate (or provide intervention to), color, flavor, season, pump up, preserve, improve a palatability of, change a smell of, improve a value of, freeze, chill, change a nutrient content of, change a moisture content of, change a density of, change a texture of, wash, and/or otherwise change one or more characteristics of the food product. Some examples of such injectates include, but are not limited to, one or more: types of water, types of marinades, types of ozonated waters, types of brine, acids (e.g., lactic acids, organic acids, vinegars, and/or any other suitable acids), bases, salts, salt solutions, elements (e.g., liquid nitrogen), compounds, mixtures, enzymes (e.g., Bromelain, Actinidin, Papain, one or more proteases, and/or any other suitable enzymes), coloring agents, disinfectants, stabilizers, food-grade additives, excipients, aromas, preservatives, sugars, sweeteners, gases (e.g., air, oxygen, nitrogen, carbon dioxide, a chemically inert gas, and/or any other suitable gas and/or gases), and/or any other suitable materials that can be injected into a food product while still allowing the food product to ultimately be eaten. Indeed, in some embodiments, however, the injectate comprises a solution comprising lactic acid.

As used herein, the term tenderize, and variations thereof, may refer to one or more processes in which a portion of a food product is at least partially ruptured, digested, proteolyzed, lysed, pumped up, and/or the food product is otherwise rendered more tender (e.g., less hard, cohesive, and/or tough).

As used herein, the term intervention, and variations thereof, may refer to one or more processes in which a portion of a food product is treated so as to kill, mitigate, deactivate, log reduce, prevent, slow propagation of, and/or otherwise reduce an amount (and/or potency) of bacteria, viruses, fungi, protozoa, germs, microbes, parasites, debris, and/or other pathogens that are on an outer surface, an inner surface, and/or any other portion of the food product.

As used herein, the term spray and variations thereof may refer to a process in which injectate and/or any other suitable material is forced through one or more nozzles. In some cases, the term spray and variations thereof further refers to a process in which injectate and/or any other suitable material is forced through a nozzle such that the injectate pierces, penetrates, impregnates, punctures, showers, sprinkles, drizzles, pours on, jets on, is discharged on, is injected into, and/or is otherwise applied to, coated on, and/or placed in a food product. Indeed, in some cases, the term spray is used to refer to the ejection of injectate from the nozzles (e.g., at a pressure that is configured to pierce an outer surface of a food product so as to inject the food product with injectate without the nozzles contacting the food product).

The following disclosure of the present invention is grouped into two subheadings, namely "SYSTEMS AND METHODS FOR FOOD TREATMENT" and "REPRESENTATIVE OPERATING ENVIRONMENT." The utilization of the subheadings is for convenience of the reader only and is not to be construed as being limiting in any sense.

Systems and Methods for Food Treatment

As mentioned, the described systems and methods are configured to inject, apply to one or more surfaces, and/or otherwise apply one or more injectates (or solutions) to a food product to: tenderize, provide intervention to, color, season, freeze, chill, modify a nutrient content of, modify a moisture content of, pump up, modify a temperature of, modify a texture of, and/or to otherwise treat such food product. While the described systems can comprise any suitable component, FIG. 1A shows that, in some embodiments, the described food treatment system 10 includes one or more injectate tanks 15; pre-filters 20; injection pumps 25; pressure regulators 30; bypass lines 33; injectate filters 35; pressure sensors 40; nozzle dwell time valves 45; injection nozzles, pulsation nozzles, spray nozzles, nozzle heads, nozzle manifolds, nozzle heads 125, and/or other applicators 50 (wherein such terms may be used interchangeably); food product transports 55; purge valves 60; wash (or clean-in-place) apparatuses 65; demisters 70; computer processing units 75; food product sensors 80; scale systems 85; and/or cabinets 90.

With respect to the injectate tanks 15, an injectate tank (and/or tanks) can perform any suitable function, including, without limitation, storing injectate prior to it being fed to one or more nozzles 50, maintaining a head pressure over the injection pump 25 by allowing fluid pressure to force air out the system 10, acting as a service supply of the injectate to keep a constant supply of injectate to the injection pump, acting as a return vessel (or recipient) for return injectate (e.g., released from the pressure regulator 30, nozzles 50, nozzle heads 125, and/or any other portion of the system), acting as a supply for cleaning the system, acting as a supply for the wash or clean in place apparatus 65, and/or any other suitable purpose.

The injectate tank 15 can comprise any suitable component or characteristic that allows it to function as described herein (e.g., store injectate (not shown) and to allow the system 10 to apply (e.g., inject and/or otherwise apply) the injectate to a food product). Indeed, FIG. 1A shows that, in some embodiments, the tank 15 optionally comprises: one or more injectate reservoirs 95 of any suitable size and shape, high shear mixers, low shear mixers, mixers, sensors 100 (e.g., any suitable type of sensors that are configured to determine one or more pressures, temperatures, amounts, fluid levels, pH, compositions, gas compositions, moisture, homogeneity (or lack thereof), and/or other characteristics of injectate within each reservoir), hygienic pressure transmitter sensors, wet well ports, feed pumps 105 and/or other suitable pumps that are configured to force injectate from the tank to the injectate pump (or injection pump) 25 and to thereby prime and/or reduce the strain on the injectate pump, heating systems that are configured to heat injectate within the tank, and/or cooling systems that are configured to cool injectate within the tank. Indeed, in some embodiments, the tank comprises one or more hygienic pressure transmitter sensors (and/or other suitable sensors) that are configured to determine a level of injectate in the tank. In this regard, the hygienic sensor can function in any suitable manner, including, without limitation, by measuring the amount of pressure read by its sensor portion and transmitting such information to the computer processor 75. In such embodiments, such sensors can be disposed in any suitable location, including, without limitation, at a wet-well port of the tank. Additionally, in some embodiments, such a sensor is used to refill the tank, to stop or slow the rate at which injectate is added to the tank, and/or to partially empty the tank (e.g., to prevent the tank from overfilling).

As mentioned, in some embodiments, the tank 10 comprises one or more temperature sensors (e.g., on a wet-well port of the tank and/or at any suitable location) that are configured to monitor the temperature of injectate in the tank. In this manner, the system and sensors can help control the temperature of the injectate (e.g., via a cooling system 110 and/or in any other suitable manner).

With regards to the cooling system 110 (or chiller) of the injectate tank 15, the chiller can comprise any suitable component that allows it to cool injectate within the tank 15. Indeed, in some embodiments, the chiller comprises one or more non-cyclic refrigeration systems, cyclic refrigeration systems, vapor-cycle refrigeration systems, vapor-compression refrigeration systems, vapor-absorption refrigeration systems, gas-cycle refrigeration system, insulators, insulation layers (including, without limitation, one or more types of foam, urethane, fiberglass, mineral wool, cellulose, gypsum, perlite, fiberboard, and/or any other suitable insulator), and/or any other suitable cooling and/or insulation mechanism or mechanisms.

In some embodiments, the chiller 110 comprises one or more glycol (and/or other suitable) chillers. In this regard, while the glycol (or other) chiller can be configured in any suitable manner, in some embodiments, the injectate tank 15 optionally comprises a jacketed tank that includes an inner wall that defines at least one reservoir 95 and an outer wall comprising an outer surface of the tank, with one or more cooling coils, conduits, baths, and/or other fluid containers and/or insulators being disposed between the two walls. In some other embodiments, the described system 10 comprises one or more conduits (e.g., one or more fluid conduits that extend within the system, one or more conduits that extend between the injectate tank and the injection pump 25, and/or any other suitable portion of the system 10) that are lined by, wrapped with, coiled around, and/or otherwise held in proximity with one or more lines and/or other containers carrying a coolant (e.g., glycol, one or more refrigerants, halocarbons, water, and/or other suitable coolants). Accordingly, in some such embodiments, the injectate in the system can be maintained in a desired temperature range, even after the injectate has been removed from the injectate tank.

Figure 1I:
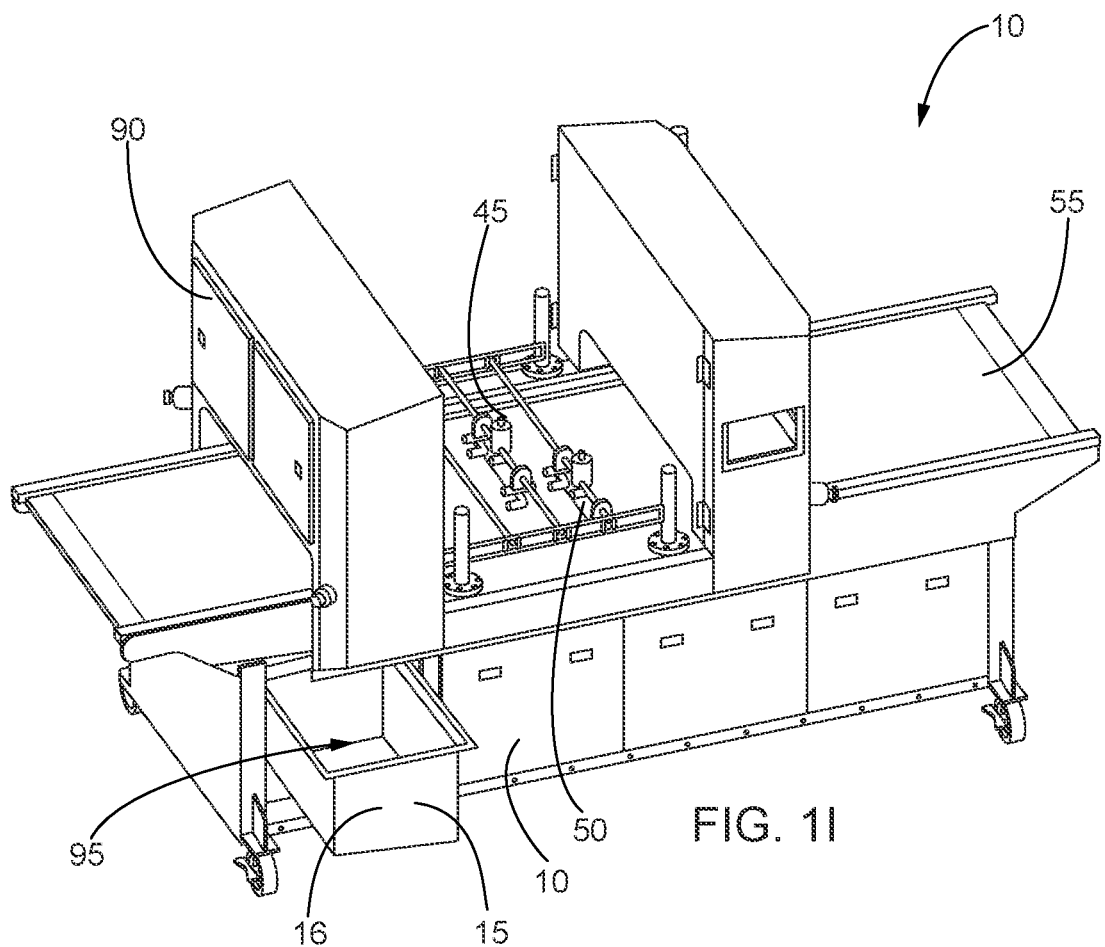
FIG. 1I illustrates a perspective view of a representative embodiment of the food treatment system.
Figure 1J:
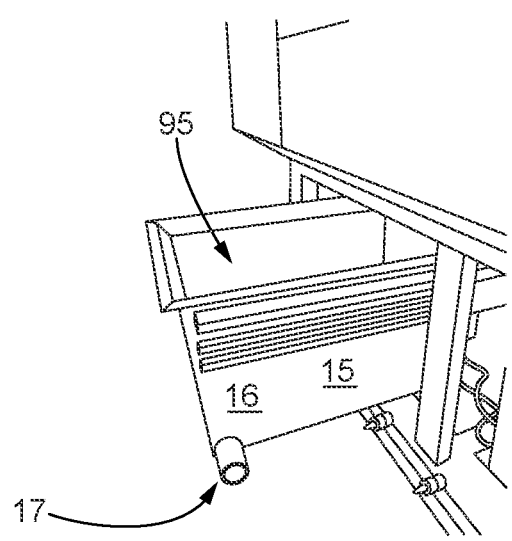
FIG. 1J illustrates a perspective view of a representative embodiment of an injectate tank.

In some embodiments, the injectate tank 15 optionally comprises one or more wheels, electrical and/or fluidic coupling devices, drawers, slides, sliding panels, rails, and/or any other suitable components that allow the tank to be selectively and fluidly connected to and/or to be disconnected from the food treatment system 10. Indeed, as shown in FIG. 1A, some embodiments of the tank 15 comprise a movable cart 115. In contrast, FIGS. 1I-1J show some embodiments in which the tank 15 comprises one or more slidable panels 16 (and/or any other suitable receptacle or element) that is disposed below the food product transport 55 and/or in any other suitable location. In this regard, in some cases in which the tank is disposed below the food product transport, the tank can perform a variety of functions, including, without limitation, catching runoff injectate that is sprayed from the nozzle and that is not retained within a food product. In such embodiments, the tank can be disposed below the food product transport in any suitable manner, including, without limitation, by being slidably coupled to the system 10 via one or more slidable panels; by being set on a shelf, floor, a wheeled skid (e.g., a skid that fits under the system and/or to the side of the system), and/or other supporting surface below the food product transport; and/or in any other suitable manner. Additionally, FIG. 1J shows that in some embodiments, the tank 16 further comprise one or more valves 17 and/or other conduits that are configured to control the flow of injectate (and/or any other fluid) out of the tank (e.g., to prevent that tank from spilling injectate when it is pulled out from the system and/or for any other suitable purpose).

As mentioned above, some embodiments of the system 10 optionally comprise one or more sliding panels 16 that that are configured to slide in and out of the system (e.g., on two parallel tracks and/or in any other suitable manner). Accordingly, in some embodiments, such sliding panels allow a user to have access to an area under the system. While such sliding panels can be configured in any suitable manner, in some embodiments, one or more panels are on a first track and one or more other panels are on a second track. Thus, in some such embodiments, the panels are configured to slide past each other to create one or more openings under the system. Accordingly, in some cases in which a bottom portion of the system comprises one or more continuous open spaces, such spaces can be accessed by sliding any panel out of the way. In some embodiments, such spaces comprises one or more tanks (e.g., injectate tank 15) that are configured to slide out on rails that line up with one or more neighboring sliding panels—making it relatively easy to access the tank by sliding a neighboring panel out of the way. In some cases, additional space under the system houses one or more injection pumps 25, which are (in some embodiments) also accessible by sliding one or more panels out of the way, as needed.

Returning to FIG. 1A, that figure shows that some embodiments of the tank 15 optionally comprise one or more plugs, wires, quick-connect couplers, strain relief chains or connection (e.g., to keep data cables and hoses from being pulled to tight), and/or valves 120 that allow the tank to be emptied, cleaned, quickly connected to the system 10 to allow fluids (e.g., injectate, glycol, water, cleaning agents, and/or any other suitable fluid, signals, reports, data, power, etc.) to flow between the tank and the system, and/or to serve any other suitable purpose. Similarly, in some embodiments, such plugs, wires, quick-connect couplers, and/or valves allow the tank to be detached from the system relatively quickly for any suitable purposes, such as for replacing the tank with another tank (e.g., another tank full of injectate and/or the wash apparatus 65) and/or sliding the tank out from underneath the food product transport 55 (e.g., as shown in FIGS. 1I-1J). Additionally, in some embodiments, the valves (e.g., one or more evacuation valves and/or any other suitable valves 120) are configured to selectively open and close (e.g., manually, automatically, by being electrically controlled, and/or in any other suitable manner) to allow the tank to provide injectate to the system, to allow the tank to be emptied for cleaning or receipt of new injectate, and/or for any other suitable purpose.

The described food treatment system 10 can include any suitable system that is configured to filter injectate. Indeed, in some embodiments (as shown in FIG. 1A), the food treatment system 10 optionally includes one or more pre-filters 20 that are configured to treat the injectate (e.g., to filter the injectate, inactivate pathogens in the injectate, and/or otherwise treat the injectate) and/or to remove particles, debris, and/or other unwanted materials from the injectate prior to allowing the injectate to pass through the injectate pump 25. In such embodiments, the pre-filter can comprise any suitable filter and/or other suitable injectate treatment mechanism, including, without limitation, one or more membrane filters, cartridge filters, canister filters, activated carbon filters, reverse osmosis filters, alkaline filtration systems, water ionizers, UV systems, infrared systems, screens, sieves, paper filters, cellulose filters, rotary drum filters, scrapers, canister mesh filters, wedge wire canister filters (and/or any other suitable wedge wire filters), multi-stage filtration systems, and/or any other suitable filtration systems. Indeed, in some embodiments, one or more of the pre-filters comprise a wedge wire canister filter. In this regard, some wedge wire canister filters are better at filtering meat runoff than are some mesh filters. Indeed, in some cases, where a mesh filter has a 75 to 150 micron range, proteins in recycled injectate tend to coagulate and bind to the mesh relatively quickly—causing the filter to plug relatively quickly. In contrast, some wedge wire filters (e.g., wedge wire canister filters) do not have the same degree of protein coagulation in the 75 to 150 micron range. Accordingly, in accordance with some embodiments, use of wedge wire filters (e.g., wedge wire canister filters) can greatly improve operation time and throughput of the system over some systems that use mesh filters instead of wedge wire filters.

Additionally, in some embodiments, in place and/or in addition to the pre-filter, the system comprises one or more blenders (e.g., shear blenders and/or any other suitable component that is configured to reduce particle sizes in the injectate) to ensure that particulates in the injectate are of a suitable size to pass through the injection pump 25.

While the pre-filter 20 can comprise any suitable characteristic, in some embodiments, the pre-filter is configured to allow particles smaller than about 200 micrometers, or any suitable size smaller than that (e.g., to allow particles smaller than about 180 micrometers, particles smaller than about 140 micrometers, particles smaller than about 125 micrometers, particles smaller than about 110 micrometers, particles smaller than about 80 micrometers, particles smaller than about 40 micrometers, and/or particles of any other suitable size) to pass through the pre-filter. Indeed, in some embodiments, the pre-filter is configured to allow particles smaller than about 80 micrometers (e.g., particles smaller than about 40 micrometers or even be limited to only allow particles smaller than 20 microns) to pass through it. Nevertheless, the pre-filter can be used, depending on the application, to prevent (and/or allow) material that is larger or smaller than any of the above-referenced sizes to pass through to the injectate pump 25.

While the pre-filter 20 can comprise any suitable filter, in some embodiments, it comprises one or more high pressure in-line hydraulic filters, high pressure tee-type hydraulic filters, medium pressure hydraulic filters, membrane filters, ceramic filters, stainless steel element filters, sintered filter elements filters, sintered tin bronze element filters, metal fiber felt element filters, nickel element filters, paper filters, cellulose filters, carbon filters, inline filters, and/or any other suitable filters. Indeed, in some embodiments, the pre-filter comprises one or more high pressure hydraulic filters (e.g., a stainless element high press filter, as produced by Norman Filter Company, LLC of Bridgeview, IL, USA and/or any other suitable entity).

In some embodiments, the system 10 comprises a multi-stage filtration system that is configured to filter waste injectate that is sprayed from the nozzle head 125, but that is not retained within one or more food products. In this regard, a significant amount of injectate may not ultimately be retained in food products. As the injectate can be relatively expensive (often costing $2 or more per gallon), the cost of waste or runoff injectate over a period of time can be become quite significant.

In many cases, runoff injectate comprises particles (e.g., meat, fat, spalling, etc.) that are dislodged from food products and that can plug nozzles when the runoff injectate is recirculated through the system. In this regard, a filtration system may need to remove particles that are large enough to block the nozzles, while still allowing desired ingredients (e.g., salts, sugars, coagulants, flavorings, proteins, etc.) to pass through. Additionally, in some cases, it is helpful to have a filtration system that can run for a relatively long period of time without requiring down time or hands-on labor.

Unfortunately, some conventional filtration systems may have some significant shortcomings, including, without limitation, becoming clogged as proteins coagulate and block pores, not being able to self-clean without wasting large amounts of injectate (e.g., causing large amounts of injectate to be dumped down the drain) when used with injectate runoff and under desired pressures, and/or not being able to sufficiently filter the runoff injectate to prevent the injectate from blocking nozzles.

In accordance with some embodiments, described multi-stage filtration system overcomes one or more of the aforementioned shortcomings. In this regard, the multi-stage filtration system can include any suitable feature, including, without limitation, any of the components of the filtration system (e.g., pre-filter 20) discussed above, rotary drum filters, scrapers, canister mesh filters, wedge wire canister filters (and/or any other suitable wedge wire filters), intermediate filters, redundant filters, pressure sensors, dump valves, automatic backflush systems, and/or other suitable components. Indeed, in some embodiments, a first stage of the multi-stage filtration system comprises one or more rotary drum filters with corresponding scrapers (e.g., to scrape and clean the rotary filter as it rotates). In this regard, the rotary drum filter can have any suitable component or characteristic. In this respect, some embodiments of the rotary drum filter are configured to be gravity fed (e.g., as runoff injectate flows down to the drum filter). In some other embodiments, the rotary drum filter is pump fed (e.g., in some embodiments in which the food product transport 55 is disposed relatively low in the system 10 so that there is not enough vertical space below the food product transport to fit a runoff pan, drain, rotary drum filter, rotary drum collection tank, etc.). In some embodiments, the drum filter further comprises a pore size between about 150 μm and about 600 μm or within any subrange thereof (e.g., between about 280 μm and about 420 μm or 350 μm±20 μm). As a result, in some embodiments, the rotary drum filter is configured to remove a significant amount of solids from recycled injectate (e.g., 80% or more, for instance 95%±3%)—thus preventing the wedge wire filters (and/or any other suitable types of filters) from being overwhelmed and thus allowing such filters to function with only occasional self-cleaning dumps and/or purges.

In some cases, the filtration system also comprises one or more canister mesh filters, wedge wire canister filters, and/or any other suitable filters that are configured to receive injectate after it has passed through the rotary drum filter. Indeed, in some embodiments, the multi-stage filtration system includes one or more wedge wire canister filters that are disposed after the drum filter. In this regard, the wedge wire canisters can have any suitable characteristic that allows them to filter injectate. In this regard, some embodiments of the wedge wire filters have a pore size that is between about 50 μm and about 350 μm or within any subrange thereof (e.g., between about 70 μm and about 220 μm). In some embodiments, the multi-stage filtration system comprises multiple wire wedge filters with the first filter having a first pore size (e.g., 200 μm±20 μm) and one or more subsequent filters having a smaller pore size (e.g., 135 μm±25 μm). In some cases, the multi-stage filtration system further comprises one or more redundant filters (e.g., wedge wire canister filters, and/or any other suitable filters) that are disposed in parallel and/or duplex configuration such that one branch comprising one or more filters can be filtering while one or more other branches are left idle and/or being cleaned.

In accordance with some embodiments, the multi-stage filtration system also comprises one or more backflush systems that are configured to flow water (and/or any other suitable material) back through one or more of the filters to unplug clogged pores in the filters. In this regard, the backflush system can comprise any suitable feature that allows it flush one or more filters in the system. Indeed, in some embodiments, the backflush system comprises one or more water sources (e.g., plant water sources, pumps, tanks, and/or other suitable water sources) that are configured to provide water to the system so as flow such water backward through one or more components of the filtration system at a desired pressure (e.g., between about 20 psi and about 200 psi or within any subrange thereof, for instance 80 psi±30 psi) and/or at a desired flow rate (e.g., between about 2 gpm and about 60 gpm or within any subrange thereof, for instance 15 gpm±5 gpm). In some such embodiments, one or more filters (e.g., wedge wire canisters and/or any other suitable filters) have their own dump valves and/or are otherwise configured so that each filter can be purged individually (e.g., experiencing the full pressure and flow rate of the backflush).

Figure 1K:
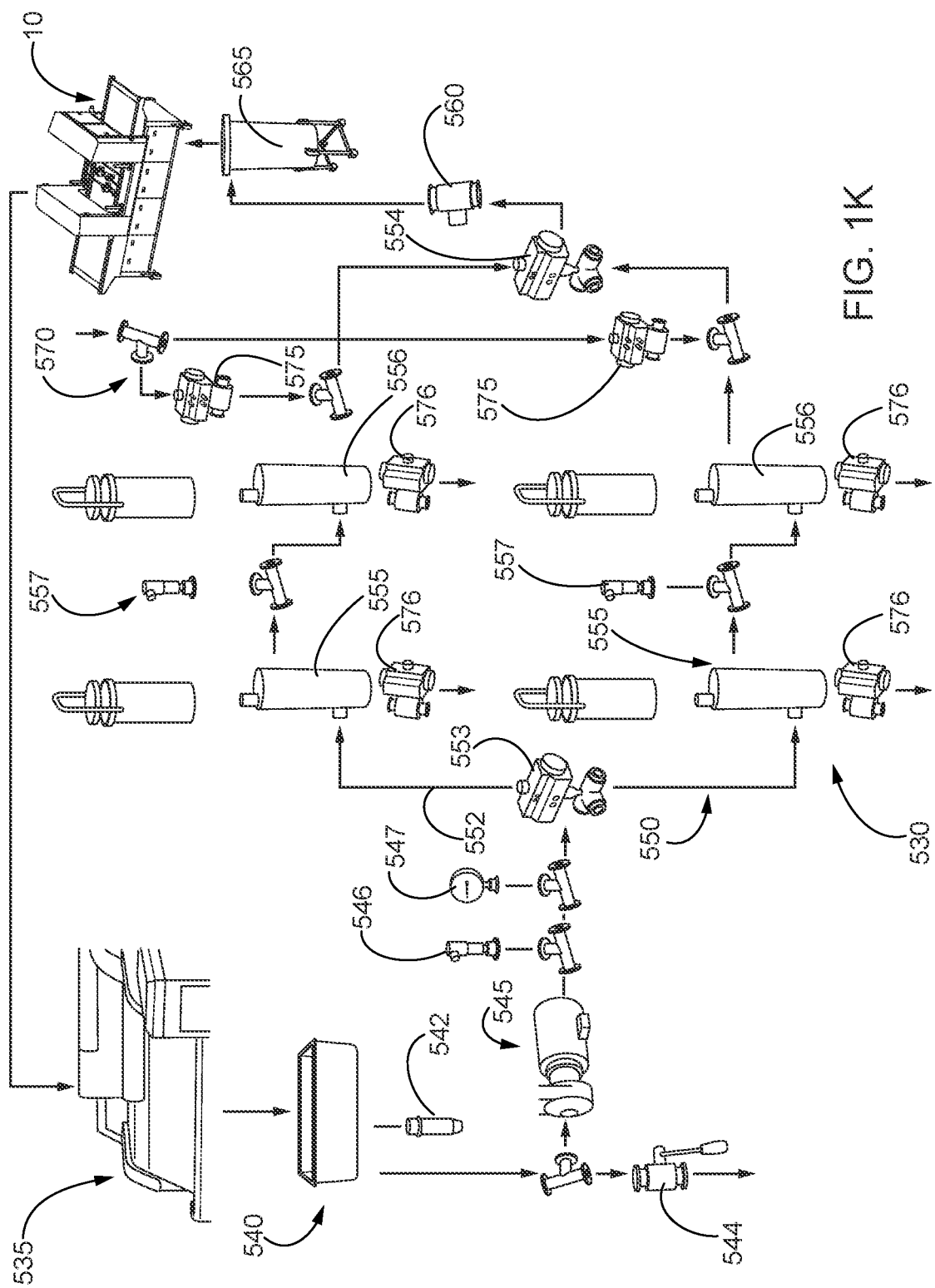
FIG. 1K illustrates a diagram depicting a representative embodiment of a multi-stage filtration system having a representative embodiment of a backflush system.
Figure 1L:
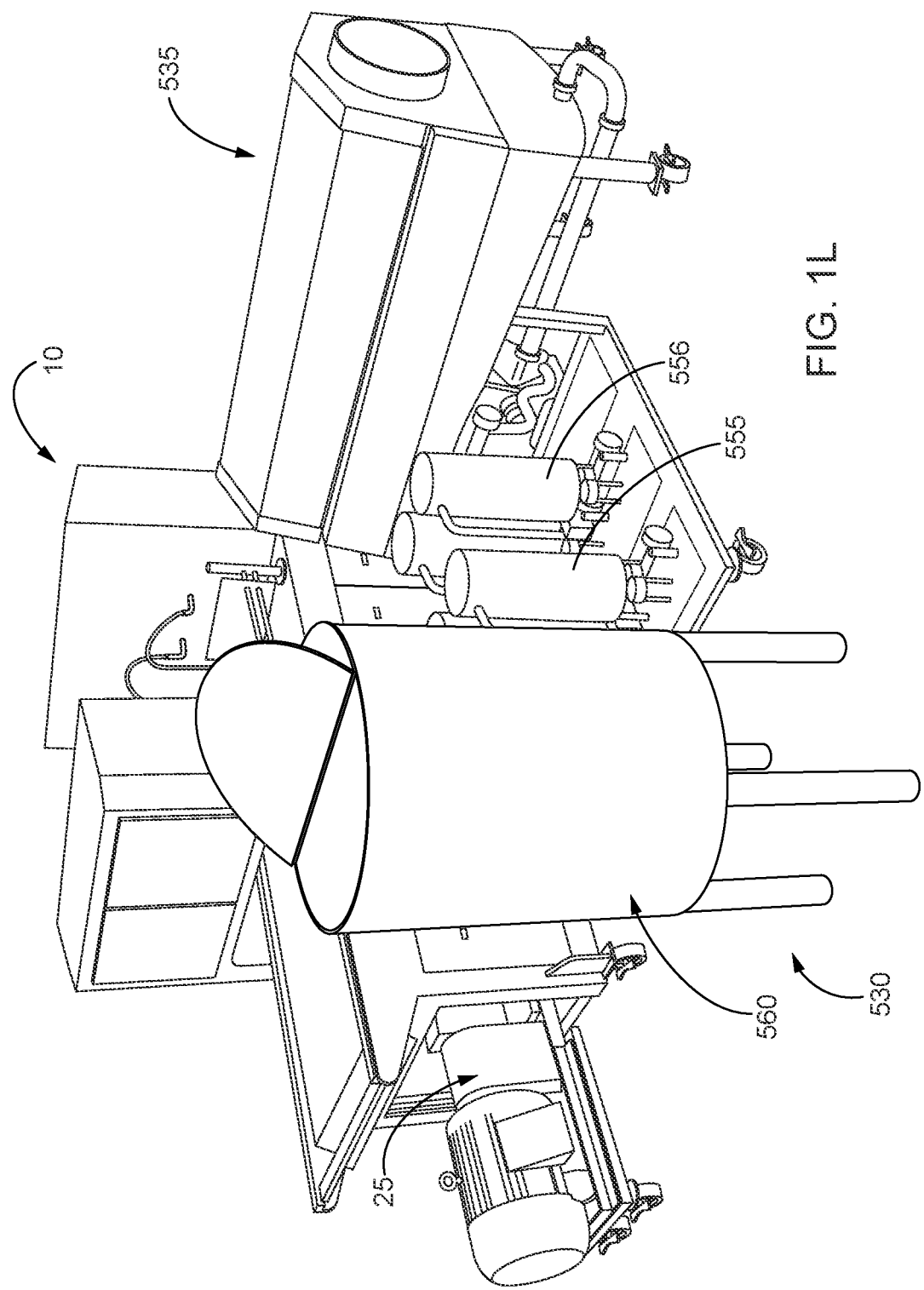
FIG. 1L illustrates a perspective view of the food treatment system and the multi-stage filtration system in accordance with a representative embodiment.

While the various components of the multi-stage filtration system can be disposed in any suitable configuration, FIGS. 1K-1L show some embodiments in which the multi-stage filtration system 530 comprises one or more rotary drum filters 535 that are configured to receive runoff injectate from the system 10 (e.g., via gravity with a drip pan and/or the tank 15 directing runoff injectate from the nozzle head 125 to the drum filter), with the rotary filter having any suitable pore size (e.g., about 300 μm±50 μm). FIG. 1K shows that in some embodiments, after the runoff injectate is passed through the rotary filter 535, such fluid is optionally directed to one or more holding tanks 540. In this regard, FIG. 1K shows that, in some embodiments, such a holding tank further comprises one or more level sensors 542 and/or dump valves. In this regard, while such dump valve can be automatically activated, FIG. 1K shows that in some embodiments, such valve is capable of being manually activated.

FIG. 1K further shows that some embodiments of the filtration system further include one or more pumps 545 (e.g., centrifugal pumps and/or any other suitable pumps) that are configured to force injectate through one or more additional filters. FIG. 1K shows that some embodiments of the filtration system further comprise one or more pressure and/or flow rate sensors (e.g., a first electronic pressure sensor 546 and/or a first analog pressure sensor 547) that are disposed after the pump to determine a pressure of the injectate before it passes through one or more additional filters.

FIG. 1K shows that in some embodiments in which the filter system 530 comprises two or more filter branches (e.g., branch 550, 552, and/or any other suitable branch), the system optionally includes one or more valves that are configured to selectively direct the pressurized injectate through one or more of the filter branches. FIG. 1K further shows that, in some cases, the various filter branches (550 and 552) include one or more filters that are disposed downstream of the rotating drum filter 535 (e.g., one or more wedge wire canister filters). In particular, FIG. 1 shows an embodiment in which each branch (550 and 552) comprises a first wedge wire canister 555 (e.g., a filter having a pore size of 200 μm±50 μm) followed by a second wedge wire canister 556 (e.g., a filter having a smaller pore size, such as 135 μm±20 μm).

In accordance with some embodiments, FIG. 1K further shows that the various branches optionally comprise one or more additional pressure and/or flow rate sensors 557. In this regard, such flow rate sensors can perform any suitable function. Indeed, in some embodiments such sensors are configured to measure a characteristic of the flow of the injectate through the branches (e.g., comparing a reading with that of the first sensor 546) and then automatically switching from one filtration branch to another (e.g., via valves 553 and 554) when the differential pressure between the subsequent sensor and the earlier sensor (and/or flow rate) indicates that a particular filter is clogged.

FIGS. 1K-1L further show that some embodiments of the multi-stage filtration system optionally include one or more flowmeters 560 that are configured: to gather information relating to a flow rate of the filtered injectate (e.g., for use in a feedback loop controlling the pump 545, for helping to determine filter doggedness, to determine how much fluid is flowing into a chiller tank 565, to help estimate the weight pickup of the food product (e.g., if the flow rate through the nozzles is known and the flow rate through the filter system is known, then the gallons (or other applicable units) per minute (or another suitable period of time) flow rate into the food product can be approximately found that flow into food product=flow rate through nozzles−flow rate through filter system, such that a rate of weight pickup per minute (or any other suitable time period) can be derived based on a density of the injectate), for determining how much injectate the filtration system is recovering, for determining the percentage of total injectate that is recycled versus new (e.g., where use of recycled injectate has an impact on quality and is therefore to be kept within a limit), for monitoring in real-time (or near real-time) any abnormalities that may occur in the system's functioning (e.g., spikes in flow rates that may occur if the system were to run with no food product for a period of time), and/or for any other suitable purpose). FIGS. 1K-1L show that, in some embodiments, filtered injectate is optionally passed into a cooling tank (e.g., a tank having any suitable characteristic discussed above with respect to tank 15) before being recycled back through the system 10 (e.g., to be sprayed from a nozzle head 125).

Additionally, FIG. 1K shows that in some embodiments, the multi-stage filtration system comprises a backflush system 570, wherein the backflush system is configured to receive water (and/or any other suitable cleaning agent) and to then flow such water backwards through one or more filters to unclog the filters. In this regard, FIG. 1K shows that in some embodiments, the backflush system 570 includes a number of valves (e.g., valves 553, 554, 575, dump valves 576, and/or any other suitable type of number of valves) that are configured to allow one or more filters (e.g., filters 555 and/or 556) from one or more branches (e.g., 550 and 552) to be backflushed at a time. Indeed, FIG. 1K shows that, in some embodiments, each filter is configured to backflushed individually.

Turning now to the injection pump 25, the system 10 can comprise one or more injection pumps, which (in turn) can each comprise any suitable pump that allows the system to force injectate through one or more nozzles (or applicators) 50 at a pressure sufficient to allow the injectate to penetrate into (or to otherwise be applied to) a food product to tenderize, flavor, provide intervention to, chill, modify a composition of, pump up, and/or to otherwise treat such food product. In this regard, some examples of suitable pumps include, but are not limited to, one or more hydra-cell pumps, positive displacement pumps, hydraulic pumps, continuous flow pumps, roto-dynamic pumps, turbo pumps, reciprocating pumps, centrifugal pumps, booster pumps, canned motor pumps, shear blenders, blenders, stators, stator pumps, rotor-stator pumps, positive displacement pumps, rotor pumps, screw pumps, twin screw pumps, liquid ring pumps, piston pumps, circumferential piston pumps, helical rotary lobe pumps, rotary lobe pumps, suction and low pulsation helical lobe pumps, bi-wing lobe pumps, centrifugal pumps, chopper pumps, circulator pumps, cryogenic pumps, multi-stage pumps, diaphragm pumps, and/or other suitable pumps. Indeed, in some embodiments, the injection pump comprises a hydra-cell positive displacement pump (e.g., a HYDRA-CELL™ seal-less pump, produced by Wanner Engineering, Inc. of MN, and/or any other suitable pump, including from one or more other vendors) that is configured to receive injectate from the injectate tank 15 at a relatively low pressure, and to then force the injectate from the injection pump at a relatively high pressure. In this regard, some such pumps can are configured to pump the injectate at desired rates and pressures (e.g., so as to pierce meat, fruit, and other food products with injectate) without the injectate gumming up or corroding the pump. Additionally, in some embodiments, the injection or injectate pump optionally comprises a shear blender, such as the FS Shear Blender produced by Fristam Pumps of Middleton Wisconsin, USA, and/or any other entity. In some embodiments, however, where the system 10 comprises a rotary drum 535 with a scraper, a shear blender is optionally not used.

While the injection pump 25 can function in any suitable manner (including, without limitation, by forcing injectate from the tank 15 to the nozzles 50), in some embodiments, the pump is configured to receive fluid (e.g., injectate, cleaning fluid, and/or any other suitable fluid) from one or more ports and to move that fluid out from the pump to one or more locations (e.g., to an optional post filter 35, to a pressure regulator 30, back to the tank 15 to release fluid back into the reservoir, to the nozzles 50, nozzle heads 125, and/or to any other suitable location). In some embodiments, an additional port that is part of, or in fluid communication with, the pump allows for a pressure relief valve to release high pressure to a three-way valve (and/or any other suitable valve).

While the injection pump 25 can release the injectate at any suitable pressure, in some embodiments, the injection pump is configured to release the injectate at any suitable pressure (depending on the type of food product being treated and the desired treatment being performed) that is less than about 4,000 psi, including at any suitable pressure or sub-range of pressures that are lower than 4,000 psi (e.g., at a pressure that is: less than about 2,500 psi, less than about 1,100 psi, less than about 800 psi, less than about 600 psi, less than about 400 psi, and/or any other suitable pressure below about 4,000 psi). For example, in some embodiments, where the food product comprises a seafood (e.g., salmon, shrimp, lobsters, etc.), the injection pump is configured to release injectate from the nozzles (or applicators) 50 at a pressure of between about 700 psi and about 900 psi. Moreover, in some embodiments in which the food product comprises a steak, the injection pump is configured to release injectate from the nozzles 50 at a pressure of between about 900 psi and about 1,450 psi. In some other non-limiting embodiments, where the food product comprises a roast, the injection pump is configured to release injectate from the nozzles 50 at a pressure of between about 2,000 psi and about 4,000 psi.

Figure 1M:
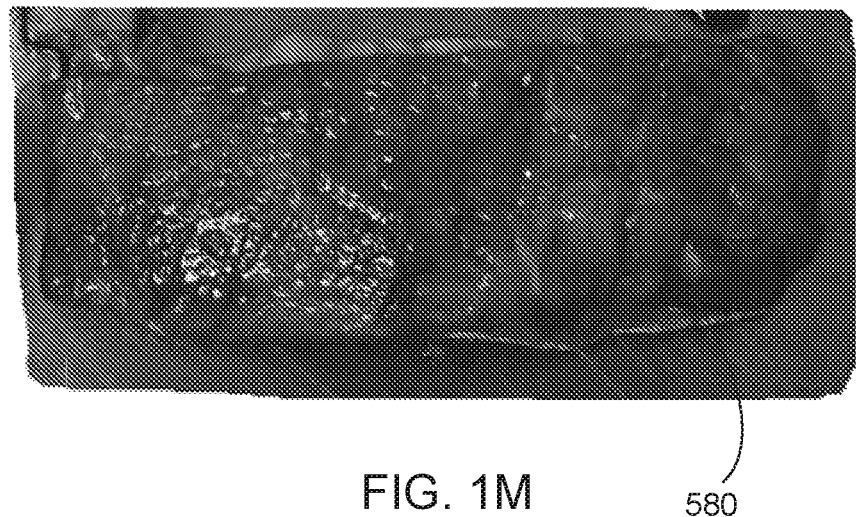
FIG. 1M illustrates a view of a first piece of meat that was injected with a representative embodiment of the food treatment system at 800 psi for 0.4 seconds.
Figure 1N:
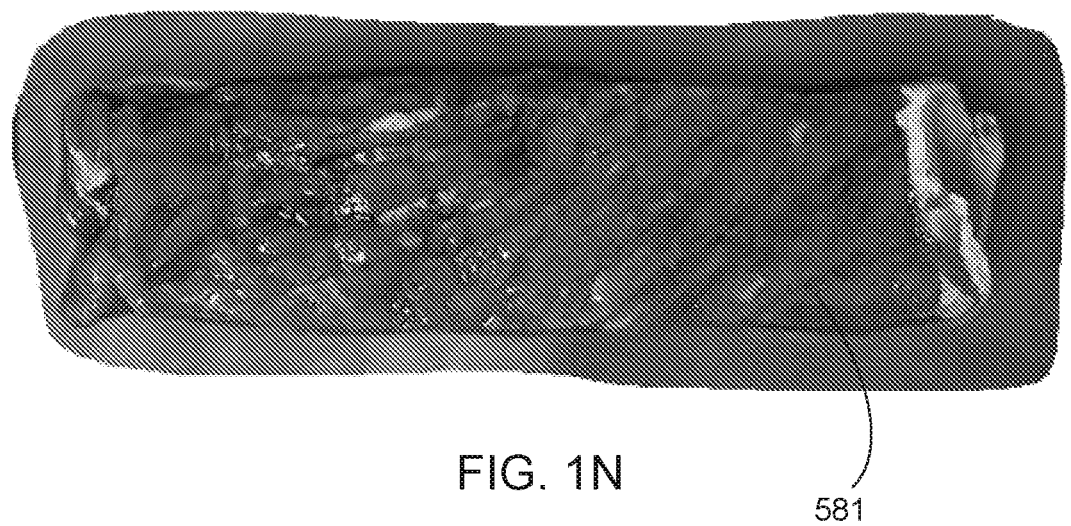
FIG. 1N illustrates a view of a second piece of meat that was injected with the representative embodiment of the food treatment system used in FIG. 1M, but at 190 psi for 2.2 seconds.
Figure 10:
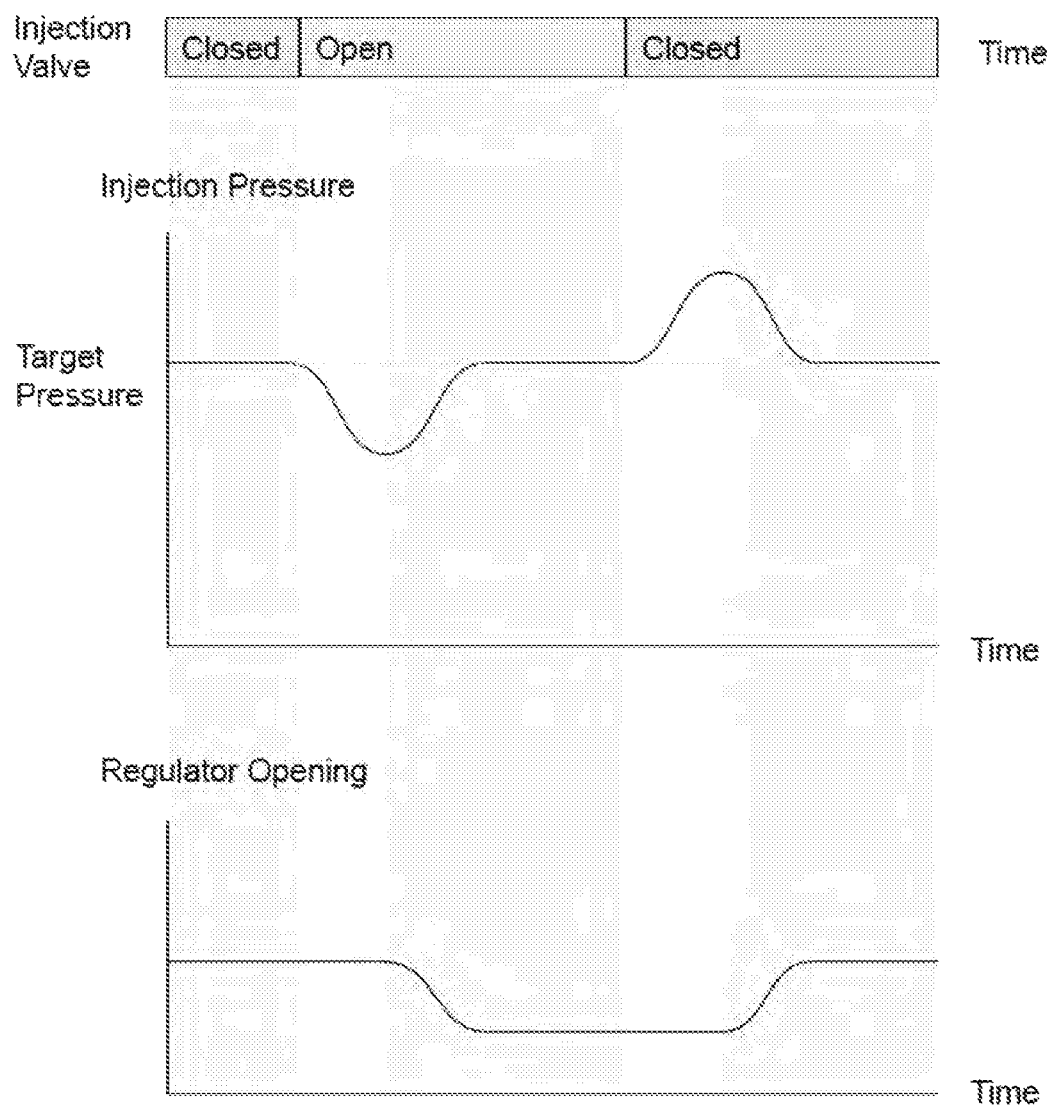
FIGS. 9-14 each illustrate a different view of the food treatment system in accordance with some embodiments of the system.

In still other embodiments, the pump is configured to release injectate from the nozzle head at a pressure that is between about 50 psi and about 500 psi, or within any subrange thereof. Indeed, in some cases, the pump is configured to spray the injectate at between about 100 psi and about 300 psi. In this regard, by spraying the injectate at lower pressures but for relatively longer periods of time (e.g., between about 1.5 seconds and about 60 seconds per spray (or within any subrange thereof, such as between about 1.8 and about 6 seconds per spray)) some embodiments of the system 10 can: more evenly distribute injectate into a food product, cause the food product to retain more of the injectate, get deeper penetration of the injectate, better maintain a weight pickup percentage, eliminate a need to treat the food product with a vacuum tumbler, reduce damage to a surface and/or internal structure of the food product, and/or serve any other suitable purpose. By way of non-limiting illustration, FIG. 1M shows a first piece of meat 580 that is was injected with injectate by the system at 800 psi for 0.4 seconds. In contrast, FIG. 1N shows a second piece of meat 581 (which was originally similar in size to the first piece of meat) that was injected by the same system at a pressure of 190 psi and for a dwell time of 2.2 seconds. In this regard, it is apparent that in this example, the second piece of meat that was injected for a longer period of time and with a lower pressure increased in size more than did the first piece of meat that was sprayed with the higher pressure for a shorter period of time.

Although some embodiments of the injection pump 25 are configured to release injectate at a substantially constant pressure, in some other embodiments, the injection pump is configured to automatically and/or manually vary its pump frequency and/or the pressure at which it releases the injectate. In other words, some embodiments of the injection pump comprise a variable frequency drive pump. Additionally, in some embodiments (as discussed below in more detail) pump speed is automatically varied to anticipate and reduce or eliminate spikes and drops in the pressure of the injectate as it is sprayed through the nozzles 50.

In some embodiments, the injectate pump 25 optionally comprises and/or is otherwise used in connection with one or more air-bleed priming valves. In this regard, such valves can perform any suitable function, including, without limitation, creating an open port to atmosphere (or ambient) and/or allowing the injectate pump 25 to clear air, vapors, and other gases from the pump and the system's plumbing.

As mentioned, some embodiments of the system 10 optionally comprise one or more pressure regulators 30 that are configured to limit, vary, and/or otherwise control the pressure of the injectate as it is released to the nozzles 50. In this regard, the pressure regulator can be configured in any suitable manner, including, without limitation, to manually and/or automatically limit, change, and/or otherwise control the pressure of the injectate to any suitable level, including, without limitation, by ensuring that the pressure of the injectate that exits the spray nozzle is less than about 4,000 psi (or, as discussed above, any suitable pressure below that). Indeed, in some embodiments, the pressure regulator (and/or the injection pump) ensures that the injectate that is released from the nozzle has a pressure between about 600 psi and about 2,800 psi (or any suitable sub-range thereof). In this regard, in some cases in which the described systems are used with a relatively delicate meat (e.g., salmon and/or another fish) or other relatively delicate food product, the pressure regulator (and/or the injection pump) ensures that the injectate is released from the nozzle at a pressure between about 550 psi and about 1,150 psi. In contrast, in some cases in which the described systems are used with a relatively thick and/or tough meat (or other food product), the pressure regulator (and/or the injection pump) ensures that the injectate is released from the nozzle at a pressure between about 1,150 psi and about 2,600 psi. In still other cases, the pressure regulator is configured to have the system 10 spray the injectate at between about 100 psi and about 300 psi (e.g., as discussed above).

In some cases, when the injection valve 45 opens, injection pressure drops because the high-pressure hydraulic system is being opened to the atmosphere. In some cases, there is a time delay before the control system (e.g., compute processing unit 75) can detect the pressure drop. In some cases, there is an additional time delay before the pressure regulator 30 actuates to tighten down the regulator valve and to thereby build up pressure again. In some cases, the opposite occurs when the injection valve closes, with the pressure spiking up with a delay before the regulator valve releases and helps return the pressure down to its target level. With respect to the foregoing, such pressure dips and spikes can slow down and/or damage the system 10. Indeed, in some cases, the system is configured not to inject until the pressure builds back up—thus wasting valuable time and causing the system to treat less food product. Additionally, in some cases, pressure spikes are harmful to equipment, especially to the pump, increasing wear and tear on the system and reducing the operational life of one or more components of the system.

In order to address the shortcomings associated with pressure dips and spikes that can occur as the injection process proceeds, some embodiments of the described system are configured to automatically modulate pressure to reduce or eliminate such dips and spikes. In this regard, the system can be configured in any suitable manner that allows it to automatically modulate pressure. In some embodiments, the system comprises one or more sensors (e.g., sensors 40, 42, 44, 46, etc., as discussed herein) that are configured to sense a change in injectate pressure, which can then be used (e.g., by the processing unit 75 or otherwise) to actuate the regulator valve. In some other embodiments, however, instead of waiting for the pressure change to be sensed before actuating the regulator valve the system is configured (e.g., the PID, PLC, and/or other processing unit is programmed, the regulator valve is configured, and/or the system 10 is otherwise configured) to preemptively actuate the regulator valve in anticipation of (or prior to) the injection valve opening and/or closing. Indeed, in some embodiments, when the injection valve opens, the regulator is already on its way to being tightened so that delay is eliminated and pressure spikes are mitigated. Similarly, in some cases, when the injection valve closes (something that happens relatively quickly), the system is configured (e.g., the PID, PLC, and/or other processing unit is programmed, the regulator valve is configured, and/or the system 10 is otherwise configured) to already have actuated the regulator such that the regulator is already in the process of opening so that there will be a place for the fluid to go (e.g., to reduce and remove injectate pressure spikes). In some cases, to predict when the injection valve is about to open, the PLC, PID, and/or other processor calculates (e.g., via kinematic equations or otherwise) when the food product transport 55 is about to stop moving. In this regard, predicting when the injection valve will open and close is relatively straightforward because the start time and duration are known.

By way of non-limiting illustration, FIG. 1O provides an upper graph showing changes in injectate pressure in some embodiments in which the regulator 30 is reactively activated (e.g., based on changes in injectate pressure) and a lower graph showing the regulator's corresponding reactive activity. In particular, FIG. 1O shows that in some embodiments after the injection valve 45 has been closed for a period of time, the injection pressure is at (or relatively close to) the "target pressure". Then, as the injection valve opens and injectate is released from the nozzles 50 and/or nozzle head 125, the injection pressure dips. When and/or after the injection pressure dips, the regulator is activated to increase pressure back towards the target pressure. FIG. 1O further shows that once the injection valve is closed and the injectate is prevented from being released from the system, the injectate pressure spikes. Then after such spike is detected, the regulator is activated to release pressure and return the injectate pressure towards the target pressure.

Figure 1P:
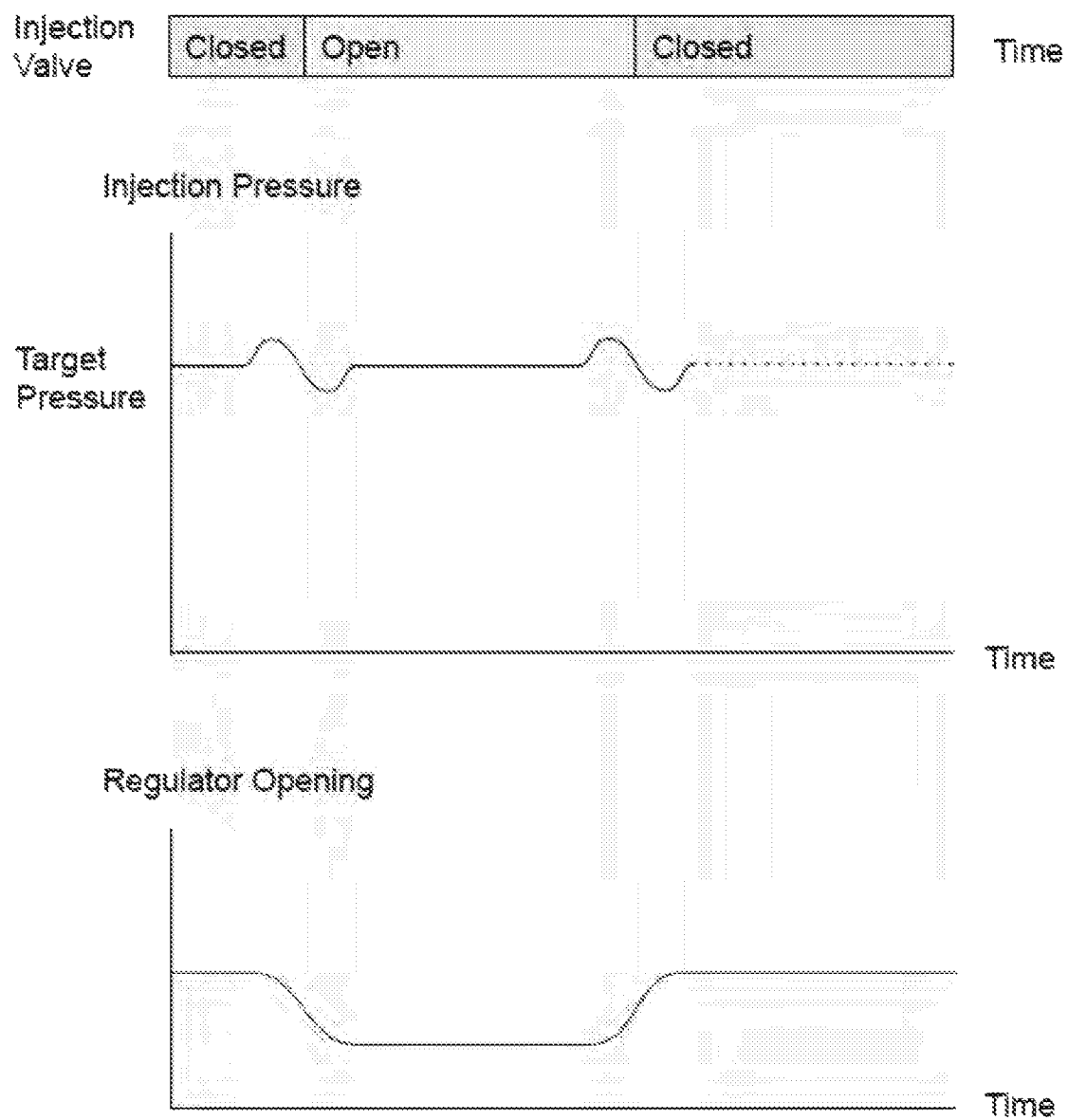
FIG. 1P illustrates two graphs, with the upper graph plotting injection pressure and the lower graph plotting regulator opening in accordance with a proactive pressure regulation embodiment.

In contrast with FIG. 1O, FIG. 1P provides an upper graph showing changes in injectate pressure in some embodiments in which the regulator 30 is proactively activated (e.g., in anticipation or in advance of changes in injectate pressure and/or valve status) and a lower graph showing the regulator's corresponding proactive activity. In particular, FIG. 1P shows that, in some embodiments, after the injection valve 45 has been closed for a period of time, the injection pressure is at (or relatively close to) the "target pressure". Then, prior to the injection valve opening, the regulator is activated, causing the injection pressure to raise slightly. Next, as the valve is opened, the pressure drops slightly (e.g., roughly equivalent and opposite, in some cases, to its initial spike) such that the as the injection valve opens and injectate is released from the nozzles 50 and/or nozzle head 125, the injection pressure rapidly reaches its target pressure. FIG. 1P further shows that, in some cases, before the valve is closed (e.g., while the valve is opened), the regulator is proactively activated, causing a slight jump in injectate pressure. However, once the valve is closed, the injectate pressure is able to drop (e.g., roughly equivalent and opposite, in some cases, to its earlier spike) and the injectate pressure is quickly restored to its target pressure.

In addition to (or in place of) modulating injectate pressure by preemptively actuating the regulator 30, in some embodiments, the system is configured (e.g., the PID, PLC, or other processing unit 75; the pump 20; and/or the system 10 is otherwise configured) to vary the pump speed to anticipate and/or eliminate pressure dips and spikes as the injection valve opens and closes. Indeed, in some embodiments, the system (e.g., the PID, PLC, or other processing unit 75; the pump 20; and/or any other suitable portion of the system) is configured to increase the pump's speed just prior to the valve opening to avoid a pressure dip as the valve opens. In contrast, in some embodiments, the system (e.g., the PID, PLC, and/or other processing unit 75; the pump 20; and/or any other suitable portion of the system) is configured to decrease the pump's speed just prior to the valve closing to avoid a significant pressure spike as the valve closes.

Indeed, in some cases in which the pump's speed is kept constant as the injection valve 45 is opened and closed, a relatively large amount of injectate is forced (e.g., when the valve is closed) back into the injectate tank. Indeed, in some cases, when the valve is closed and the pump is pumping at a constant speed, most if not all of the injectate is channeled back to the tank. In some cases, this recirculation of unsprayed injectate back to the tank (e.g., via bypass line 33) is important to help regulate pressure (e.g., to help prevent pressure from getting too high). That said, such recirculation can waste energy and can even heat up the injectate, which can lead to increased bacterial growth rates and/or injectate spoilage.

Figure 1Q:
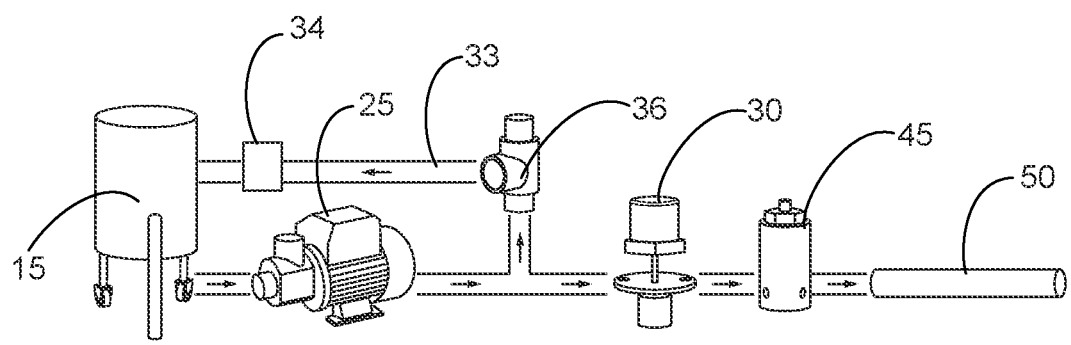
FIGS. 1Q-1R each show a schematic view of a different representative embodiment of the food product treatment system.
Figure 1R:
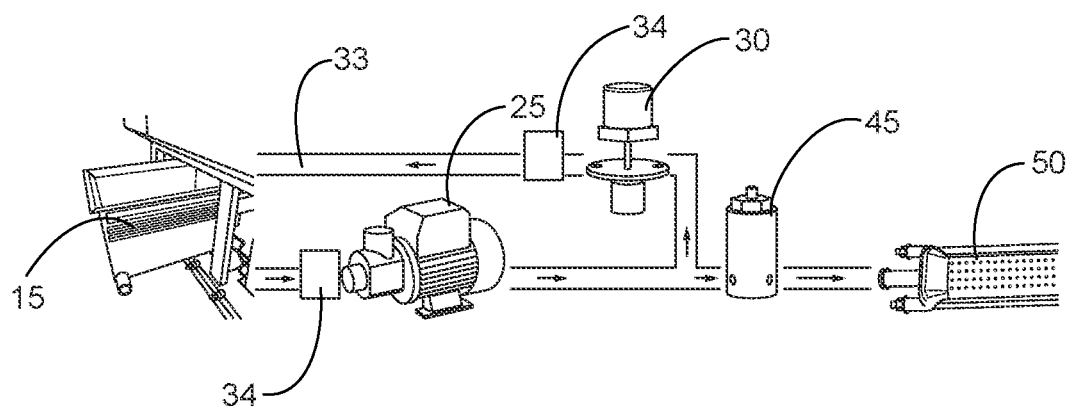

In light of the foregoing, the system 10 can be modified in any suitable manner that allows it to reduce the amount of injectate that is channeled back to the tank 15 without ever passing through the nozzles 50. In some embodiments, the system comprises one or more flowmeters (and/or any other suitable sensor) on an exhaust side of the regulator 30 that are configured to track injectate that flows back to the tank. By way of non-limiting illustration FIGS. 1Q and 1R show some embodiments in which a flowmeter 34 is configured to determine when and/or how much injectate is being returned to the tank 15 (and/or sent to any other suitable location).

In some cases, flow rate through the regulator valve 30 and/or the bypass line 33 is used to modulate the pump's speed (e.g., via the PLC, PID, and/or any other suitable processing unit). For instance, in some cases, when the valve 45 is closed and injectate is flowing back into the injectate tank 15, measurements of injectate flow to the tank are used to reduce the speed of the pump 25 so as to reduce injectate flow through the regulator valve (e.g., back to the tank). In some such cases, the processor is configured to treat the injection valve as being in one of two different states, namely in either an open a closed state. Thus, in some cases, the pump speed that is ideal for minimizing regulator flow while the injection valve is different (e.g., higher) when the valve is open than it is when the valve is closed and the system is trying to reduce injectate flow through the regulator and back to the tank. Accordingly, in some cases, the system is configured to operate the pump at two different speeds (e.g., a higher speed when the valve is open (and/or about to open) and a lower speed when the valve is closed (or about to close). Indeed, in some cases, the system is configured to switch from the valve closed state to the valve open state a little early (e.g., before pump speed is sped up) to ensure that there is no period (or to reduce any time period) when the pump is not delivering sufficient injectate to spray the injectate from the nozzles 50 at a desired pressure.

Where the system 10 comprises one or more pressure regulators 30, the system can comprise any suitable type of pressure regulator that is configured to raise, release, and/or otherwise control pressure in a portion of the system and/or to valve injectate to and/or to otherwise control the introduction of injectate into the tank 15 or to any other suitable location (e.g., when the valve 45 is closed). In this regard, some examples of suitable regulators, include, without limitation, one or more back pressure regulators, dome loaded pressure regulators, pressure regulator valves, tank blanketing regulators, pressure relief valves, pressure regulating safety valves, computer controlled pressure regulators, electro-pneumatically actuated computer pressure regulators, pressure sensor regulators, and/or any other suitable regulators. Moreover, while some embodiments of the pressure regulator are used with a separate pressure relief valve 36 to send unsprayed injectate back to the tank 15 through one or more bypass lines 33 to regulate pressure (see e.g., FIG. 1Q), in some other embodiments, the pressure regulator itself optionally comprises a pressure relief valve that is in fluid communication with one or more outlet ports of the injectate pump 25 to allow for any high pressure injectate to be released (e.g., in the case that a bypass regulator valve or three-way valve of the system fails, in turn, letting the high-pressure fluid escape the system without damaging the pump). By way of non-limiting illustration, FIG. 1R shows an embodiment in which the regulator 30 is configured to act as a valve that channels excess injectate back to the tank 15 so as to keep injectate pressure at desired levels within the system.

Where the system 10 comprises a regulator 30, the regulator can be disposed in any suitable location. Indeed, FIG. 1Q shows that in some embodiments, the regulator 30 is disposed in fluid communication and in series with the pump 25 and nozzles 50 and/or the nozzle head 125. In contrast, FIG. 1R shows that in some embodiments, the regulator 30 is disposed in parallel with the pump (e.g., prior to the injection valve 45) instead of being in series with the pump. In this regard, while having the regulator being parallel with the pump may serve a variety of purposes, in some cases, such a configuration helps remove air from the injectate that is sent to the nozzles 50 and/or helps to better steady injection pressure.

In some cases, the system 10 comprises one or more computer controlled actuators, including, without limitation, one or more computer controlled regulators, electro-pneumatic actuators, electro-pneumatically actuated computer controlled pressure actuators, and/or any other suitable actuators that allow the system to regulate injectate pressure. In some such embodiments, the actuator comprises (or is otherwise used with) a microprocessor based PID (proportional integral derivative controller) and/or other processor that provides precise algorithmic pressure control to injectate in at least a portion of the system (e.g., by modulating the pressure regulator 30, the pump 25, one or more pressure relief valves 36, and/or any other suitable component). In some embodiments, such an actuator allows for injectate to return to the tank 15 during the time the nozzles 50 are not spraying (e.g., during advancement of the food product transport 55). In some embodiments, the actuator has and/or is otherwise used with a PID controller or other processor with a set point that is set via the computer processor 75 (e.g., via a touchscreen, a smartphone, phone, laptop, tablet, computing device, and/or any other suitable input) such that the PID (or other processor) plays a role in controlling the injectate pressure within the system 10. In accordance with some embodiments, the PID (or other processor) also utilizes air pressure to control the mechanical function of a venting pressure regulator to set the desired pressure. In some cases, the electro-pneumatic actuator is used for operation of the head such that any pressure exceeding the specified amount is relieved by the pressure regulator and/or a back-pressure regulator (e.g., into the injectate tank 15).

In some cases, the system 10 optionally comprises one or more venting pressure regulators. While such a venting pressure regulator can comprise any suitable component, in some embodiments, it comprises a high pressure, low flow piston sensed regulator. Additionally, in some embodiments, the venting pressure regulator works in conjunction with the electro-pneumatic actuator (and/or any other suitable regulator). In some cases, however, the electro-pneumatic actuator is optionally configured to fail in an open position so that it performs the function of the venting pressure regulator (e.g., acting as an overpressure safety relief valve). In some cases, the venting pressure regulator (and/or the electro-pneumatic actuator) works to maintain a computer specified pressure from the action of the electro-pneumatic actuator, with such specified pressure falling in any suitable range, including, without limitation, between about 80 psig and about 20,000 psig, or within any subrange thereof (e.g., between about 6,000 psig and about 15,000 psig or even between about 100 psig and 350 psig).

In some cases, the system 10 further comprises one or more pulsation dampers that are configured to relieve hydraulic shock caused by pulsation from some embodiments of the injectate pump 25, actuation of the regulator 30, actuation of the injection valve 45, and/or actuation of any other suitable component of the system. While such dampers can be disposed in any suitable location, in some embodiments, they are disposed between the pump and the nozzles 50. Additionally, in some cases, to reduce vibration to the cabinet 90 and the system, one or more conduits leading to and/or from the injectate pump are configured to reduce vibration (e.g., such conduits comprise flex hoses, rubber hoses, and/or any other suitable material).

In accordance with some embodiments, the system 10 optionally comprises one or more three-way valves. In this regard, such valves can perform any suitable purpose, including, without limitation, for: shunting injectate through one filtration branch or another (e.g., filtration branch 550 or 552 in FIG. 1K), forcing water and/or another backflushing agent through one or more particular filters (e.g., as shown in FIG. 1K), directing injectate into and/or away from one or more injection valves 45 and/or nozzle heads, releasing pressure from a portion of the system, purging air bubbles from the system, draining cleaning solution from the system during a cleaning cycle, and/or any other suitable purpose. In this regard, such a valve can comprise any suitable valve, including, without limitation, a pressure shutoff valve (e.g., an air operated, manually operated, automated, computer controlled, and/or any other suitable three-way valve) and/or any other suitable valve.

In some cases, one or more of the optional three-way valves comprise an optional pressure shutoff valve that is configured to help maintain a desired injectate pressure within the system 10. While such a valve can have any suitable characteristic, in some embodiments, it comprises any suitable pressure rating (e.g., between about 12,000 psi and about 4,000 psi (at its high end), or anywhere between, such as between about 10,000 psi and about 6,000 psi). Additionally, while the pressure shutoff valve can be actuated at any suitable pressure, in some embodiments, the valve is actuated with a minimum/maximum pressure range of about 40 psi to about 200 psi, in any subrange thereof (e.g., about 80 psi to about 110 psi).

As additional examples of suitable characteristics of the optional three-way valve (e.g., the purge/return valve 1270 in FIG. 22H), in some cases, it optionally comprises an inlet port, an outlet port to the tank 15 to allow for the injectate from the pressure regulator 30 to return to the tank 15 as it passes through the three-way valve, and one outlet port that is configured to function as a drain for cleaning the system. Indeed, in some embodiments instead of a two-way pressure relief valve 36 in FIG. 1Q, the pressure relief valve 36 comprises a three-way valve having one outlet that flows to the injectate tank and one that flows to a drain and/or any other suitable location. In some embodiments, the three-way valve is configured to allow injectate to either be returned to the tank 15 after passing through the injection pump 25 in normal operating conditions, or to dump fluids through a dedicated flush port exiting the cabinet 90. In some cases, the fluids delivered to the inlet port originate from the pressure regulator 30 (e.g., the venting pressure regulator). Additionally, in some cases, when the system 10 is cleaned, the three-way valve can direct fluids to both the tank and a dedicated flush port.

With respect now to the bypass line 33, FIGS. 1A, 1Q, and 1R show that some embodiments of the system 10 comprise one or more bypass lines 33 that allow injectate to be released from the system (e.g., to the tank 15) when injectate pressure in the system is above a set limit for one or more components of the system. Indeed (and as mentioned above), in some instances in which the injection pump 25 is pressurizing injectate and the dwell time valve 45 is closed between sprays of injectate through the nozzles 50, the bypass line prevents undue pressure increases by bleeding some of the injectate out of the system (e.g., into an injectate tank). Additionally, (and as mentioned above) in some cases, the bypass line leads from the venting pressure regulator (or pressure regulator 30) and/or a relief valve to allow fluid to be returned to the tank (e.g., via the three-way valve (discussed above), a two-way valve, and/or in any other suitable manner).

Where the system 10 comprises one or more bypass lines 33, the bypass lines 33 can drain injectate (and/or any other suitable material) from the system 10 into any suitable location, such as into the injectate tank 15 (e.g., for recirculation and/or any other suitable use), a drain, a storage tank, etc. In accordance with some embodiments, however, FIG. 1A shows that the bypass line 33 bleeds injectate back into the injectate tank 15. In some such embodiments, the bypass line comprises one or more nozzles, is angled, is configured to be submersed, and/or is otherwise configured to direct injectate back into the injectate tank in such a manner that injectate within the tank is mixed and prevented from becoming stagnant as injectate is introduced into the tank through the bypass line. In some embodiments, however, the tank comprises and/or is configured to be in fluid communication with one or more high shear and/or low shear mixers to mix the injectate (and/or to prevent the injectate from becoming stagnant).

With respect now to the injectate filter 35, some embodiments of the system include a pre-filtration system that is configured to filter the injectate before it enters into the injection pump 25 (as discussed above). In some such embodiments, the system does not include any filters after the pump. In some other embodiments, however, the system optionally comprises one or more injectate filters that are disposed after the pump, and which can (in turn) each comprise any suitable filter that is capable of preventing particles and/or other debris in the injectate from passing through the filter and plugging the nozzles 50 in the nozzle head 125. Some non-limiting examples of such filters include one or more high pressure in-line hydraulic filters, high pressure tee-type hydraulic filters, medium pressure hydraulic filters, membrane filters, ceramic filters, stainless steel element filters, sintered filter elements filters, sintered tin bronze element filters, metal fiber felt element filters, nickel element filters, paper filters, and/or any other suitable filters. Indeed, in some embodiments, the injectate filter comprises one or more high pressure hydraulic filters (e.g., a stainless steel element high pressure hydraulic filter, as produced by Norman Filter Company, LLC of Bridgeview, IL, USA and/or any other suitable entity). Additionally, in some cases, in addition to, or in place of, the injectate filter, the system 10 comprises one or more blenders (e.g., shear blenders) that are configured to reduce particulate size.

While the injectate filter 35 can comprise any suitable characteristic, in some embodiments, the filter has a pore size between about 10 μm and about 120 or any suitable sub-range thereof (e.g., between about 65 μm and about 80 between about 70 μm and about between about 15 μm and about 20 and/or any other suitable sub-range). Indeed, in some embodiments, the filter ensures that particles in the injectate that reach the nozzles 50 are at least 90% the size of a spray orifice (or exit aperture) in the nozzle, or smaller (e.g., less than about 76%, less than about 60%, less than 50%, or any suitable amount smaller than a diameter of the orifice). For instance, some embodiments of the injectate filter comprise a pore size that is about 20 μm±5 so as to only allow particles smaller than such pore size to pass through the injectate filter. In still other embodiments, the injectate filter comprises a pore size that is about 5 μm±3 so as to only allow particles smaller than such pore size to pass through the injectate filter With respect to the pressure sensors 40, FIG. 1A shows that some embodiments of the system 10 optionally comprise one or more pressure sensors 40 or transducers. While theses pressure sensors can be disposed in any suitable location (e.g., before and/or after the dwell time (or injection) valve 45), FIG. 1A shows an embodiment where a first digital pressure sensor 42 is disposed before the dwell time valve 45, a second digital pressure sensor 44 is disposed after the dwell time valve 45 along with a pressure gauge 46 comprising a display (and/or that is capable of providing pressure readings to the PID, PLC, and/or any other suitable computer processing unit 75). Accordingly, in such an embodiment, the pressure sensors can determine a pressure of the injectate in one or more lines (and/or in the system itself) prior to and after the dwell time valve. Additionally, in some embodiments, one or more pressure sensors are configured to determine the operating pressure of the fluid (e.g., injectate, cleaning fluid, and/or other fluid) exiting the nozzles 50 and to report that pressure to the PID, PLC, processing unit, and/or the pressure regulator 30 (e.g., an electro-pneumatically actuated computer controlled pressure regulator). Moreover, in some embodiments, the pressure sensor is located before at a position between about −15 degrees and about 30 degrees, or any subrange thereof (e.g., between about 1 degree and about 15 degrees) above a 90 degree angle in line with the supply tube to which it is coupled. In some such embodiments, such a placement allows for air to escape from the system for a more accurate reading while allowing for excess fluid to drain during system cleaning.

With specific reference now to the nozzle dwell time valve 45, the system can comprise any suitable number of dwell time valves, which, in turn, can each comprise any component or characteristic that allows each valve to open and close to respectively allow and stop the flow of injectate through the nozzles 50 and/or the nozzle head 125 (and/or to allow for the evacuation of air and/or to function as the system is cleaned). Indeed, in some embodiments, the dwell time valve is configured (e.g., as controlled by one or more sensors and/or the PLC, PID, and/or any other suitable processing unit 75) to open and close to provide timed bursts of injectate through one or more of the nozzles. Indeed, in some cases, the dwell time valve is controlled by the PLC. Although such control can function in any suitable manner, in some embodiments, the PLC sends a signal (e.g., a 24 VDC and/or any other suitable signal) to a solenoid (e.g., an air solenoid and/or any other suitable solenoid) and the solenoid actuates the valve (e.g., with air pressure and/or in any other suitable manner.

In any case, the dwell time valve can be configured to open for any suitable length of time that allows the system to tenderize, provide intervention to, pump up, and/or otherwise treat a food product. Indeed, in some embodiments, the dwell time valve is configured to open and allow injectate to spray from the nozzle for a burst that is any suitable amount of time less than about 30 seconds (including, without limitation, any suitable amount of time less than about 10 seconds). For instance, depending on the characteristics of the food product being treated and the desired treatment, in some embodiments, the valve is configured to allow the nozzle to provide a food product with bursts of injectate that last between about 0.05 and about 8 seconds (e.g., between about 0.2 and about 0.8 seconds or any subrange thereof). In some other embodiments (as discussed above), the valve is configured to provide bursts of injectate that last for between about 1 second and about 6 seconds (e.g., 2 seconds±0.6 seconds).

The dwell time valve 45 can comprise any suitable valve that is capable of functioning as described herein. Indeed, in some embodiments, the valve comprises one or more integrated solenoid valves, pneumatic assist valves, pneumatic valves, electric valves, motorized valves, and/or any other suitable type of valves. In some cases, however, the dwell time valve (or manifold actuation valve) comprises a solenoid valve which has a pneumatic assist.

The dwell time valves 45 can be disposed in any suitable location in the system that allows them to control when and how long injectate is sprayed from the spray nozzle head 125. In some embodiments, however, the dwell time valves are disposed relatively close to the nozzle heads. In this manner, by having the valves close to the nozzle heads, the injection sprays can begin and end abruptly, thus providing more precision in the sprays and providing the sprays in an efficient and timely manner. In this regard, a dwell time valve can be any suitable distance from one or more corresponding nozzle heads 50. Indeed, in some cases, the dwell time valve is within 1 m or any subrange thereof (as measured as a distance of fluid flow, or a length of conduit) from an inlet of a corresponding nozzle head. In some other cases, the dwell time valve is within about 0.3 m (as measured as a distance of fluid flow) from a corresponding nozzle head (e.g., less than about 25 cm).

Although in some embodiments, the system 10 is configured such that injectate is sprayed from one or more nozzles 50 and/or nozzle heads 125 when the positions of the food product and the nozzles are substantially static with respect to each other (e.g., the system stops the movement of the food product and/or the nozzle heads 125 while injectate is being sprayed), in some other embodiments, the system 10 is configured to move the food product and/or the nozzle heads continuously and/or intermittently while the injectate is being sprayed.

Indeed, in some embodiments, the system 10 is configured to move the food product in pulses where the product is moved and then stopped when the injectate is sprayed, before the product is then moved again, only to stop to allow the injectate to be sprayed in a different position. Additionally, in some embodiments, the system is configured to move the food product (or, in some cases, 1, 2, 3, 4, 5, 6, 7, 8, 9, 10, or more nozzle heads are configured to move) by relatively short increments. In some cases, the spray nozzle head 125 comprises multiple rows of nozzles 50 with each row being separated by set distance. In some such cases, the incremental movement of the food product (and/or the nozzle heads) allows the nozzle head to spray a first injection pattern, and then to have the food product (or nozzle head) be moved incrementally such that a second spray can be provided, with the second spray being offset from the first spray so as to be sprayed in between rows of the first injection pattern.

Figure 17A:
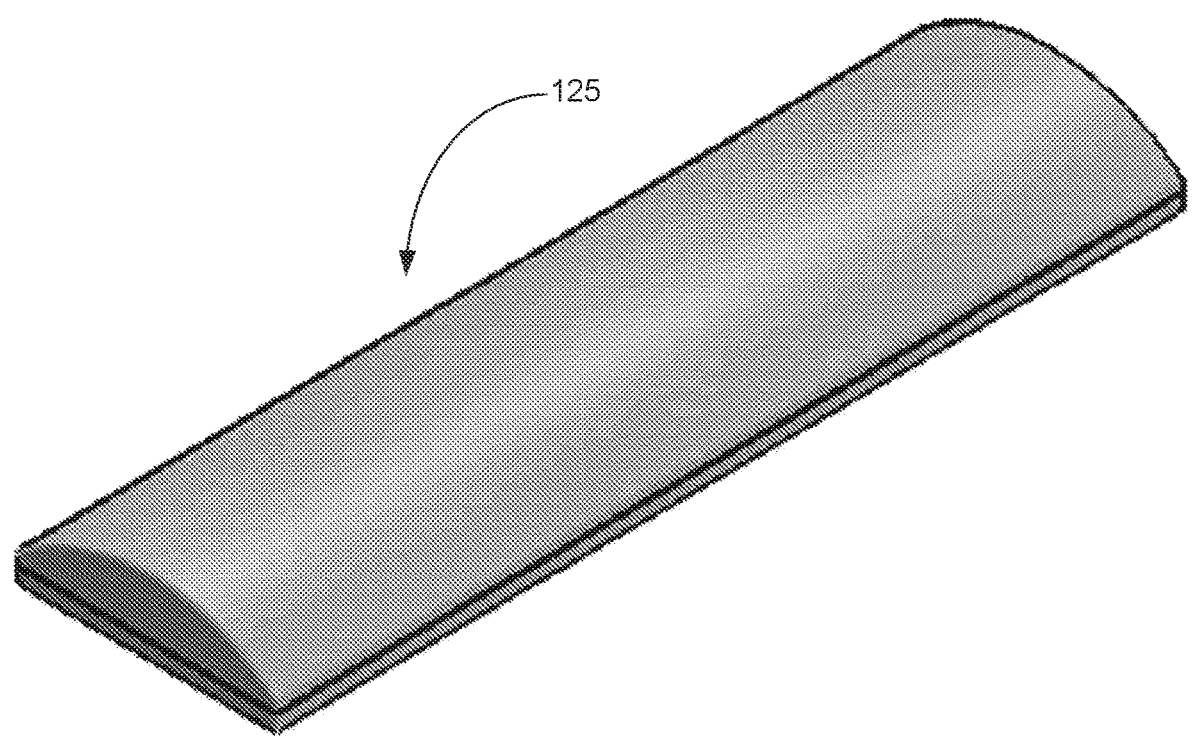
FIG. 17A illustrates a prospective, back side view of a representative embodiment of the spray nozzle head.
Figure 17B:
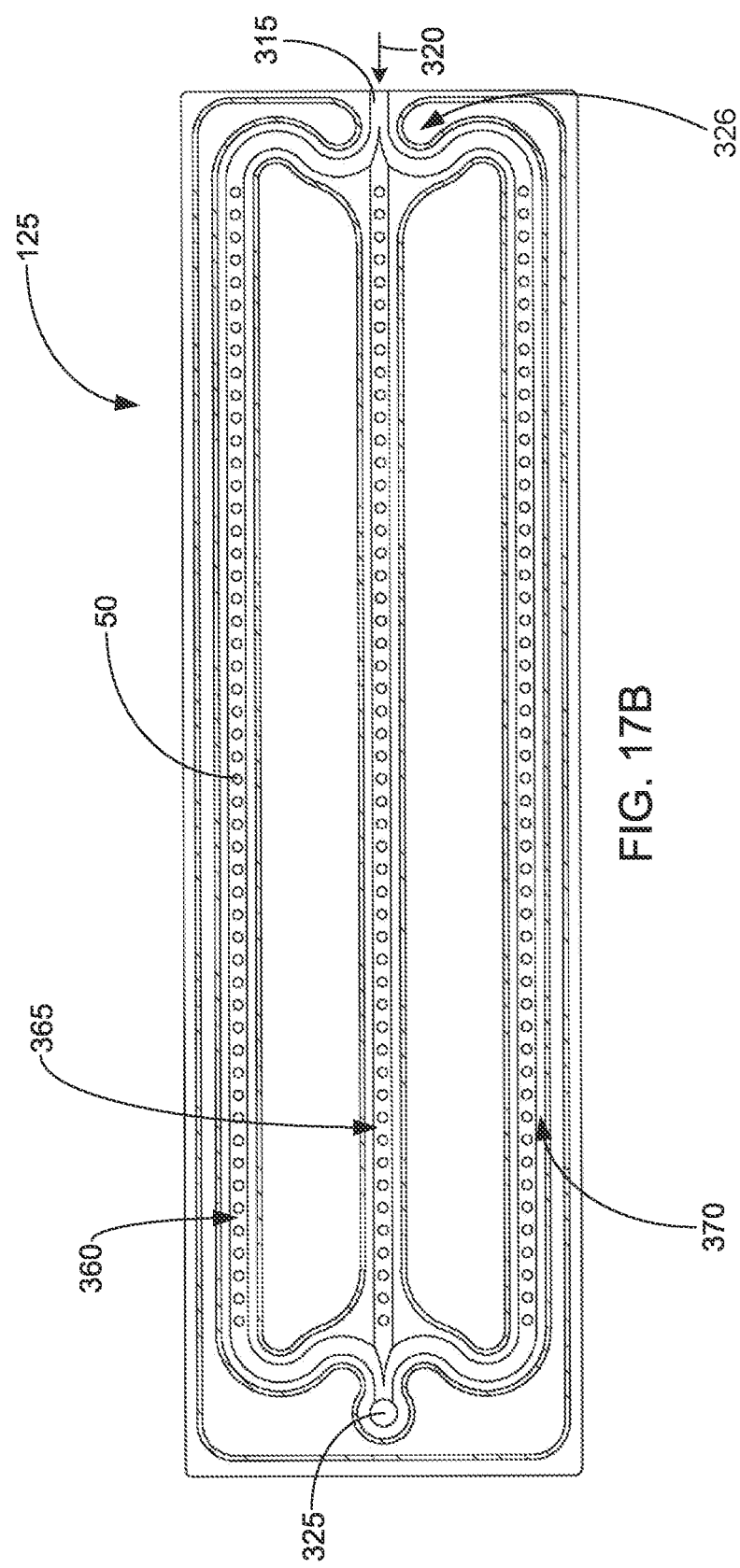
FIG. 17B illustrates a face view of a representative embodiment of the spray nozzle head.
Figure 17C:
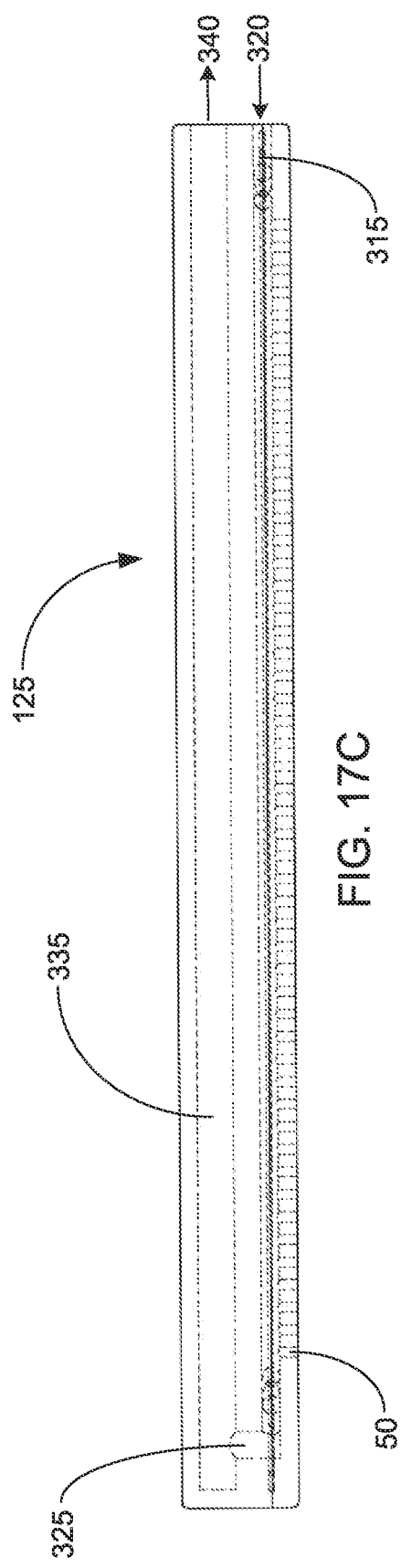
Figure 17D:
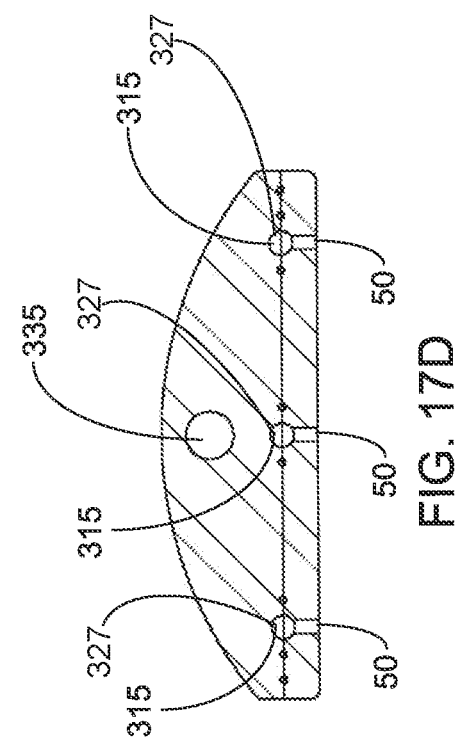

In some other embodiments, the system 10 is configured to move the food product (or, in some cases, the nozzle heads 125) by relatively short increments (e.g., 1, 2, 3, 4, 5, 6, 6, 7, 8, or more increments), with the injectate being sprayed between the incremental movements, followed by a relatively long movement of the food product (or nozzle heads). Indeed, in some cases, as the food product is moved in the relatively long movement, the food product is moved by any suitable distance, including, without limitation, by a distance that is approximately equal to (or that is slightly longer or shorter than) the distance between the farthest-most rows of nozzles (or the distance between the first set 360 and the third set 370 of nozzles 50 in FIG. 17B, when measured in the direction of the movement of the food product,) plus the distance from the second set of nozzles 365 to the third set of nozzles 370. In this regard, the distance between the farthest-most nozzles can be any suitable distance, including, without limitation, between about 0.5 cm and about 0.5 m, or within any subrange thereof (e.g., between about 2 and about 9 cm). Additionally, the distance between the first and second set of nozzles and the second and third set of nozzles can be any suitable distance, including, without limitation, 0.25 cm and about 0.25 m, or within any subrange thereof (e.g., about 3 cm±2 cm). In this manner, some embodiments of the system are configured to treat food products at a relatively high rate.

Where the system 10 is configured to move the food product 200 (or the nozzles 50) in relatively short increments, with the injectate being sprayed between the incremental movements, followed by a relatively long movement of the food product (or nozzle heads), the system can determine how far to move the food product (or nozzles) in any suitable manner. Indeed, in some embodiments, in which the system comprises N number of rows of nozzles (e.g., 360, 365, and/or 370) (or heads) that are separated in the direction of movement of the food product transport 55 by a distance of "$d_H$" (or a distance between heads or nozzles), the system and/or an operator can choose any suitable integer "j" that is greater than zero. In some such embodiments, the system will take j−1 for "small" movements of a distance $d_H/j$, followed by a "long" movement of $d_H*(N-1)+d_H/j$. Thus, in some embodiments, the result will be rows of evenly-spaced injections that are separated by a distance of $d_H$, with no overlapping injections.

By way of non-limiting illustration, if a user has a nozzle head 125 with 6 rows of nozzles 50 that are 1 inch apart, the user need not be stuck with 1 inch spacing between injections. Indeed, in accordance with some embodiments of the system 10, the user can have ½", ⅓", ¼", ⅕" . . . 1/n" spacing, without injections ever necessarily overlapping or being inconsistently spaced. Accordingly, in some embodiments, the described system can: have multiple rows of nozzles, treat a relatively large amount of food product in a set period of time (e.g., more than many competing devices), provide a substantially even spacing of injections (without overlap, in some cases), provide a consistent quality in food product treatment, and/or allow a user/the system to vary spacing of injections (e.g., to vary weight pickup, injection patterns, etc.).

Indeed, in some embodiments in which the system 10 (or a competing device) only comprises a single row of needleless nozzles 50, such a system can be relatively slow and be able to treat only a relatively small amount of food product. In contrast, by having multiple rows of nozzles (e.g., in a single head, in multiple heads, multiple heads coupled to one or more of the same manifolds, and/or in any other suitable manner) and by moving the food product in small movements (j−1) of distance $d_H/j$, followed by "long" movements of $d_H*(N-1)$, some embodiments of the current system are configured to provide a variety of movement and injections options, while avoiding injection overlaps and while allowing injections to be evenly spaced.

Figure 16A:
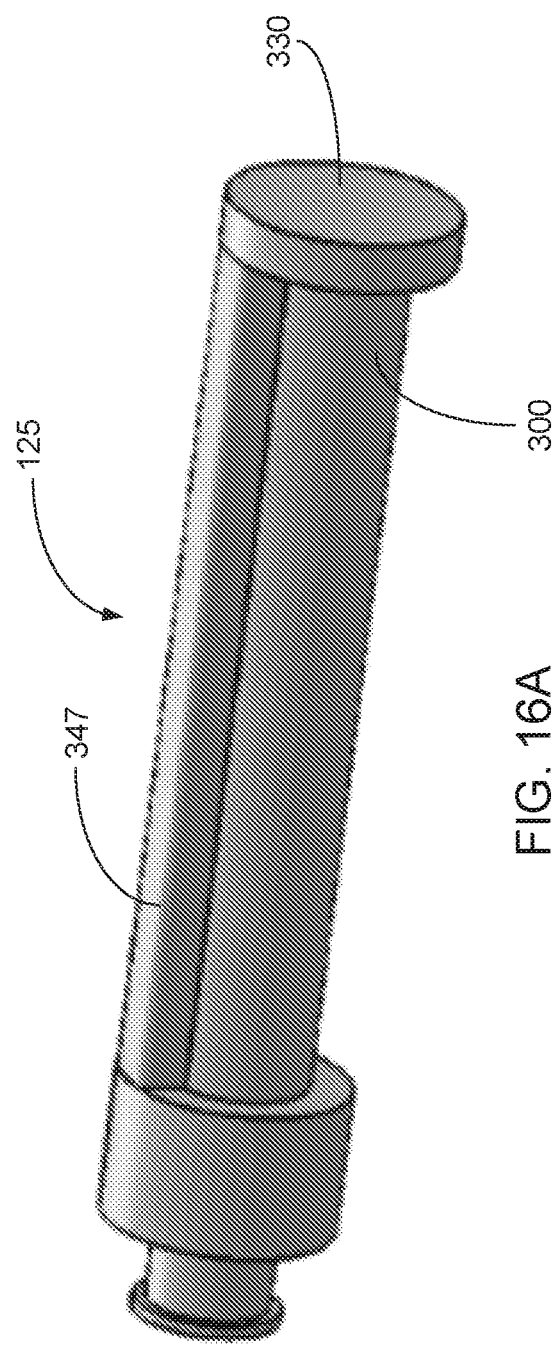
FIG. 16A illustrates a perspective view of a representative embodiment of a spray nozzle head.
Figure 16B:
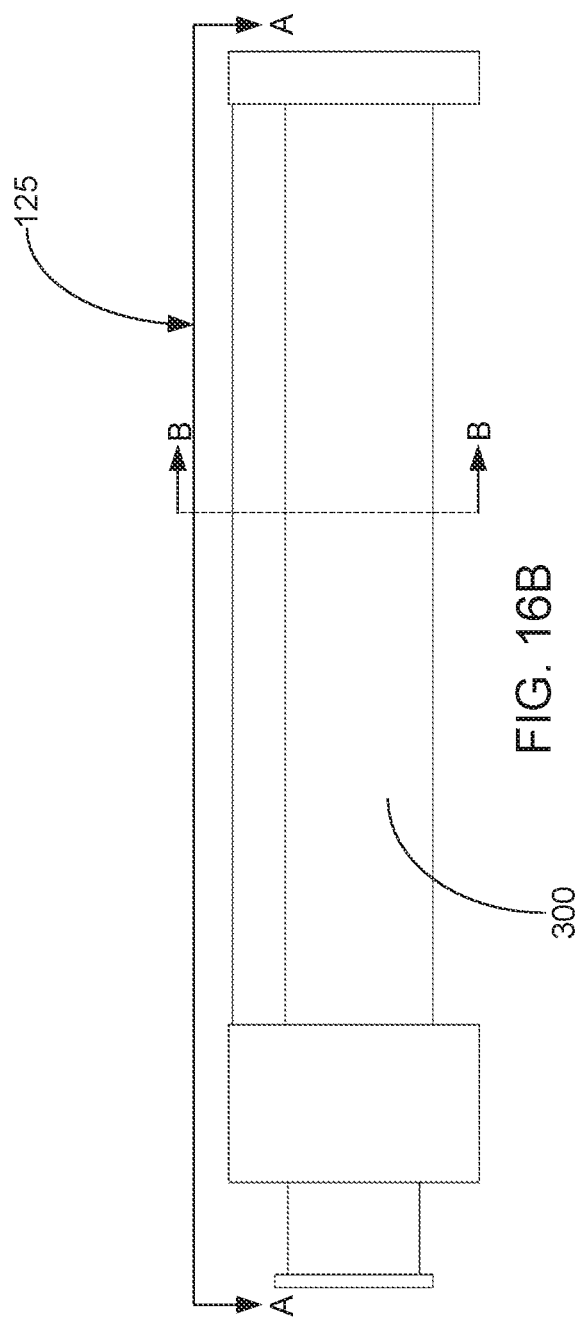
FIG. 16B illustrates a front schematic view of a representative embodiment of the spray nozzle head.
Figure 16C:
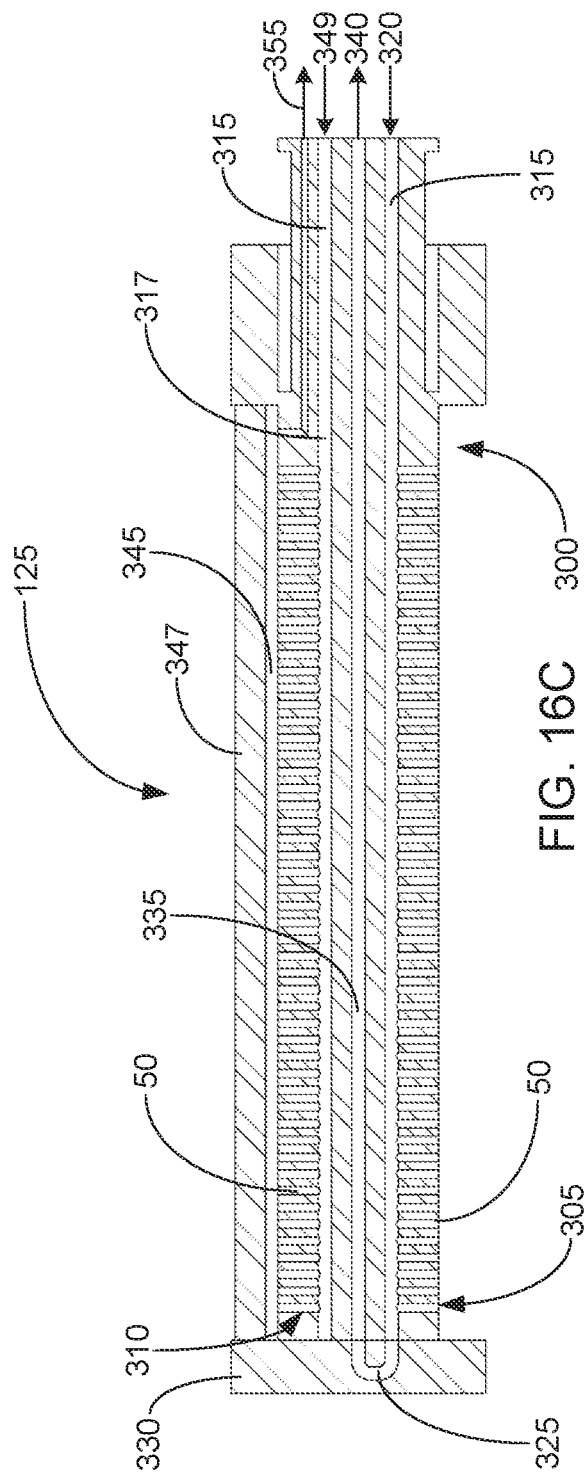
FIG. 16C illustrates a cross-sectional view of the spray nozzle of FIG. 16B, taken along line A-A of FIG. 16B.
Figure 16E:
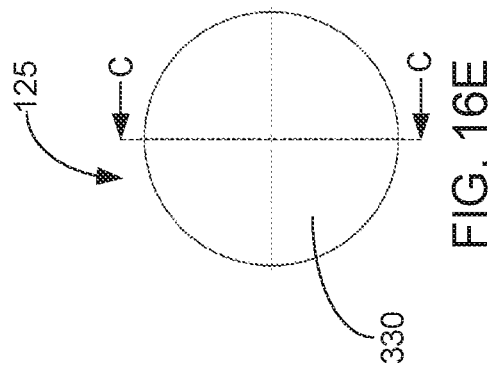
FIG. 16E illustrates an end schematic view of a representative embodiment of the spray nozzle head.
Figure 16D:
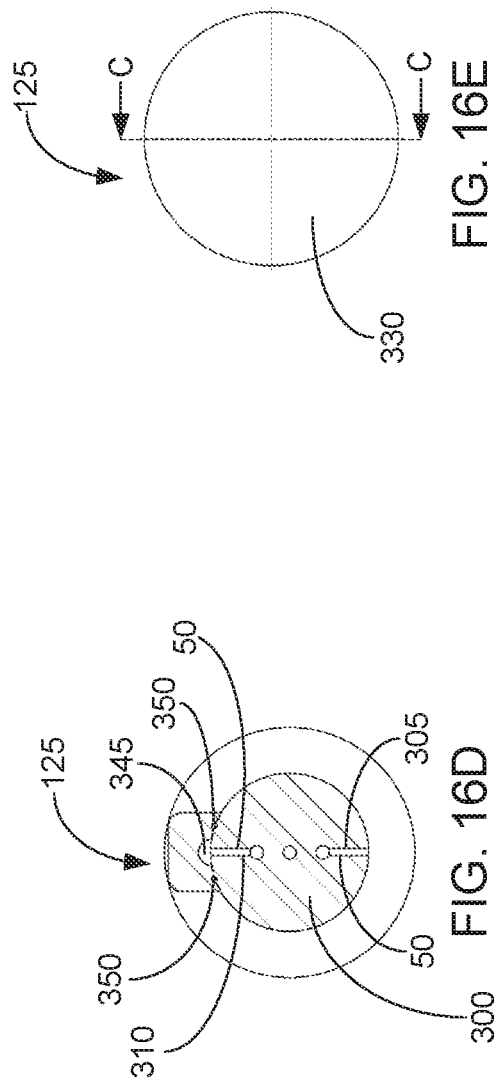
FIG. 16D illustrates a cross-sectional view of a representative embodiment of the spray nozzle head, taken along line B-B in FIG. 16B.
Figure 16F:
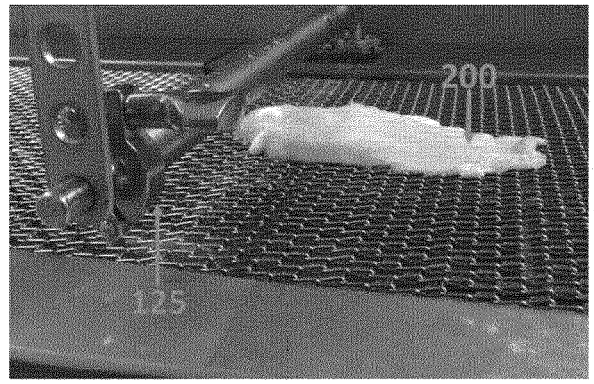
Figure 16J:
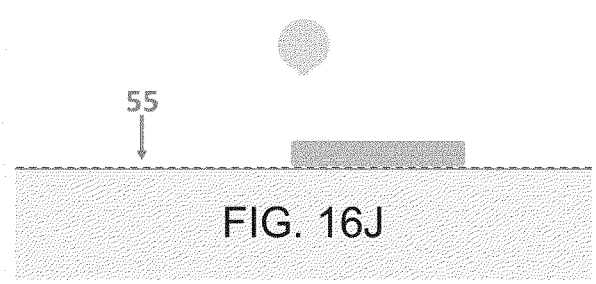
Figure 16G:
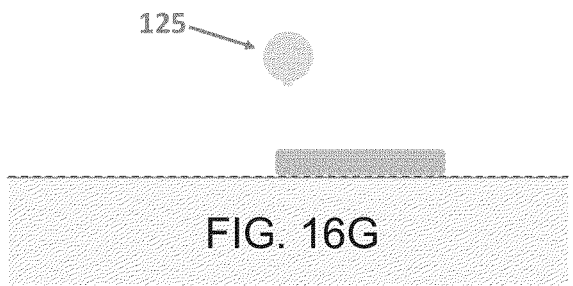
Figure 16K:
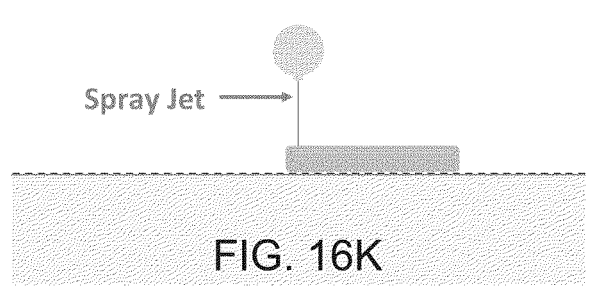
Figure 16H:
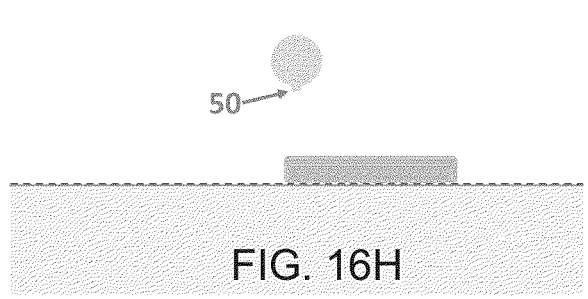
Figure 16L:
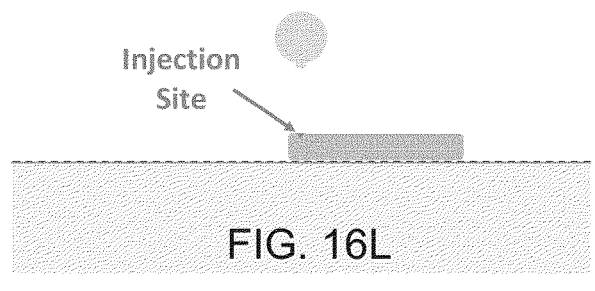
Figure 16I:
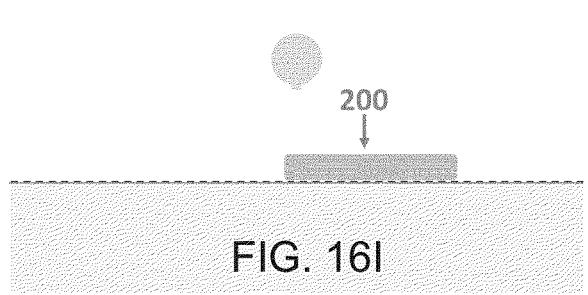
Figure 16M:
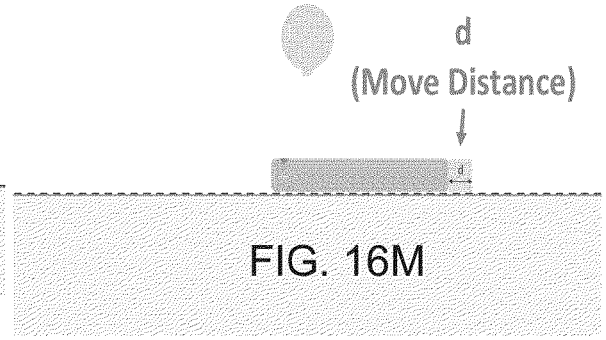
Figure 16R:
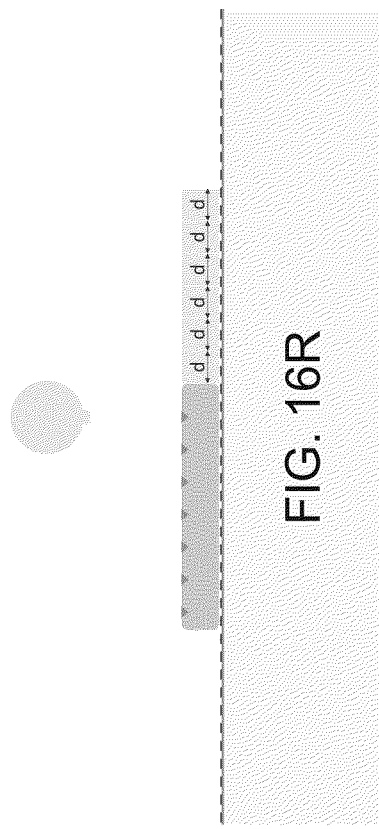
Figure 16S:
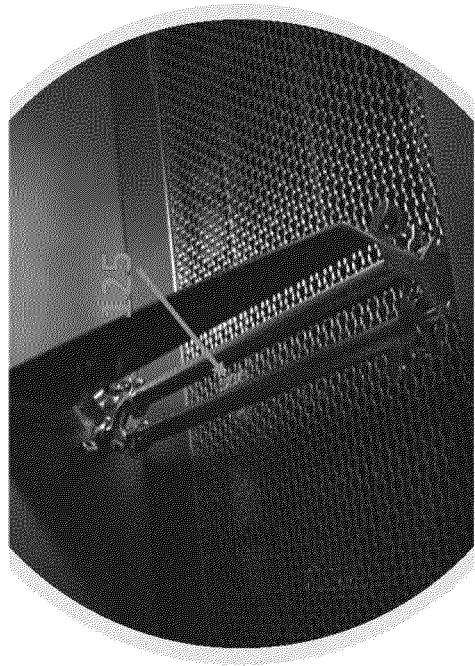
Figure 16T:
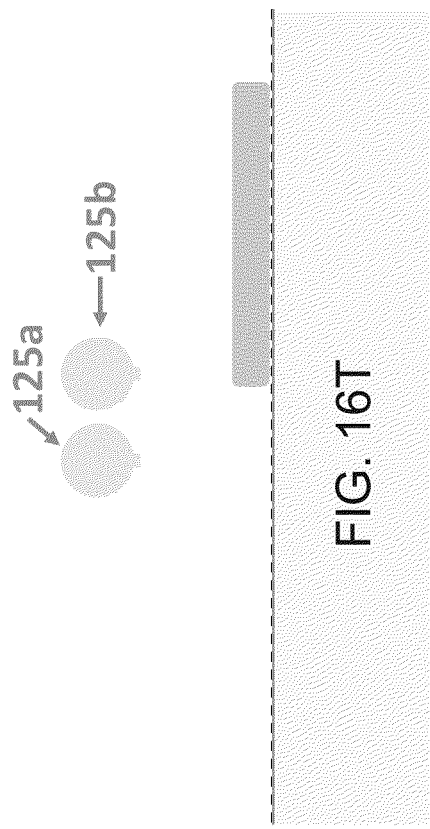
Figure 16U:
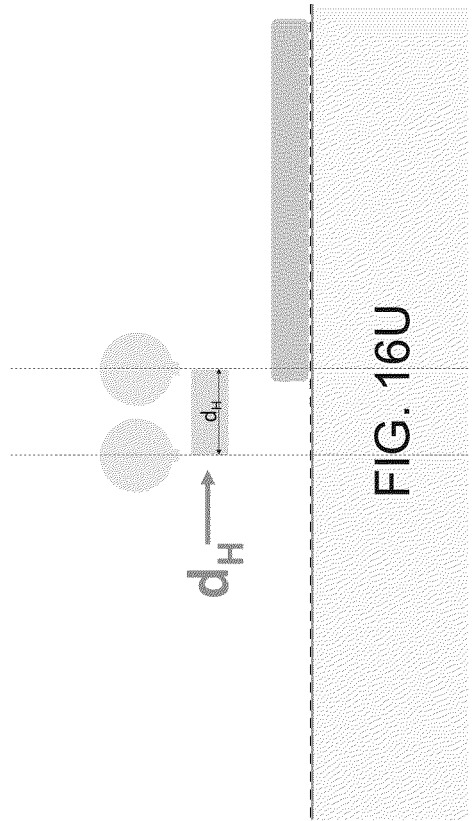
Figure 16A:
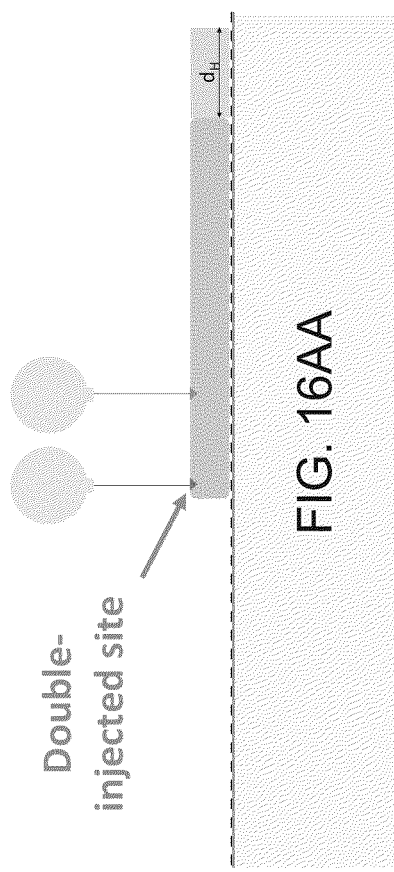
Figure 16A:
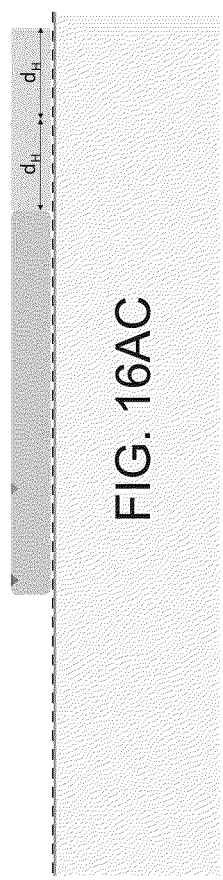
Figure 16Z:
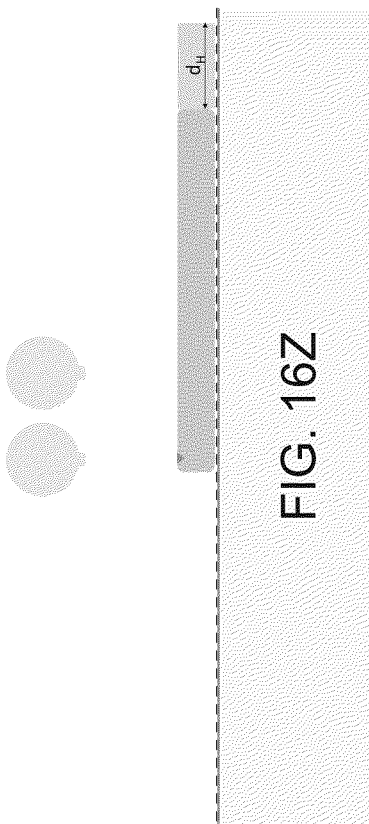
Figure 16A:
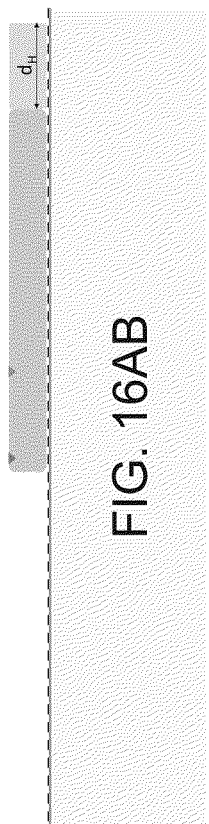
Figure 16A:
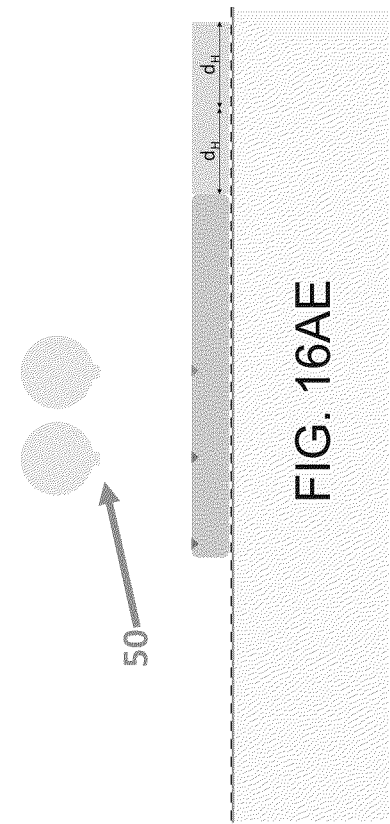
Figure 16A:
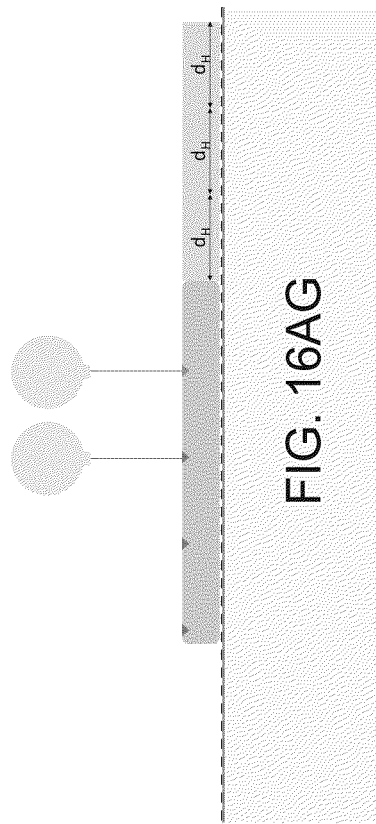
Figure 16A:
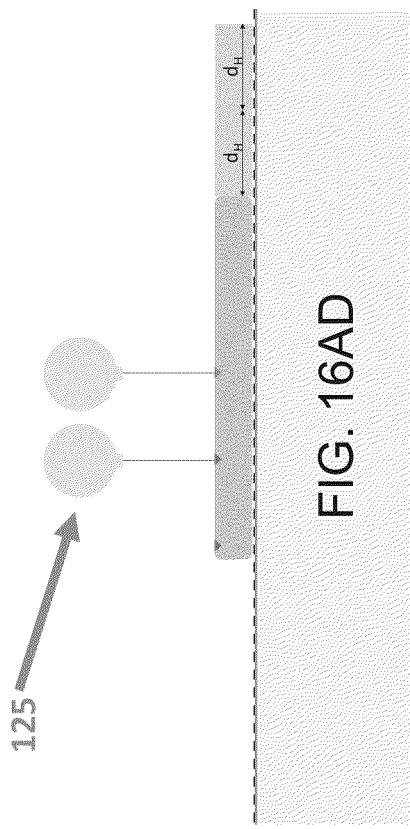
Figure 16A:
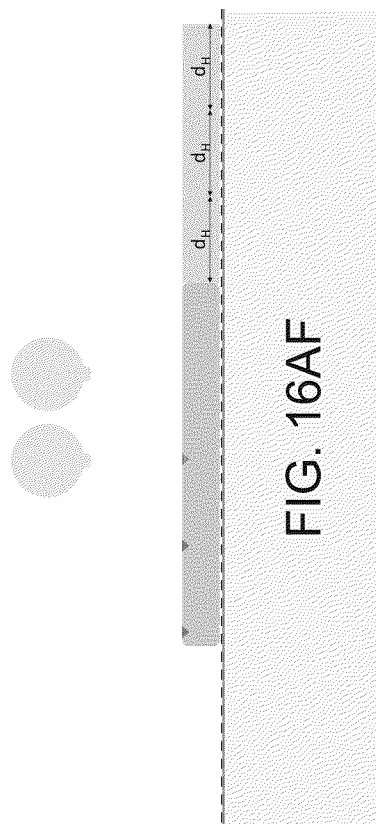
Figure 16A:
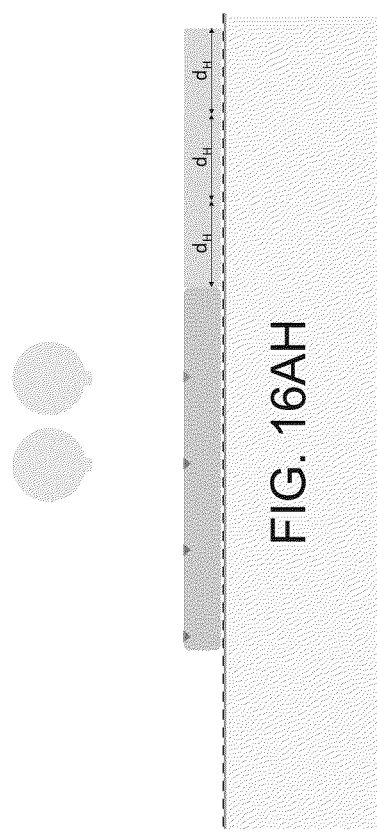
Figure 16A:
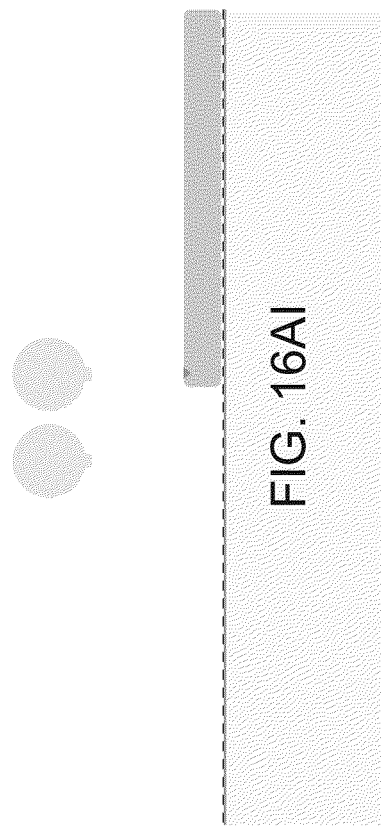
Figure 16A:
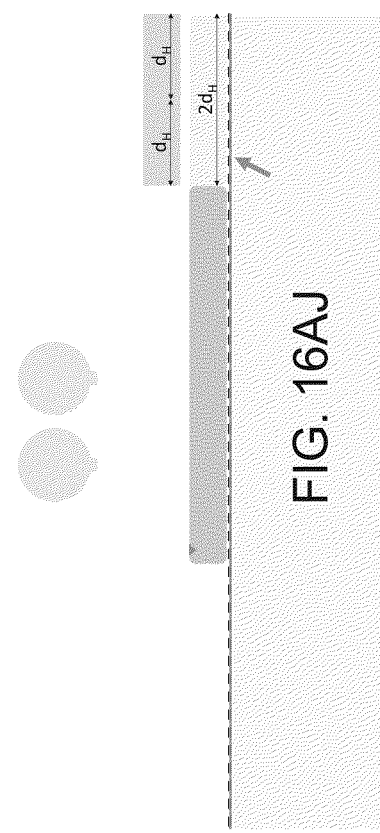
Figure 16A:
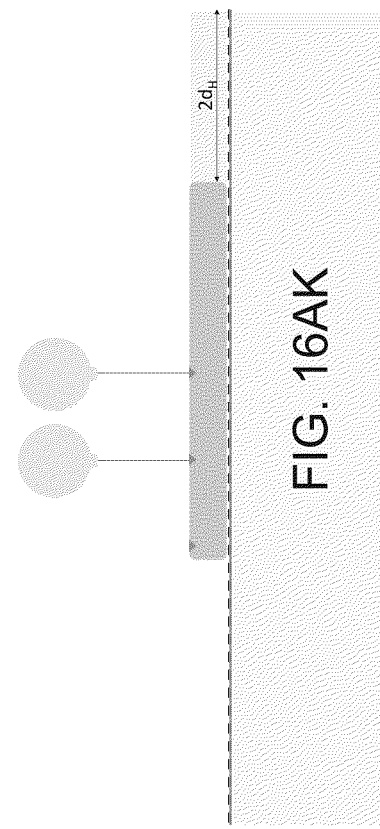
Figure 16A:
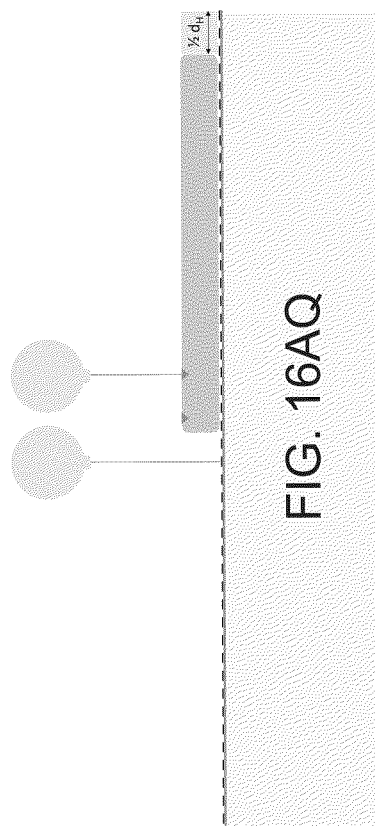
Figure 16A:
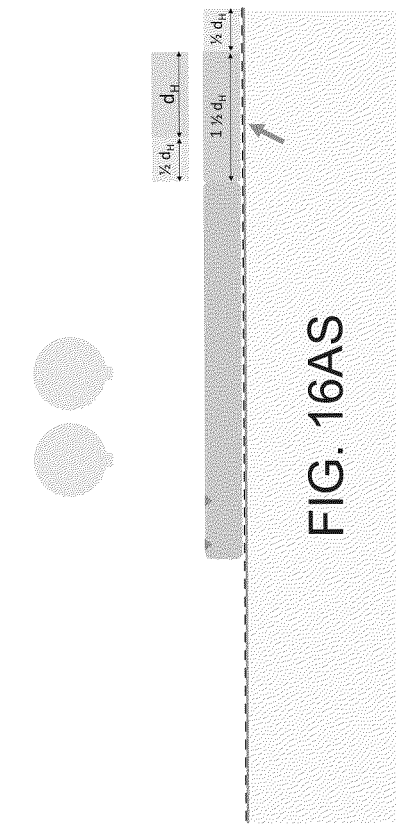
Figure 16A:
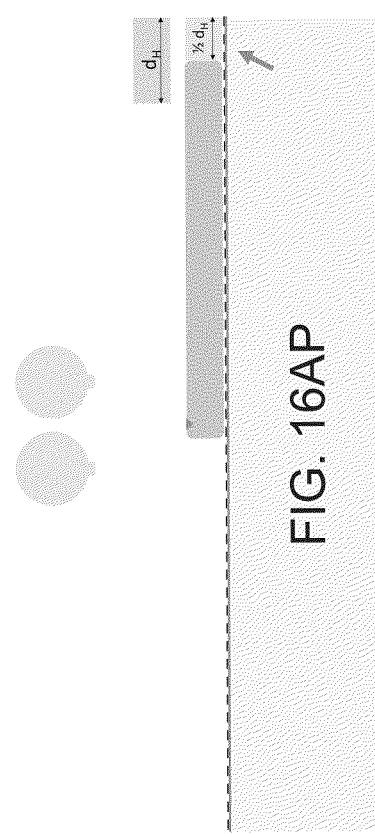
Figure 16A:
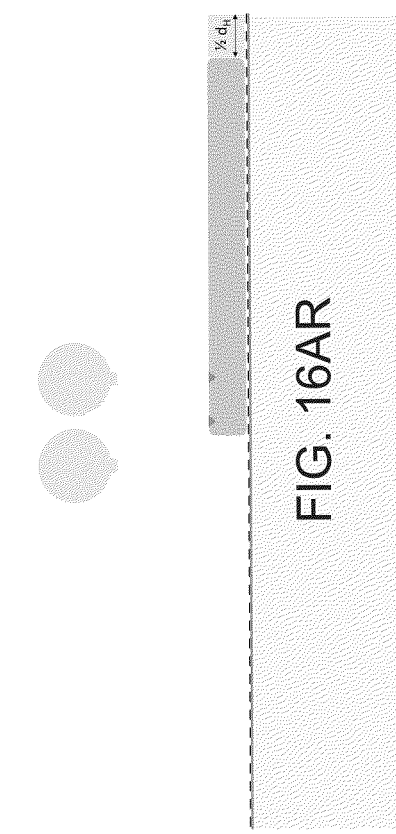
Figure 16A:
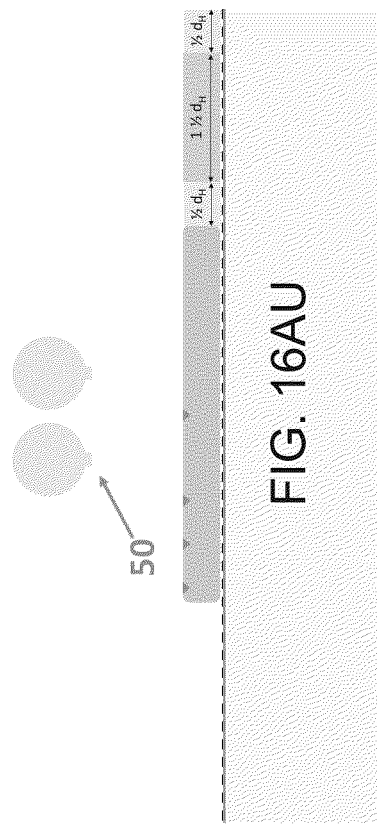
Figure 16A:
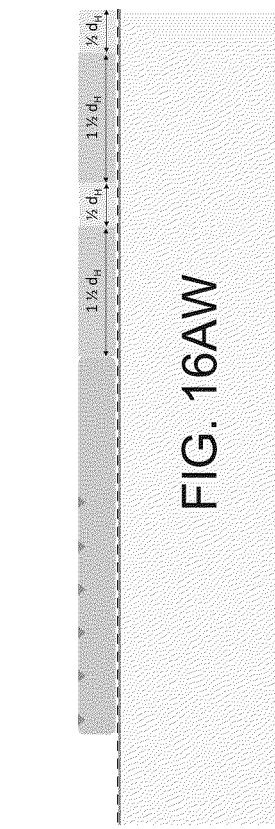
Figure 16A:
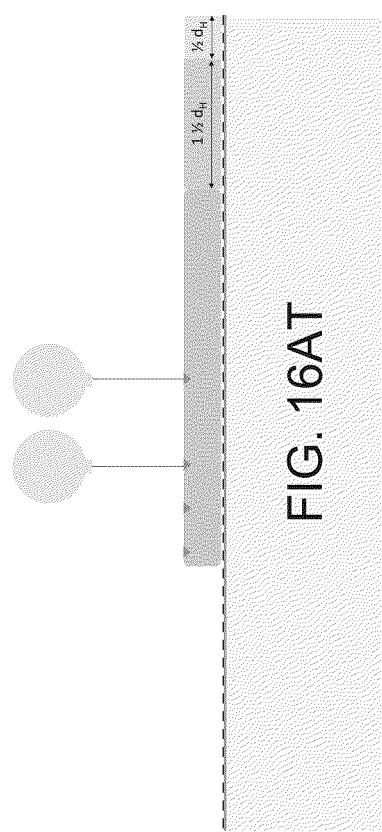
Figure 16A:
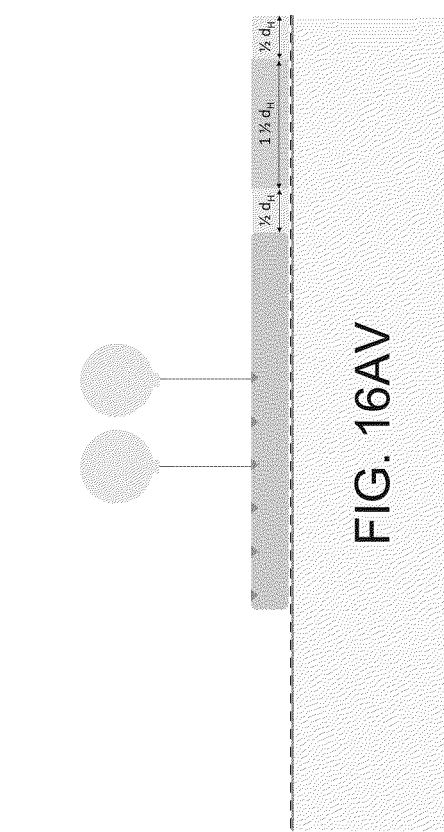

Some non-limiting illustrations of injection patterns for some nozzle head 125 configurations are shown in FIGS. 16F-16AAK. In particular, FIGS. 16F-16R show that, in some embodiments, in which the system comprises a single nozzle head 125, the food product transport 55 is configured to move the food product 200 in substantially equidistant movements "d" to provide the food product with evenly spaced injections. Additionally, FIGS. 16S-16AH show that in some embodiments in which the system 10 comprises two nozzle heads (e.g., a first nozzle head 125a and a second nozzle head 125b that are each coupled to a first and a second manifold such that the heads are both fed from both ends and/or any other suitable nozzle heads), the food product is configured to be moved incrementally by a distance between the two nozzle heads injection sites (or ci). As a result of such movement, in some cases, some sites in the food product are double injected.

Furthermore, FIGS. 16AI-16AM show that in some embodiments, in which the system 10 comprises two nozzle heads 125a and 125b, the system is configured to move the food product by twice the head separation $d_H$ to ensure substantially even injection placement.

Moreover, FIGS. 16AN-16AAA show that, in some embodiments, the system is configured to move the food product 200 by small increments of ½ $d_H$ and by larger increments of 1½ $d_H$ to provide the food product with even injection placement.

FIG. 16AAB shows that some embodiments in which the system 10 comprises two nozzle heads 125a and 125b, the food product transport 55 is also configured to move the food product 200 in increments of ½ $d_H$ and 1½ $d_H$ to provide the food product with even injection placement.

FIG. 16AAC shows that in some embodiments, one method for determining movement of the food product 200 comprises identifying the number "n" of spray heads being used, with the distance between adjacent spray heads or nozzles "$d_H$" being substantially the same distance. FIG. 16AAD shows that, in some cases, the number "n" of nozzles in the system is determined. Some embodiments further include identifying the desired distance between injection sites "j", with j being a whole number, and understanding that the larger j is, the small the separation distance "s" between the injections will be. In some such embodiments, a movement sequence for the food product transport is generated, with such sequence including long "L" and short "S" movements. Specifically, FIGS. 16AAF-16AAJ show that, in some embodiments, such a sequence comprises a repeating pattern that includes a long L move followed by a number "x" short moves, where x is one less than j (or x=j−1). In this regard, the distance the food product should move during each short move may be referred to as "$d_S$". Moreover, the $d_S$ can be the same distance as the separation distance between injections or $d_S=d_H/j$ and $d_S=s$. Additionally, the distance the food product transport can move during a long move L can be referred to as $d_L$, with the $d_L$ being the distance from the first head to the last head plus one more $d_S$ ($d_L=d_H*(n-1)+d_S$). In other words, the dL can be thought of as a distance to get from the spot the first head just injected all the way to the next spot after the last head that needs injected.

In light of the foregoing, FIGS. 16AAF-16AAI show some examples of food product movement patterns that include short S and long L movements. In particular, FIG. 16AAG shows an embodiment in which there are two heads 125a and 125b, with a repeated pattern comprising a long movement L of 1⅓ $d_H$ followed by two short movements S of ⅓ $d_H$.

FIG. 16AAH shows a food product transport 55 pattern comprising a long movement L of 2⅓ $d_H$ followed by two short movements S of ⅓ $d_H$. In contrast, FIG. 16AAI shows an embodiment of a food product transport pattern comprising a long movement L of 2⅓ $d_H$ followed by one short movement S of ⅓ $d_H$. Moreover, FIG. 16AAJ shows an embodiment of a food product transport pattern comprising a repeated long movements L of 3 $d_H$. Thus, as shown in FIG. 16AAK, the described system is configured to be used with any number of nozzle heads 125 and/or rows of nozzles.

As mentioned, some embodiments of the system 10 are configured to move the food product with respect to the nozzles (and/or vice versa). This movement can occur (as mentioned above) in any suitable manner (e.g., in pulses, at any speed, with rest periods (or periods in which a distance between the food product and a nozzle or nozzle head 125 is substantially static), for any suitable amount of time, with continual movement, with continuous movement, and/or in any other suitable manner. Indeed, in some embodiments, the system is configured (e.g., depending on the number of nozzle heads in the system, head placement, nozzle placement, desired food product saturation with injectate, and/or any other suitable factor) to use spray dwell time and movement of the food product with respect to the nozzles (or vice versa) to provide a food product with a desired injectate application. Thus, in some embodiments, the system is configured to ensure that an entire food product is treated (e.g., tenderized, pumped up, provided with intervention, flavored, colored, and/or otherwise treated). In some embodiments, the system is further programmable and/or optimizable (e.g., manually, automatically, and/or otherwise, as discussed herein) to ensure that spray dwell time, movement of the food product and/or nozzles, and/or any other suitable parameter of the system is configured to provide a desired treatment.

With respect to the spray nozzles 50, the system 10 can comprise any suitable number of spray nozzles that allow the system to provide a desired food treatment, to be cleaned, and/or to evacuate air from the system (e.g., during warmup). Indeed, in some embodiments, the system comprises between 1 and 4,000 nozzles, or any sub-range thereof (e.g., between about 1 and about 12, between about 12 and about 64, 400, etc.). By way of non-limiting illustration, FIGS. 16C, 16D, 17B-17F, and 18C-18H show some embodiments in which a nozzle head 125 comprises multiple nozzles 50.

The spray nozzles 50 can comprise any suitable characteristic that allows them to treat a food product with injectate. Indeed, although some embodiments of the nozzles are configured to coat a food product with injectate, some other embodiments of the nozzles are configured to spray the injectate at a relatively high pressure (as discussed above) such that a portion of the injectate penetrates to a desired depth into the food product being treated, without any needles or nozzle needing to contact the food product. In such embodiments, each nozzle can comprise any suitable characteristic that allows it to perform such a function. For instance, the nozzles can each define a spray orifice of any suitable size. In this regard, some embodiments of the nozzles comprise a spray orifice that is less than about 300 μm (or any suitable amount smaller than that) in size. Indeed, in some embodiments, the nozzle's spray orifices are less than about 152 μm (e.g., about 145±8 μm) in size.

The spray nozzles 500 can further comprise any suitable type of nozzle. In this regard, some examples of suitable nozzles comprise one or more sapphire spray nozzles, stainless steel spray nozzles, diamond spray nozzles, orifices in a pipe, orifices in a tube, orifices in a nozzle head 125 (or support), ports, openings, and/or any other suitable spray nozzle or nozzles. In some embodiments, however, one or more nozzles comprise a sapphire spray nozzle.

While FIG. 1A shows that, in some embodiments, the spray nozzles 50 are disposed on a single spray nozzle head 125 (or support), in some other embodiments, the spray nozzles can be disposed on any other suitable number of spray nozzle heads, including, without limitation, 2, 3, 4, 5, 6, 7, 8, 9, 10, or more. By way of non-limiting illustration, FIGS. 1B-1E show some embodiments in which the system 10 comprises three nozzle heads 125 (or heads, manifolds, or supports). Additionally, FIGS. 18L-18N show some embodiments in which the system 10 comprises three nozzle heads 125.

Where the system 10 comprises more than one nozzle head 125, each head can be fluidly coupled to the system in any suitable manner, including, without limitation, by being connected to the system in series, by being connected to one or more distribution manifolds, by sharing one or more optional purge valves 60, by comprising its own optional purge valve, by sharing one or more optional drain lines 160, by comprising its own optional drain line, and/or in any other suitable manner.

Additionally, the nozzle head 125 can have any suitable characteristic that allows it to inject injectate into a food product without requiring the nozzle head or any needles to contact the food product for injection. In one non-limiting illustration, FIGS. 18D-18K show that, in some embodiments, the nozzle head 125 comprises an elongated member 126 that defines one or more injectate channels 127 that extend through a length of the elongated member. In this regard, the injectate channels can have any suitable relation to each other (e.g., running parallel to each other, running perpendicular to each other, running at an angle to each other, being any suitable distance apart from each other, and/or having any other suitable characteristic). By way of illustration, FIG. 18C shows an embodiment in which the channels 127 run substantially parallel to each other.

Where the nozzle head 125 comprises one or more injectate channels 127, injectate and/or any other suitable fluid can be fed into the channels (e.g., to be sprayed) in any suitable manner. Indeed, in some embodiments, the nozzle head has: a single fluid inlet (e.g., to feed injectate into the nozzle head from the single inlet), multiple fluid inlets (e.g., to feed the injectate into the nozzle head from multiple directions, one or more optional fluid outlets (e.g., for off-gassing and/or any other suitable purpose, see e.g., FIGS. 16C, 16D, 17C, and 17D, which are discussed in more detail below)), and/or any other suitable components.

Indeed, in some embodiments, the nozzle head 125 is configured to receive injectate from 1, 2, 3, 4, 5, 6, 7, 8, 9, or more fluid inlets. In this regard, the fluid inlets can be disposed in any suitable location, including without limitation, a one portion or multiple portions (e.g., sides, ends, faces, etc.) of the nozzle head. In some embodiments, however, the nozzle head is configured to be fed injectate from at least two opposite ends (see e.g., FIG. 18F). While such a configuration can provide the nozzle head with a variety of features, in some cases, by having injectate flow into the nozzle head from two opposite sides, the nozzle head is rapidly ready to spray a substantially even spray and pressure from all of its nozzles (as opposed to a nozzle head that has only one inlet at one side and which can take a relatively long period of time to get fluid all of the way to the nozzles at the farthest end of the nozzle head from the inlet). Indeed, while it can, in some cases, take a relatively long time to fill a nozzle head from just one side, in some other cases, by filling the head from multiple sides, the nozzle head can have a relatively fast response time (e.g., spraying injectate relatively soon after the valve 45 opens). In some cases, each nozzle in the nozzle head can cause a small drop in pressure across a length of the nozzle head, causing nozzles that are further from an inlet in the nozzle head to have a progressively lower pressure and/or to spray at a later time than nozzles that are closer to the inlet. Thus, in some embodiments, by filling the nozzle head from multiple inlets, at various ends, sides, and/or any other suitable portions of the nozzle head, such embodiments of the nozzle head can provide their various nozzles with a relatively consistent pressure along a length of the head and/or with a substantially constant spray timing across a length of the head. Accordingly, in some embodiments, by having the nozzle head be filled from multiple sides, the nozzle head can be relatively large (e.g., allowing the system to treat relatively large amounts of food product quickly and without requiring the nozzle head to be moved).

Where the nozzle head 125 comprises an elongated member 126, injectate can be fed into the elongated member in any suitable manner, including, without limitation, through the use of one or more: conduits that are dedicated to one or more channels 127, manifolds, head caps, and/or any other suitable component. By way of non-limiting illustration, FIG. 18D shows embodiment in which two nozzle head caps 128 are configured to channel injectate (and/or any other suitable material) from an inlet 129 and into the elongated member 126. In other words, in some embodiments, the nozzle head caps function as manifolds to direct injectate through the nozzle head. For instance, FIG. 18D shows that, in some embodiments, the nozzle head caps 128 are each configured to direct injectate to feed the various channels 127 in the nozzle head 125.

While FIGS. 1B-1E show that, in some embodiments, the nozzle heads 125 are configured to be disposed above the food product (not shown in FIGS. 1B-1E), in some other embodiments, the heads are disposed above, below, on one or more sides of, at one or more angles to, and/or in any other suitable location with respect to the food product. Indeed, in some embodiments, the system 10 comprises at least one spray nozzle head that is disposed above a food product. Moreover, in some other embodiments, the system comprises at least one spray nozzle head that is disposed above a food product and one spray nozzle head that is disposed below the food product (e.g., so as to spray the food product through a wire mesh conveyor belt or otherwise). Furthermore, in some embodiments, one or more nozzle heads are configured to be disposed above a food product at an angle (e.g., so as to not be parallel with a bed of the food product transport 55). In such embodiments, the nozzle head can be disposed at any suitable angle, including, without limitation, an angle between about 0 degrees and about 180 degrees to one side and/or another side of the food product, or within any sub-range thereof (e.g., by less than about 30 degrees to one side or another).

Figure 2A:
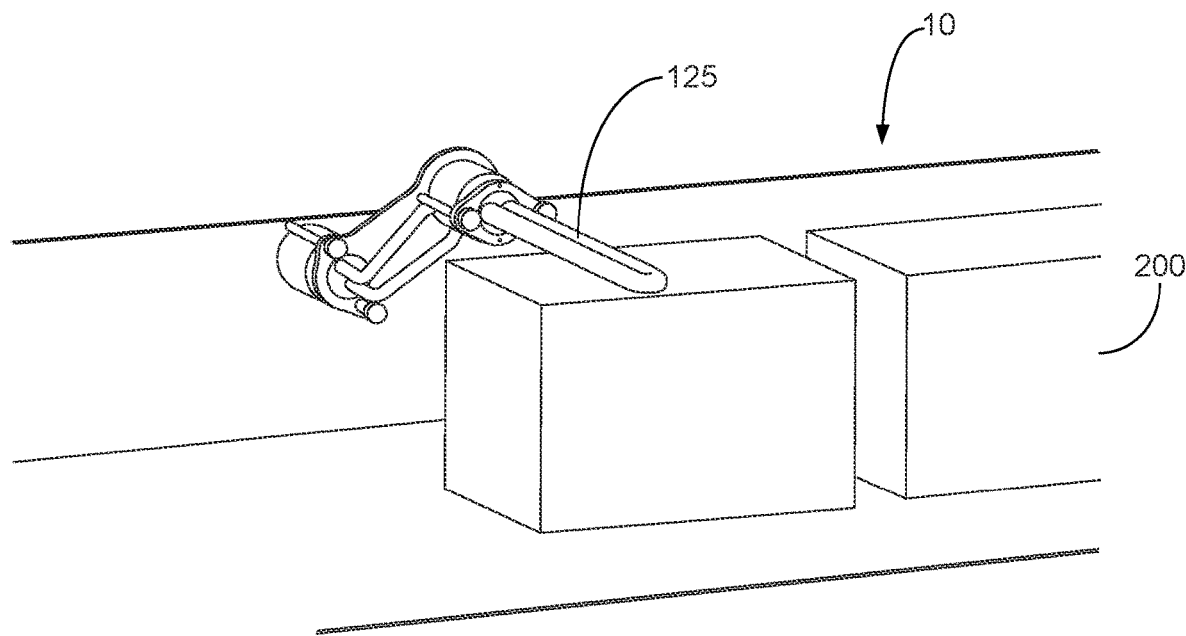
FIGS. 2A-2B each illustrate a perspective view of a spray nozzle head in accordance with a representative embodiment of the food treatment system.

In some embodiments, one nozzle head 125 is configured to spray and/or otherwise apply injectate on or to one side of a food product 200 (see e.g., FIG. 2A). In some other implementations, the described system 10 comprises at least two nozzle heads that are configured to apply injectate onto and/or into different surfaces of a food product (as mentioned above). In some such implementations, the described system comprises a first nozzle head that is configured to spray a first surface (e.g., a top surface) of a food product, and a second nozzle head that is configured to spray a second surface (e.g., a bottom surface) of the food product (or a surface resting on a conveyor belt or other food product transport 55). In this regard, the two nozzle heads can inject and/or otherwise apply injectate to the food product in any suitable manner, including, without limitation, as the food product is hung and moves past the nozzle heads (e.g., via a meat hook, a clip, a basket, and/or any other suitable method); as the nozzle heads are moved past the food product; and/or as the food product moves past the nozzles 50 on a conveyor belt, a spinning platform, a moving surface, and/or any other suitable food product transport 55.

Figure 20A:
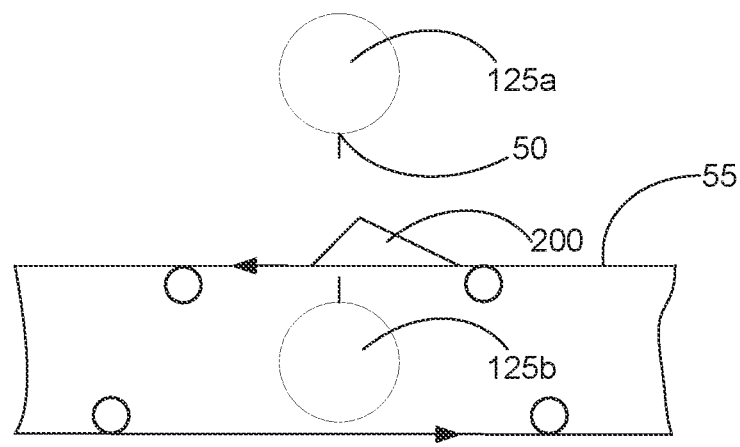
FIGS. 20A-20F illustrate side views of some embodiments of the food treatment system that are configured to inject injectate into two opposite sides of a food product while the food product rests on the food product transport.
Figure 20B:
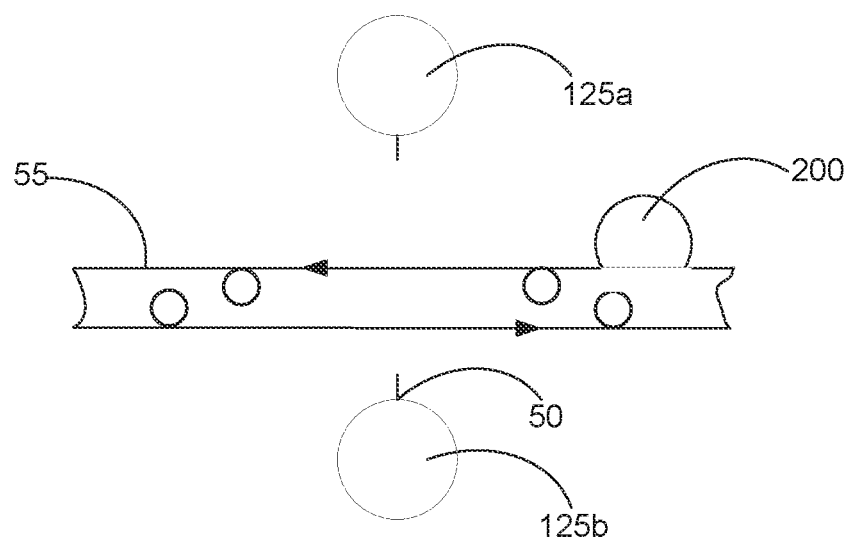

In some cases, the food transport 55 comprises a rod conveyor belt, a wire belt, a chain conveyor belt, a pintle chain, a perforated conveyor belt (or a conveyor belt having openings in it), a perforated rotating surface (or a rotating surface having openings in it), a mesh conveyor, a mesh surface, a weave belt, and/or any other suitable food transport that allows the second nozzle head to spray (and/or otherwise apply) injectate directly through a portion of the food transport and to a food product 200 resting on the transport. By way of non-limiting illustration, FIG. 20A shows an embodiment in which a first nozzle head 125a is configured to spray injectate down on a food product 200, while a second nozzle head 125b is configured to spray the injectate up through a layer of the food transport 55 (e.g., a single layer of a rod conveyor belt, a wire belt, a chain belt, a perforated belt, and/or any other suitable food transport). Similarly, FIG. 20B shows an embodiment, in which a first nozzle head 125a is configured to spray injectate down on a food product 200, while a second nozzle head 125b is configured to spray the injectate up through multiple layers of the food transport 55 (e.g., two layers of a wire belt, a chain belt, a perforated belt, and/or any other suitable food transport).

In some embodiments, the food product transport 55 comprises one or more openings that are configured to align with one or more nozzles 50 so as to allow the nozzles to spray injectate into the food product when the food product transport stops. In this regard, the openings in the food product transport can align with the nozzles (e.g., to allow the nozzles to spray the food product through a belt or other portion of the food product transport) in any suitable manner.

Indeed, in some embodiments, the food product transport 55 comprises one or more servos (and/or any other suitable actuator or actuators) that are configured to position the belt (and/or any other suitable portion of the food product transport) such that one or more openings in the belt align with one or more corresponding nozzles. For instance, some embodiments of the food product transport comprise an absolute encoder that is associated with a servo and/or other actuator and that is configured to be programmed and/or otherwise to be adjusted to stop the food product transport (e.g., a belt) to ensure that openings in the food product transport are properly aligned with one or more nozzles. In some embodiments, the food product transport comprises one or more sensors (e.g., proximity sensors, alignment sensors, and/or any other suitable sensors) that are configured to ensure that openings in the belt are correctly aligned with the nozzles. In some such cases, as the belt gets old and stretches out, the sensor is configured to identify such stretching and to modify movement of the belt to allow openings in the belt to align with nozzles by moving the belt to compensate for the stretching of the belt. In some embodiments, such a sensor is configured to indicate that a belt needs to be replaced and/or repaired. Additionally, while the belt can comprise any suitable belt, in some embodiments, it comprises a rod conveyor belt, which may only be aligned correctly on one axis instead of two (as is found in some other belts), due to its wires being perpendicular to its direction of travel.

Figure 20C:
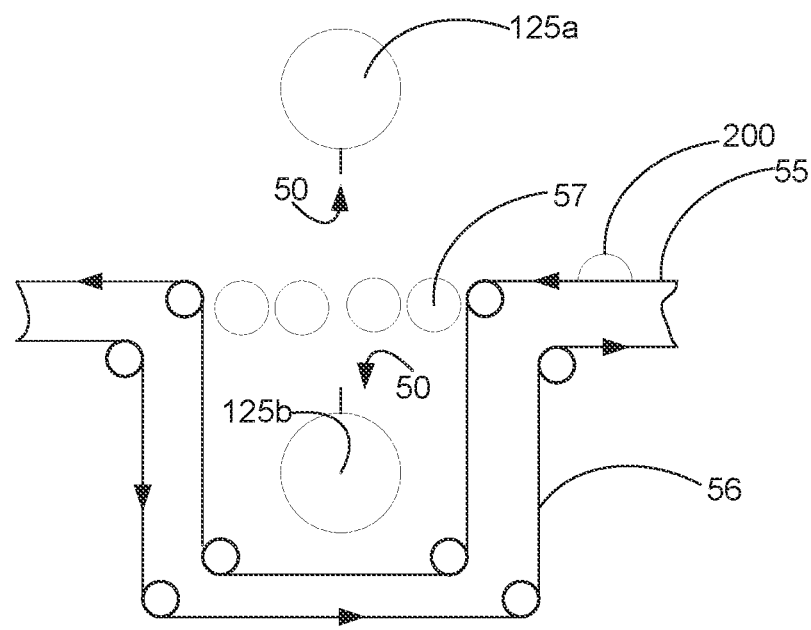

In some embodiments in which the food transport 55 comprises a belt (e.g., a conveyor belt and/or any other suitable belt system) and/or another suitable transport, the belt and/or transport is configured to snake, bend, end at, and/or otherwise be disposed under and/or to a side of the first and/or second nozzle heads. By way of non-limiting illustration, FIG. 20C shows a representative embodiment in which a first nozzle head 125a is configured to spray injectate down on a food product 200, while a second nozzle head 125b is configured to spray injectate into a bottom side of the food product 200 (or a surface of the product that is resting on the transport 55). In this regard, FIG. 20C shows an embodiment in which a conveyor belt 56 or other food transport 55 is configured to wrap around the second nozzle head 125b such that the second nozzle head does not need to spray injectate through the transport. Additionally, FIG. 20C shows an embodiment in which the gap formed by the deviation in the transport 55 comprises one or more rollers 57 (motorized and/or non-motorized) that are configured to support the food product 200 as it passes from one portion of the transport (e.g., conveyor belt) 55 to another. Of course, instead of rollers, the system can have any other component that is configured to support the food product as it is sprayed, including, without limitation, one or more perforated plates, perforated slides, and/or any other suitable supports. Additionally, in some embodiments, the gap in the transport or between the transports is so small that no additional supports are needed.

Figure 20D:
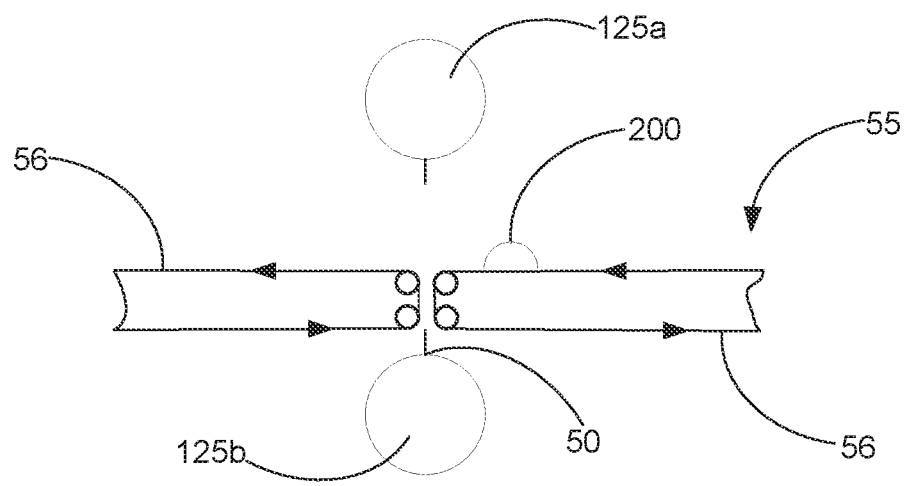

In some other embodiments (as illustrated in FIG. 20D) in which the food transport 55 comprises two belts 56 (and/or other suitable food transportation mechanisms), the second nozzle head 125b is configured to spray injectate in between the two belts (and/or other mechanisms) and then into the food product 200.

Figure 20E:
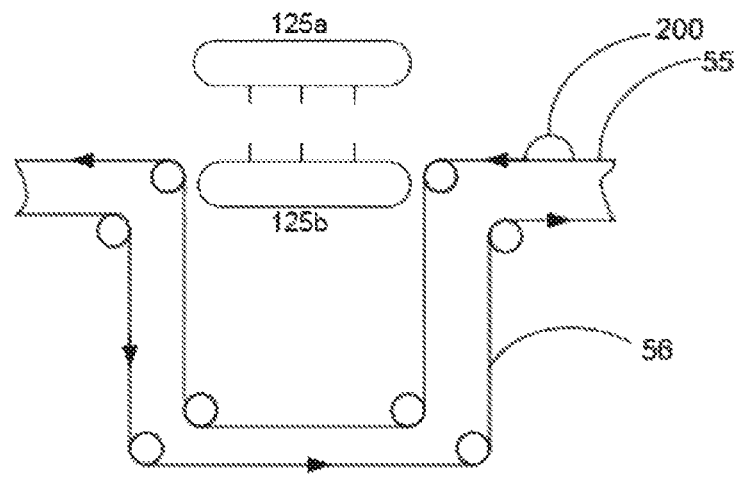

In still other embodiments, FIG. 20E shows that, in some cases, one or more nozzle heads 125b are disposed between two portions of the food product transport 55, such that food products 200 are configured to be delivered to the nozzle head, to slide across a portion of the nozzle head for injection, and then to continue moving on the food product transport. In this regard, while the nozzle head generally need not touch the food product, in some embodiments, such as the one shown in FIG. 20E, the nozzle head may touch the food product, although the nozzle head is needleless, as described herein.

Figure 20F:
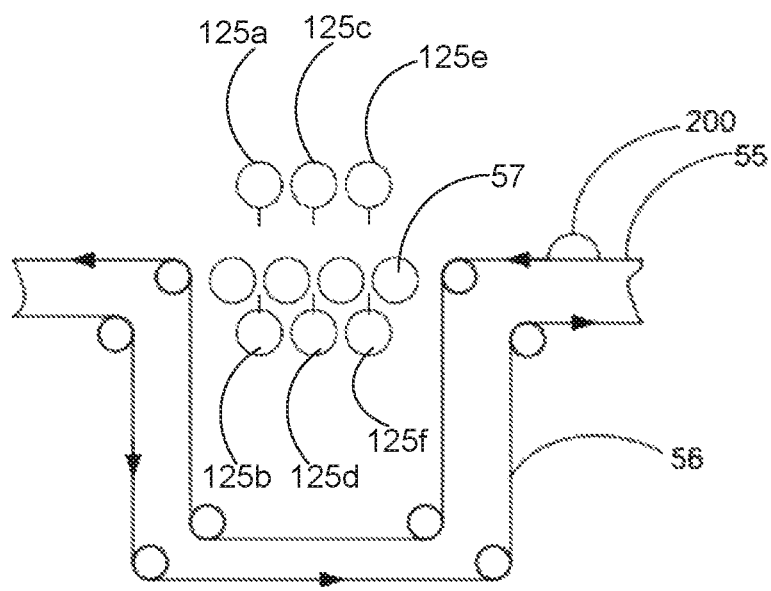

In yet other embodiments, FIG. 20F shows that, in some cases, multiple rollers 57 are disposed between two portions of the food product transport 55, with one or more nozzle heads 125D, 124E, 125F, etc. being configured to spray injectate past a roller and into a food product 200 that is disposed on the rollers.

While spraying injectate into a food product 200 from two or more sides (e.g., a top surface and a bottom surface, a side surface, etc.) can perform a variety of functions, in some cases, by injecting injectate into a food product from two sides, the system 10 is configured to effectively double the thickness of the food product that it can treat. For instance, in some cases in which injectate is only able to penetrate about 1.9 cm into a side of a piece of meat, in some cases in which injectate is sprayed from a top and a bottom nozzle head (e.g., 125a and 125b, as shown in FIG. 20E), the injectate is able to penetrate (from both sides) to fully treat a food product that is 2.8 cm thick.

Where the system 10 comprises more than one nozzle head 125, the various heads can perform any suitable function that allows the system to function as intended. Indeed, in some embodiments, multiple nozzle heads in the system are configured to spray the same injectate (e.g., at approximately the same time, at approximately the same pressure, at a different time, and/or at a different pressure). Accordingly, in some embodiments, the use of multiple nozzle heads allows the system to apply (e.g., inject) the injectate to a food product more rapidly than could otherwise be achieved with a single head. As a result, in some such embodiments, the system is configured to treat more food product in a shorter period of time than could be achieved with a single nozzle head.

In some embodiments, the system 10 comprises one or more nozzle heads 125 that substantially extend across a width of the food product transport 55. In some other embodiments, the system comprises 2, 3, 4, 5, 6, or more nozzle heads that are aligned end to end, side by side, and/or in any other suitable manner that allows them to extend substantially across the width of usable portion of the food product transport (thus allowing the system to treat food product that is disposed across a relatively wide belt and/or other food product transport 55 while the nozzle heads remain in a static position). By way of non-limiting illustration, FIGS. 18O-18P show that in some embodiments, the system 10 comprises multiple nozzle heads 125 (e.g., 3) that are disposed side by side and that are offset along their lengths so as to extend across a width of the food product transport 55. In this regard, one style of nozzle head can be used for multiple systems having food product transports of different widths.

Although in some embodiments, each nozzle head 125 in the system performs the same function (e.g., sprays injectate through its nozzles at the same time, at the same pressure, etc.), in some other embodiments, one or more nozzle heads in the system are configured to perform a different function than another nozzle head of the system. For instance, one nozzle support may be used to: apply (e.g., inject) a different injectate (e.g., a flavoring instead of a tenderizer), apply an injectate at a different pressure, apply a different amount of the injectate, apply injectate through a different size orifice, be at a different distance from the food product, be at a different location with respect to a food product (e.g., be above, below, on an opposite side to, at an angle to, and/or any other orientation), to move at a different time, to move to a different extent, and/or to otherwise perform a different function (and/or function in different manner) than another nozzle head in the system.

Additionally, the spray nozzle heads 125 can comprise any suitable characteristic that allows them to place one or more spray nozzles 50 within a desired distance from a food product. Indeed, in some embodiments, one or more spray nozzle heads are: shaped to substantially match a contour of a food product, selectively be re-shapeable (e.g., via one or more swivel unions, hoses, connector rings, clamps, adjustable connections, and/or otherwise) to allow a configuration of the nozzles to substantially match a contour of the food product, movable (e.g., in shape, in position, manually, automatically, as directed by one or more sensors, to adjust for different food products, and/or otherwise) to help keep the nozzles at one or more desired distances from the food product, and/or is otherwise configured to keep one or more specific nozzles at one or more desired distances from a surface of the food product (e.g., between 0.25 cm and 25.5 cm from the food product, or any suitable subrange thereof, such as between about 3.8 cm and about 8.9 cm, depending on the characteristics of the food product and the desired treatment).

The system 10 can further be configured in any suitable manner that allows it to spray injectate into multiple locations on a single food product 200. Indeed, in some embodiments, the system is configured to move the one or more nozzles 50 (e.g., via movement of one or more nozzle heads 125 and/or in any other suitable manner) with respect to the food product. In some other embodiments, however, the system is configured to move the food product with respect to one or more nozzles (e.g., with respect to one or more heads). In still other embodiments, the system is configured to move both the food product and the nozzles (e.g., the heads) with respect to each other as the system treats the food product.

Where the system 10 is configured to move a food product 200 with respect to the nozzles 50 (e.g., the nozzle heads 125), the system can comprise any suitable components that allow it to accomplish such a function, including, without limitation, one or more conveyor belts (e.g., wire, wire mesh, rubber, plastic, chain, slat, roller, metal, hinge metal, screen cloth, and/or other suitable conveyor belts), roller conveyor systems, augers, servos, food product hanging systems (e.g., rail or otherwise), moving baskets or containers, actuators, motors, moving platforms, rotating surfaces, and/or other suitable food product transports that are powered in any suitable manner, including, without limitation, via one or more motors, pneumatic actuators, linear actuators, servos, hydraulic actuators, electric actuators, mechanical actuators, air cylinders, and/or other mechanical movement devices. By way of non-limiting illustration, FIG. 1A shows an embodiment in which the food product transport 55 comprises a motor driven conveyor belt (e.g., a wire mesh conveyor, a chain belt, and/or any other suitable belt).

With respect now to the purge valve 60, some embodiments of the system 10 do not include such a valve. Indeed, in some embodiments that comprise a nozzle head 125 such as those shown in FIGS. 18C-18G, injectate flows into the nozzle head from two opposite sides of the nozzle head such that all injectate is released through the nozzles and none needs to be release through a purge valve. That said, some embodiments of the system optionally comprise one or more purge valves. While such purge valves can perform any suitable function, in some embodiments, they are configured to be manually and/or automatically (e.g., via the computer processing unit 75 and/or otherwise) opened and closed such that air, injectate, and/or other materials can be purged from the system. Indeed, in some embodiments, the purge valves allow air, water, detergents, vinegar, ozone, and/or other cleaning agents to be run through and drained from the system. Additionally, while some embodiments of the purge valve are configured to open and close mechanically, in some other embodiments, the purge valve comprises a valve that is permeable to gases (e.g., air) and impermeable to liquid (e.g., injectate).

With respect now to the wash apparatus 65 (which may also be referred to as a clean-in-place apparatus), in some embodiments, the system 10 optionally comprises one or more wash apparatuses that are configured to provide one or more cleaning agents and/or rinsing agents (e.g., water and/or any other suitable rinse) to the system. In such embodiments, the wash apparatus can comprise any suitable component or characteristic that allows it to rinse and/or otherwise clean one or more components of the system. By way of non-limiting illustration, FIG. 1A shows that, in some embodiments, the wash apparatus 65 comprises one or more water filters 130 (e.g., carbon filters, activated carbon filters, depth filters, screen filters, surface filters, reverse osmosis filters, ceramic filters, membrane filters, deionization filters, distillation filters, ion exchange filters, mechanical filters, ultraviolet filters, ultraviolet lights, water softeners, stainless steel element filters, sintered filter elements filters, sintered tin bronze element filters, metal fiber felt element filters, nickel element filters, paper filters, and/or any other suitable filter that is able to filter undesirable materials from a water source, such as a potable water source 135 (as illustrated in FIG. 1A)); water softeners 140 (e.g., a salt system, ion-exchange polymer system, and/or any other suitable water softening system); reverse osmosis systems 145 (e.g., one or more reverse semipermeable membranes); reservoirs for cleaning materials 150 (e.g., ozone, ozonated water, purified water, one or more soaps, detergents, vinegar, and/or other cleaning agents); reservoirs for rinse water (e.g., purified rinse water) 155; and/or pumps 156 (e.g., low pressure pumps configured to provide fluid from the wash apparatus to the injection pump 25). In some embodiments, the wash apparatus water filters comprise one or more high pressure hydraulic filters (e.g., stainless element high press filters, as produced by Norman Filter Company, LLC of Bridgeview, IL, USA and/or any other suitable entity).

Thus, in some embodiments, after the system 10 has been used (e.g., after a work shift, between the use of different injectates in the system, after servicing the system, before the systems first use, etc.), the wash apparatus 65 is used to clean one or more components of the system (e.g., the pre-filter 20, the injection pump 25, the pressure regulator 30, the injection filter 35, the pressure sensors 40, the dwell time valve 45, the nozzles 50, the nozzle heads 125, one or more conduits 160 that fluidly connect the system's various components, and/or any other suitable portion of the system). In such embodiments, the materials that are used to clean the system can be disposed of in any suitable manner, including, without limitation, by being directed to a drain (e.g., via a drain conduit 165 or otherwise) and/or a storage tank (e.g., the injectate tank 15, a storage tank in the wash apparatus, an attached filtration system so that the filter system can be cleaned (e.g., via a filter clean in place cycle that is integrated with the injectors and/or pumps, and/or any other suitable cleaning process), etc.). In this regard, while the materials that are purged from the system via the purge valves 60 can be directed to an injectate tank, in some embodiments (unlike that shown in FIG. 1I), the system is configured to prevent injectate that has been sprayed from the nozzles 50 from being mixed with (and potentially contaminating) injectate that has not been sprayed from the nozzles (e.g., unused injectate in the tank and/or injectate that returns to the tank via bypass line 33 and/or one or more drain conduits 165).

Some embodiments of the system 10 are unsealed and open to ambient air (e.g., food products are open to ambient air as the system injects injectate into such food products). In some such embodiments, by having a food product transport 55 that moves food product from ambient air and past the nozzles 50, the system is configured to treat significantly more food product than could be treated in some embodiments in which the system is sealed and only treats food product that is already disposed within a sealed system.

Turning now to the demister 70, some embodiments of the system 10 optionally comprise one or more demisters 70 that are configured to draw air (e.g., one or more gases) and/or vapor from the system (e.g., the cabinet 90, which is discussed below). In this regard, the demister can perform any suitable function, including, without limitation, destructing ozone; preventing toxic or potentially toxic gases and/or vapors (e.g., ozone, lactic acid vapor, etc.) from flowing out of the system (e.g., cabinet 90) where they could cause harm to an operator and/or other person; preventing cross-contamination; collecting and/or condensing vapors, which may otherwise condense in the system and allow for bacterial breeding and bacterial rain to condense and fall from a surface of the system; removing smoke, steam, evaporated injectate, and/or any other suitable material from air in the cabinet; and/or carrying out any other suitable purpose.

While the demister 70 can comprise any suitable component that allows it to draw air and/or vapor from the system 10, in some embodiments, the demister comprises one or more fans, impellors, suction systems, diffusers, condensers (e.g., condenser 72, as shown in FIG. 1A), moisture eliminators, hoods, collectors, ozone destructors, and/or any other suitable components. In one example, while some embodiments of the demister comprise a fan, vacuum, and/or other ventilation device that is disposed between the cabinet 70 and a diffuser, condenser, moisture eliminator, vent, and/or other component configured to remove liquids from air pulled from the cabinet (collectively and individually, a liquid eliminator), in other embodiments, the liquid eliminator is disposed between the cabinet and the fan and/or other ventilation device that is configured to draw air from within the cabinet through the demister. Accordingly, in some embodiments, the liquid eliminator protects the ventilation device from unwanted condensation, contact, and/or contamination with moisture from inside the cabinet.

Turning now to the computer processing unit 75, some embodiments of the system 10 optionally comprise one or more PLCs, PIDs, computers, and/or other processing units (some embodiments of which are discussed below in more detail). In this regard, the processing unit can perform any suitable function, including, without limitation, providing power to any suitable portion of the system; controlling and/or receiving information from or about the pumps (e.g., 25 (as discussed above), 105, 156, 545, etc.), the pressure regulators 30 (as discussed above), the food product transports 55, the demisters 70, the valves (e.g., 45, 60, 120, 553, 554, 575, 576, etc.), movement of the nozzle heads 125, the filters (e.g., 20, 25, 535, 555, 556, etc.), the filtration system (as discussed above), the backflush system, the wash apparatuses 65, the wash apparatus pump 156, the cooling systems 110, the pressure sensors (e.g., 40, 44, 46, 546, 547, 557, etc.), the sensors 80, the flowmeters 34, 560, etc., the scales 85, and/or any other suitable portions of the system; monitoring and/or rectifying nozzle 50 pluggedness; operating any suitable portion of the system (e.g., as listed above); running diagnostics on one or more portions of the system; adjusting the operating parameters of any suitable portion of the system (e.g., as discussed herein); optimizing any suitable operating parameters (e.g., injectate temperatures, nozzle spray pressure, nozzle spray time, food product transport speed, food transport advancement, demister speed, and/or any other suitable parameter) of any suitable portion of the system based on one or more specific characteristics of specific food products, injectates, and/or other desired factors; determining the status of any suitable components of the system (e.g., the tanks 15, the filters (e.g., 20, 35, 535, 555, 556, etc.), the pumps (e.g., 25, 105, 156, 545, etc.), the pressure regulators 30, the food product transports 55, the demisters 70, the valves (e.g., 45, 60, 120, etc.), the nozzle heads 125, the wash apparatuses 65, the wash apparatus pumps 156, the cooling systems 110; the pressure sensors (e.g., 40, 44, 46, 546, 547, 557, etc.), the sensors 80, the flowmeters 560, the scales 85, and/or any other suitable portions of the system; diagnosing errors with one or more components of the system; stopping and/or starting any suitable components of the system; determining when one or more nozzles 50 and/or nozzle heads are partially and/or completely occluded; moving the nozzles and/or nozzle heads; moving the food treatment transport; determining the amount of injectate that has passed through one or more nozzle heads; determining the amount of injectate that has been injected into one or more specific food products; controlling UV lights and/or any other suitable system decontaminating apparatus; determining whether the food product transport is jammed and/or gummed up; reporting on the status of any suitable components of the system; trouble shooting errors with the system; controlling system cleaning; controlling filter backflushing; controlling nozzle cleaning; and/or otherwise monitoring and governing any suitable components and/or parameters of the system.

In some additional non-limiting examples of suitable functions of the processing unit 75, some embodiments of the processing unit: determine pressures within the injectate tank 15; determine injectate levels within the injectate tank; determine and/or address a pluggedness of one or more nozzles; determine and controls the temperature of injectate within the injectate tank; power on and off and/or varies a speed and pressure produced by one or more pumps 25 and/or 545, pressure regulators 30, valves, and/or otherwise controls a fluid pressure provided by such (e.g., pumps 25, 105, 156 and/or 545); adjust a pressure limit on the pressure regulator 30; determines a cleanliness of the injectate filtration system (e.g., filters 535, 555, 556, etc.); determine an amount of fluid that has passed through the filters (e.g., 130, 20, 35, 535, 555, 556, etc.); open and close and determine a status of the dwell time valve 45; determine the pressures measured by the various pressure sensors (e.g., 40, 42, 44, 46, 546, 547, 557, etc.); control a speed at which, a status of, and when the food product transport 55 (and/or food product transport driver 73) moves and stops; determine a status of and opens and closes the purge valve 60; move the food product 200 to a desired location with respect to the nozzles 50 (e.g., via the food product transport and/or otherwise); move one or more of the nozzles and/or nozzle heads 125 to a desired location with respect to the food product; determine a status of and turns on and off and otherwise controls the demister 70, including one or more individual components thereof; control network communications (as discussed below); control or otherwise communicate with one or more user interfaces (as discussed below); control and receive information from the scale system 85; respond to one or more emergency stop switches (e.g., switches 180, shown in FIG. 1A, switches that are triggered when a door or hood is opened, etc.); and/or perform any other functions that allow the processing unit to control, monitor, troubleshoot, record data from, communicate data, and/or otherwise govern the food treatment system 10.

By way of non-limiting illustration, FIG. 1A shows that, in some embodiments, power and/or signal output are provided (as illustrated by lines 170) from the processing unit 75 to various components of the system 10 and signal input (as shown by lines 175) is provided from some such components (e.g., the injectate tank pumps 105, the pressure sensors 100 in the injectate tanks 15, the injection pumps 25, the filter pump 545, the pressure regulators 30, the injectate filters 35, the pressure sensors 40, the filtration sensors (e.g., 546, 547, 557, 560, etc.), the dwell time valves 45, the purge valves 60, the food product transports 55, the wash apparatus pumps 156, the demisters 70, the food product sensors 80, the valves (e.g., 120, 544, 553, 554, 575, 576, etc.), the scale systems 85, and/or any other suitable components) back to the processing unit.

In some embodiments (as mentioned), the processing unit 75 gathers information (e.g., from one or more scales, flowmeters 560, probes (as discussed below), users, tests, sensors, gauges, safety sensors, and/or any other suitable sources) and uses such information to optimize and/or control the system 10 (e.g., via a continuous feedback loop and/or otherwise). While such information can be used to optimize the system in any suitable manner, in some embodiments, such information is used to optimize (e.g., automatically, to notify a user to optimize, and/or to otherwise optimize): injectate recipes, injectate spray time, injectate pressure, injectate temperature, the amount of injectate that is applied to food products, injectate pump speed, regulator 30 operation, filtration pump 545 speed and operation, injectate spray depth, how far a food product 200 moves between injectate applications, food transport movement patterns, distances between food products and one or more nozzles 50, distances between food products on the food product transport 55, timing of cleaning cycles, backflushing one or more portions of the filtration system, length of cleaning cycles, cleaning pressures, nozzle head rotation, cleaning cycle parameters, UV light use parameters, and/or any other suitable characteristic or parameter of the system and its method of functioning. Thus, in some embodiments, as the system functions and gathers data, the system is able to use such data to improve (e.g., automatically, via artificial intelligence, and/or as directed by a user) the functioning of the system (e.g., to produce better food product, to waste less food product, to waste less injectate, etc.).

In some embodiments, the processing unit 75 is in communication with a modem (e.g., modem 185) and/or another suitable network interface (as described below in more detail). In such embodiments, this network interface can perform any suitable function, including, without limitation, connecting the described system 10 to a server comprising software to run the system; recording and monitoring information regarding the use of the system; allowing programs and applications to be added to, deleted from, updated on, and/or to otherwise be modified on the system; allowing information from one or more systems to be gathered; allowing for the system to be controlled, troubleshot, operated, optimized, and/or monitored remotely; and/or allowing the system and its components to be remotely monitored, adjusted, updated, diagnosed, fixed, actuated, deactivated, optimized, and/or otherwise controlled. Indeed, in some embodiments, the system is configured such that it will not tenderize, provide intervention to, pump up, spray injectate into, and/or otherwise treat a food product unless the system is properly connected to a network (e.g., cloud 190). Accordingly, in some embodiments, an administrator can ensure that the system is not used without permission, can monitor system use, can charge royalties based on use (and/or any other factor), and/or can otherwise monitor and control the system.

In some embodiments (as mentioned), the processing unit 75 is further connected to a user interface and/or another input and/or output device 195 (a touchscreen, keyboard, button array, and/or other suitable device, as discussed below, and as illustrated at 195 in FIG. 1A). In this regard, the input/output device can serve any suitable function, including, without limitation, providing a user with an interface for operating, determining the status of, adjusting, controlling, diagnosing, and/or otherwise observing and governing the function of the system 10.

In some embodiments, the system 10 further comprises one or more scale systems 85. In this regard, the scale systems can comprise any suitable component that allows the system 10 to determine how much injectate has been added into one or more food products by the system and/or any other suitable information (e.g., how much of the injectate that is sprayed is not retained by a food product, etc.). By way of non-limiting illustration, FIG. 1A (and FIGS. 1F-1H) show that, in some embodiments, the system 10 optionally comprises one or more scale systems, with some embodiments of the scale system 85 comprising an in-motion scale (and/or other suitable scale) having both an "in" scale 86 and an "out" scale 87, with the in scale being disposed prior to the spray nozzles 50 and the out scale being disposed after the spray nozzles.

In some embodiments in which the system 10 comprises an in scale 86 and an out 87 scale, the scale system 85 can measure how much injectate has been received by any suitable number of food products. In one example, the scale system 85 determines a weight of one food product before being injected with injectate and then determines the weight of that same food product after it has been injected to determine how much injectate has remained within the food product. In another example, however, the scale system is configured to measure the weight of multiple food products that enter and leave the system over a period of time (e.g., per minute, per hour, etc.). In this example, the system 10 can determine an average amount of injectate that is retained within the food products that pass through the system. Moreover, in accordance with some embodiments, if the processing unit 75 (and/or a user/administrator) determines that more or less injectate should be applied to the food product, the processing unit automatically records such data, notifies a user and/or administrator, and/or changes the system's operating parameters (e.g., "on the fly", as directed by the user/administrator, and/or in any other suitable manner) to ensure that a desired amount of injectate is applied to and/or within the food product and/or to further optimize the system's operations.

With regards to the food product sensors 80, some embodiments of the system 10 do not comprise foot product sensors 80. That said, some embodiments do optionally comprise one or more food product sensors 80 (e.g., as shown in FIG. 1A) that are configured to determine a size, height, width, length, shape, contour, position, mass, and/or other characteristic of a food product passing through the system 10. While the system can comprise any suitable type of sensors (e.g., one or more types of sonar, electronic eyes, light beam sensors, laser sensors, photoelectric sensors, tactile sensors, contact sensors, cameras, motion detectors, proximity sensors, infrared sensors, photodetectors, fiber-optic sensors, safety sensors, and/or any other suitable sensor), in some embodiments, the sensors comprise one or more electric eyes.

Where the system 10 comprises one or more food product sensors 80, the sensors can perform any suitable function. Indeed, in some embodiments, the sensors determine when a food product is passing in proximity to the nozzles 50 (thus indicating when the system should inject injectate). In some other embodiments, the system comprises one or more sensors that detect a food product before it reaches the nozzles 50, thus, allowing the nozzles to begin spraying, to modify pump speed, to actuate the pressure regulator based on food product placement, to purge air from the nozzle head 125, and/or to perform any other suitable function before, during, and/or after the food product comes into proximity with the nozzles. In still other embodiments, the sensors further determine the proximity of a food product to the nozzles (e.g., the nozzle heads 125), thus allowing the system to automatically change the distance between the nozzles and the food product or vice versa.

Figure 2B:
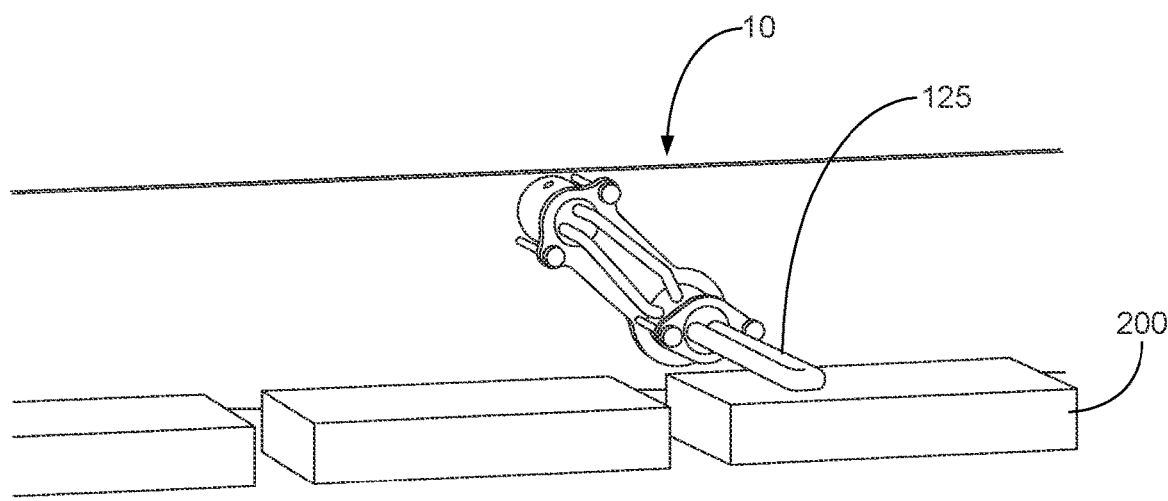
Figure 2C:
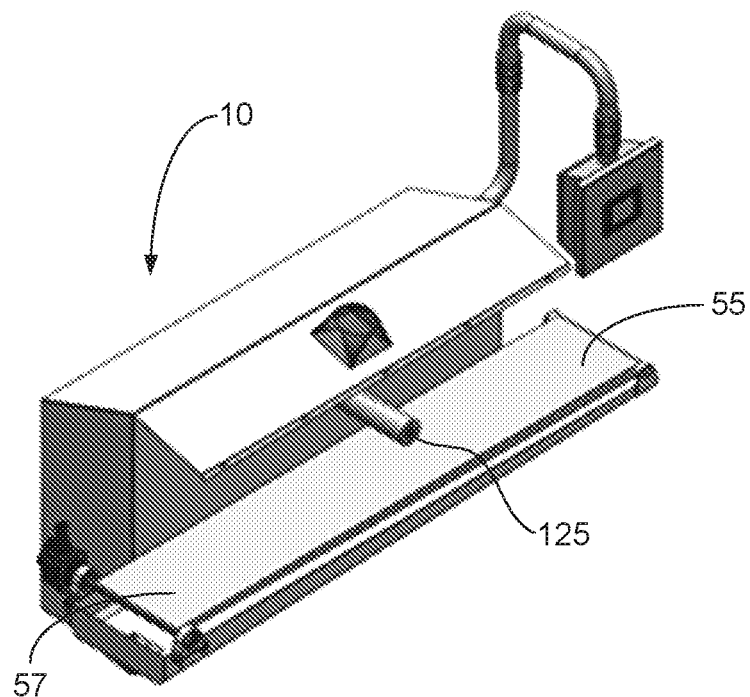
FIG. 2C illustrates a perspective view of a representative embodiment of the food treatment system with the food transport system in the first position in accordance with a representative embodiment.
Figure 2D:
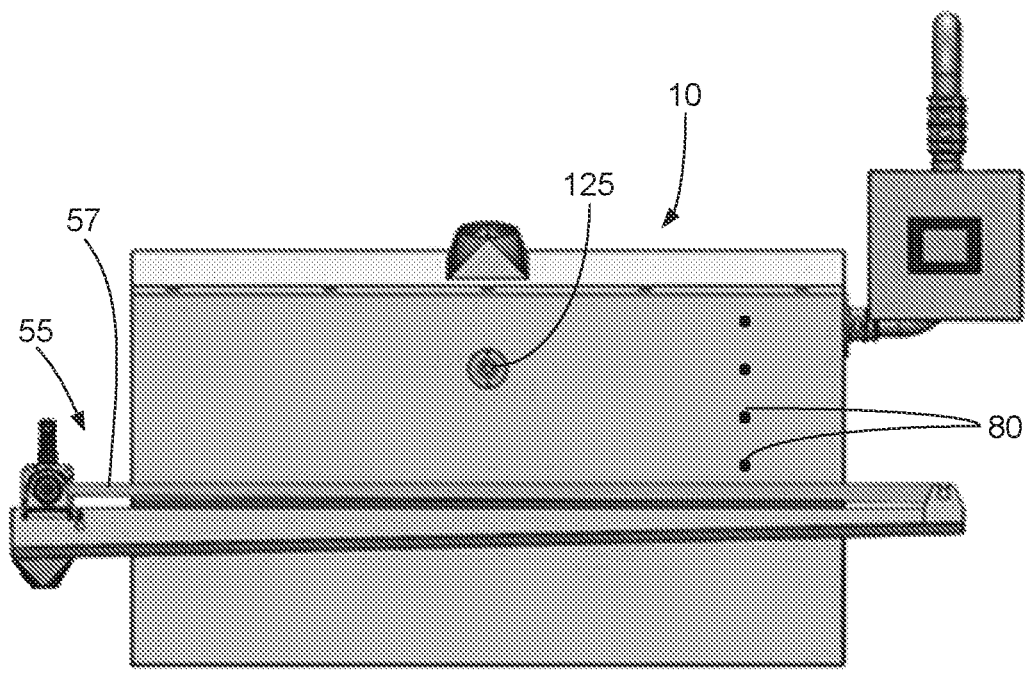
FIG. 2D illustrates a front schematic view of a representative embodiment of the food treatment system with the food transport system in the first position in accordance with a representative embodiment.
Figure 2E:
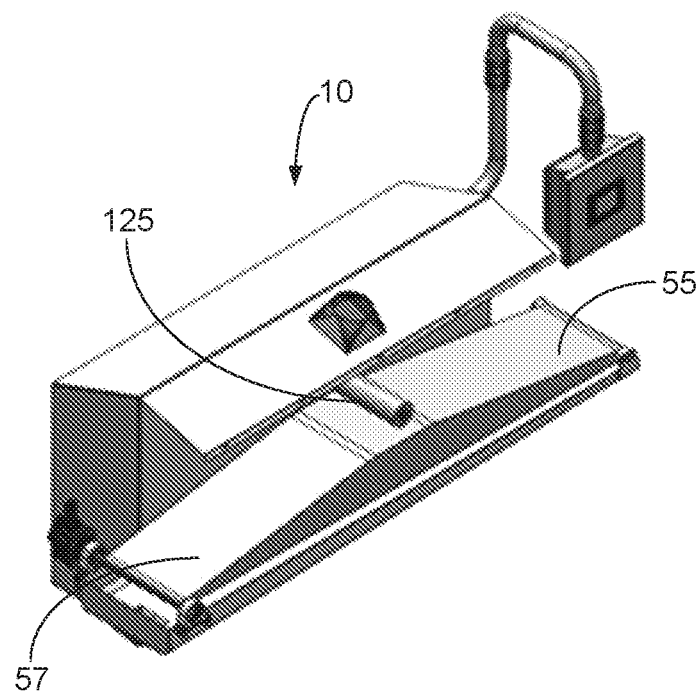
FIG. 2E illustrates a perspective view of a representative embodiment of the food treatment system with the food transport system in the second position in accordance with a representative embodiment.
Figure 2F:
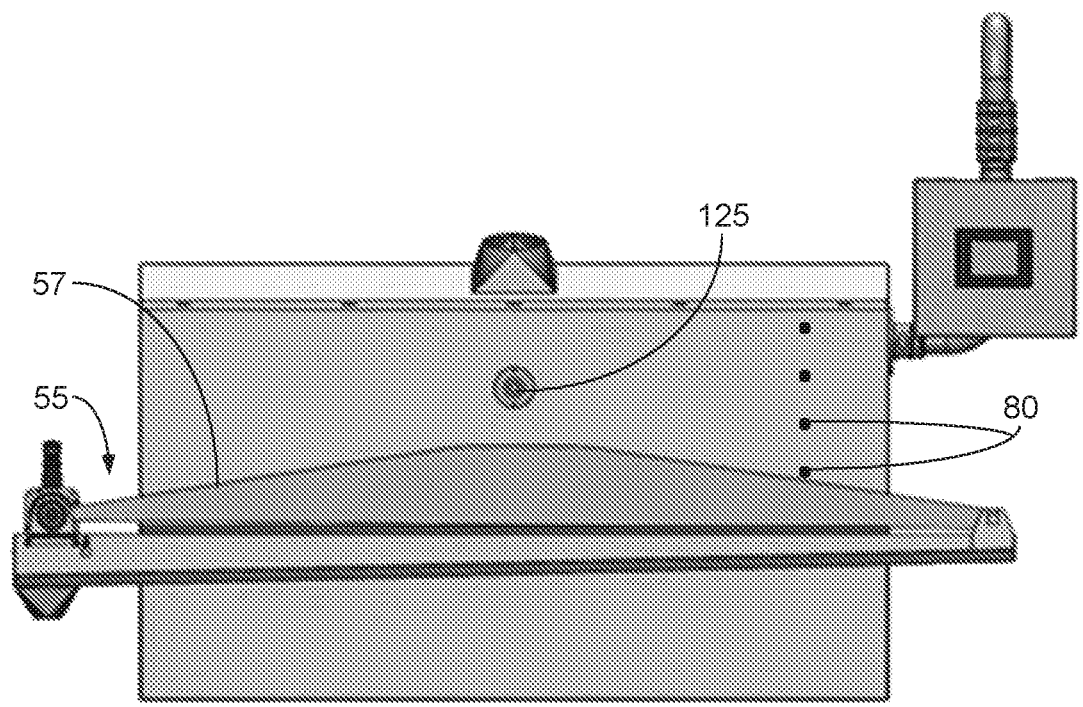
FIG. 2F illustrates a front schematic view of a representative embodiment of the food treatment system with the food transport system in the second position in accordance with a representative embodiment.

By way of non-limiting illustration, FIGS. 2A-2B show that in some embodiments, the system 10 is optionally configured to move one or more spray nozzle heads 125 (e.g., via one or more motors, pneumatic actuators, linear actuators, servos, hydraulic actuators, electric actuators, mechanical actuators, movable frameworks, and/or other suitable mechanical movement devices) to be a desired distance (e.g., between about 0.1 and about 10 inches, or any sub-range thereof) from a surface of the food product 200. Indeed, in some embodiments, the system is configured to maintain one or more spray nozzles within a distance between about 0.2 inches and about 0.8 inches from a surface of a food product that is being treated. In this regard, in some embodiments, the sensors 80 allow the spray nozzle head to be substantially maintained at a desired distance from a food product by adjusting to the various contours of a specific food product. In any case, the spray nozzle heads can be configured to move based on food product sensor 80 readings, user preference, programming, parameters set for various programs, and/or in any other suitable manner.

In another example (e.g., as illustrated in FIGS. 2C-2F), the system 10 is configured to move a portion of the food product closer to and/or further from the nozzles 50 and/or nozzle heads 125. While this can be accomplished in any suitable manner, in some embodiments, as one or more food product sensors 80 determine a size, contour, and/or other characteristic of one or more specific food products, the system (e.g., the processing unit 75) causes the food product transport 55 to move the food product closer to and/or farther from one or more nozzle heads 125 (e.g., by moving a portion of the transport 55 closer to the head via the use of one or more motors, pneumatic actuators, linear actuators, servos, hydraulic actuators, electric actuators, mechanical actuators, air cylinders, pulley systems, rail systems, and/or other mechanical movement devices). Indeed, as shown in FIGS. 2C-2F, in some embodiments, a portion of a conveyor belt 57 is configured to be raised and/or lowered to maintain the food product (not shown in FIGS. 2C-2F) at a desired distance from the nozzle heads 125 (e.g., by raising a portion of a carry way that supports the conveyor belt, allowing end rollers of the conveyor belt to come closer together and/or further apart, and/or in any other suitable manner). Additionally, while such movement of the food product transport can be controlled (in some embodiments) based on readings from the food product sensor 80, in some other embodiments, the food product transport can be raised or lowered manually, based on a program, based on a particular food product setting, and/or in any other suitable manner.

In some implementations, one or more nozzle heads 125 are configured to be moved toward and/or away from a food product 200. In this regard, the nozzle heads can be moved in any suitable manner, including, without limitation, by being moved manually, automatically, and/or in any other suitable manner. In some cases, however, at least one nozzle and/or nozzle head comprising multiple nozzles is coupled to one or more linear actuators, linear bearings, pneumatic actuators, hydraulic actuators, motors, geared motors, robotic arms, movable frames, supports, shelves, scaffolds, movable arms, and/or other suitable actuators and/or supports that are configured to move the nozzle (e.g., based on user preference, a programmatic setting, the size and/or position of a food product as determined by one or more sensors and/or users, one or more characteristics of the injectate and/or the food product, and/or any other suitable factor).

Figure 2G:
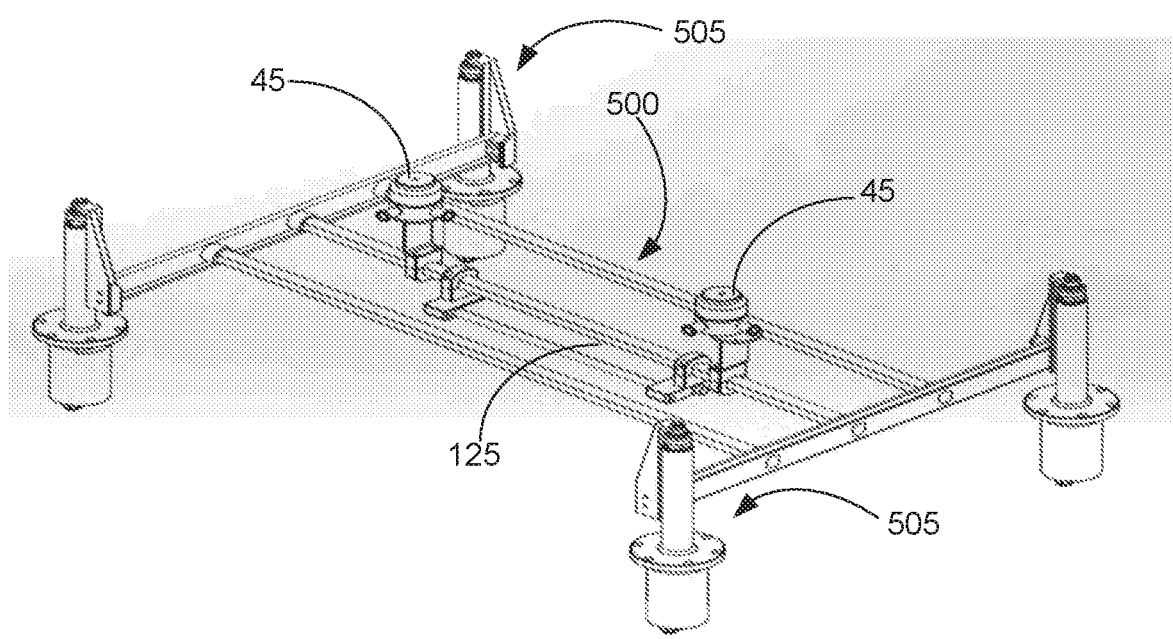
FIGS. 2G-2M illustrate different views of different embodiments of a mechanism for moving the spray nozzle head.
Figure 2H:
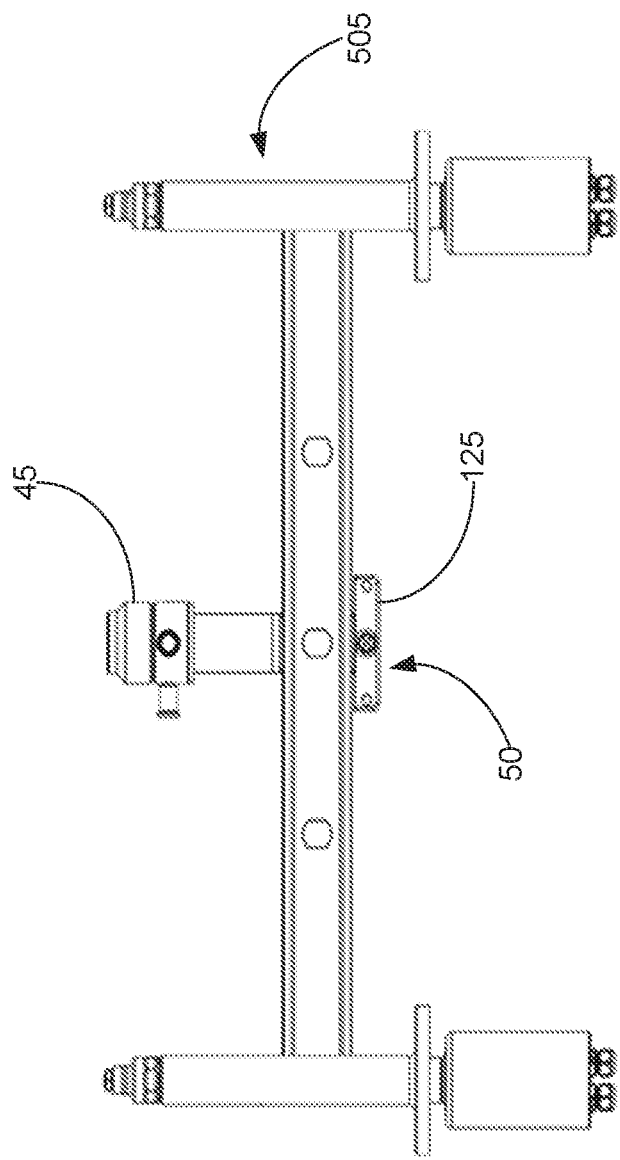
Figure 2I:
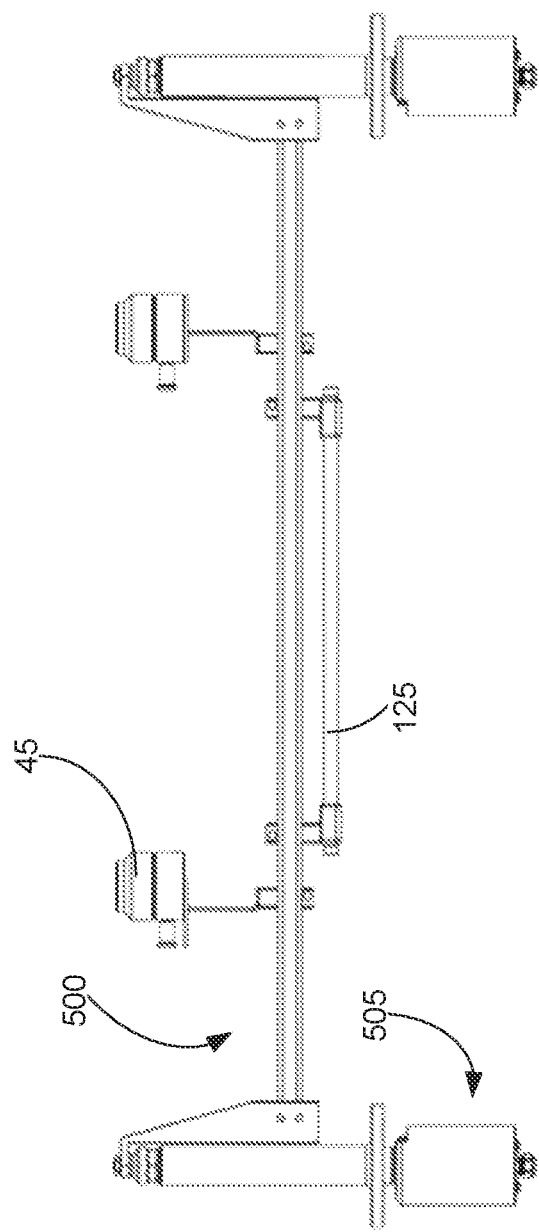
Figure 2J:
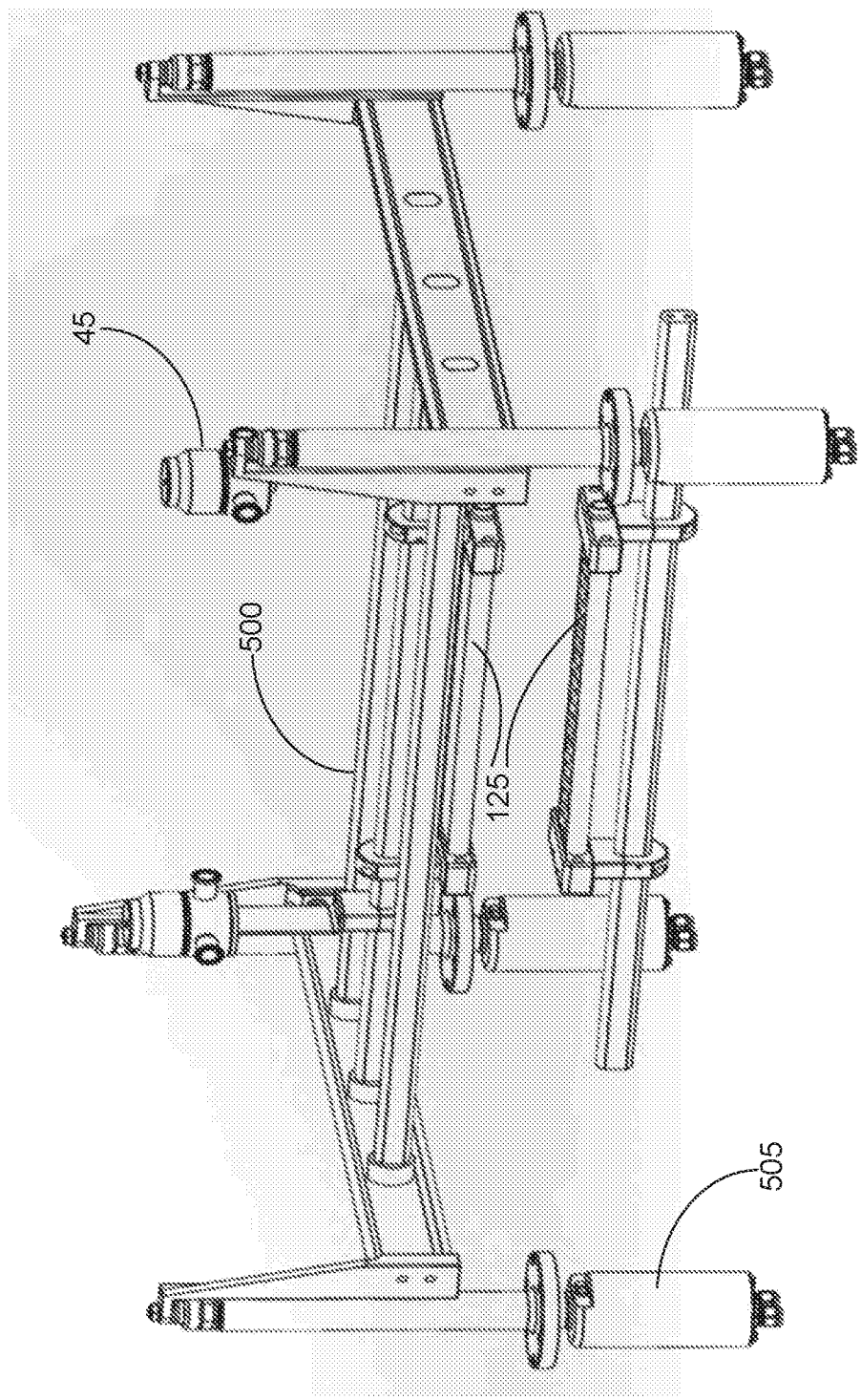
Figure 2K:
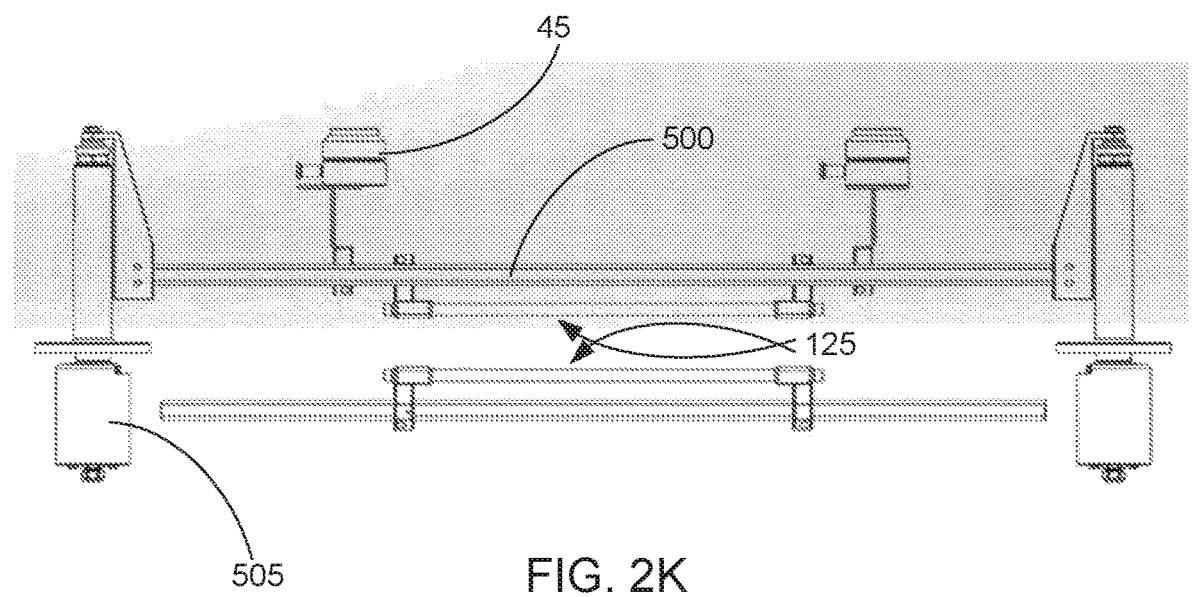
Figure 2L:
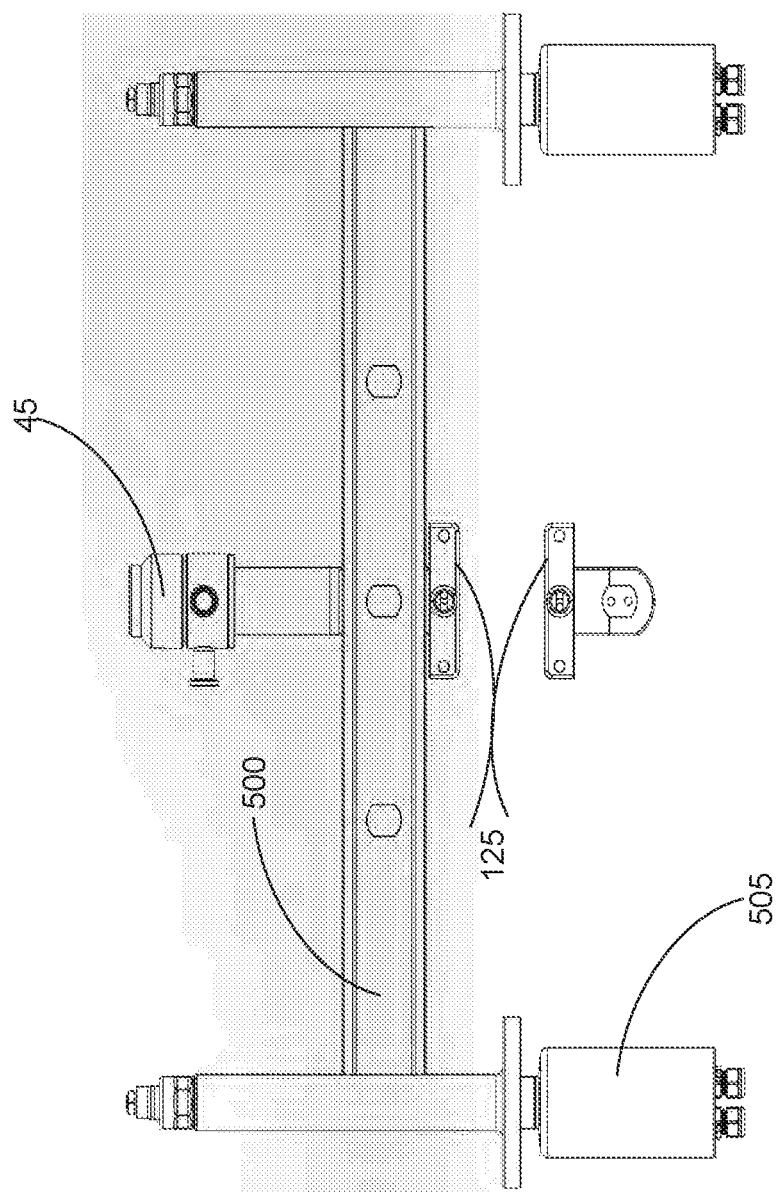
Figure 2M:
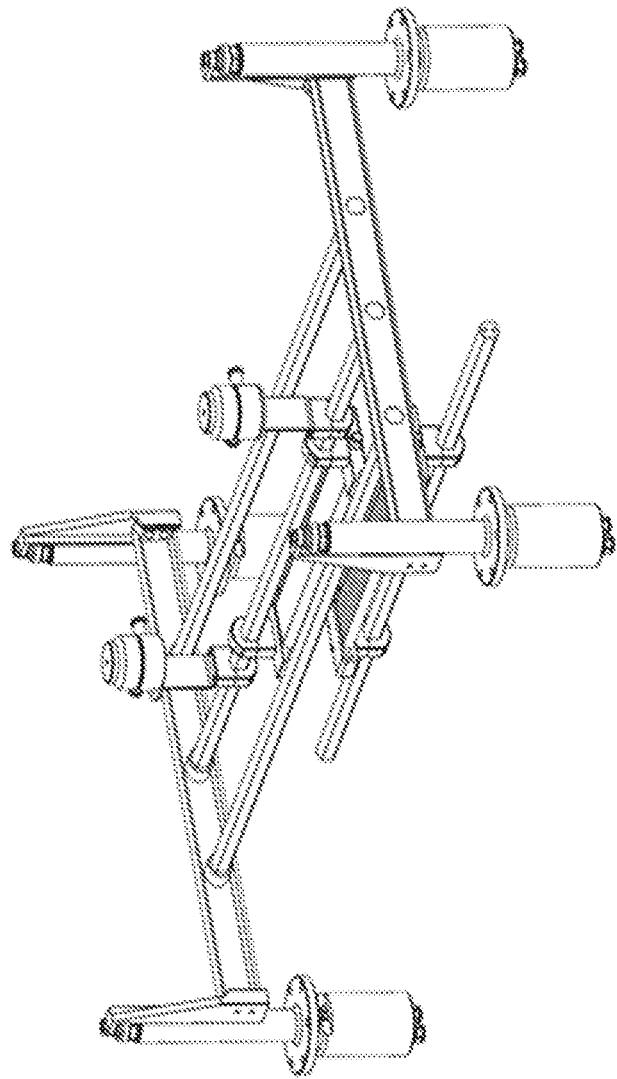

By way of non-limiting illustration, FIGS. 2G-2M and 18L-18P show that, in some embodiments, one or more nozzles 50 and/or nozzle heads 125 are coupled to a moveable framework 500. While such a framework can function in any suitable manner, FIG. 2G shows that, in some embodiments, the framework 500 comprises a gantry, a scaffold, and/or any other support structure. Additionally, FIG. 2G show that some embodiments of the frame comprise one or more actuators 505 (e.g., linear actuators) that are configured to raise, lower, and/or otherwise move one or more nozzle heads 125 (e.g., based on one or more food product sensor 80 readings, based on the size and/or other characteristics of one or more particular food products, based on a program, as controlled by a user, and/or any other suitable factor). In this regard, FIG. 18L shows an embodiment in which the movable framework 500 raises and/or lowers multiple spray nozzle heads 125 at once. In this regard, such a framework is (in some cases) sufficiently strong to ensure that nozzle heads do not move (or that they move minimally) when the injectate is sprayed through the nozzle heads.

Figure 2N:
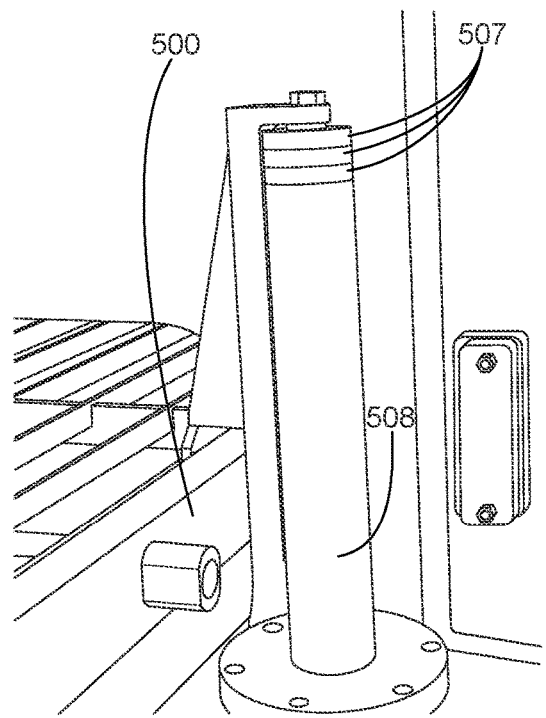
FIGS. 2N-2P each show a different view a moveable framework comprising a nozzle head in accordance with a representative embodiment.
Figure 2O:
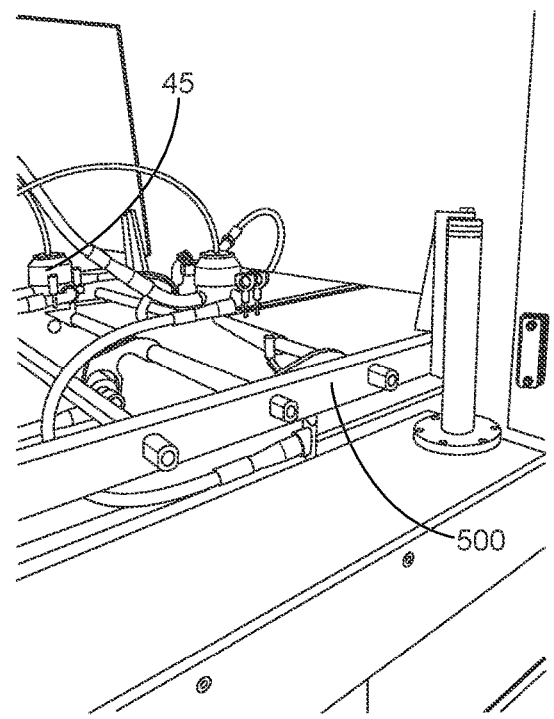
Figure 2P:
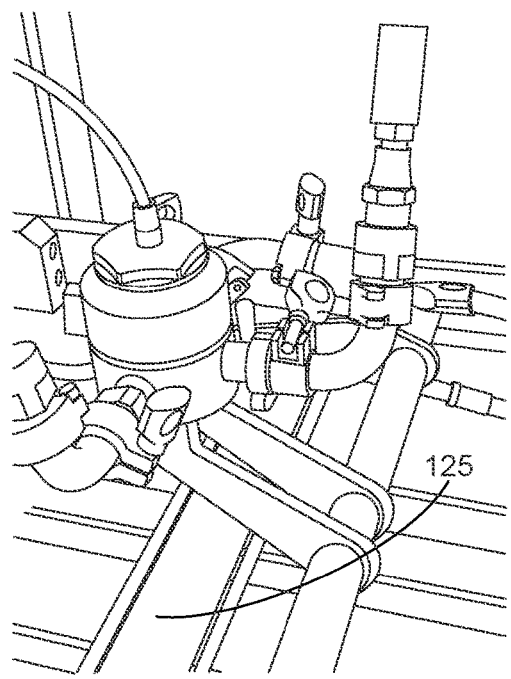

While some embodiments of the movable framework 500 are configured to be raised and/or lowered automatically (e.g., as discussed above), in some other embodiments, the framework's positioning is configured to be moved in any other suitable manner, including, without limitation, manually. Where the framework's positioning is configured to be manually adjusted, such adjustment can occur in any suitable manner, including, without limitation, by inserting or removing one or more spacers 507 between a portion of the framework 500 and a corresponding support 508 (see e.g., FIG. 2N).

Although some embodiments of the described system 10 are configured to move one or more nozzle heads 125 by themselves, in some other embodiments, the system is configured to move one or more injection manifolds, dwell time valves 45, risers, sensors, and/or any other suitable component with the nozzle heads. Indeed, in some embodiments (as shown in FIGS. 2G 2P, 20, and 18L-18O), one or more valves 45 are maintained in relatively close proximity with the nozzle head 125 (e.g., as discussed above and by being moved with the nozzle head) to provide increased response time to valve operation and throughput of the system.

Thus, in some embodiments, the system 10 is configured to move the food product 200 and/or nozzle head 125 to maintain the food product at a desired distance (e.g., between about 0.25 cm and about 25.4 cm, or any sub-range thereof) from one or more nozzles 50. Indeed, in some embodiments, the system is configured to maintain the food product within a distance between about 0.5 cm and about 2 cm (or any sub-range thereof) from a nozzle. In this regard, the sensors 80 and/or programming, in some embodiments of the system, allow the food product to be substantially maintained at a desired distance from one or more spray nozzles by adjusting a portion of the transport to move the food product based on the various contours of the food product.

Figure 3:
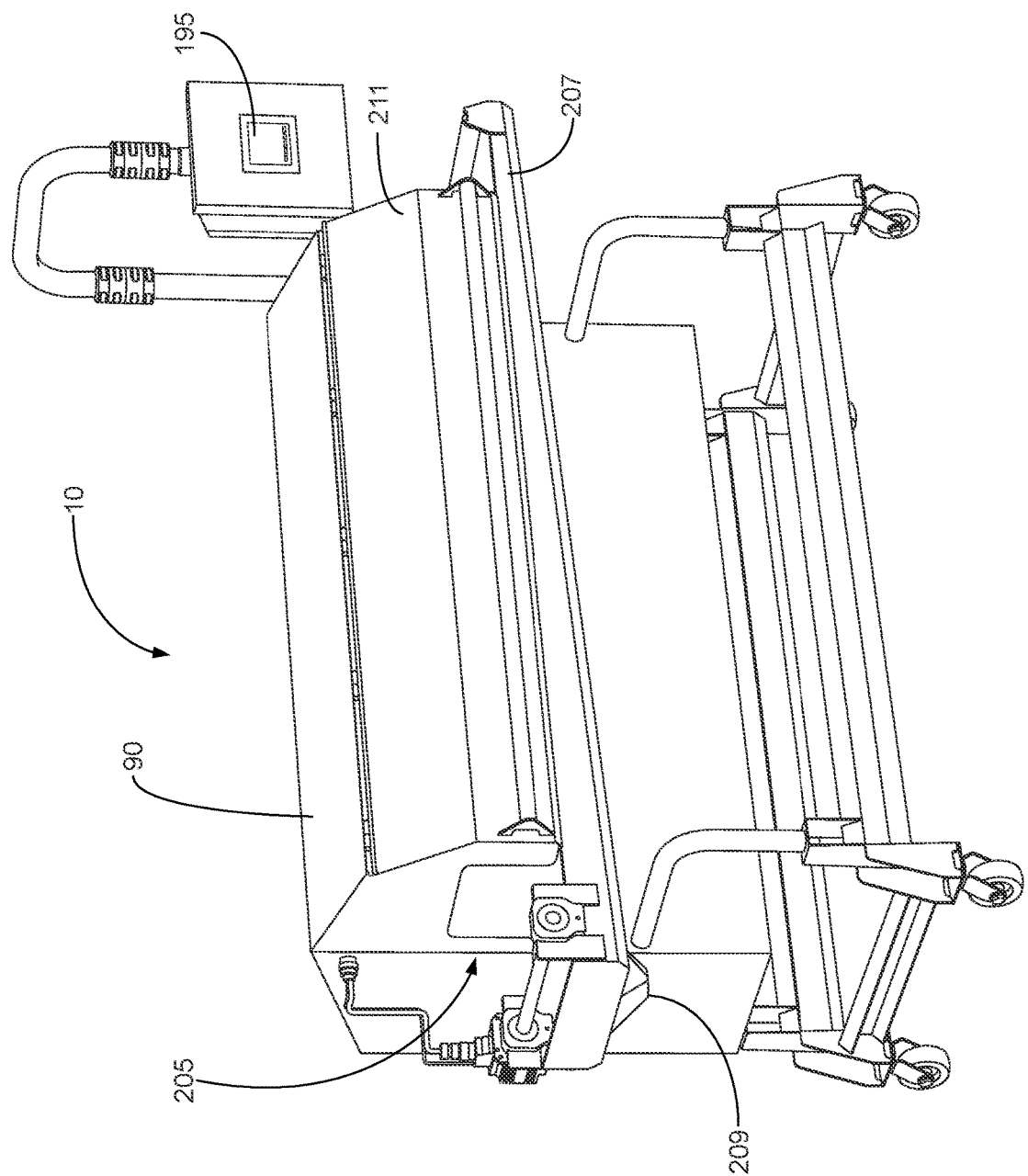
FIGS. 3-4 each illustrate a perspective view of the food treatment system in accordance with a representative embodiment of the invention.
Figure 4:
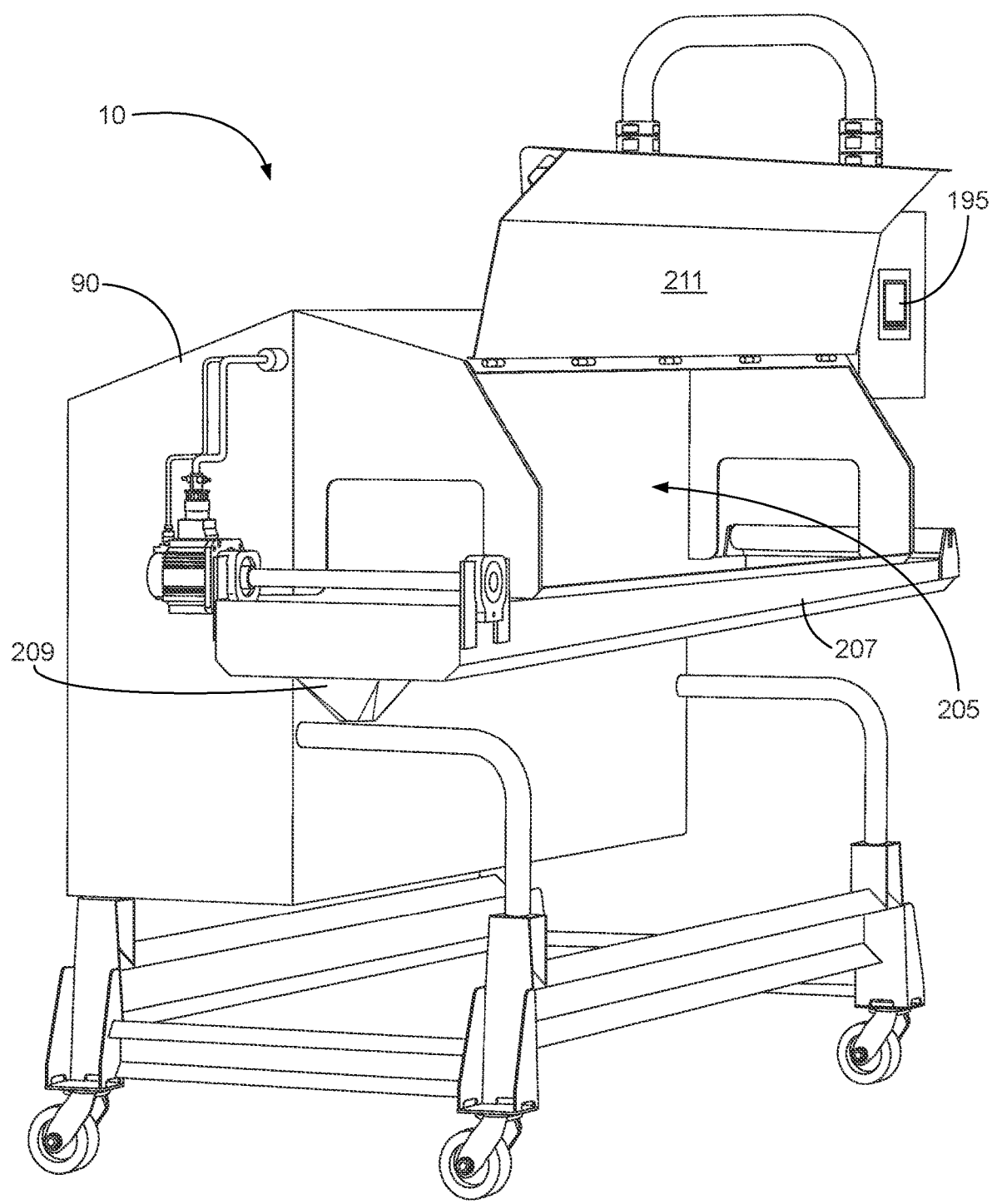

Turning now to the cabinet 90, some embodiments (and as illustrated in FIGS. 3-8, and 18L) of the system 10 comprise one or more cabinets 90 that are configured to house one or more components of the system. In this regard, the cabinet can have any suitable feature. For example, FIGS. 3-4 and 18L show that, in accordance with some embodiments, the cabinet 90 comprises a chamber 205 that is configured to house the spray nozzles 50 and nozzle heads 125 (not shown in either of FIGS. 3-4) and to contain the food product (not shown in either of FIG. 3-4 or 18L) as it is treated. In such embodiments, the cabinet can perform any suitable function, including, without limiting, directing vapors and gases upwards (see e.g., FIG. 18L) and/or to the optional demister 70, preventing a user from being exposed to undesirable amounts of injectate spray and/or off-gassing, and/or any other suitable purpose.

In another example, one or more internal surfaces of the cabinet 90 are configured to direct condensation in the cabinet to a desired location (e.g., a drain, a storage container, etc.). By way of non-limiting illustration, FIG. 4 shows that, in some embodiments, a lower tray 207 and/or lid 211 of the cabinet 90 is sloped and/or otherwise configured to direct excess injectate, blood, food-product drippage, and other materials to a drain 209 and/or to a filtration system (as discussed above). Accordingly, in some such embodiments, the cabinet may prevent (and/or reduce an amount of) condensation that forms in the cabinet from dripping on a food product disposed therein. While such a function can be accomplished in any suitable manner, in some embodiments, one or more surfaces of a lid of the cabinet are sloped at an angle that allows condensation that forms on such lid to be directed away from food products within the cabinet.

Figure 5:
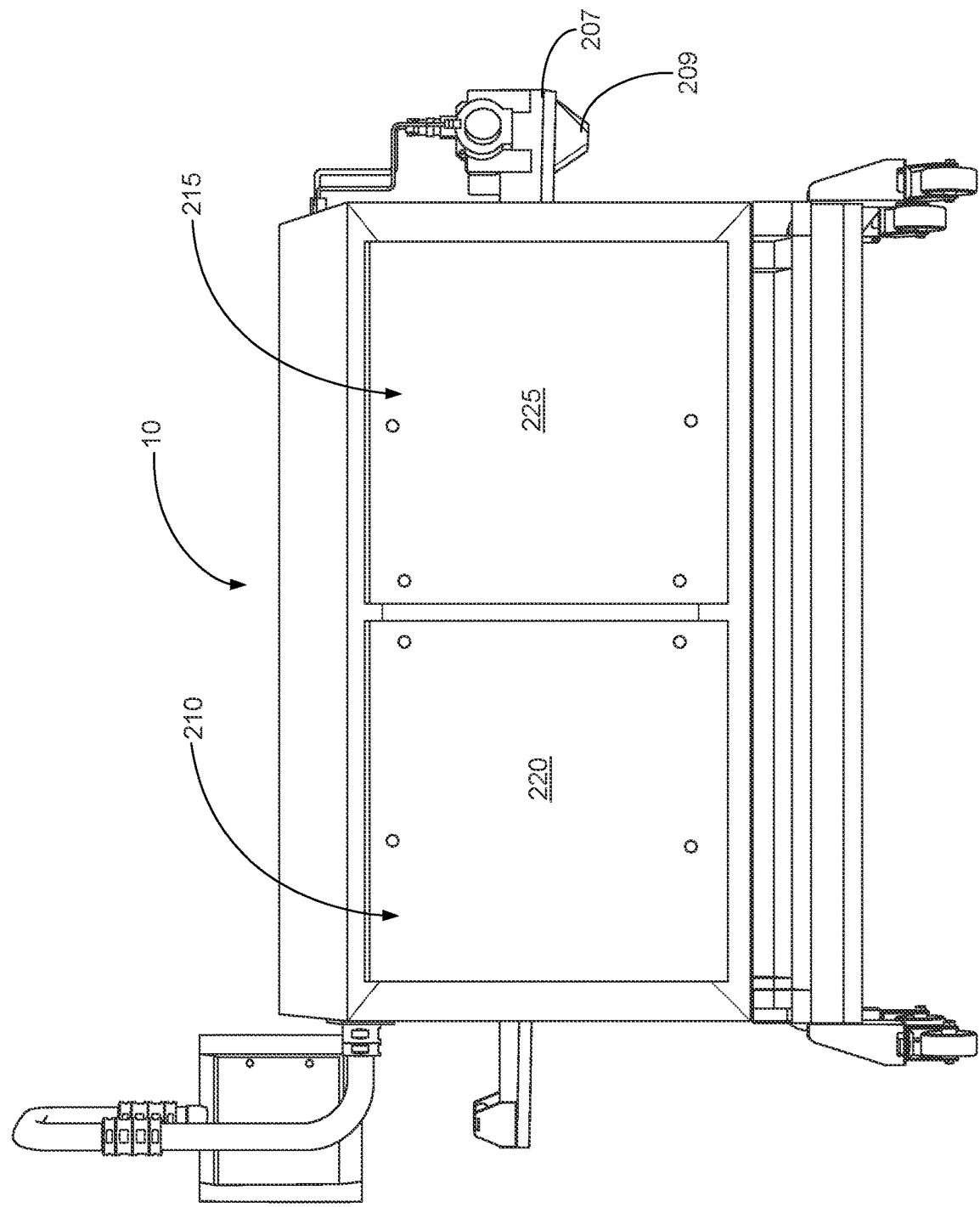
FIG. 5 illustrates a back side view of a representative embodiment of the food treatment system.
Figure 6:
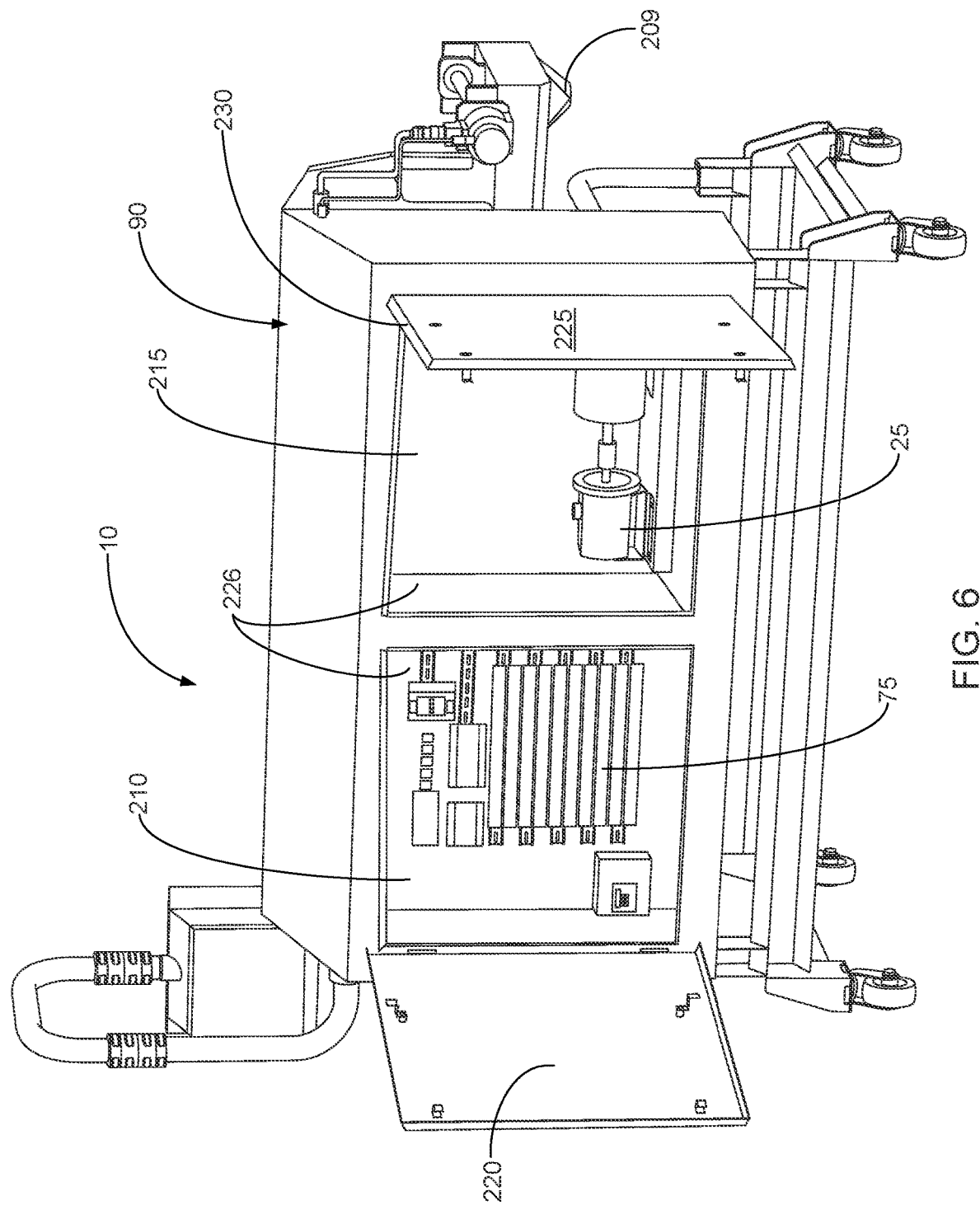
FIG. 6 illustrates a back side perspective view of a back side of a representative embodiment of the food treatment system.
Figure 7:
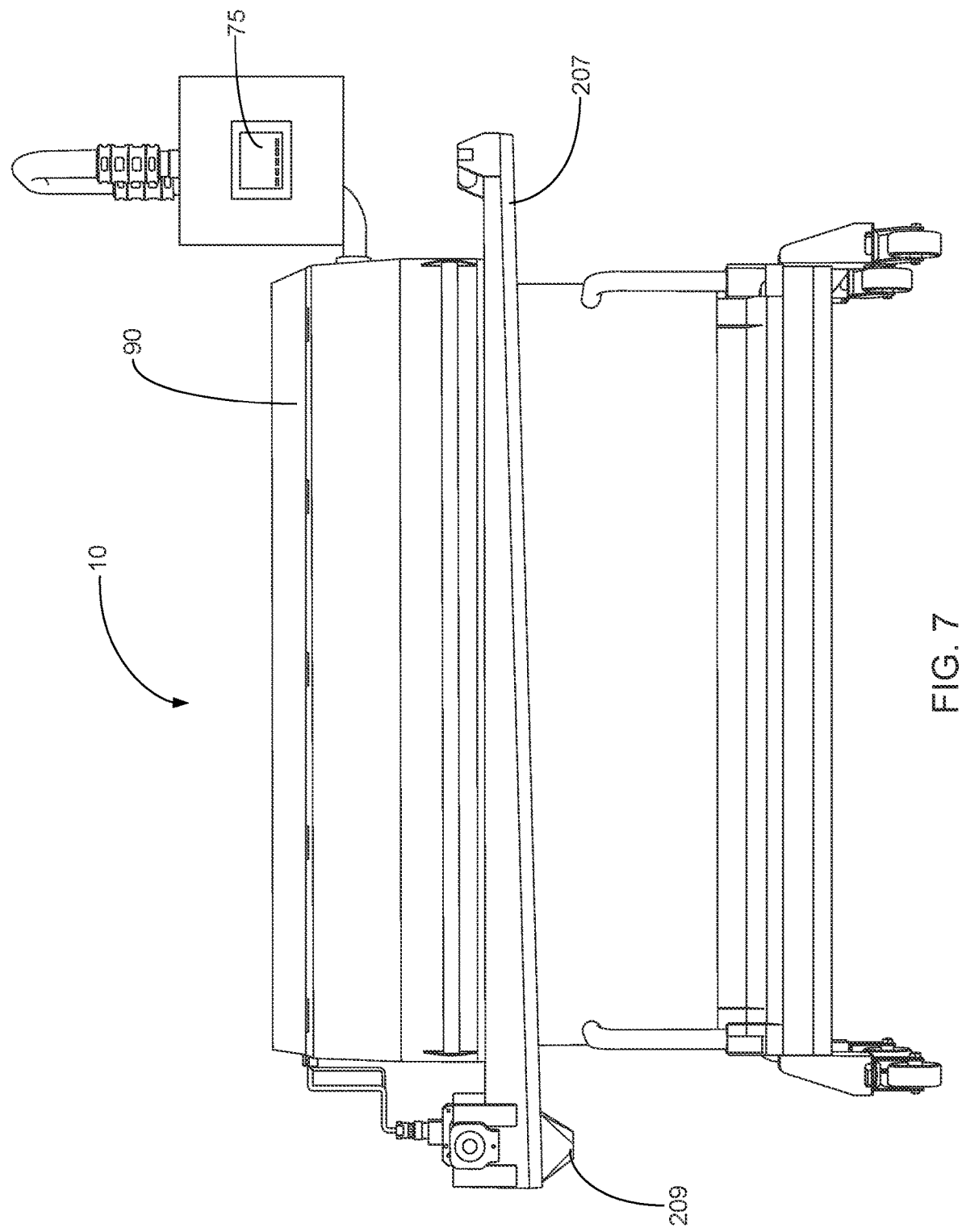
FIG. 7 illustrates a front view of a representative embodiment of the food treatment system.
Figure 8:
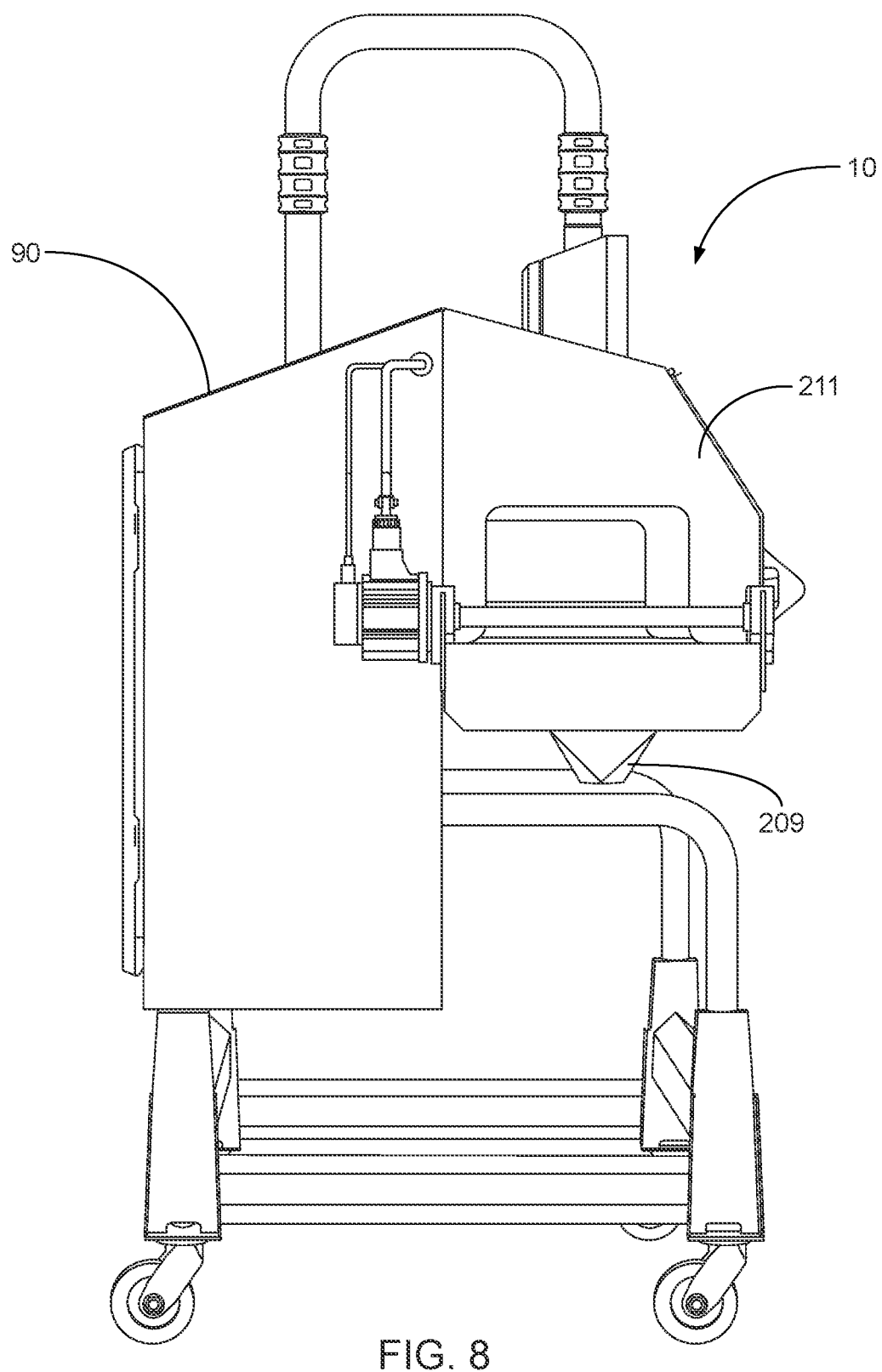
FIG. 8 illustrates a side view of a representative embodiment of the food treatment system.

In another example, FIGS. 5-6 and 18L show that, in some embodiments, the cabinet 90 comprises one or more separate compartments (e.g., compartments 210 and 215). While these two compartments can perform any suitable function, in some embodiments, one compartment 210 comprises some electronic components of the system (e.g., the processing unit 75), while the other compartment 215 comprises one or more fluid conduits, the injection pump 25, and/or any other components that may potentially be exposed to leaks of injectate and/or other liquids that pass through the system 10.

Where the cabinet 90 comprises one or more compartments (e.g., compartments 210 and 215), the compartments can comprise any suitable feature. In this regard, some embodiments of the cabinet comprise one or more doors with one or more seals. By way of non-limiting illustration, FIG. 6 shows an embodiment in which the cabinet 90 comprises two doors 220 and 225 comprising a seal and/or lip 226 that extends exteriorly, and wherein a portion of the edging 230 around the door is configured to slope away from the opening of the corresponding compartment to help direct any liquids that fall or condense on such edging away from such compartment.

In addition to the aforementioned features, the described food treatment system 10 can be modified in any suitable manner that allows it to treat a food product. In one example, the system is configured to have the pump 25 and/or one or more spray nozzle heads be readily removed and replaced in the system. In this regard, the ability to replace such components can be useful for a variety of reasons, including, without limitation, by allowing the system to readily change its throughput, allowing the system to experience little downtime when the pump and/or nozzle heads are removed, and/or by otherwise allowing such components to be quickly removed and/or replaced. Indeed, in some embodiments, a user can purchase a first system having a first throughput capacity. In some such embodiments, the user can acquire a new pump and/or spray heads having a greater capacity than the original components and can quickly replace the original components with components having a greater output. Indeed, in some cases, by changing the pump and nozzle heads, the system can quickly be changed from having a throughput of 3,000 pounds of food product per hour to 15,000 pounds of food product per hour—all without needing to purchase a new system.

Where the pump 25 and/or nozzle heads 125 are configured to be switched out, the various components can be changed out in any suitable manner, including, without limitation, with or without the use of tools. In some embodiments, however the pump and/or the nozzle head are configured to be rapidly replaced without requiring the use of any tools.

Indeed, in some embodiments the pump 25 is configured to be replaced without requiring the replacement of any other component. In some other embodiments, however, the pump is coupled to a skid (e.g., a plate, shelf, and/or any other suitable object that comprises wheels), is configured to slidingly couple to the system, and/or that is otherwise configured to be coupled to and removed from the system. Indeed, in some embodiments, the pump (e.g., a pump that is configured to pump between about 1 gallon and about 100 gallons of injectate per minute) is coupled to a skid that is configured to be selectively released from the system and to be replaced with another skid (or with the same skid) having a different pump. In some such embodiments, the skid includes multiple wheels to allow the skid to roll around. Additionally, in some embodiments, the system comprises one or more electrical panels and/or connections for adding, removing, upsizing, downsizing, and/or otherwise changing one or more variable frequency drives for different sized pumps.

Where the pump 25 and/or the nozzle head 125 can be removed and/or switched out with the use of one or more tools, the pump and nozzle heads can couple to the system in any suitable manner. In some embodiments, the pump and nozzle heads couple to the system through the use of one or more quick connect hydraulic fittings, plugs, couplers, frictional engagements, mechanical engagements, threaded coupling mechanisms, clamps, catches, pawls, ratcheting mechanisms, and/or any other suitable mechanisms that are configured to selectively couple and/or decouple the pump and/or nozzle head to and from the system 10. By way of non-limiting illustration, FIGS. 22F and 22G show some embodiments in which the nozzle head (not shown in FIG. 22F) is configured to couple to the framework 500 via the use of one or more lever clamping mechanisms 509 and pins 511.

In another example of a suitable modification, some embodiments of the system 10 are configured to monitor a pluggedness of one or more nozzles 50 and/or nozzle heads 125 in the system. In this regard, it is noted that some high pressure flowmeters can be relatively expensive and unreliable. While some embodiments of the system are configured to use such flowmeters, in some other embodiments, the system comprises one or more low pressure flowmeters. While such low pressure flowmeters can be disposed in any suitable location, FIG. 1R shows that, in some embodiments, one or more low pressure flowmeters 34 (e.g., magnetic and/or any other suitable type of flowmeter) is disposed at and/or prior to an injection pump inlet. Additionally, FIG. 1R shows that, in some embodiments, one or more additional flowmeters 34 (e.g., magnetic and/or any other suitable type of flowmeter) are disposed at and/or after an outlet of the pressure regulator 30. In some such embodiments, the PLC, PID, and/or any other suitable processing unit 75 is configured to derive a difference in the measurements of the two flowmeters—with such difference giving a total flow rate of the nozzles 50 without requiring a flowmeter on the high-pressure fluid line or line that feeds injectate from the injection pump 25 to the nozzle head 125. Additionally, in some cases, the system is configured to sample an average nozzle flow rate over a period of time (e.g., for one or more injectates) to create one or more flow rate reference points. In such cases, when the injection pressure and injection time are unchanged, that reference point will represent a 0% doggedness state. In contrast, if the average flowrate were to reach 0 gallons per minute that would represent a 100% clogged state. Thus, in some cases, the percent pluggedness of the system can be continuously and/or continually derived (e.g., by calculating 100×the current average flow rate/the reference point average flow rate).

As yet another example of a suitable modification, some embodiments of the system 10 comprise one or more UV lights that are configured to kill, disable, log reduce, and/or otherwise reduce microbes in any suitable portion of the system 10 and/or the injectate. Accordingly, in some embodiments, such lights are used to keep one or more portions of the food treatment system and/or a food product that is treated thereby, sanitary.

In another example, the described system 10 is configured to provide multiple injectates (e.g., one or more tenderizers, coloring agents, flavoring agents, etc.) to a food product passing therethrough. While this can be accomplished in any suitable manner, in some embodiments, the system comprises two more separate injectate tanks 15 and two or more separate pumps (e.g., pump 25), injection filters 35, and/or spray nozzle heads 125 that are each configured to independently deliver a different injectate to one or more food products.

In still another example, while some embodiments of the food product transport 55 have a direct-drive and/or an indirect drive system, in some embodiments, one or more rollers about which the food product transport (e.g., a conveyor belt) wraps comprises an internal motor (e.g., thus helping to prevent belts, chains, gears, and/or other indirect drive components from being covered with injectate).

In still another example, some embodiments of the system 10 are configured to apply one or more injectates to a food product in more than one manner. In this example, the injectate(s) can be applied to the food product via one or more external application techniques (e.g., spraying, misting, soaking, pouring, an injectate curtain, and/or any other suitable method); internal injection techniques (e.g., injection techniques using needles and/or other objects that penetrate the food product); injection techniques in which no nozzles, needles, and/or other objects penetrate the food product to inject the injectate, and/or any other suitable injection technique; and/or through any other suitable methods. Indeed, in some embodiments, an injectate (and/or any other suitable fluid) is applied to an outer surface of a food product 200 (e.g., as a decontaminant, colorant, seasoning, etc.) and one or more injectates are injected at a high pressure to one or more depths into the food product (e.g., via the nozzle head 125), without a nozzle, needle, and/or any other object being required to penetrate the food product to inject the injectate.

Figure 9:
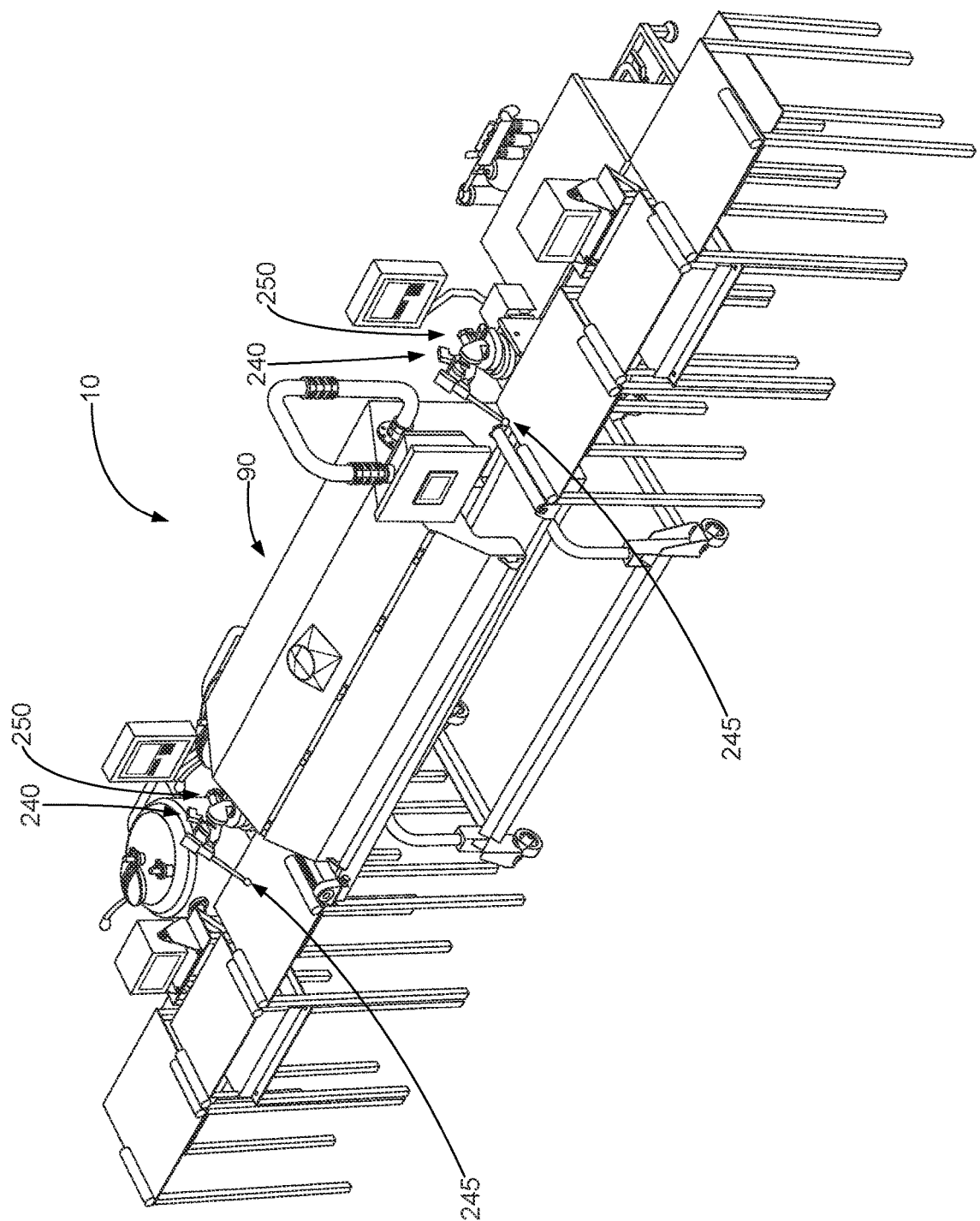
Figure 10:
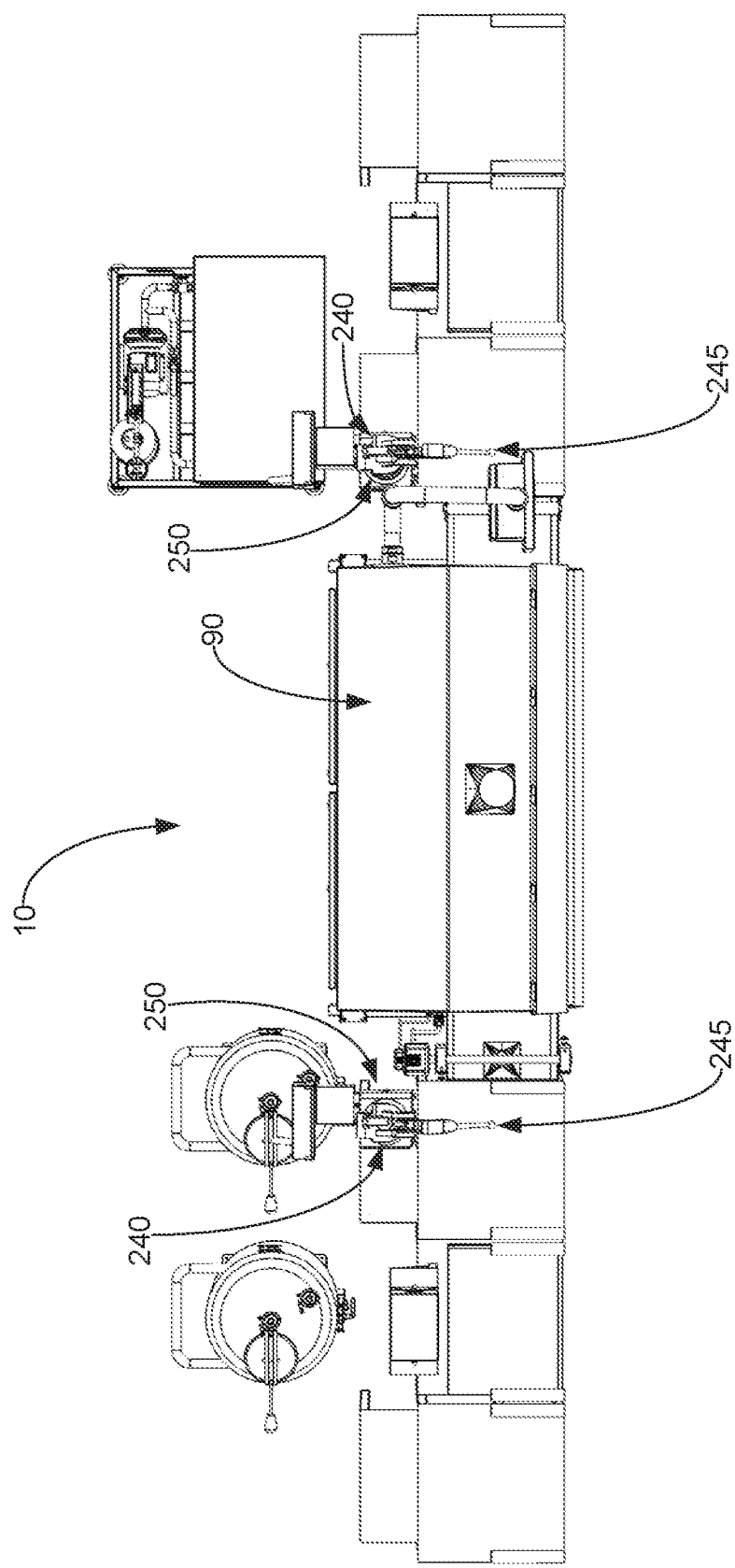
Figure 11:
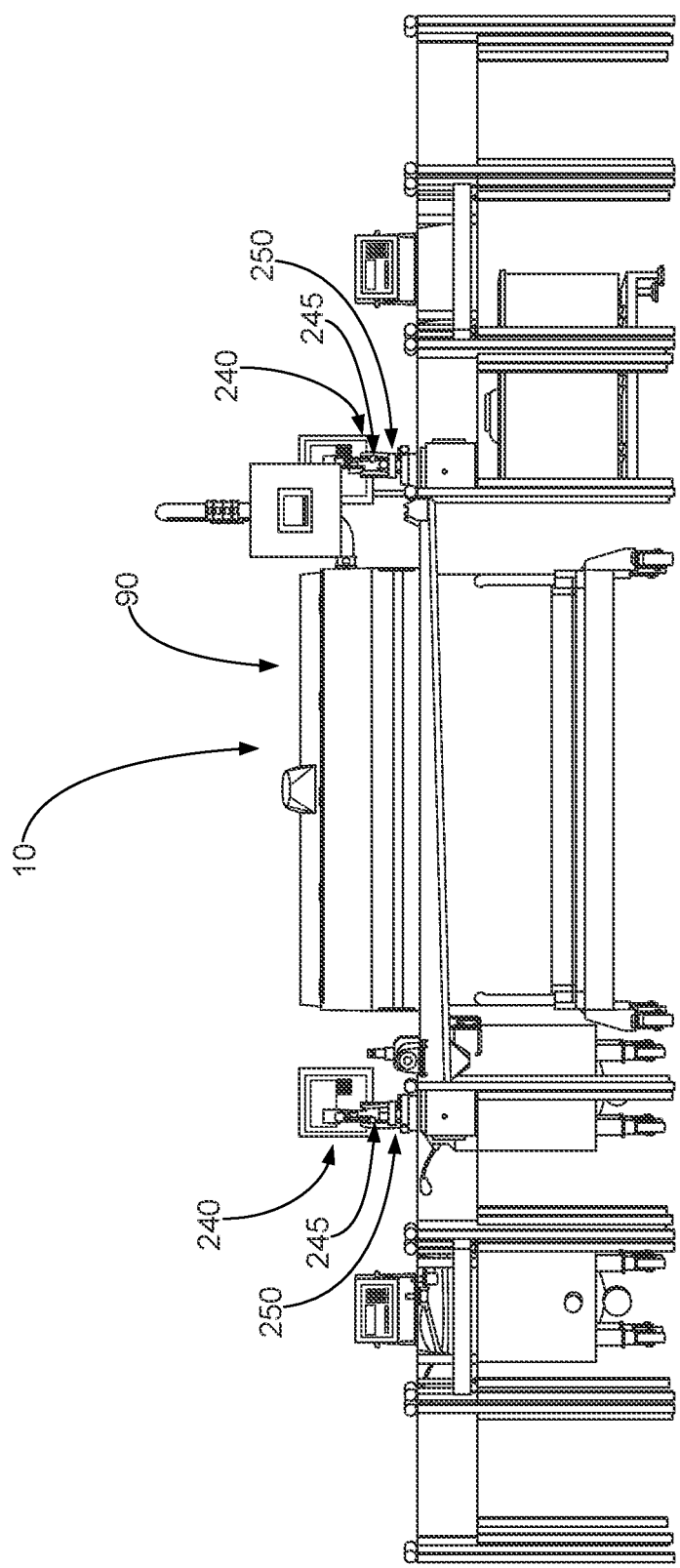
Figure 12:
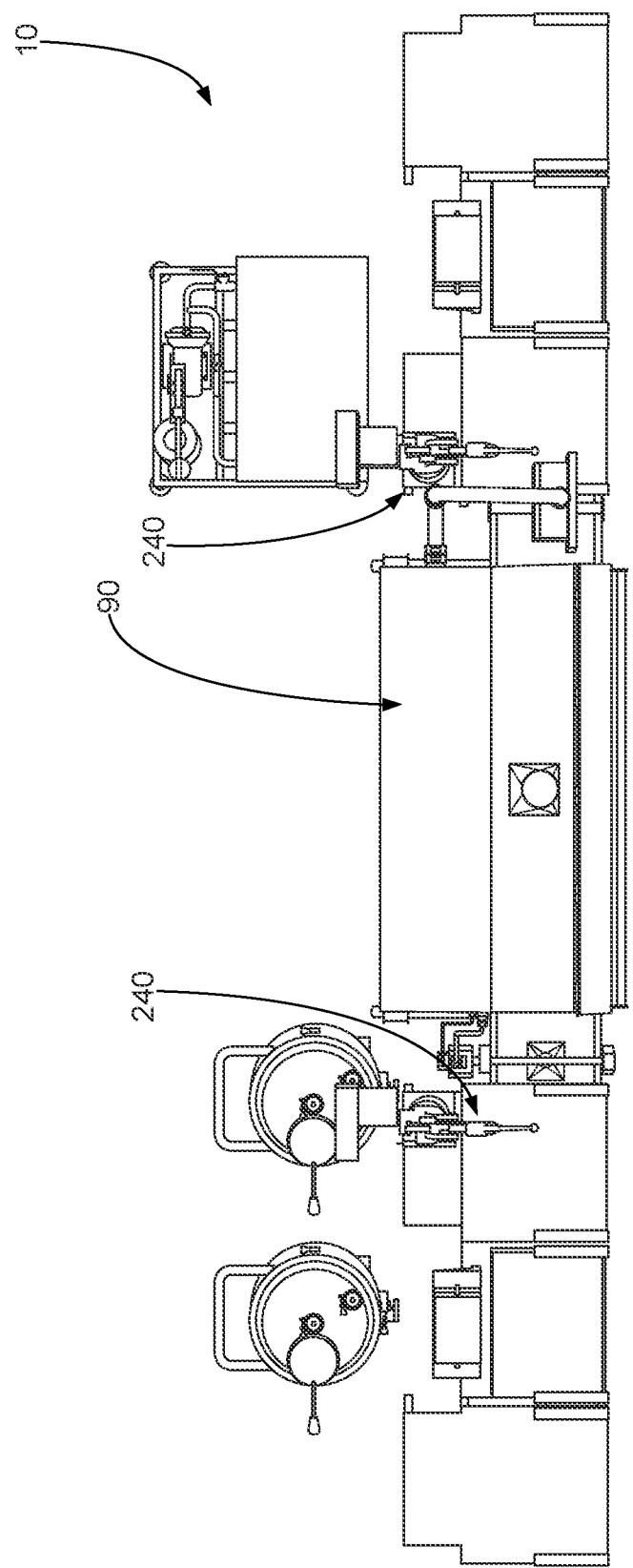
Figure 13:
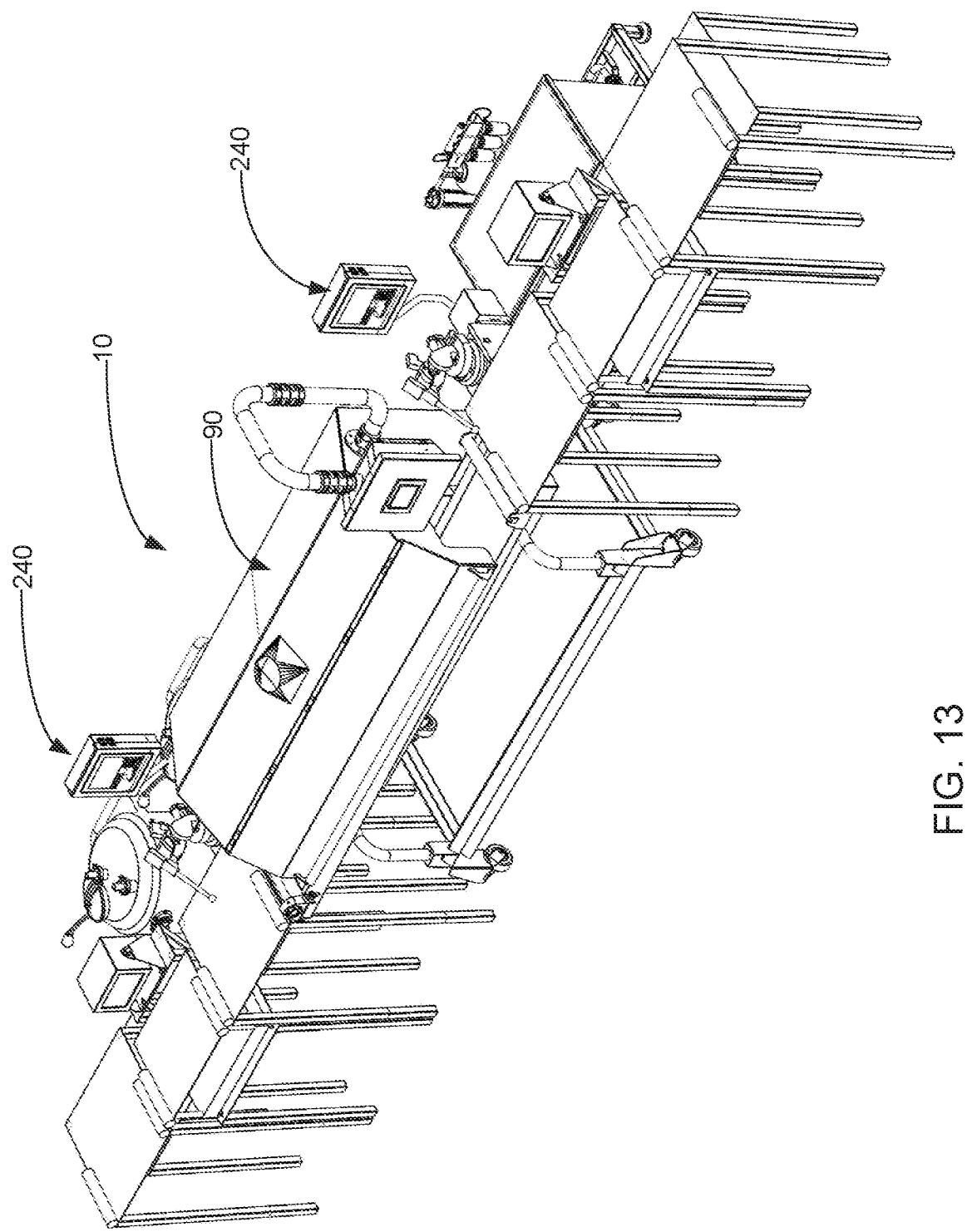
Figure 14:
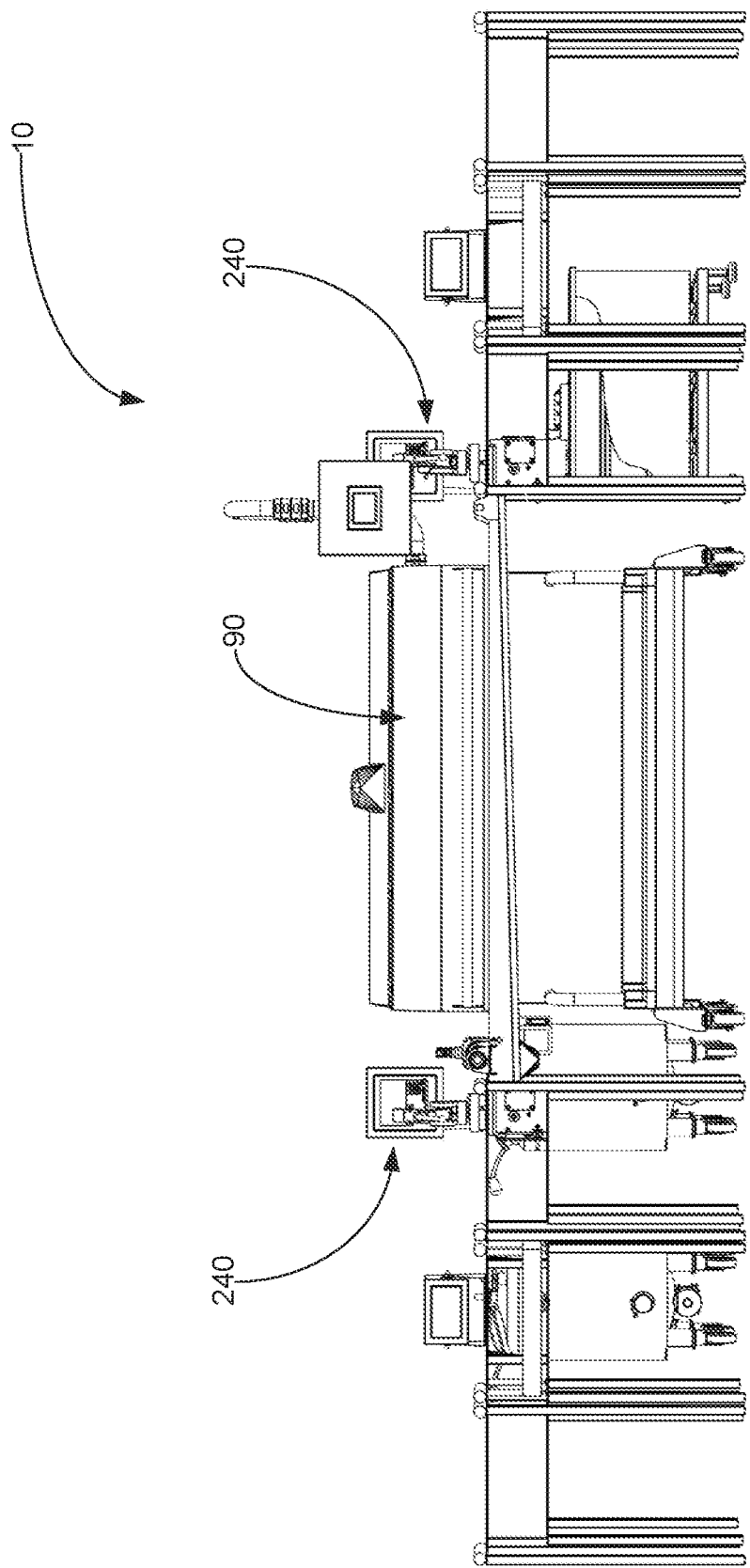

In yet another example, some embodiments of the described system 10 optionally comprise one or more probes and/or other sensors that are configured to detect one or more characteristics of a food product 200 that is treated by the system. While such a probe and/or sensor can perform any suitable function, including, without limitation, measuring, sensing, and/or otherwise determining a tenderness, texture, pH, moisture, temperature, color, size, fat composition, composition, moisture content, freshness, ripeness, and/or any other suitable characteristic of a food product, in some embodiments, one or more probes are used to measure a tenderness of a food product (and/or to test a piece of a food product) at one or more times (e.g., before, during, and/or after injectate is applied to the food product). Indeed, in some embodiments, the described system is configured to measure the tenderness of a food product before and after it is treated.

Where the system 10 comprises one or more probes for measuring food product tenderness, the probes can function in any suitable manner. Indeed, in accordance with some embodiments, FIG. 9 shows that each probe 240 comprises a probe tip 245 that is connected to a strain gauge 250 such that when the probe tip is forced against a food product, the strain gauge is able to measure a resistance to pressure and/or to otherwise obtain a relative tenderness of such food product. Additionally, while the system can comprise any suitable number of probes, FIGS. 9-14 show some embodiments in which the system 10 comprises two probes 240 with one being disposed before and one being disposed after the cabinet 90. Thus, in some such embodiments, the system can measure tenderness (and/or one or more other characteristics) of a food product before and after the product is treated with injectate.

Figure 15:
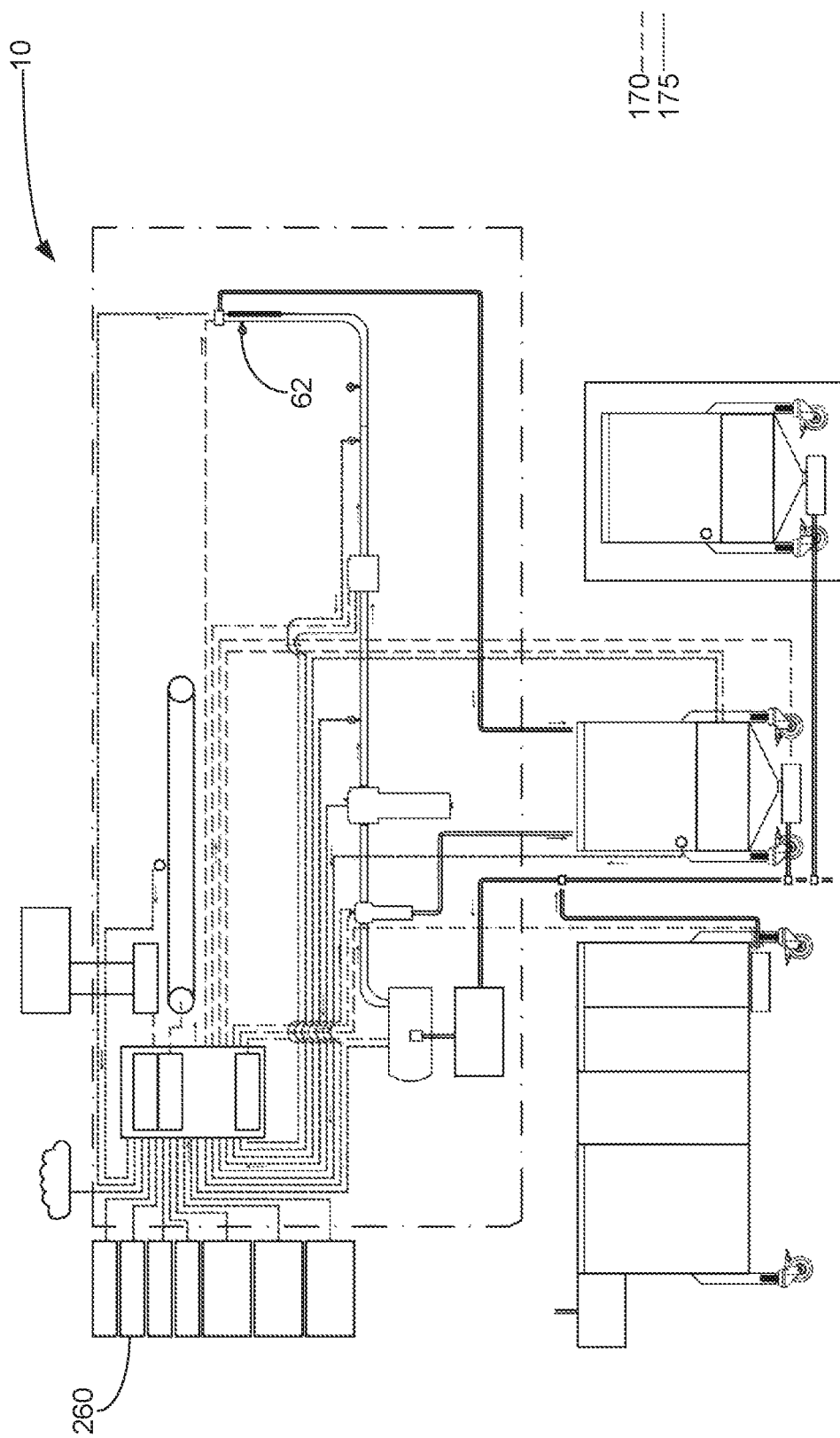
FIG. 15 illustrates a schematic view of the food treatment system in accordance with a representative embodiment of the food treatment system.

Once such one or more probes 240 obtain information regarding the tenderness (and/or any other suitable characteristic) of a food product, such information can be used in any suitable manner. Indeed, in accordance with some embodiments, FIG. 15 shows that the PLC, PID, and/or other processing unit 75 is configured (e.g., via one or more probe interfaces 260) to record, store, analyze, average, summarize, display, and/or otherwise manipulate such information; adjust injectate application (e.g., adjust injectate pressure, spray time, pump 25 speed, temperature, the pressure regulator 30, penetration depth, etc.), adjust the food product transport's 55 movements, and/or adjust any other parameter of the system 10 based on the obtained information; and/or otherwise use the data/information obtained from such probes.

Thus, in some embodiments, the described systems and methods are configured to transform a food product into a treated food product (e.g., to transform a rough piece of meat into a tender one, to transform a contaminated food product into a decontaminated food product, etc.). Moreover, some embodiments of the system 10 are further configured to measure one or more characteristics of food products being treated and to adjust operation of the system to produce food products having one or more desired characteristics.

In some embodiments, where a probe 240 is used to contact, and thereby test, one or more food products (or food product samples), such a probe is not cleaned between tests. In other embodiments, however, the probe is heated; dipped, sprayed with, bathed with, wiped with, vibrated, coated with, and/or otherwise treated with a sanitizing agent; exposed to UV light; and/or otherwise cleansed. While such cleansing can be accomplished in any suitable manner, in some embodiments, a sanitizing agent is sprayed on and/or otherwise applied to the tip between tests. In some other embodiments, however, the described system 10 is configured to move the probe tips 245 between a testing position and a sanitation position in which a sanitizing agent is applied (e.g., via dipping the probe tip in the agent and/or otherwise applying the agent to the tip), such that the tips can be cleaned between tests (and/or at any other suitable time).

In another example of a suitable modification, in some embodiments, one or more components of the system 10 (e.g., the food product transport 55 and/or any other suitable components) are configured to be cleaned (e.g., by being readily removable, by being configured to be cleaned while coupled to the system, and/or in any other suitable manner). Indeed, in some embodiments, the food product transport comprises one or more removable conveyor belts, shaft rails, and/or other parts for cleaning. Moreover, in some embodiments, the system comprises one or more continuous belt cleaners, UV lights, spraying mechanisms, washing mechanisms, and/or other features that allow one or more components of the system to readily be washed, rinsed, sanitized, and/or otherwise cleaned.

In another example of a suitable modification, although some embodiments of the described system 10 are configured to ensure that injectate that is sprayed through the nozzle head 125 is not recirculated through the system (e.g., to avoid contaminating unused injectate with pathogens and/or debris from the sprayed food product), in some other embodiments, the system is optionally configured to collect injectate that has been sprayed and/or otherwise released from one or more nozzle heads and to then recirculate that injectate back through the nozzle heads (e.g., to greatly reduce an amount of injectate that is wasted).

Where the system 10 is configured to recirculate injectate that has been sprayed through a nozzle 50, such a recirculation process can be accomplished in any suitable manner. Indeed, in some embodiments, after the injectate is sprayed, it is collected in one or more fluid collection systems, filtered (e.g., via one or more screens, sieves, colanders, paper filters, synthetic filers, meshes, catches, rotary drum filters 535, wedge wire canister filters 555, the multi-stage filtration system (discussed above), and/or via any other suitable filters or filtering mechanisms), and then optionally passed through a blender.

Figure 19A:
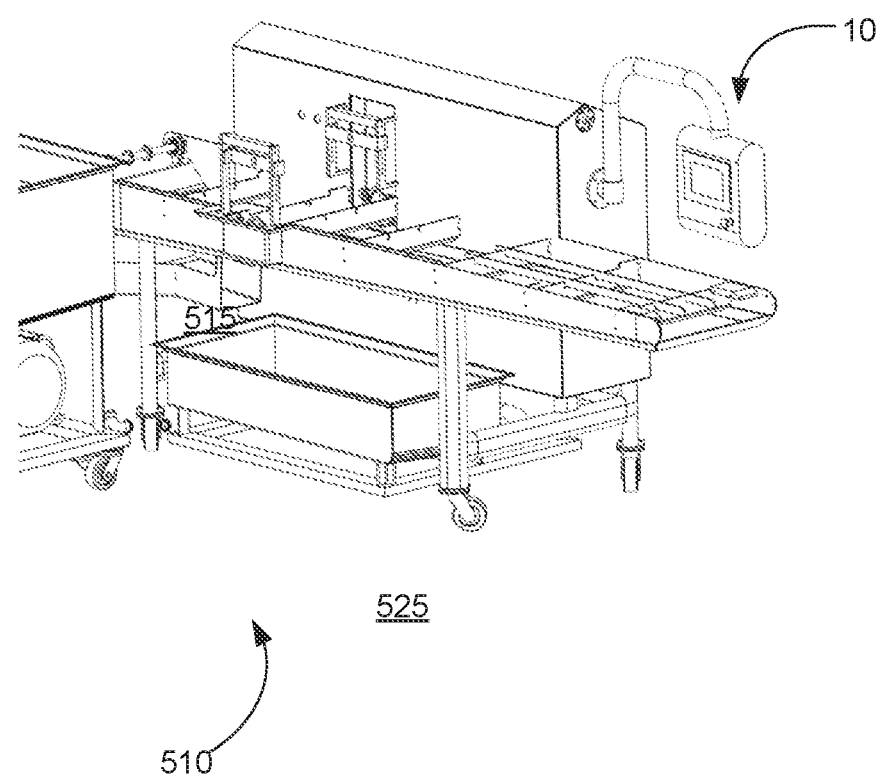
FIG. 19A illustrates a perspective view of a representative embodiment of the food treatment system.

By way of non-limiting illustration, FIGS. 19A-19E show some embodiments of a system 510 for recirculating injectate that has been sprayed through the system 10. In particular FIG. 19A illustrates that, in some embodiments, the recirculation system 510 comprises a first collector 515 (e.g., a sloped pan, a funnel, and/or any other suitable object that is configured to capture injectate after it is sprayed). Additionally, FIGS. 19A-19E show that the collected injectate can be strained (e.g., via one or more screens 520, sieves, colanders, paper filters, synthetic filers, meshes, catches, rotary drum filters 535, wedge wire canister filters 555, the multi-stage filtration system (discussed above), and/or any other suitable filters or filtering mechanisms) as it passes from the first collector 515 to a second collector 520 to remove any large debris (e.g., debris over 300 micrometers in size or any other desired size). Furthermore, FIGS. 19A-19E show that, in some embodiments the system 10 further comprises one or more shear blenders, blenders, stators, stator pumps, rotor-stator pumps, positive displacement pumps, rotor pumps, screw pumps, twin screw pumps, liquid ring pumps, piston pumps, circumferential piston pumps, helical rotary lobe pumps, rotary lobe pumps, suction and low pulsation helical lobe pumps, bi-wing lobe pumps, centrifugal pumps, chopper pumps, circulator pumps, cryogenic pumps, multi-stage pumps, diaphragm pumps, and/or other suitable pumps that are configured to mix the injectate and to break up particulate matter. Indeed, in some embodiments, the system 10 comprises a shear blender, which can blend masses in the injectate to produce a homogenous solution with particles of any suitable size (e.g., any size less than about 200 micrometers, such as less than about 80 micrometers).

In some embodiments, once the relatively large particles and/or other masses have been filtered out of the injectate and the injectate has been passed through one or more shear blenders (and/or other suitable mixers) to be homogenized, it is pumped and/or otherwise introduced back into the system (e.g., directly into the system, into a holding tank, through the multi-stage filtration system, into the injectate tank 15, and/or to any other suitable location).

In still another example of a potential modification, some embodiments of the described system 10 comprise one or more self-cleaning nozzle heads 125. In such embodiments, the nozzle heads can clean themselves in any suitable manner, including, without limitation, by being flushed with one or more rinse and/or cleaning agents (e.g., from the wash apparatus 65, the tank 15, and/or from any other suitable source), by being placed in an ultrasonic bath, by vibrating the nozzle heads (e.g., ultrasonically and/or in any other suitable manner), by contacting and/or by being contacted (e.g., by being sprayed with, dipped in, and/or otherwise coming in contact) with a cleaning and/or rinse agent, and/or in any other suitable manner. In some embodiments, however, a vibrating mechanism is coupled to one or more nozzle heads to ultrasonically vibrate and clear the heads.

In some embodiments, however, the nozzle head 125 is configured to rinse (and/or otherwise clean) one or more sets of nozzles 50 while another set, or multiple sets, of nozzles are configured to apply injectate to a food product 200. Thus, in some embodiments, the system 10 can clean a first set of nozzles while a second set of nozzles is injecting (or otherwise applying) injectate. Similarly, in some embodiments, while the first set of nozzles is spraying injectate, the second set of nozzles can be cleaned. As a result, in some embodiments, the system's nozzles can continually be cleaned, without necessarily taking the system offline and preventing it from treating food products.

Where the nozzle head 125 comprises multiple sets of nozzles 50 and is configured to allow one set of nozzles to apply injectate while another set is being cleaned, the nozzle head can comprise any suitable component or characteristic that allows it to function in such a manner. By way of illustration, FIGS. 16A-16E show some embodiments in which the nozzle head 125 comprises multiple sets of nozzles 50. In particular, while the head can comprise any suitable number of nozzle sets (including, without limitation, 1, 2, 3, 4, 5, 6, 7, 8, 9, or more), with a set being one or more nozzles in a given location (e.g., one side of the head, a portion of the head, in one general location, etc.), FIGS. 16C and 16D show some embodiments in which the nozzle head 125 comprises a conduit 300 having a first set 305 and a second set 310 of nozzles 50. Additionally, while FIGS. 16C and 16D show that, in some embodiments, the first 305 and second 310 sets of nozzles 50 are disposed on substantially opposite portions of the conduit, in some other embodiments, the nozzle sets are disposed in any other suitable location that allows the self-cleaning head to function as described herein.

In some embodiments, in which the nozzle head 125 comprises multiple sets of nozzles 50 (e.g., the first 305 and second 310 sets), the head is configured such that when one set of nozzles (e.g., the first set 305) is in a spray position (or a position in which it can apply injectate to a food product), one or more other sets of nozzles (e.g., the second set 310) is in a cleaning position (or a position in which fluid can be passed through such nozzles without being applied to the food product). While the head can be configured to move the various sets of nozzles between the spray and the cleaning position in any suitable manner, including, without limitation, by rotating the conduit, sliding the conduit, translating the conduit, and/or otherwise moving the conduit between the cleaning position and the spray position (or vice versa), FIGS. 16A-16E illustrate some embodiments in which the conduit 300 is configured to rotate between the spray and the cleaning position and vice versa (e.g., via one or more motors, pneumatic actuators, linear actuators, servos, hydraulic actuators, electric actuators, mechanical actuators, air cylinders, manual movement mechanisms, and/or via any other suitable mechanical movement device).

While the nozzle head 125 can function in any suitable manner, FIGS. 16C and 16D show that, in some embodiments, when a nozzle set (e.g., the first 305 or the second 310 set) is in the spray position, injectate is introduced through one or more inlet channels 315 (e.g., in the direction of arrow 320), where it is allowed to be sprayed from the adjoining nozzles 50. Additionally, FIG. 16C shows that, in some embodiments, the nozzle head 125 optionally comprises one or more risers 325 extending from, and in fluid communication with, the channels 315 corresponding to the nozzle set that is in the spray position. In this regard, the risers can comprise any suitable channel, duct, recess, canal, tubing, piping, and/or other feature that allows one or more gases (e.g., air) and/or fluids that are introduced into the nozzle head prior to and/or with the injectate to rise above the injectate in the channel and to be vented out of the nozzle head (e.g., via one or more optional ducts (such as an duct 335, in the direction of arrow 340), through one or more optional purge valves 60, by being drained to the injectate tank 15 and/or a drain via one or more optional drain conduits 165, by being be vented to air and/or a drain, etc.) without being forced through one or more nozzles.

Where the nozzle head 125 comprises one or more risers 325, the risers 325 can be disposed in any suitable location. That said, FIG. 16C shows an embodiment in which the riser 325 is disposed in an endcap 330, which allows the riser to be used to vent air (and/or other gases or fluids) from either the first 305 or the second 310 set of nozzles 50 when either set is in the spray position. Thus, in some embodiments, as injectate is introduced into a channel (e.g., inlet channel 315) when a set of nozzles is in the spray position (e.g., the first set of nozzles 305, as shown in FIG. 16C), air (and/or other fluid) that is introduced into the channel can rise above the injectate and be purged from the system. In some embodiments, once air (and/or any other suitable fluid) has been purged from the nozzle head 125, the system 10 can function in any suitable manner, including, without limitation, by closing the purge valve 60; by leaving the purge valve open to allow any residual air or fluid to escape the heads without passing through the nozzles, with any injectate that passes through purge valve (e.g., without contacting the food product) being redirected to the injectate tank 15; by allowing air to escape the purge value while preventing liquids from also escaping the valve; and/or in another other suitable manner.

FIGS. 16C and 16D further show that, in accordance with some embodiments, when one or more sets of nozzles 50 (e.g., the second set 310, as shown in FIGS. 16C-16D) are in the cleaning position, the system 10 is configured to introduce one or more cleaning and/or rinsing agents into one or more corresponding inlet channels 317 (e.g., in the direction of arrow 349) and to force such agents through the channels and corresponding nozzles. Accordingly, by forcing the fluids through the channels and nozzles (e.g., via the wash apparatus 65, a fluid tank, and/or otherwise), the system can remove unwanted debris, mineral build up, and/or other materials from the nozzles. Additionally, while some embodiments of the nozzle head comprise one or more risers that are configured to allow air to be purged from the nozzle set that is in the cleaning position, FIG. 16C shows that, in some embodiments, the system does not comprise a riser for the inlet channel 317 corresponding to the nozzles that are in the cleaning position (e.g., the second set 310 of nozzles 50 in FIG. 16C). As a result, in some embodiments, any cleaning and/or rinsing agents are forced, at any suitable pressure (including, without limitation, between about 50 psi and about 6,000 psi, or any sub-range thereof) to exit the inlet channel of the nozzle set being cleaned through the nozzles (e.g., the second set of nozzles), to clean the nozzles.

As mentioned, some embodiments of the system 10 are configured to allow one or more sets of nozzles 50 on the nozzle head 125 to apply injectate to a food product while one or more other sets of nozzles on the head are being cleaned. In such embodiments, the cleaning and/or rinsing agents that are used to clean the nozzles that are in the cleaning agents may be handled in any suitable manner, including, without limitation, by being allowed to be sprayed freely within the cabinet 90, by being directed through a duct away from the food product 200, and/or in any other suitable manner. By way of non-limiting illustration, FIGS. 16B-16D show that, in some embodiments, a portion of the conduit 300 is received by a sleeve and/or other housing 347 that defines an exit duct 345 and comprises one or more seals 350 between it and the conduit 300 so as to direct any cleaning and/or rinsing agents out of the nozzle head 125 (e.g., in the direction of arrow 355) to a drain, storage tank, and/or to any other suitable location. Accordingly, in some embodiments, the system is configured to allow one set of nozzles of a nozzle head to inject and/or otherwise apply injectate into a food product, while another set of nozzles on the same head are being cleaned, without exposing the food product to the cleaning and/or rinsing agent.

One or more sets of nozzles 50 of the nozzle head 125 can be cleaned at any suitable time, including, without limitation, at a time directed by a user, an administrator, the processing unit 75, and/or at any other suitable time. In some embodiments, however, the system is configured to clean a set of nozzles after a particular amount of usage time, after a certain amount of fluid has passed through the nozzles, as the system determines that one or more nozzles have become at least partially occluded (e.g., by comparing pressure readings from a pressure gauge in fluid communication with the head (e.g., pressure sensor 62 shown in FIG. 15) with pressure readings from one or more other pressure gauges in the system (e.g., gauges 40, 42, 44, 46, etc.), by measuring differences in flowmeter 34 readings, as shown FIG. 1R, and/or in any other suitable manner), and as the system otherwise determines appropriate. Thus, in some embodiments, the system itself may determine when a set of nozzles should be cleaned. Moreover, in some such embodiments, the system can clean the nozzle sets without substantially impacting the system's ability to treat food product.

As another example of a suitable modification, FIGS. 17A-17F show that, in some embodiments, a single head comprises 1, 2, 3, 4, 5, 6, or more sets (e.g., 360, 365, 370, etc.) of nozzles 50. Additionally, while each set of nozzles can comprise one or more of its own risers 325 and/or ducts 335, FIGS. 17B-17F show some embodiments in which the head 125 is configured to act as a manifold that allows air to be purged from head through one or more shared risers 325 and ducts 335. In this regard, FIGS. 17B-17F show some embodiments in which the nozzle head 125 comprises one or more fluid inlets 315 that are configured to channel (e.g., via one or more fluid manifolds 326) injectate into multiple channels 327 that each comprise one or more nozzles. In accordance with some embodiments, FIGS. 17B-17F show that the nozzle head further comprises one or more risers 325 and ducts 335 that are configured to channel air and/or any other suitable fluid out of the nozzle head. Additionally, while not shown in FIGS. 17B-17F, in some embodiments, one or more valves that are controlled by the processing unit 17 (and/or in any other suitable manner) are in fluid communication with the ducts 335 to ensure that fluids exit the nozzle head through the ducts only when desired.

As yet another example of a suitable modification, in some cases, after a food product 200 receives injectate from a nozzle 50, the described method is further configured to pass the food product through a bath, cascade, waterfall, curtain, dip, spray, powder, stream, breading, rub, coating, and/or other application method that is configured to coat, bread, fill holes in, color, preserve, flavor, and/or otherwise treat the food product.

As even another example of a suitable modification, some embodiments of the system 10 comprise one or more automated hoods, covers, doors, and/or other objects. Indeed, in some embodiments, a lid 211 (see e.g., FIG. 8) and/or doors 206 (e.g., see through and/or any other suitable doors) of the cabinet 90 and/or the chamber 205 (see e.g., FIGS. 18M-18N) are configured to be opened and closed by one or more motors, pistons, and/or other suitable actuators.

In yet another example of a modification, in some embodiments, when the lid 211 is opened, a door 206 is opened, an emergency stop 208 (as shown in FIG. 18M) is triggered, and/or any other set stop procedure occurs, the system 10 is configured stop spraying injectate from the nozzles 50 and/or to stop the food product transport.

In still another example of a modification, in some embodiments, the system 10 comprises one or more mixing vessels and/or feed vessels. In this regard, such vessels can perform any suitable function (including, without limitation, to mix, store, and/or feed injectate, black-flush fluid, and/or any other suitable fluid to a desired location) and be disposed in any suitable location (including, without limitation, in the injectate tank 15, in the cabinet 90, below the food product transport 55 (e.g., in a tank next to the injectate tank and/or in any other suitable location), in separate vessels, and/or in any other suitable location). Indeed, in some embodiments, the mixing vessel and/or the feed vessel allow relatively small batches of injectate to be mixed (e.g., via any suitable high shear mixer, low shear mixer, blender, paddle, stirrer, magnetic stirrer, vibrator, and/or other suitable mixing mechanism), filtered, and/or fed to one or more nozzles 50.

Figure 18A:
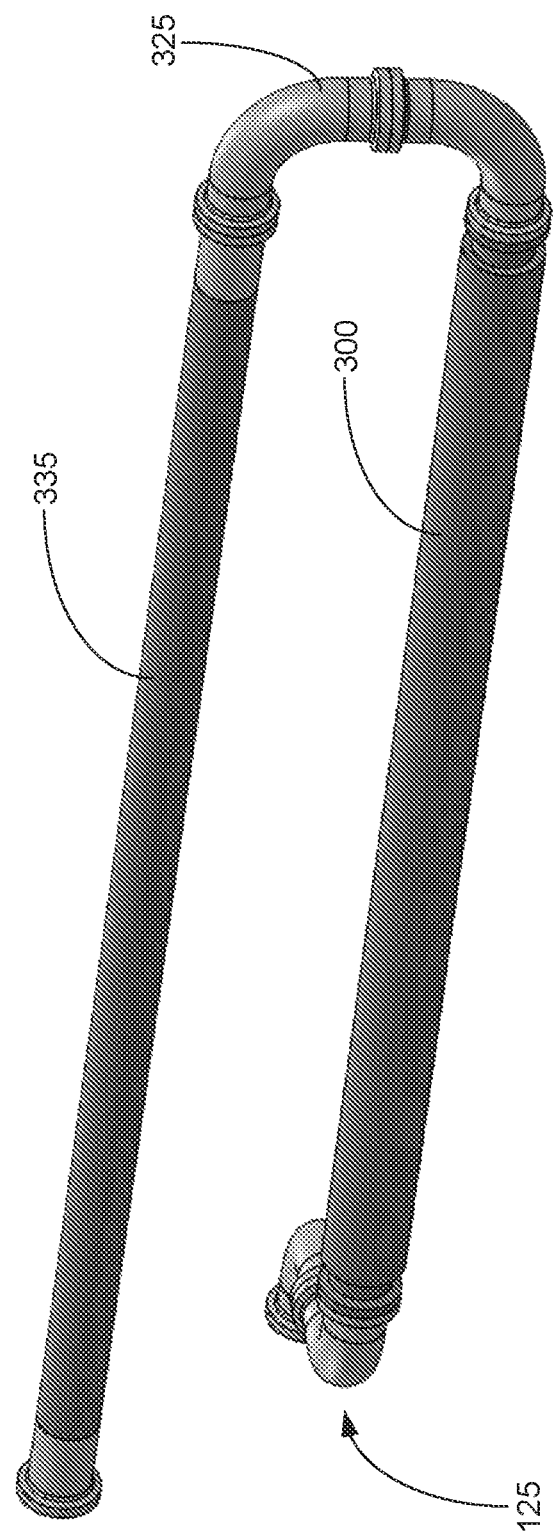
FIG. 18A illustrates a perspective view of a representative embodiment of the spray nozzle head.
Figure 18B:
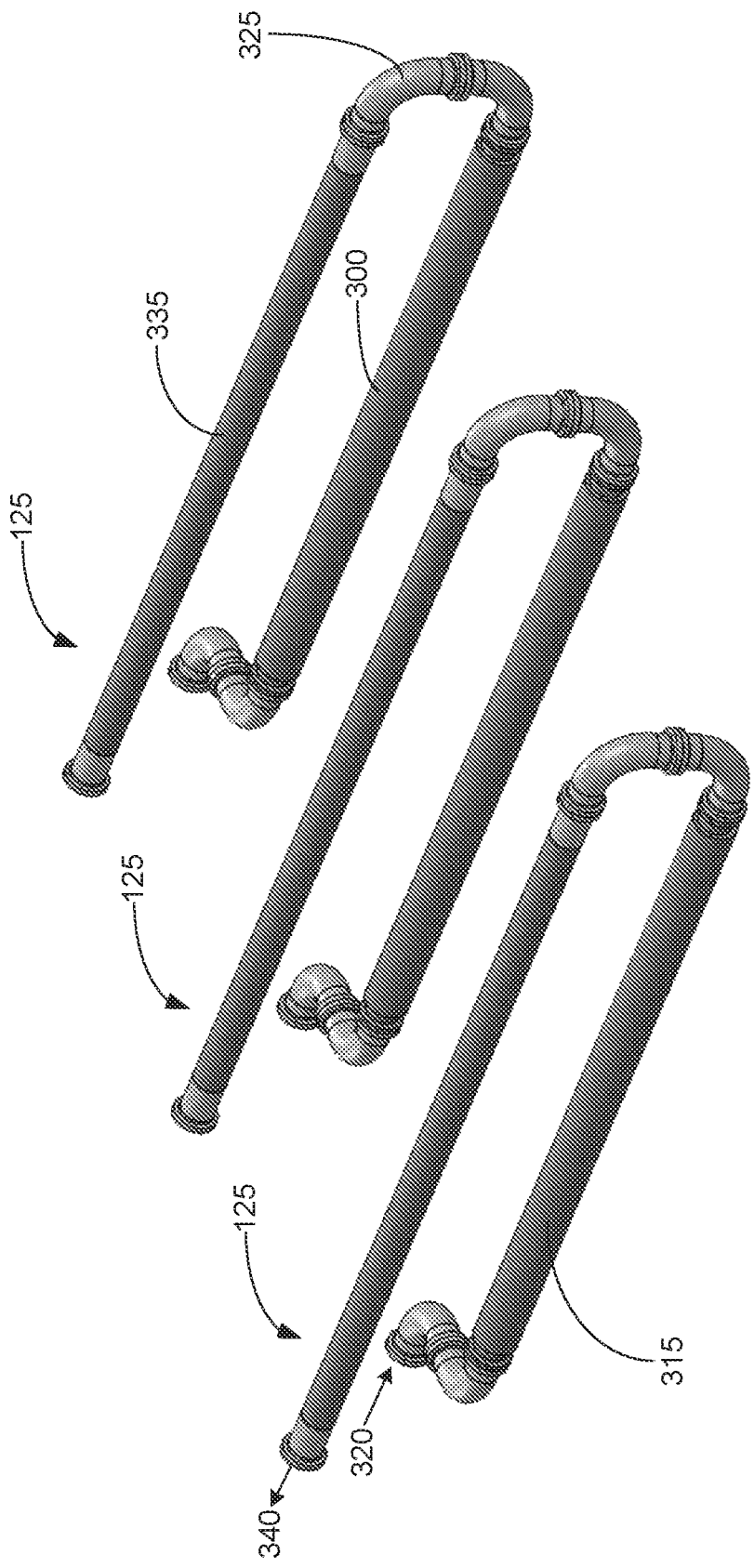
FIG. 18B illustrates a perspective view of three spray nozzle heads in accordance with a representative embodiment.
Figure 18C:
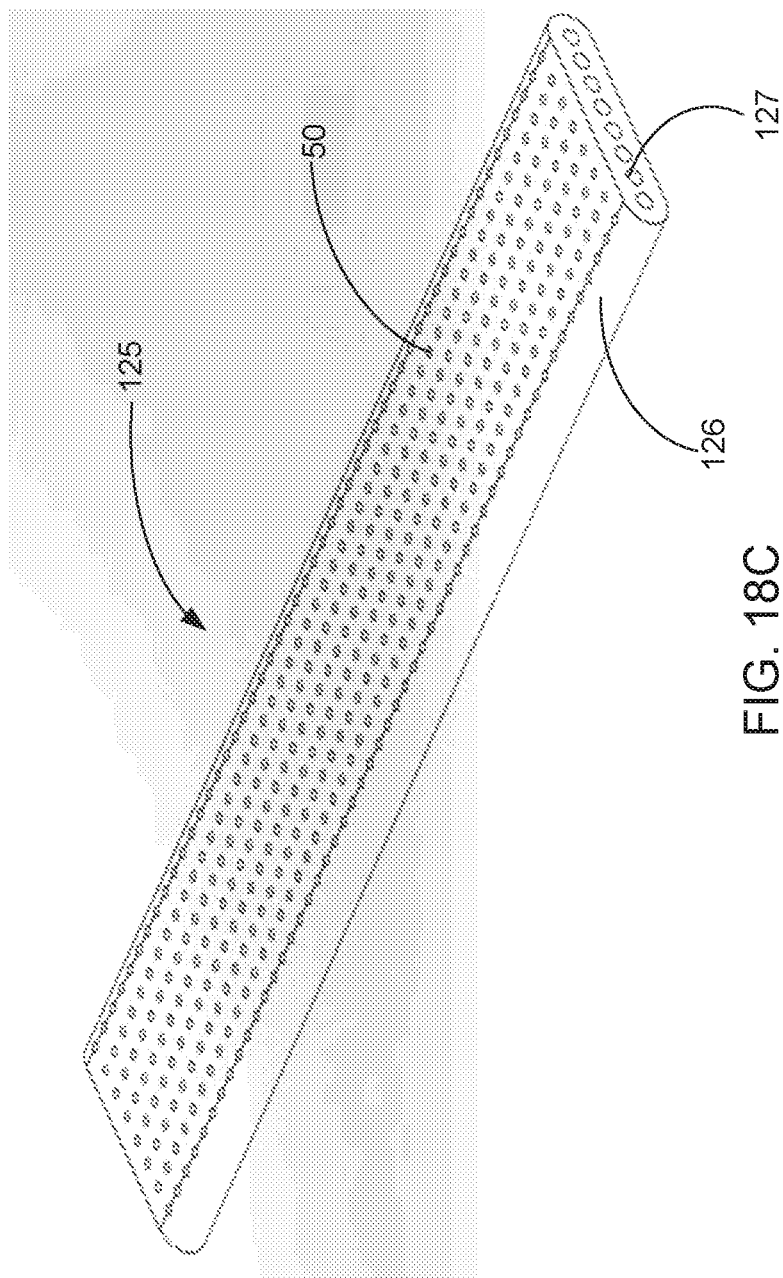
FIGS. 18C-18D illustrate perspective views of some representative embodiments of the spray nozzle head.
Figure 18D:
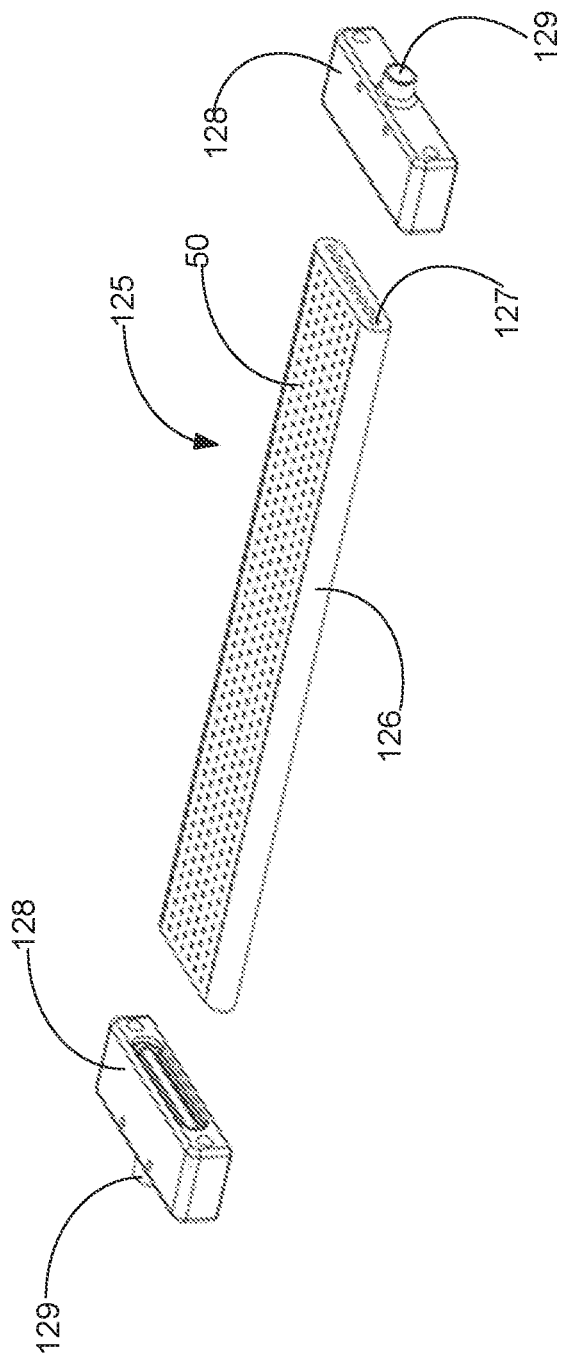
Figure 18E:
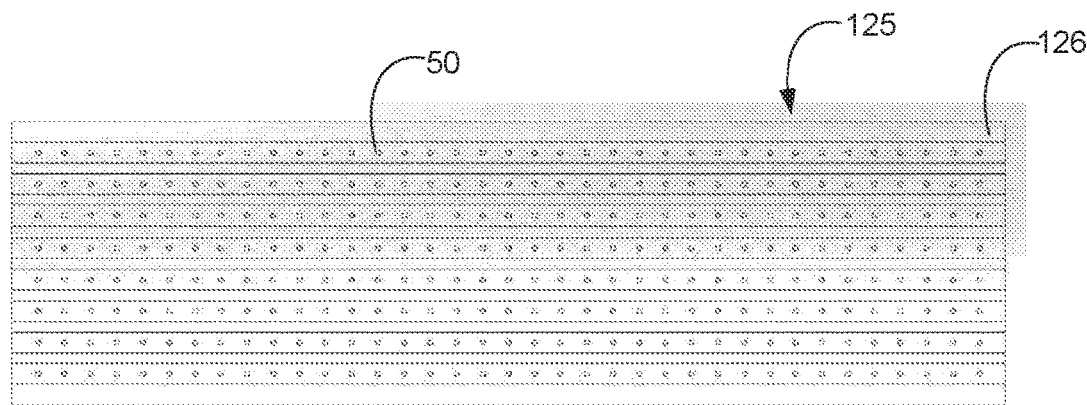
FIGS. 18E-18K illustrate different views of some embodiments of the spray nozzle head.
Figure 18F:
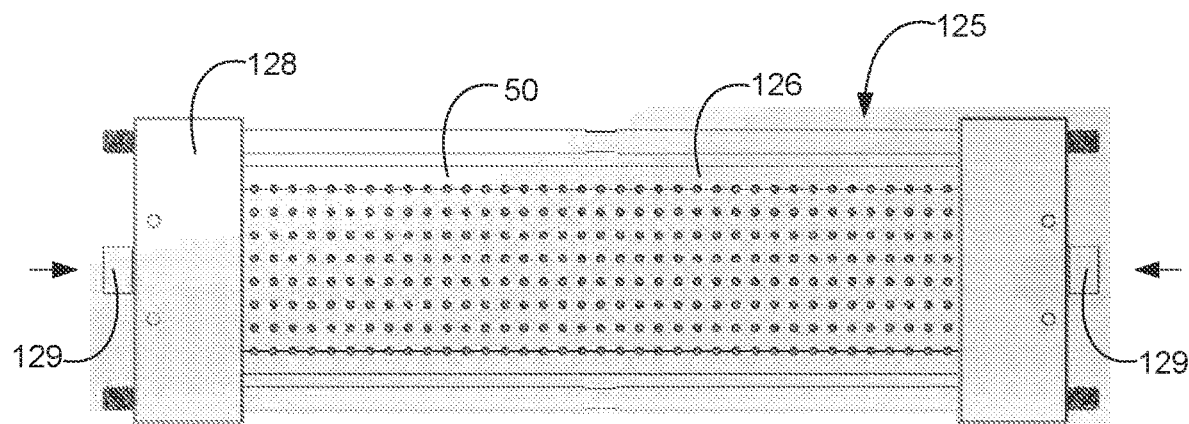
Figure 18G:
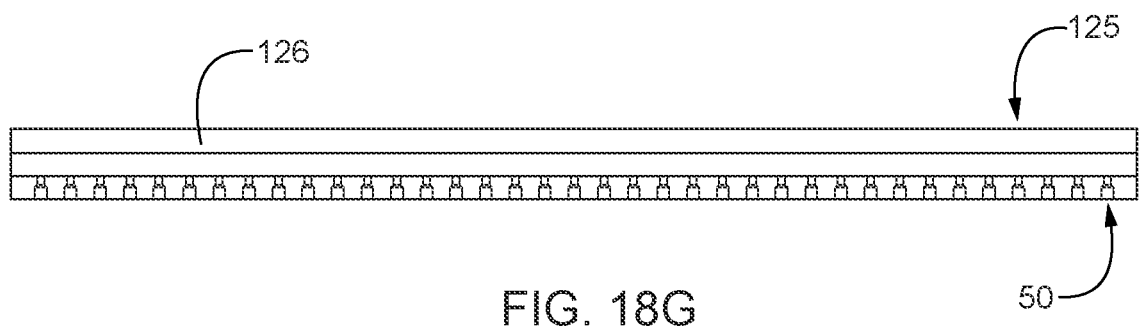
Figure 18H:
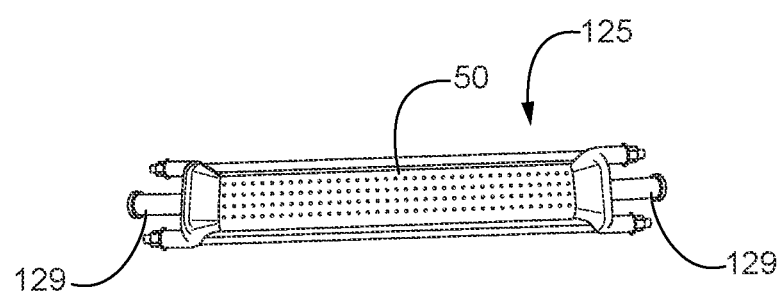
Figure 18I:
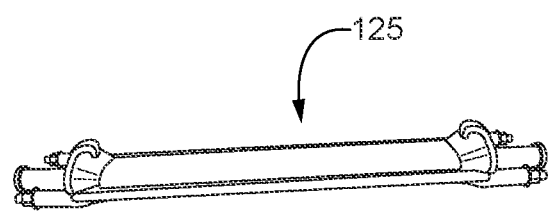
Figure 18J:
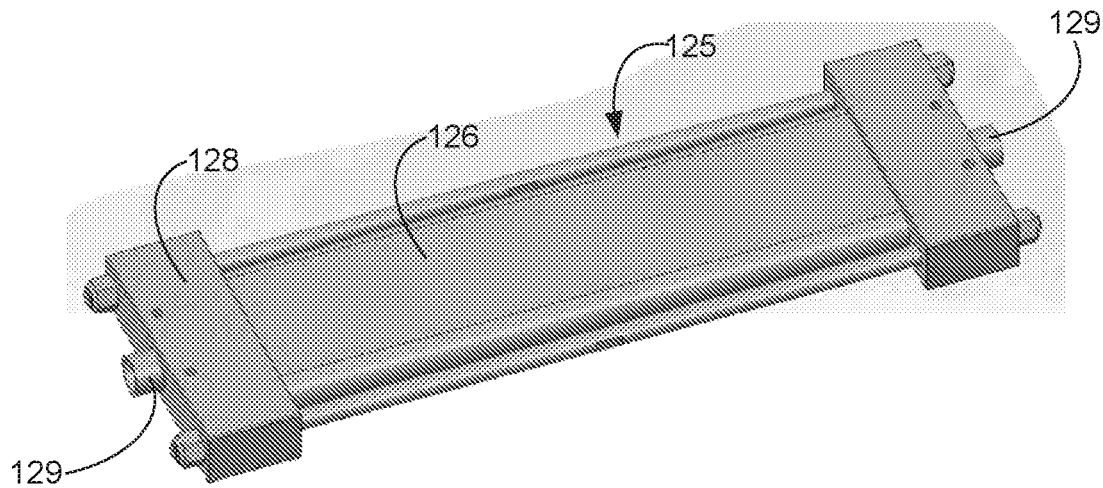
Figure 18K:
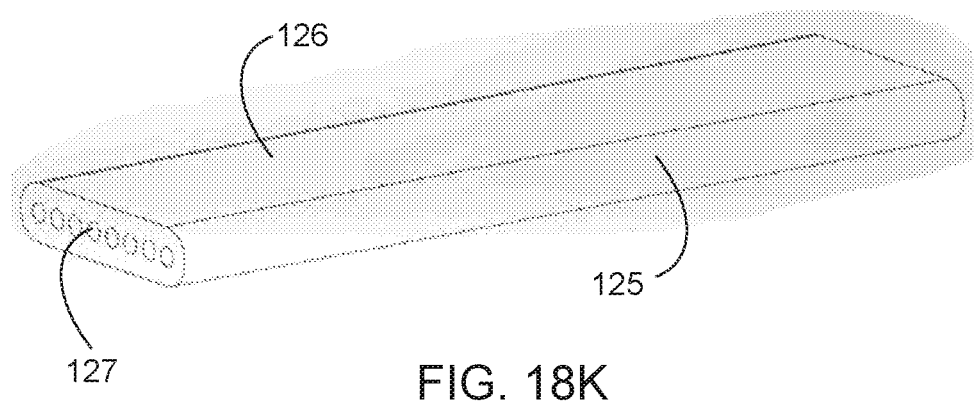
Figure 18L:
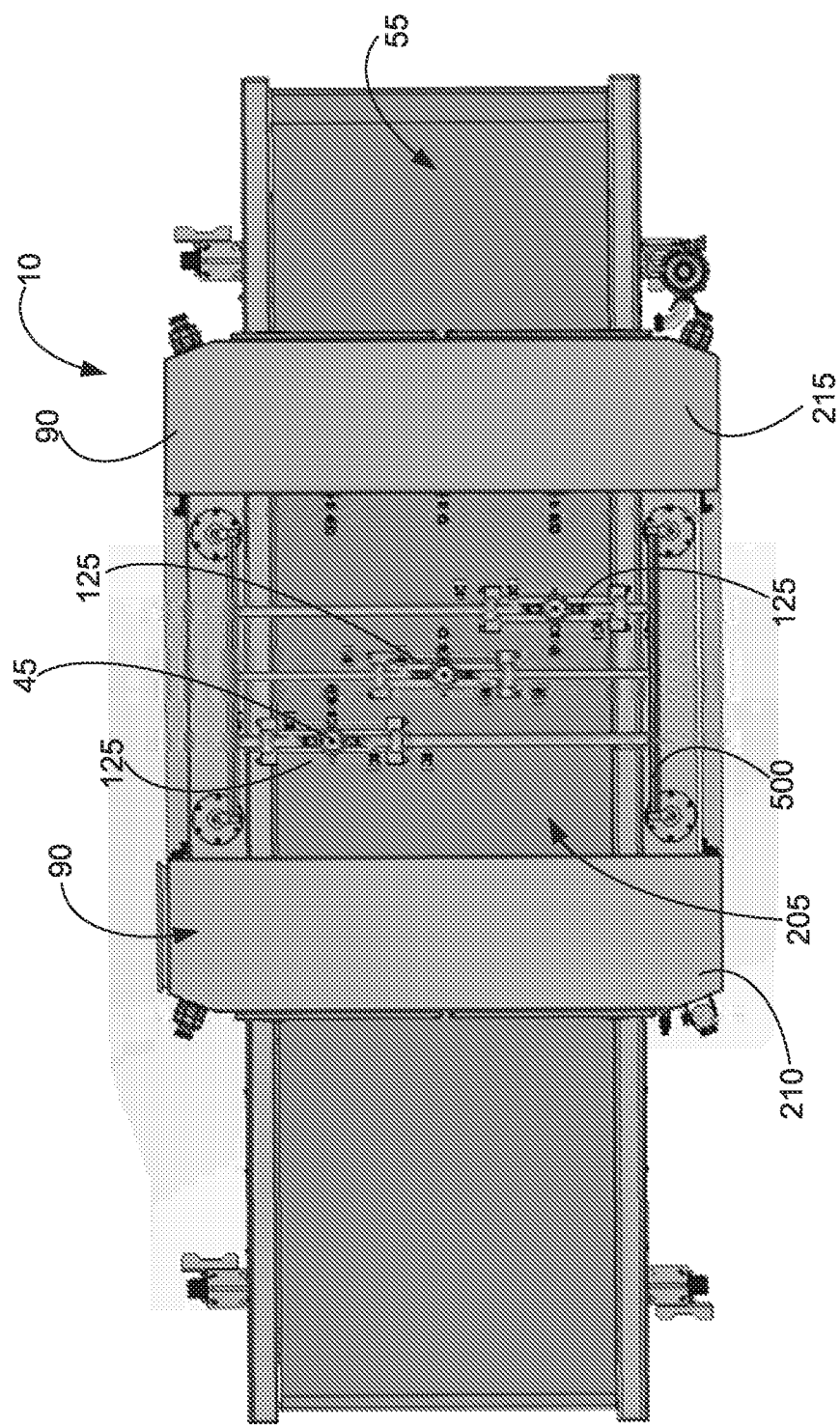
FIGS. 18L-18P show different views of some embodiments of the food product treatment system.
Figure 18M:
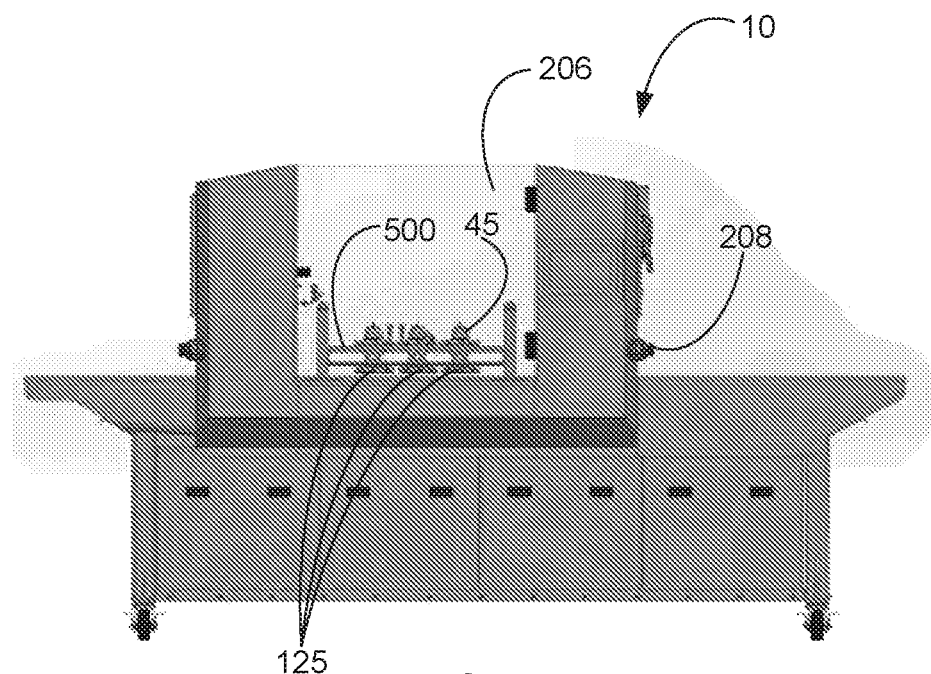
Figure 18N:
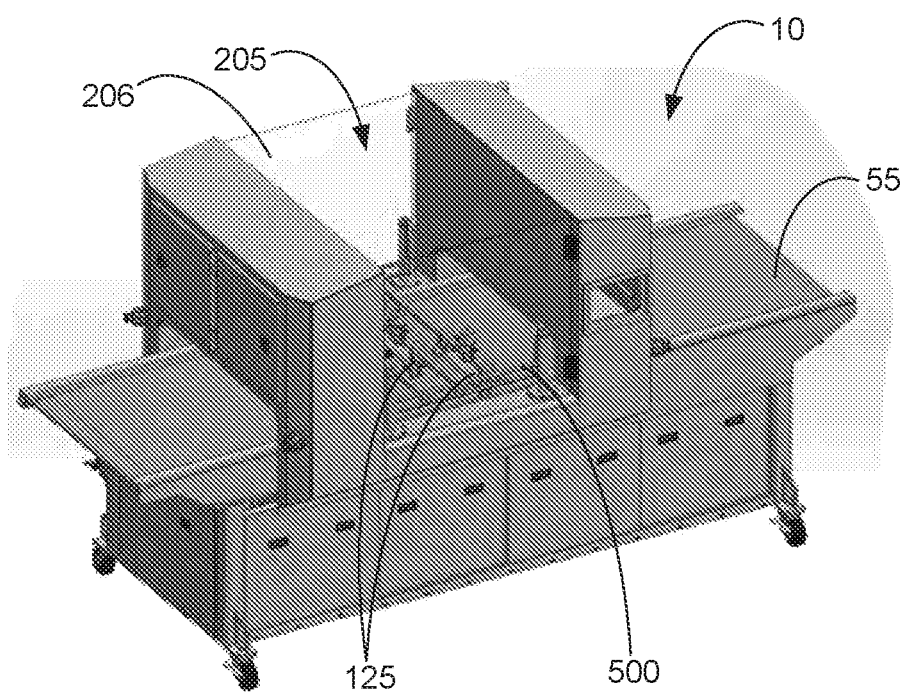
Figure 18O:
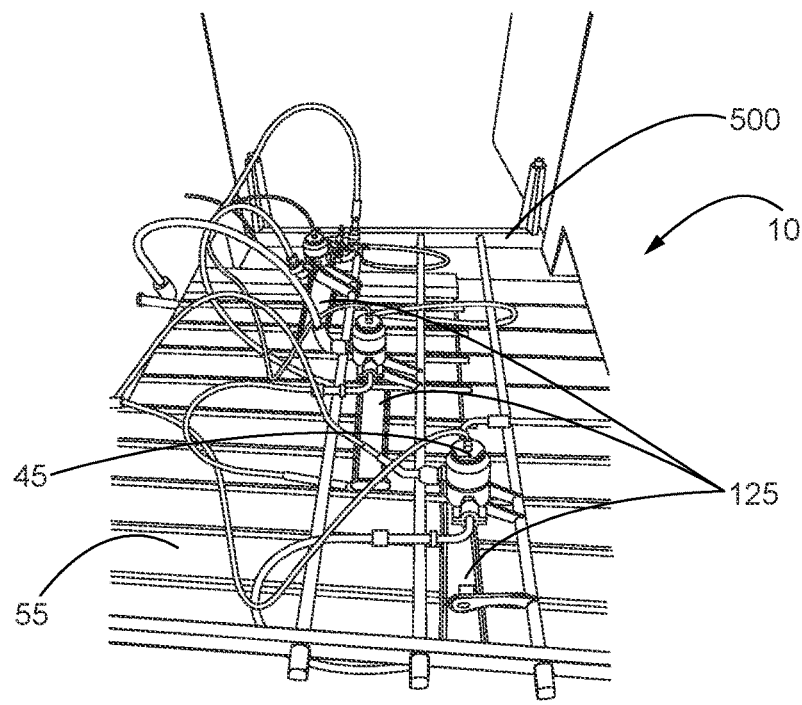
Figure 18P:
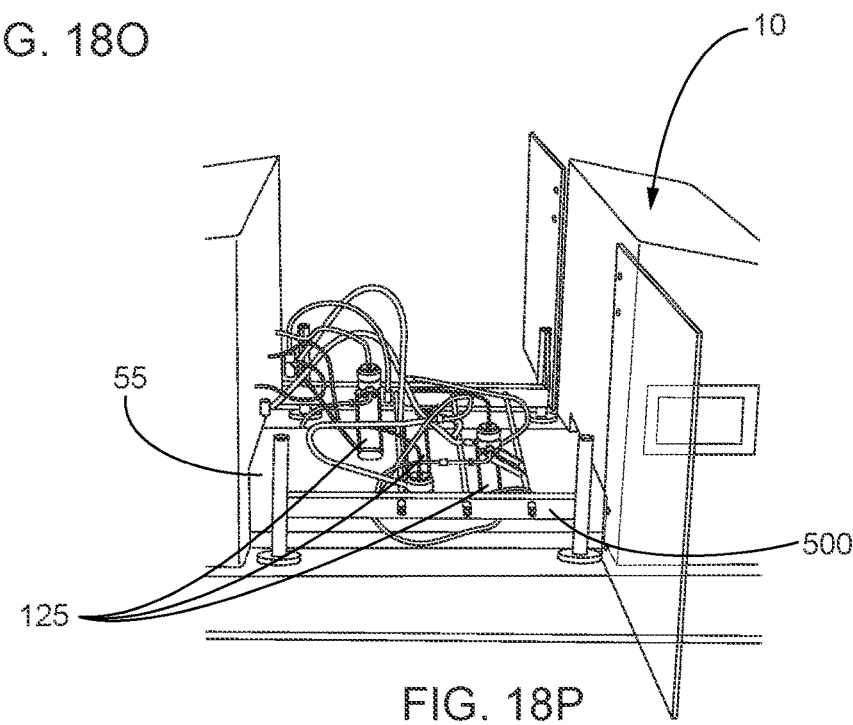

As yet another example of a suitable modification, FIGS. 18A and 18B show some embodiments in which the spray nozzle head 125 optionally comprises one or more elongated conduits that define one or more risers 325 to allow air (and/or any other suitable fluid) to rise above injectate in the head and to be vented (e.g., in the direction of arrow 340) from the system (e.g., via one or more ducts 335, purge valves 60, drain lines 165, etc.). Again, in some such embodiments, the system can comprise one or more valves that are configured to control when air or any other fluid exits the nozzle head 125 through the duct 335.

As still another example of a suitable modification, FIG. 18L shows that, in some embodiments, one or more of the cabinets 90 are disposed above the food product transport 55, the chamber 205 is open from its top, and/or the food product transport 55 has a width that is substantially equal to a width of a footprint of the system 10.

Figure 21A:
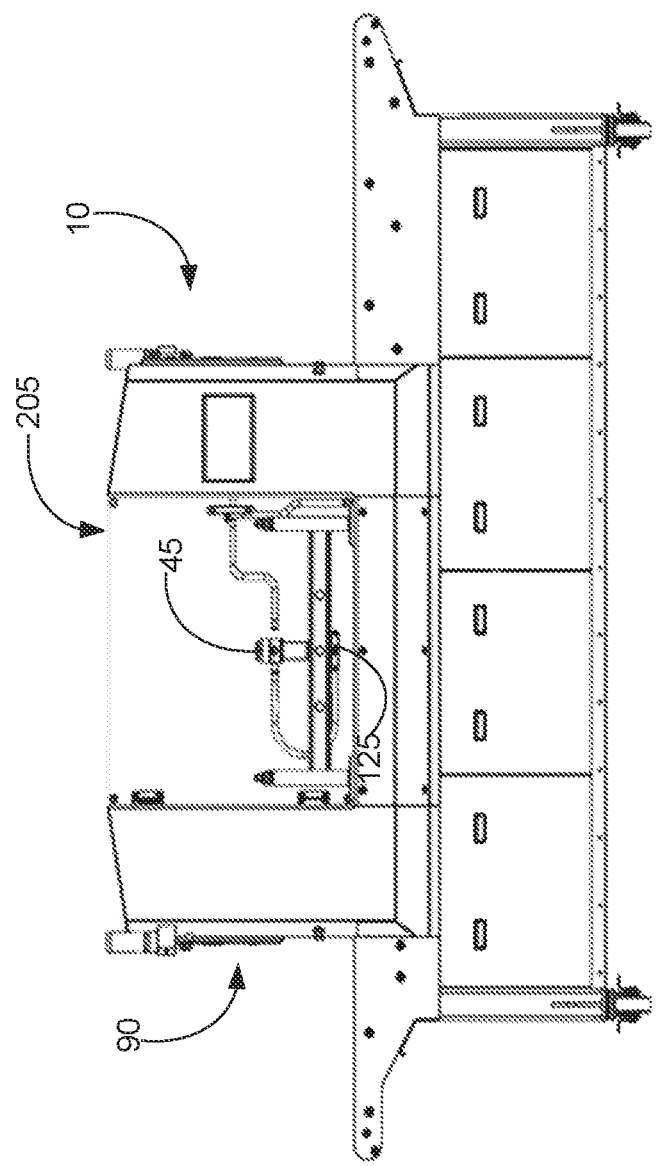
FIGS. 21A-21C illustrate multiple views of a representative embodiment of the food treatment system.
Figure 21B:
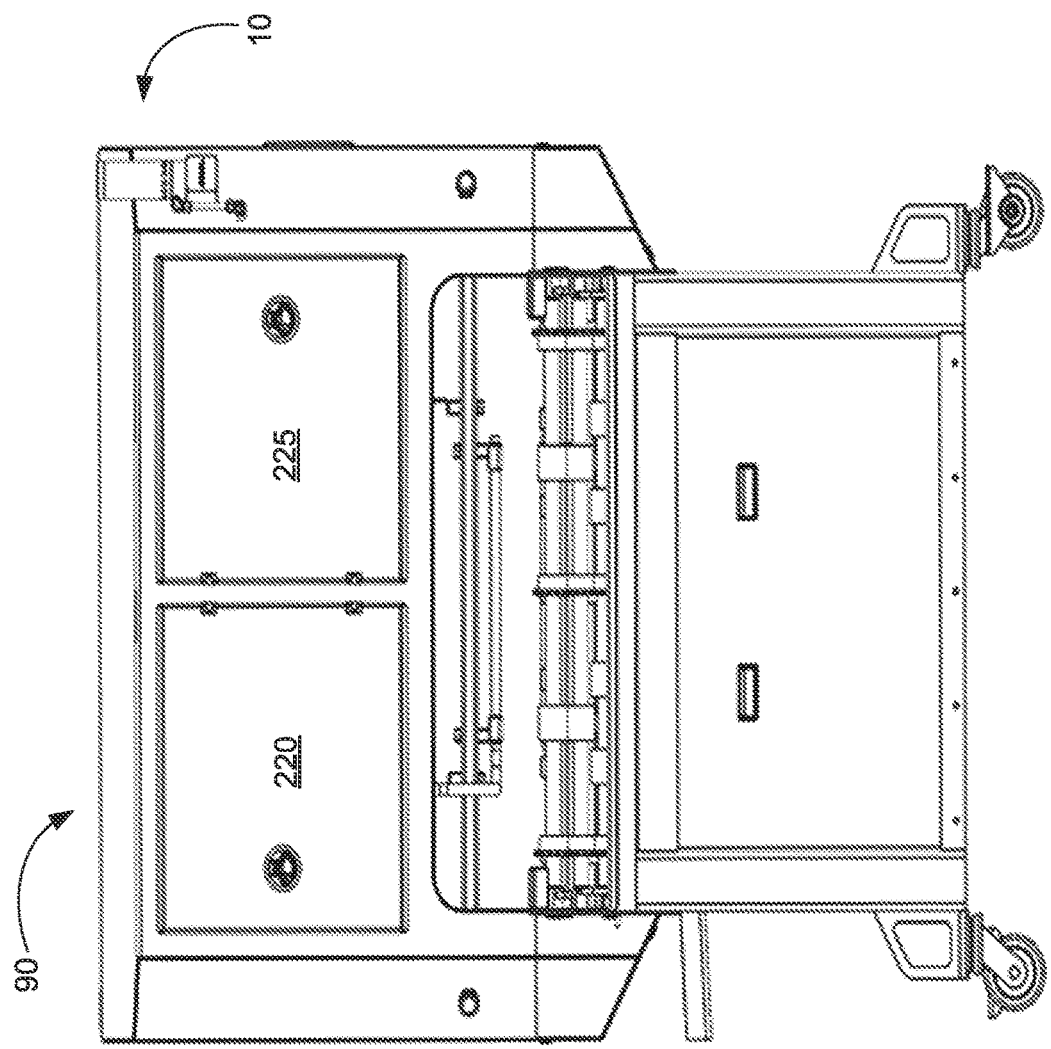
Figure 21C:
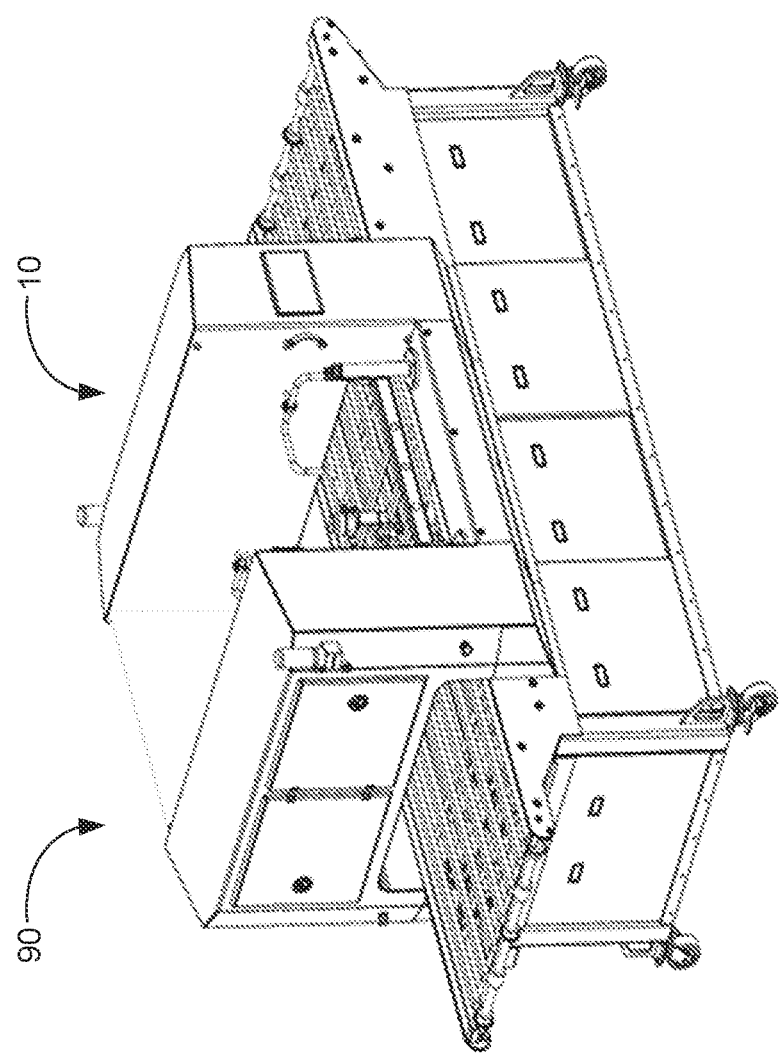

As even another example of a suitable modification, the described system 10 can be modified in any suitable manner, including, without limitation, by changing the size and/or design of the cabinet 90 (e.g., as shown FIGS. 21A-21C and/or in any other suitable manner), by changing the layout and electrical format of the system (e.g., as shown in FIGS. 22A-22E and 22H), and/or in any other suitable manner.

Figure 22A:
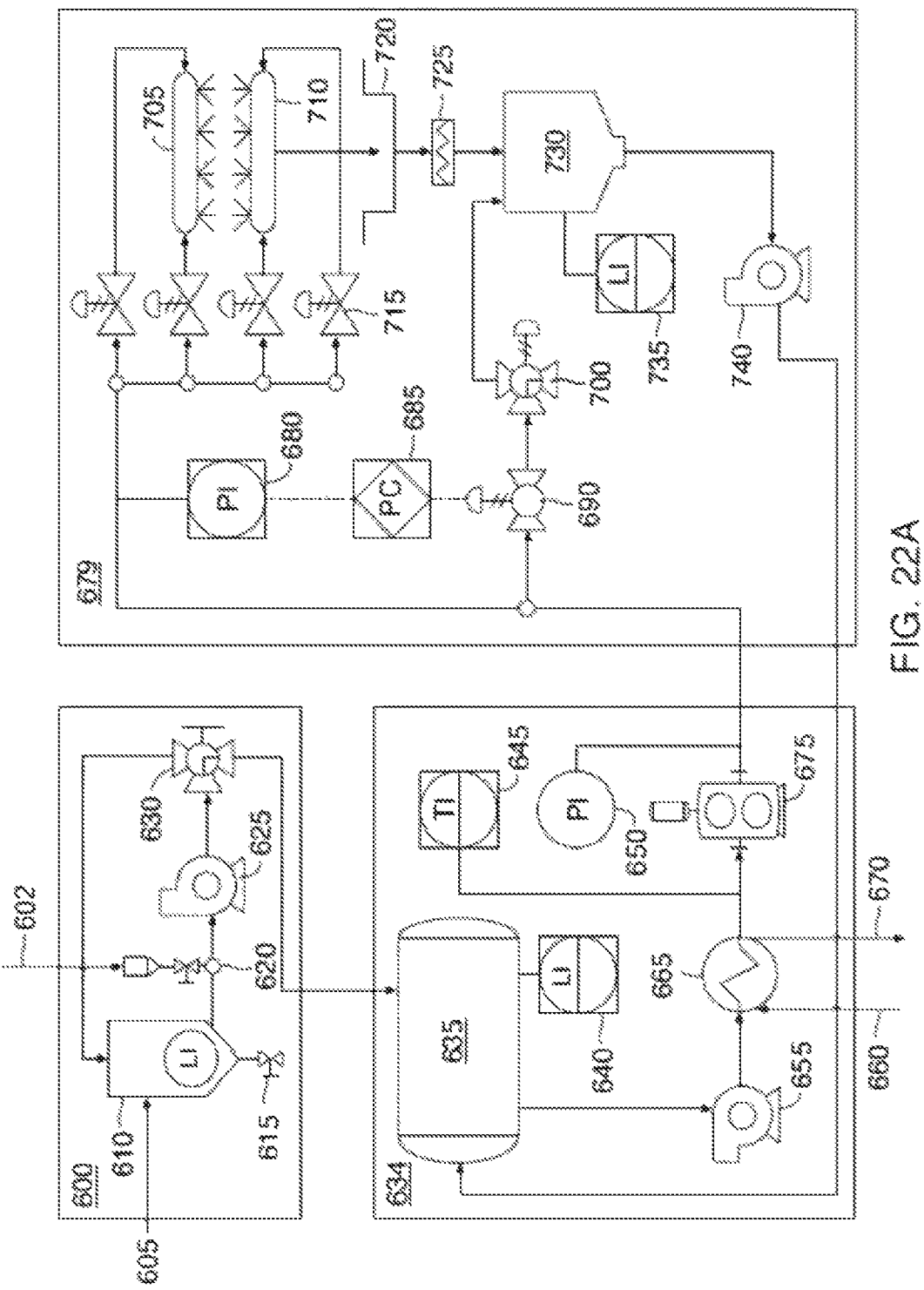
FIG. 22A illustrates a schematic view of a representative embodiment of the food treatment system.
Figure 22B:
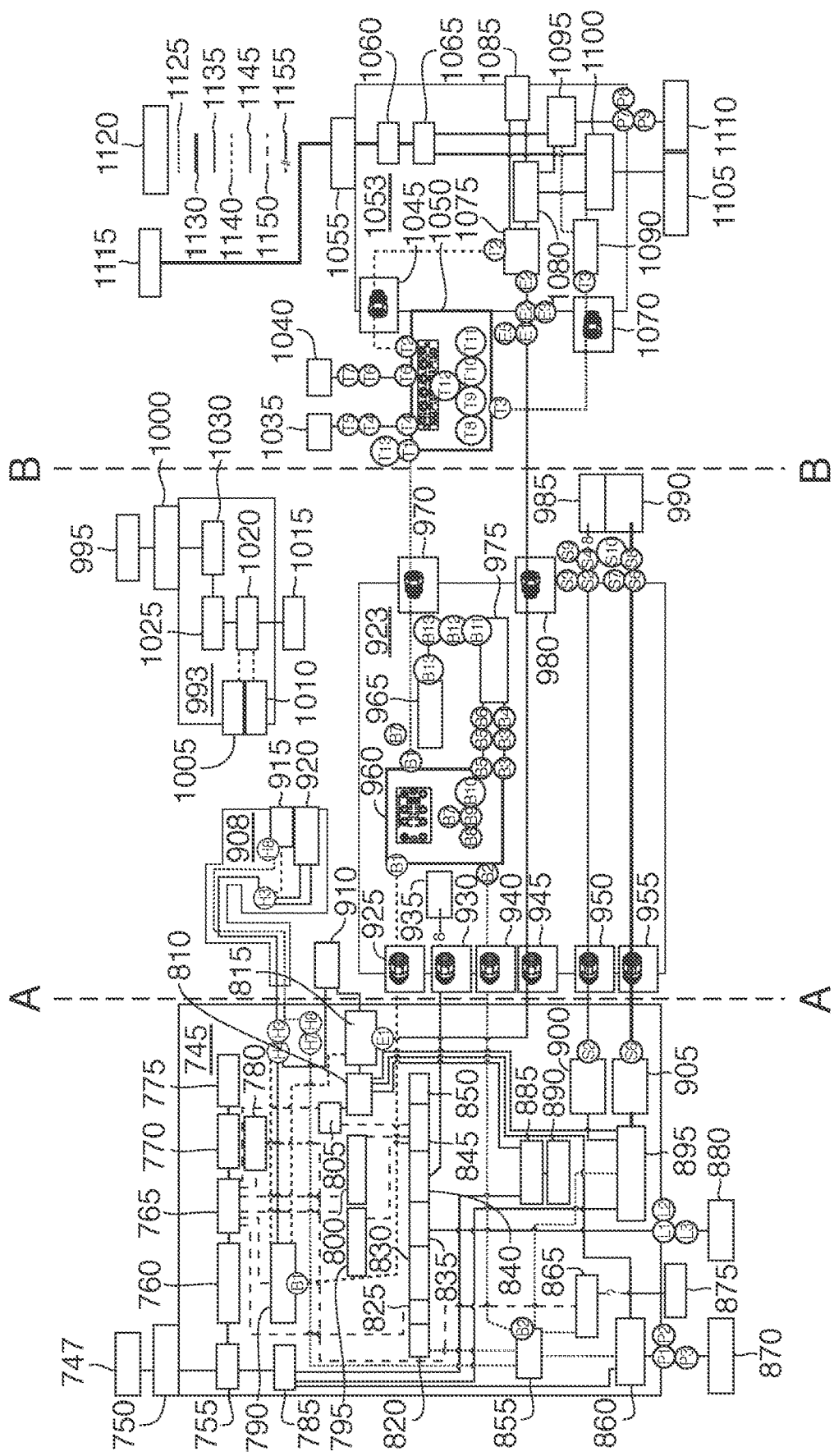
FIG. 22B illustrates a schematic view of a food treatment system in accordance with a representative embodiment.
Figure 22C:
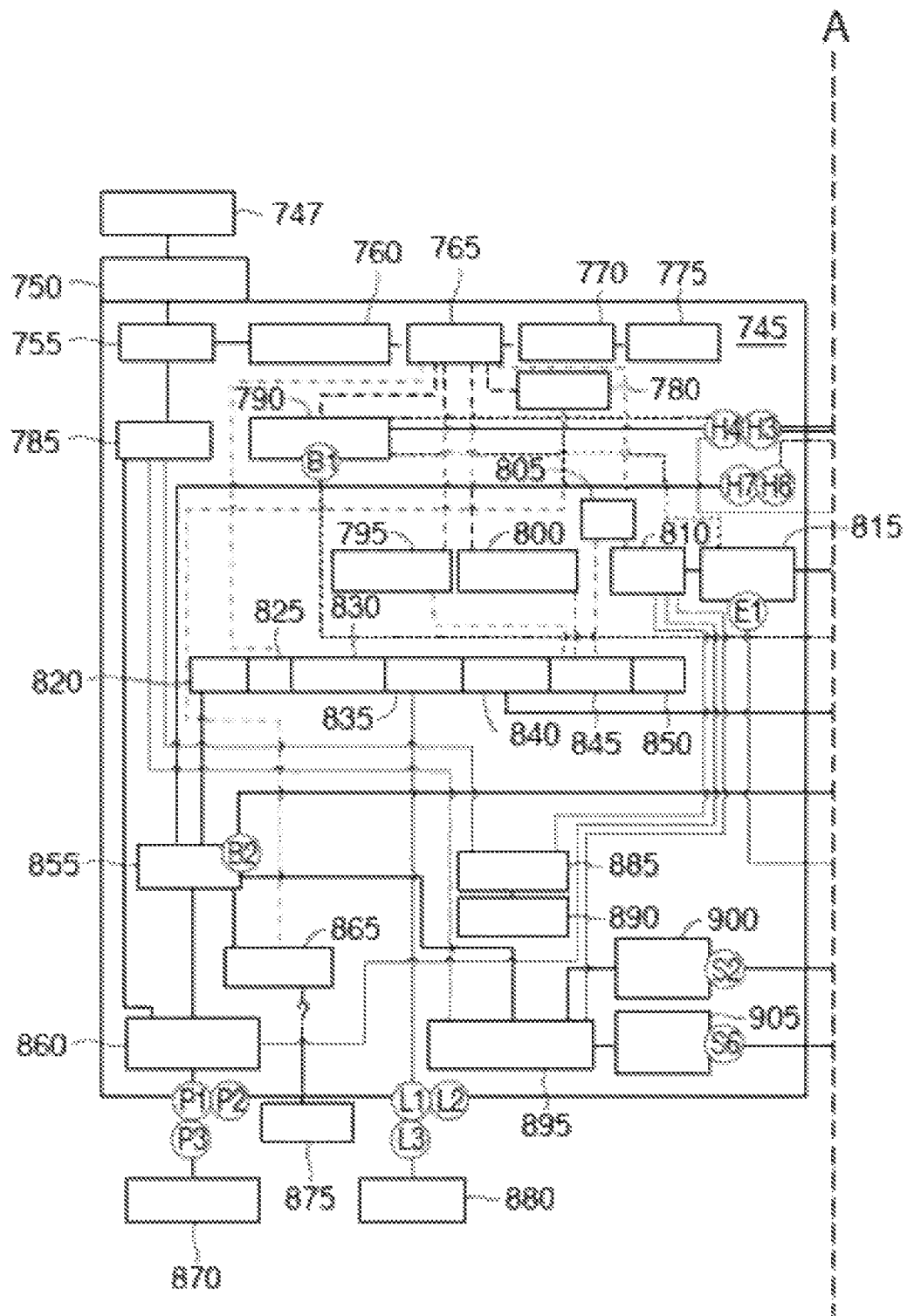
FIG. 22C illustrates an enlarged view of a portion of FIG. 22B, as shown to the left of line A-A in FIG. 22B.
Figure 22D:
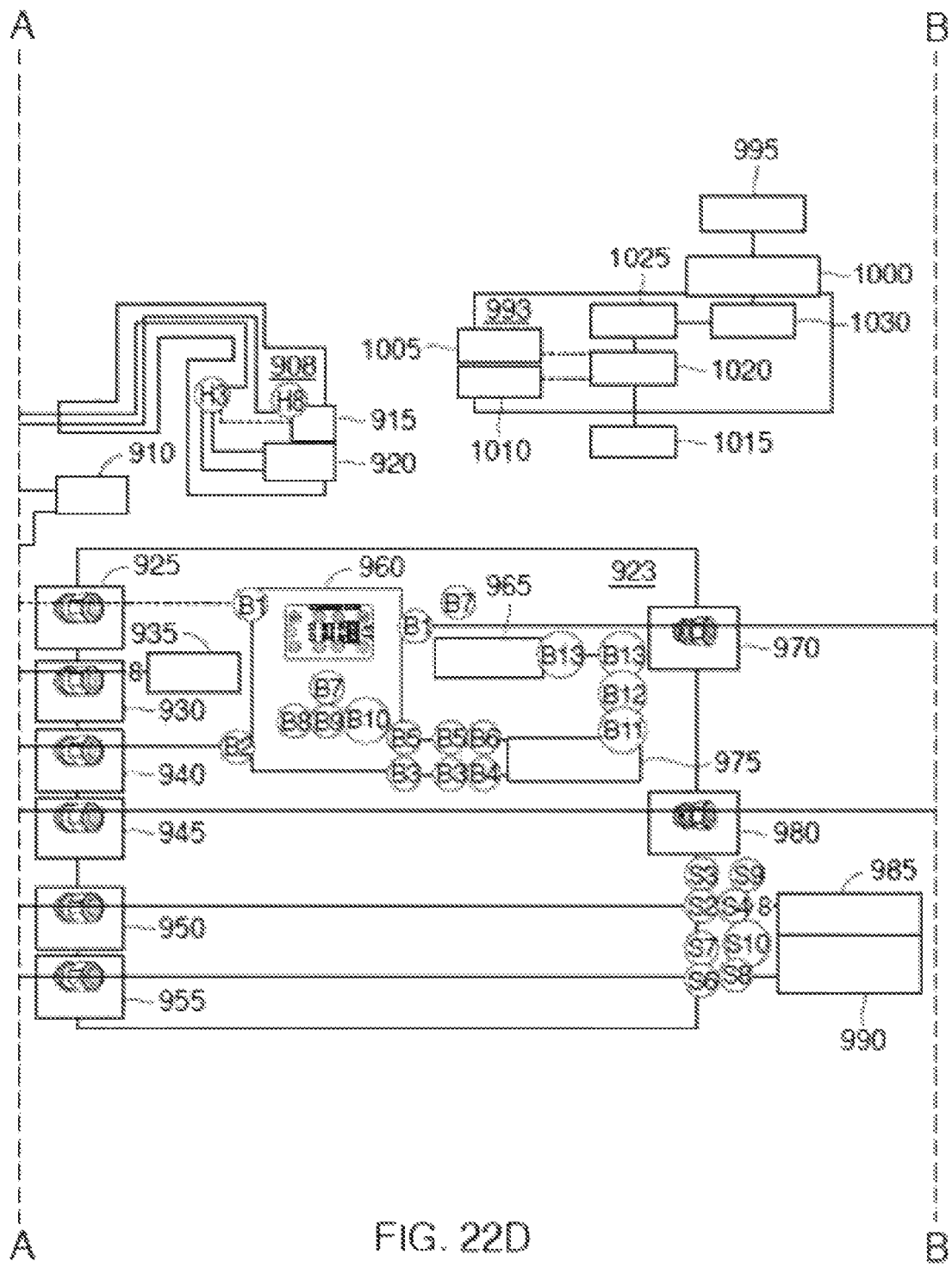
FIG. 22D illustrates an enlarged view of a portion of FIG. 22B, as shown between lines A-A and B-B in FIG. 22B.
Figure 22E:
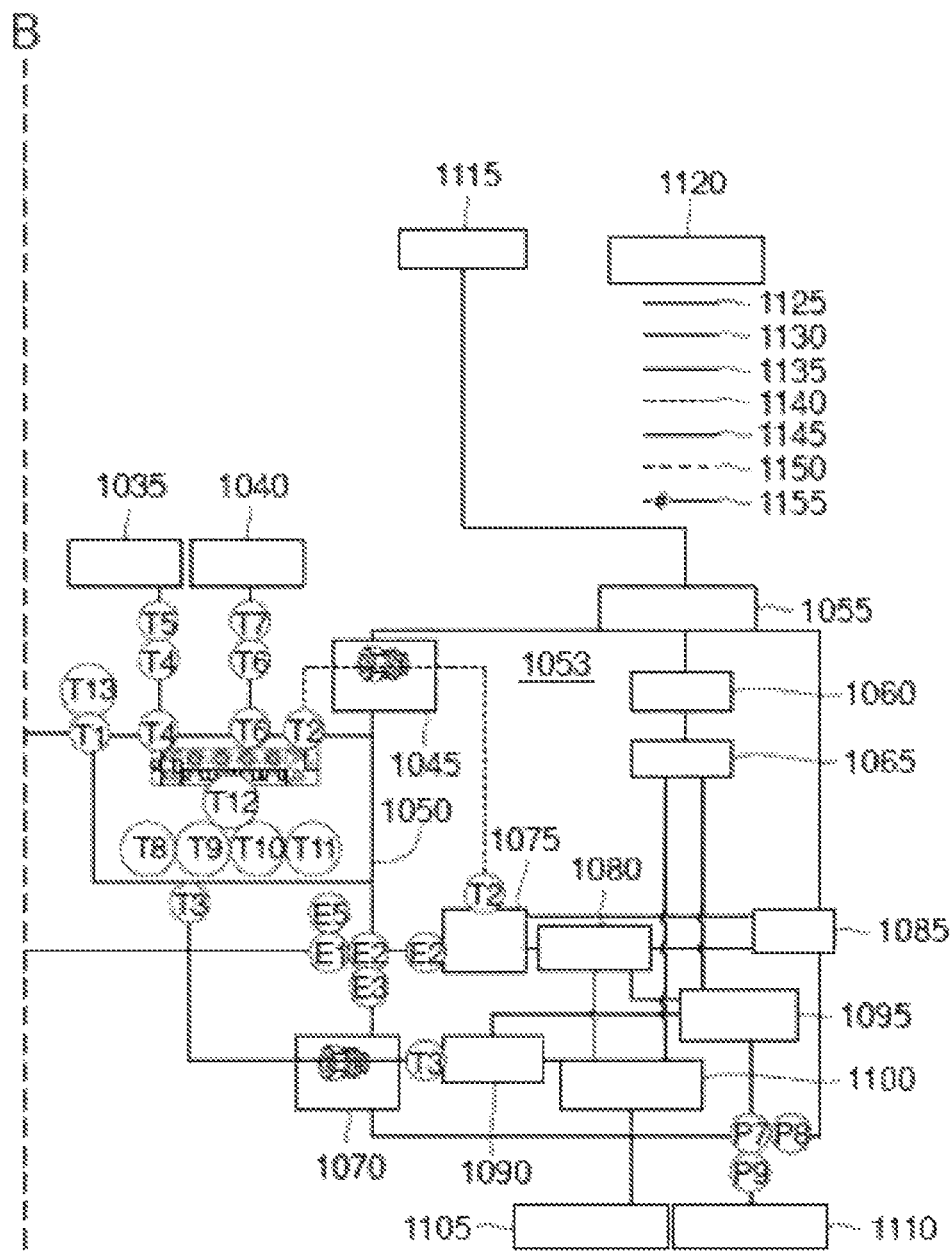
FIG. 22E illustrates an enlarged view of a portion of FIG. 22B, as shown to the right of line B-B in FIG. 22B.
Figure 22F:
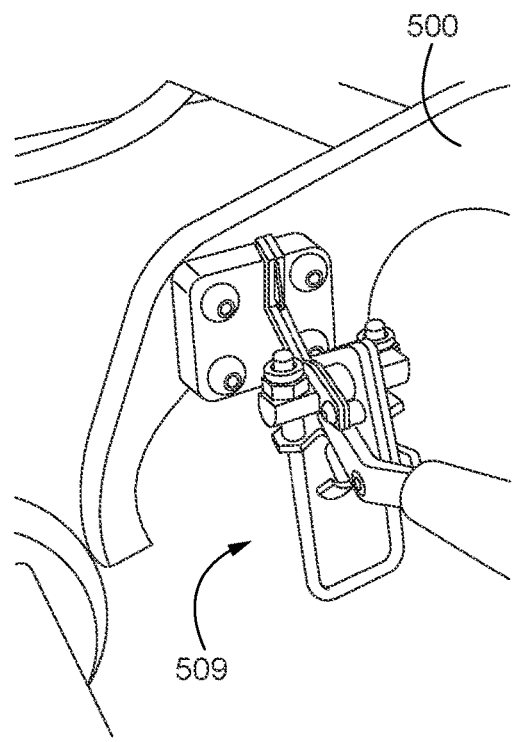
FIGS. 22F-22G illustrate a mechanism for selectively coupling a nozzle head to the system in accordance with some representative embodiments.
Figure 22G:
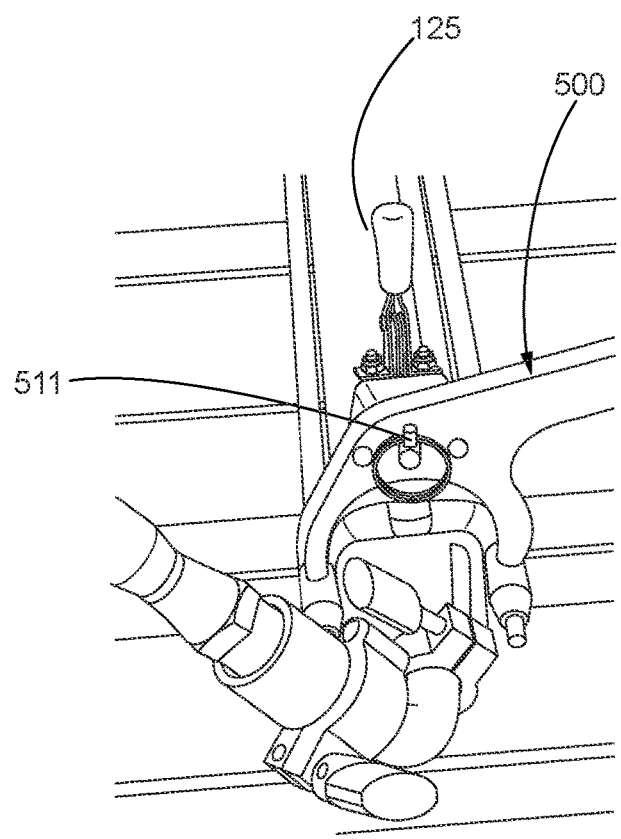

In one non-limiting example, FIG. 22A shows that, in some embodiments, the system comprises a mix skid (and/or any other suitable component) that is configured to be used to mix injectate. Once the injectate is produced, FIG. 22A shows that it can be sent to a supply device (e.g., the injectate tank 15), where its temperature can be cooled and its level can be monitored (e.g., such that new injectate can be automatically generated on demand). FIG. 22A then shows that the injectate can be sent to the injector, where it can be applied to food products. That drawing further shows that runoff injectate can be collected, run through a mixer and/or blender, and then be returned to the supply device for recirculation through the system. The following tables identify various portions of the representative systems shown in FIG. 22A and FIG. 22B-22E:

TABLE 1

(FIG. 22A)

| No. | Element |
|---|---|
| 600 | MIX SKID |
| 602 | POWDER IN |
| 605 | CUSTOMER-CHILLED WATER |
| 610 | MIX TANK, 80-GALLON |
| 615 | MIX DUMP HAND VALVE |
| 620 | POWDER IN HAND VALVE |
| 625 | SHEAR PUMP |
| 630 | BATCH CONTROL HAND VALVE |
| 634 | SUPPLY SKID |
| 635 | SUPPLY TANK, 80-GALLON |
| 640 | LEVEL SENSOR |
| 645 | TEMPERATURE SENSOR |
| 650 | MANUAL PRESSURE GAUGE |
| 655 | CENTRIFUGAL PUMP |
| 660 | CUSTOMER GLYCOL IN |
| 665 | HEAT EXCHANGER |
| 670 | CUSTOMER GLYCOL OUT |
| 675 | WANNER INJECTION PUMP |
| 679 | S1000 INJECTOR |
| 680 | PRESSURE FEEDBACK SENSOR |
| 685 | ER5000 |
| 690 | BACK PRESSURE REGULATOR AIR DOME |
| 700 | PURGE/RETURN VALVE |
| 705 | SPRAY BAR |
| 710 | RUNOFF |
| 715 | MAIN INJECTION VALVES |
| 720 | DRIP PAN |
| 725 | BEEZEE SCREEN |
| 730 | RECLAIM TANK, 45 = GALLON |
| 735 | LEVEL SENSOR |
| 740 | SHEAR BLENDER |

TABLE 2

(FIGS. 22B-22E)

| No. | Element |
|---|---|
| 745 | DRY CABINET |
| 747 | PLANT 480 VAC POWER SUPPLY |
| 750 | MOUNTED POWER SWITCH |
| 755 | 480 VAC BREAKER |
| 760 | 480 VAC TO 120 VAC TRANSFORMER |
| 765 | 120 VAC FUSES |
| 770 | COOLER THERMOSTAT |
| 775 | COOLER AIR VALVE |
| 780 | NEMA 5 OUTLET |
| 785 | 480 VAC FUSES |
| 790 | 120 VAC TO 24 VDC TRANSFORMER |
| 795 | POSITIVE HOOD LIMIT SWITCH |
| 800 | NEGATIVE HOOD LIMIT SWITCH |

TABLE 2-continued (FIGS. 22B-22E)

| No. | Element |
|---|---|
| 805 | 24 V RELAY |
| 810 | SAFETY RELAY |
| 815 | PANEL TERMINAL BLOCK |
| 820 | PLC |
| 825 | PWR |
| 830 | ANALOG OUT X2 ANY |
| 835 | ANALOG IN X8 ANY |
| 840 | DIGITAL OUT X16 RELAYS |
| 845 | DIGITAL IN X16 120 VAC |
| 850 | RTD IN X6 |
| 855 | ETHERNET SWITCH |
| 860 | 5 HP VFD |
| 865 | CRADLEPOINT |
| 870 | SHEAR BLENDER |
| 875 | ANTENNAE |
| 880 | LEVEL SENSOR |
| 885 | 1 HP VFD HOOD |
| 890 | HOOD LINEAR ACTUATOR |
| 895 | 1 HP VFD W/SERVO ENCODER |
| 900 | PANEL TERMINAL BLOCK |
| 905 | PANEL TERMINAL BLOCK |
| 908 | STRONG ARM |
| 910 | ESTOP BUTTON |
| 915 | HMI |
| 920 | ESTOP BUTTON |
| 923 | WET CABINET |
| 925 | CABLE GLAND |
| 930 | CABLE GLAND |
| 935 | SOLENOID MASTER STATION |
| 940 | CABLE GLAND |
| 945 | CABLE GLAND |
| 950 | CABLE GLAND |
| 955 | CABLE GLAND |
| 960 | FIELDBUS STATION BLCEN |
| 965 | PRESSURE SENSOR |
| 970 | SS GLAND |
| 975 | ER5000 REGULATOR |
| 980 | SS GLAND |
| 985 | INTERROLL MOTOR ENCODER 24 V DC |
| 990 | INTERROLL MOTOR POWER 2.5 A 480 V 3 PHASE |
| 993 | MIX SKID |
| 995 | PLANT 480 VAC POWER SUPPLY |
| 1000 | ENCLOSURE POWER SWITCH |
| 1005 | START BUTTON |
| 1010 | STOP BUTTON |
| 1015 | SHEAR PUMP |
| 1020 | 5 HP STARTER |
| 1025 | 480 VAC FUSES |
| 1030 | 480 VAC BREAKER |
| 1035 | TEMP SENSOR |
| 1040 | LEVEL SENSOR |
| 1045 | SS GLAND |
| 1050 | FIELDBUS STATION TBEN |
| 1053 | SUPPLY SKID |
| 1055 | MOUNTED POWER SWITCH |
| 1060 | 480 VAC BREAKER |
| 1065 | 480 VAC FUSES |
| 1070 | SS GLAND |
| 1075 | PANEL TERMINAL BLOCK |
| 1080 | SAFETY RELAY |
| 1085 | ESTOP BUTTON |
| 1090 | ETHERNET SWITCH |
| 1095 | ½ HP VFD |
| 1100 | 30 HP VFD |
| 1105 | WANNER PUMP |
| 1110 | CENTRIFUGAL PUMP |
| 1115 | PLANT 480 VAC POWER SUPPLY |
| 1120 | KEY |
| 1125 | ETHERNET CABLE |
| 1130 | 4-CONDUCTOR 480 V 3Ø |
| 1135 | 1-CONDUCTOR 120 VAC ESTOP |
| 1140 | 2-CONDUCTOR 24 V DC |
| 1145 | 2-CONDUCTOR 4-20 MA |
| 1150 | 2-CONDUCTOR 120 VAC |
| 1155 | #-CONDUCTOR COMBINATION |

Figure 22H:
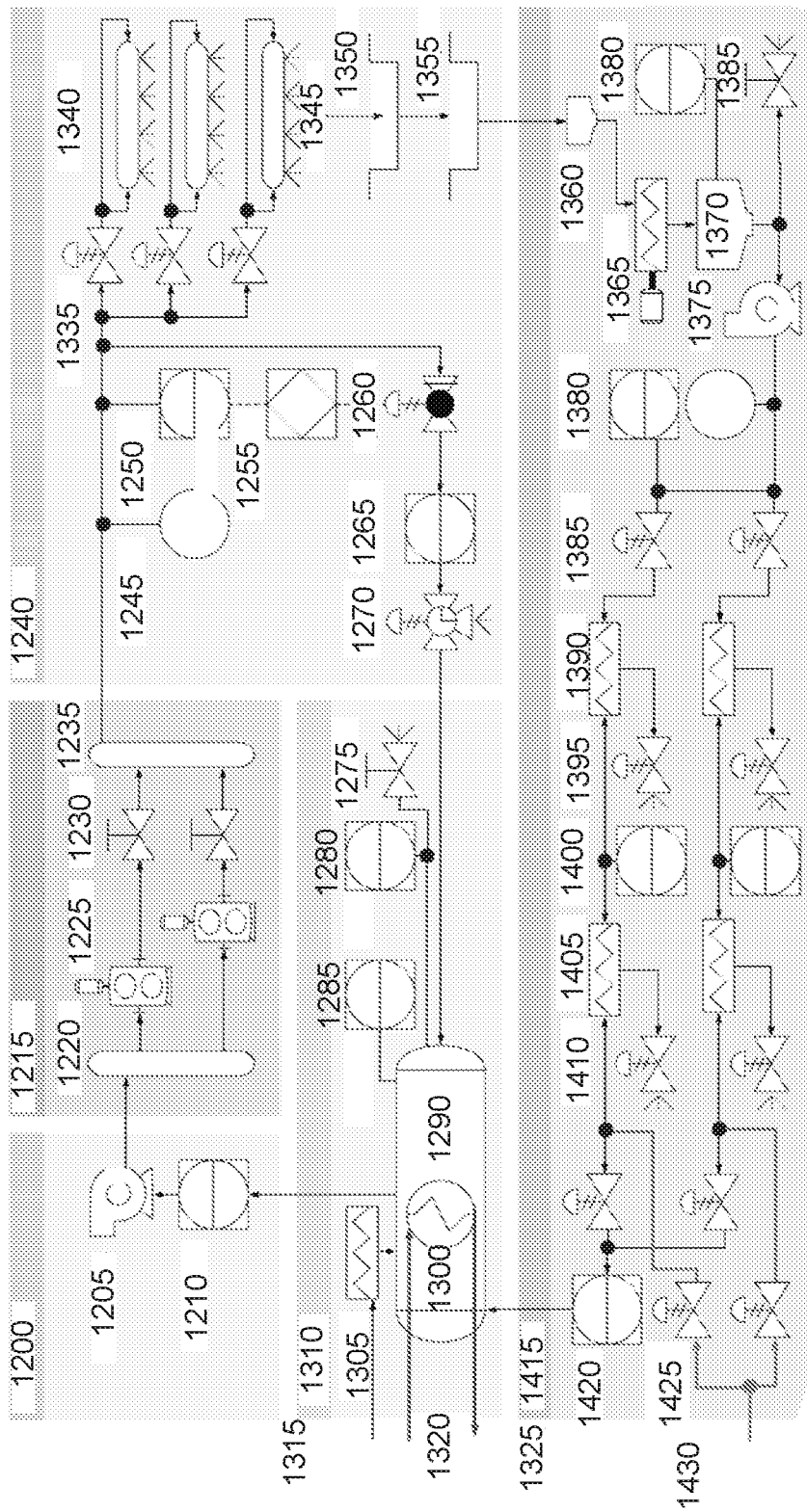
FIG. 22H illustrates a schematic view of a food treatment system in accordance with a representative embodiment.

Additionally, the following table identifies various portions of the representative embodiment of system 10 shown in FIG. 22H:

TABLE 3

(FIG. 22H)

| No. | Element |
|---|---|
| 1200 | INJECTOR |
| 1205 | FEED PUMP |
| 1210 | FLOW TRANSMITTER |
| 1215 | PUMP SKID |
| 1220 | HEADER |
| 1225 | INJECTION PUMPS |
| 1230 | ISOLATION VALVES |
| 1235 | HEADER |
| 1240 | INJECTOR |
| 1245 | INJECTION PRESSURE GAUGE |
| 1250 | INJECTION PRESSURE FEEDBACK TRANSMITTER |
| 1255 | PRESSURE CONTROLLER |
| 1260 | BACK PRESSURE REGULATOR AIR DOME |
| 1265 | PRESSURE BLEED-OFF FLOWMETER |
| 1270 | PURGE/RETURN VALVE |
| 1275 | DRAIN VALVE |
| 1280 | LEVEL TRANSMITTER |
| 1285 | TEMPERATURE TRANSMITTER |
| 1290 | INJECTION SUPPLY TANK (CLEAN) |
| 1300 | HEAT EXCHANGER |
| 1305 | WEDGE WIRE BASKET NOZZLE (E.G., 150 MM AND/OR ANY OTHER SUITABLE SIZE) |
| 1310 | TANK SKID |
| 1315 | INJECTATE IN (E.G., 10 PSI AND/OR ANY OTHER SUITABLE PRESSURE) |
| 1320 | GLYCOL IN |
| 1325 | GLYCOL OUT |
| 1335 | INJECTION VALVES |
| 1340 | NOZZLE HEADS |
| 1345 | RUNOFF |
| 1350 | CONVEYOR BED |
| 1355 | FILTER FEE RUNOFF TRAY |
| 1360 | ROTARY DRUM FEED HOPPER |
| 1365 | WEDGE WIRE ROTARY DRUM WITH SCRAPER (E.G., 300 MM AND/OR ANY OTHER SUITABLE SIZE WEDGE WIRE) |
| 1370 | FIRST STORAGE FILTER TANK |
| 1375 | FILTER PUMP |
| 1380 | PRESSURE GAUGE AND TRANSMITTER |
| 1385 | DUPLEX AUTOMATIC SWITCHOVER VALVES |
| 1390 | WEDGE WIRE CANISTER FILTERS (E.G., 200 MM AND/OR ANY OTHER SUITABLE SIZE) |
| 1395 | BACKWASH DUMP VALVES |
| 1400 | PRESSURE TRANSMITTERS |
| 1405 | WEDGE WIRE CANISTER FILTERS (E.G., 150 MM AND/OR ANY OTHER SUITABLE SIZE) |
| 1410 | BACKWASH DUMP VALVES |
| 1415 | FILTER SKID |
| 1420 | FLOW TRANSMITTER |
| 1425 | AUTOMATIC BACKWASH VALVES |
| 1430 | CLEAN WATER IN (E.G., 80 PSI AND/OR ANY OTHER SUITABLE PRESSURE) |

In addition to the aforementioned features, the described food treatment system 10 can comprise any other suitable feature. Indeed, in some embodiments, the described system is able to inject injectate into a food product without ever having the nozzles 50 touch (and potentially contaminate) the food product.

In another example, in some embodiments of the system, the injectate comprises liquid nitrogen. In this example, the liquid nitrogen can be used to freeze or chill a food item from the inside out.

In another example, some embodiments of the described system are configured in such a manner that the penetration depth of the injectate into a food item is adjustable. For instance, in some embodiments in which the food item comprises a fillet of fish, the system can be configured to inject the injectate into the fish through the cut surface, without penetrating the fish's skin that covers the opposing side of the fillet.

In still another example, in some embodiments, the described system 10 is configured to inject fluid (e.g., injectate and/or any other suitable material) into a food product to increase the weight of (e.g., pump up) such product. In this regard, the system can increase the weight of a food product through injection by any suitable amount, including, without limitation, by between about 0.01% and about 45%, or by any sub-range thereof. Indeed, in some embodiments, the system is configured to inject injectate into a food product to increase the weight of the food product by between about 1% and about 22% (e.g., by about 15%±5% (or any other amount between about 0.01% and about 45%)).

In still another example, although some conventional systems for tenderizing food products inject injectate through the use of one or more needles, which can significantly damage the food product, some embodiments of the described system 10 inject injectate into a food product without the use of needles that penetrate into the food product and (thereby) cause little to no damage to the food product. Accordingly, some embodiments of the described systems and methods are configured to waste less food product than are some conventional systems.

The described food treatment system 10 can comprise any suitable materials that allow it to function as intended. Indeed, in some embodiments, the food treatment system comprises one or more metals, plastics, types of glass, ceramics, synthetic materials, types of fiberglass, polymers, natural materials, and/or other suitable materials. Indeed, in some embodiments, one or more of the nozzle heads 125 comprise stainless steel.

The described food treatment system 10 can also be made in any suitable manner. In this regard, some non-limiting examples of methods for making the described food treatment system include, cutting, folding, bending, molding, shaping, extruding, connecting various pieces with one or more adhesives, mechanical fasteners (e.g., clamps, rivets, crimps, pins, brads, nails, staples, pegs, clips, threaded attachments, couplers, etc.), welding pieces together, connecting pieces together, and/or any other suitable method that allows the described food treatment system to perform its intended functions.

REPRESENTATIVE OPERATING ENVIRONMENT

The described systems and methods can be used with or in any suitable operating environment and/or software. In this regard, FIG. 23 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose processing unit capable of performing various different functions or one associated with a special-purpose processing unit capable of performing a limited number of functions. In this regard, in some embodiments, the PLC, PID, and/or other processing unit 75 comprises a specialized processing unit that is configured for use with the described system 10.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

Figure 23:
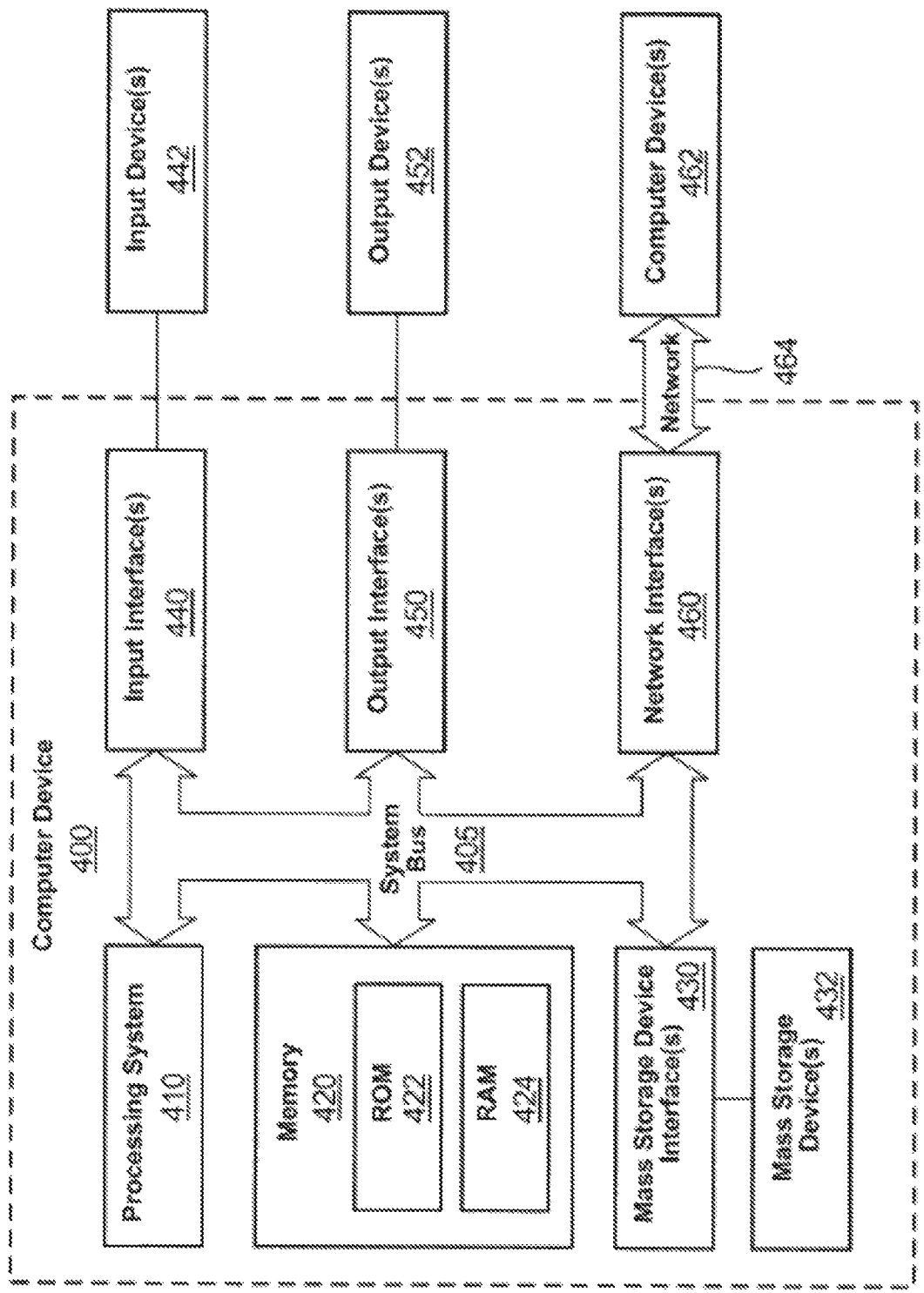
FIG. 23 illustrates a representative system that provides a suitable operating environment for use with some embodiments of the food treatment system.

With reference to FIG. 23, a representative system includes computer device 400 (e.g., a programmable controller or PLC, proportional-integral-derivative controller or PID, and/or any other suitable computing unit), which may be a general-purpose or special-purpose computer (e.g., processing unit 75). For example, computer device 400 may be a personal computer, a notebook computer, a PDA or other hand-held device, a workstation, a food treatment system 10 computer, a PID, a PLC, a minicomputer, a mainframe, a supercomputer, a multi-processor system, a network computer, a processor-based consumer device, a cellular phone, a tablet computer, a smart phone, a feature phone, a smart appliance or device, a control system, or the like.

Computer device 400 includes system bus 405, which may be configured to connect various components thereof and enables data to be exchanged between two or more components. System bus 405 may include one of a variety of bus structures including a memory bus or memory controller, a peripheral bus, or a local bus that uses any of a variety of bus architectures. Typical components connected by system bus 405 include processing system 410 and memory 420. Other components may include one or more mass storage device interfaces 430, input interfaces 440, output interfaces 450, and/or network interfaces 460, each of which will be discussed below.

Processing system 410 includes one or more processors, such as a central processor and optionally one or more other processors designed to perform a particular function or task. It is typically processing system 410 that executes the instructions provided on computer readable media, such as on the memory 420, a magnetic hard disk, a removable magnetic disk, a magnetic cassette, an optical disk, or from a communication connection, which may also be viewed as a computer readable medium.

Memory 420 includes one or more computer readable media (including, without limitation, non-transitory computer readable media) that may be configured to include or includes thereon data or instructions for manipulating data, and may be accessed by processing system 410 through system bus 405. Memory 420 may include, for example, ROM 422, used to permanently store information, and/or RAM 424, used to temporarily store information. ROM 422 may include a basic input/output system ("BIOS") having one or more routines that are used to establish communication, such as during start-up of computer device 400. RAM 424 may include one or more program modules, such as one or more operating systems, application programs, and/or program data.

One or more mass storage device interfaces 430 may be used to connect one or more mass storage devices 432 to the system bus 405. The mass storage devices 432 may be incorporated into or may be peripheral to the computer device 400 and allow the computer device 400 to retain large amounts of data. Optionally, one or more of the mass storage devices 432 may be removable from computer device 400. Examples of mass storage devices include hard disk drives, magnetic disk drives, tape drives, solid state mass storage, and optical disk drives.

Examples of solid state mass storage include flash cards and memory sticks. A mass storage device 432 may read from and/or write to a magnetic hard disk, a removable magnetic disk, a magnetic cassette, an optical disk, or another computer readable medium. Mass storage devices 432 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 440 may be employed to enable a user to enter data (e.g., initial information) and/or instructions to computer device 400 through one or more corresponding input devices 442. Examples of such input devices include a keyboard and/or alternate input devices, such as a digital camera, a sensor, bar code scanner, debit/credit card reader, signature and/or writing capture device, pin pad, touch screen, mouse, trackball, light pen, stylus, or other pointing device, a microphone, a joystick, a game pad, a scanner, a camcorder, and/or other input devices. Similarly, examples of input interfaces 440 that may be used to connect the input devices 442 to the system bus 405 include a serial port, a parallel port, a game port, a universal serial bus ("USB"), a firewire (IEEE 1394), a wireless receiver, a video adapter, an audio adapter, a parallel port, a wireless transmitter, or another interface.

One or more output interfaces 450 may be employed to connect one or more corresponding output devices 452 to system bus 405. Examples of output devices include a monitor or display screen, a speaker, a wireless transmitter, a printer, and the like. A particular output device 452 may be integrated with or peripheral to computer device 400. Examples of output interfaces include a video adapter, an audio adapter, a parallel port, and the like.

One or more network interfaces 460 enable computer device 400 to exchange information with one or more local or remote computer devices, illustrated as computer devices 462, via a network 464 that may include one or more hardwired and/or wireless links. Examples of the network interfaces include a network adapter for connection to a local area network ("LAN") or a modem, a wireless link, or another adapter for connection to a wide area network ("WAN"), such as the Internet. The network interface 460 may be incorporated with or be peripheral to computer device 400.

Figure 24:
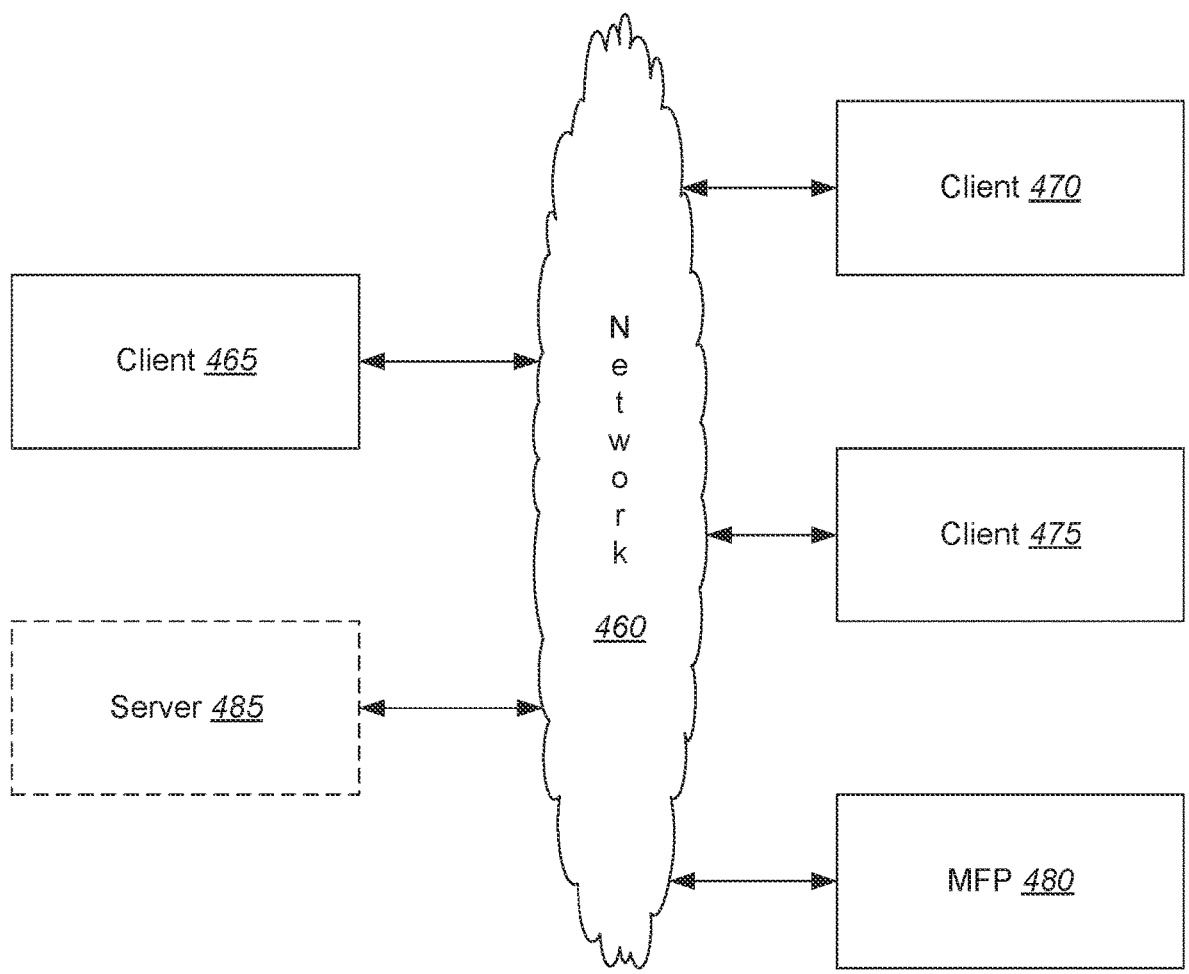
FIG. 24 illustrates a representative embodiment of a networked system that provides a suitable operating environment for use with some embodiments of the food treatment system.

In a networked system, accessible program modules or portions thereof may be stored in a remote memory storage device. Furthermore, in a networked system computer device 400 may participate in a distributed computing environment, where functions or tasks are performed by a plurality networked computer devices. While those skilled in the art will appreciate that the described systems and methods may be practiced in networked computing environments with many types of computer system configurations, FIG. 24 represents an embodiment of a portion of the described systems in a networked environment that includes clients (465, 470, 475, etc.) connected to a server 485 via a network 460. While FIG. 24 illustrates an embodiment that includes 3 clients (e.g., systems 10) connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote monitoring, observation, adjusting, trouble shooting, data collecting, system optimizing, and/or other controlling of the system 10 from many places throughout the world.

Thus, as discussed herein, embodiments of the present invention embrace food treatments. More particularly, some embodiments of the described invention relate to systems and methods for injecting (and/or otherwise applying) an injectate to a food product to: tenderize, limit microbial growth in (or provide intervention to), color, flavor, pump up, and/or otherwise treat the food product. Moreover, while the described systems and methods can include any suitable component, in some cases, they include an injectate reservoir, a filter, a first pump configured to force injectate from the injectate reservoir through the filter, a nozzle that is configured to inject injectate into a food product without having the nozzle contact the food, and a valve that is configured to selectively open and close to regulate when and how much of the injectate that passes through the filter is forced out of the nozzle. In some embodiments, the described system further includes a chiller configured to cool injectate in the reservoir, a sensor to determine a distance between the nozzle and the food item, an actuator configured to move the nozzle, and/or a computer processor that controls an amount of injectate sprayed from the nozzle.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object—regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. A needleless spray nozzle system comprising:
    a main chassis comprising a food product transport device;
    a first row of needleless spray nozzles and a second row of needleless spray nozzles that are each releasably coupled to the main chassis and that are each configured to spray and inject injectate into a food product on the food product transfer device without requiring either of the first row of needleless spray nozzles or the second row of needleless spray nozzles to contact the food product;

a coupling mechanism coupled to the first row of needless spray nozzles and the second row of needleless spray nozzles, wherein the coupling mechanism is configured to selectively couple the first row of needleless spray nozzles and the second row of needleless spray nozzles to the needleless spray nozzle system; and a first pump that is releasably coupled to the main chassis, wherein the first row of needleless spray nozzles, the second row of needleless spray nozzles and the first pump are configured to inject the injectate at a first rate, and wherein the first row of needleless spray nozzles, the second row of needleless spray nozzles, and the first pump are configured to be readily released from the main chassis and to be respectively replaced with a third row of second needleless spray nozzles, a fourth row of needleless spray nozzles, and a second pump that are configured to inject the injectate at a second rate that is different than the first rate.

2. The system of claim 1, wherein the coupling mechanism comprises a quick connect mechanism.

3. The system of claim 1, further comprising a first quick connect that is configured to selectively couple the first pump to, and to selectively decouple the first pump from, the main chassis without the use of a tool.

4. The system of claim 1, wherein the second pump, third row of needleless spray nozzles, and the fourth row of needleless spray nozzles allow the needleless spray nozzle system to inject a substantially equal amount of the injectate into each food product, while processing more than twice as much food product in a time period than possible with the first pump, the first row of needleless spray nozzles and the second row of needleless spray nozzles.

5. The system of claim 1, further comprising an electrical panel that is coupled to the main chassis and that is programmed to selectively add a variable frequency drive for the second pump.

6. A needleless spray nozzle system comprising:

a needleless spray nozzle head that is configured to spray and inject injectate into a food product without requiring the needleless spray nozzle head to contact the food product;

a recipient that is configured to receive the injectate that is injected by the needleless spray nozzle head and that is not retained within the food product;

a multi-stage filtration system for filtering the non-retained injectate that is received within the recipient, the multi-stage filtration system comprising:

a first stage of the multi-stage filtration system comprising a wedge wire rotary drum filter with a scraper having a pore size between 301 μm and about 500 μm;

a second stage of the multi-stage filtration system comprising a first wedge wire filter having a pore size of between about 75 µm and 150 µm; and a flowmeter programmed to measure a flowrate of the non-retained injectate that is received within the recipient, wherein the flowrate of the non-retained injectate is used to determine a weight pickup of the food product; and a pump that is configured to recirculate an amount of the non-retained injectate from the recipient to the needleless spray nozzle head, wherein the amount is determined responsive to the determined weight pickup of the food product.

7. The system of claim 6, further comprising a second wedge wire filter that is disposed between the first stage and the second stage.

8. The system of claim 6, further comprising a processor, wherein the processor determines the weight pickup by comparing the flowrate of the non-retained injectate with a flowrate of the injectate that passes through the needleless spray nozzle head.

9. The system of claim 8, wherein the flowrate of the non-retained injectate is used to determine a ratio of recirculated injectate injected into the food product as compared to a total injectate injected into the food product.

10. The system of claim 6, further comprising a first pressure sensor and a second pressure sensor that are configured to measure a differential pressure across a filter to determine when the filter is clogged.

11. The system of claim 10, wherein the multi-stage filtration system comprises multiple fluid branches, wherein the first mesh canister filter is coupled to a first fluid branch, wherein a redundant canister filter is coupled to a second fluid branch, and wherein the system is configured to switch fluid flow from the first fluid branch to the second fluid branch when the first and second pressure sensors determine that the first wedge wire filter is at least partially clogged.

12. The system of claim 6, wherein the multi-stage filtration system comprises a backflush system that is configured to automatically backflush the first wedge wire filter.

13. The system of claim 6, further comprising a second wedge wire canister filter, wherein the first wedge wire filter is in fluid communication with a first dump valve and the second wedge wire filter is in fluid communication with a second dump valve, and wherein the first and second dump valves are independently controllable such that the first dump valve is configured to be closed while the second dump value is opened.

14. The system of claim 6, wherein the multi-stage filtration system is disposed below the recipient so as to be configured to be gravity fed by the recipient.

15. A needleless spray nozzle system comprising:
a needleless spray nozzle head that is configured to spray and inject an injectate into a food product without requiring the needleless spray nozzle head to contact the food product;
an injectate tank;
a pump that is configured to pump the injectate from the injectate tank to and through the needleless spray nozzle head;
an injection valve that is in fluid communication with the needleless spray nozzle head and that is configured to selectively open and close to respectively allow the injectate to flow through, and to prevent the injectate from flowing through, the needleless spray nozzle head;
a pressure regulator valve; and a processor that is configured to predict when the injection valve is about to at least one of open or close and to preemptively actuate the pressure regulator valve by a predetermined amount of time prior to the injection valve at least one of opening and closing, such that the pressure regulator valve begins actuating prior to a time when the injection valve is at least one of opening and closing.

16. The system of claim 15, wherein the processor is configured to modify a speed of the pump prior to the injection valve at least one of opening and closing so as to keep a pressure of the injectate being released by the needleless spray nozzle head substantially constant as the injectate is released.

17. The system of claim 15, further comprising:
a sensor that is configured to measure a flow characteristic of the injectate as it is sprayed from the needleless spray nozzle head; and
a proportional, integral, derivative controller that is configured to received feedback from the sensor, wherein the proportional, integral, derivative controller is configured to use the feedback received from the sensor to modify operation of at least one of (i) the pump and (ii) the pressure regulator valve to keep a pressure of the injectate being released by the needleless spray nozzle head substantially constant as the injectate is sprayed.

18. A needleless spray nozzle system comprising:
a needleless spray nozzle head comprising multiple rows of spray nozzles, wherein the needleless spray nozzle head is configured to spray and inject an injectate into a food product without requiring the needleless spray nozzle head to contact the food product;
a pump that is configured to pump the injectate to and through the needleless spray nozzle head, the injection pump having a first inlet and a first outlet;
a pressure regulator valve having a second inlet and a second outlet;
a first flowmeter disposed adjacent to and at or before the first inlet of the pump;
a second flowmeter disposed adjacent to and at or after the second outlet of the pressure regulator valve; and
a processor, wherein the processor is configured to derive a difference in readings from the first and second flowmeters to determine a cloggedness of the needleless spray nozzle head; and
a food product transport configured to move the food product according to a predetermined food product movement pattern that includes moving the food product transport by a first distance followed by moving the food product transport by a second distance, wherein the second distance is different than the first distance, wherein at least one of the first distance and the second distance corresponds to a distance between the multiple rows of spray nozzles.

19. The system of claim 18, wherein the first flowmeter comprises a low pressure magnetic flowmeter.

20. The system of claim 18, wherein the second flowmeter comprises a low pressure magnetic flowmeter.

21. The system of claim 18, wherein the system is configured to determine the cloggedness of the needleless spray nozzle head without the use of a flowmeter on a high pressure conduit that feeds the injectate from the pump to the needleless spray nozzle head.

22. A needleless spray nozzle system comprising:
a first row of needleless spray nozzles that is configured to spray and inject an injectate into a food product without requiring the first row of needleless spray nozzles to contact the food product;

a second row of needleless spray nozzles that is configured to spray and inject the injectate into the food product without requiring the second row of needleless spray nozzles to contact the food product;

a food product transport configured to move the food product according to a predetermined food product movement pattern including first movements and second movements, wherein each of the first movements is less than a distance between the first row of needleless spray nozzles and the second row of needleless spray nozzles, and each of the second movements is greater than a distance between the first row of needleless spray nozzles and the second row of needleless spray nozzles; a pump that is configured to pump the injectate to and through the first row of needleless spray nozzles and the second row of needleless spray nozzles;

an injectate recipient that is configured to receive injectate that is sprayed through at least one of the first row of needleless spray nozzles and the second row of needleless spray nozzles and that is not retained in the food product;

a pressure regulator valve;

a drain line from the pressure regulator valve to the injectate recipient;

a dwell time valve that is configured to open and close to respectively allow and prevent flow of the injectate through the first row of needleless spray nozzles and the second row of needleless spray nozzles;

a flowmeter that is configured to track an amount of the injectate that flows from the pressure regulator valve, through the drain line, and to the injectate recipient; and a processor that is configured to dynamically modulate a speed of the pump based on a flowrate of the injectate through the drain line.

23. The system of claim 22, wherein the processor is configured to automatically run the pump at a first speed when the injection valve is open and at a second speed when the injection valve is closed, the second speed being slower than the first speed.

24. The system of claim 22, wherein the processor is configured to activate the pressure regulator prior to activation of the dwell time valve to keep flow pressure through the first row of needleless spray nozzles and the second row of needleless spray nozzles substantially constant during a spray.

* * * * *